(12) United States Patent
Chung et al.

(10) Patent No.: US 12,534,452 B2
(45) Date of Patent: Jan. 27, 2026

(54) N-(1H-IMIDAZOL-2-YL)BENZAMIDE COMPOUND AND PHARMACEUTICAL COMPOSITION COMPRISING THE SAME AS ACTIVE INGREDIENT

(71) Applicant: KAINOS MEDICINE, INC., Seongnam-si (KR)

(72) Inventors: Jaeuk Chung, Seongnam-si (KR); Sunmi Kim, Seongnam-si (KR); Hanyang Cho, Seongnam-si (KR); Jiyoung Min, Seongnam-si (KR)

(73) Assignee: Kainos Medicine, Inc., Seongnam-si (KR)

( * ) Notice: Subject to any disclaimer, the term of this patent is extended or adjusted under 35 U.S.C. 154(b) by 957 days.

(21) Appl. No.: 17/764,668

(22) PCT Filed: Sep. 29, 2020

(86) PCT No.: PCT/KR2020/013397
§ 371 (c)(1),
(2) Date: Mar. 29, 2022

(87) PCT Pub. No.: WO2021/066559
PCT Pub. Date: Apr. 8, 2021

(65) Prior Publication Data
US 2022/0348560 A1 Nov. 3, 2022

Related U.S. Application Data

(60) Provisional application No. 62/909,498, filed on Oct. 2, 2019.

(51) Int. Cl.
*C07D 403/12* (2006.01)
*C07D 401/14* (2006.01)
*C07D 403/14* (2006.01)
*C07D 405/14* (2006.01)

(52) U.S. Cl.
CPC ......... *C07D 403/12* (2013.01); *C07D 401/14* (2013.01); *C07D 403/14* (2013.01); *C07D 405/14* (2013.01)

(58) Field of Classification Search
CPC .. C07D 403/12; C07D 401/14; C07D 403/14; C07D 405/14
See application file for complete search history.

(56) References Cited

U.S. PATENT DOCUMENTS

| | | | |
|---|---|---|---|
| 6,020,357 A * | 2/2000 | Pinto | C07D 249/10 548/369.7 |
| 2013/0274241 A1 | 10/2013 | Jorand-Lebrun et al. | |
| 2014/0303149 A1 | 10/2014 | Arora et al. | |
| 2015/0094305 A1 | 4/2015 | Romero et al. | |
| 2016/0326151 A1 | 11/2016 | Gummadi et al. | |
| 2016/0340366 A1 | 11/2016 | Gummadi et al. | |

FOREIGN PATENT DOCUMENTS

| | | | | |
|---|---|---|---|---|
| CN | 102617578 A | 8/2012 | | |
| WO | WO-03030902 A1 * | 4/2003 | ............. | A61P 37/06 |
| WO | 2005/110994 A2 | 11/2005 | | |
| WO | WO-2009099177 A1 * | 8/2009 | ............. | A61P 43/00 |
| WO | WO-2010132404 A1 * | 11/2010 | ............. | A61P 31/20 |
| WO | 2012/007375 A1 | 1/2012 | | |
| WO | 2012/084704 A1 | 6/2012 | | |
| WO | 2014/181287 A1 | 11/2014 | | |
| WO | 2015/048281 A1 | 4/2015 | | |
| WO | 2015/104662 A1 | 7/2015 | | |
| WO | 2015/104688 A1 | 7/2015 | | |
| WO | WO-2018184019 A1 * | 10/2018 | ........... | C07D 487/04 |

OTHER PUBLICATIONS

Chemical Abstracts Service, Columbus, Oh, US; STN database accession No. 2098722-69-9; entered STN Jun. 20, 2017; Accessed Mar. 6, 2025 (Year: 2017).*
Lindsley et al., J Med Chem, 2004, 47:5825-5828 (Year: 2004).*
Lindsley et al., Pharm Pat Analyst, 2013, 2:93-108 (Year: 2013).*
Moir et al., Tetrahedron Letters, 2019, 60: 151019 (Year: 2019).*
International Search Report of PCT/KR2020/013397 dated Jan. 19, 2021 [PCT/ISA/210].
Written Opinion of PCT/KR2020/013397 dated Jan. 19, 2021 [PCT/ISA/237].

(Continued)

*Primary Examiner* — Andrew D Kosar
*Assistant Examiner* — Jonathan D Mahlum
(74) *Attorney, Agent, or Firm* — Sughrue Mion, PLLC

(57) ABSTRACT

N-(1H-imidazol-2-yl)benzamide compound of formula (I), or a pharmaceutically acceptable salt, a prodrug, a solvate, or a stereoisomer thereof which is a novel compound exhibiting excellent inhibitory activity against IRAK-4, can be used without side effects for efficient prevention and treatment of diseases mediated by IRAK-4 receptors, particularly autoimmune diseases or lymphomas.

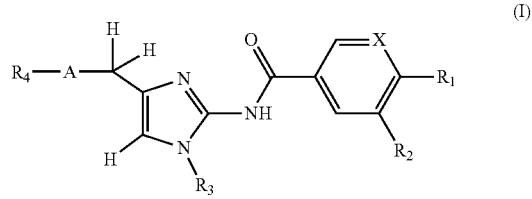

19 Claims, No Drawings

(56) References Cited

OTHER PUBLICATIONS

W. Michael Seganish, "Inhibitors of interleukin-1 receptor-associated kinase 4 (IRAK4): a patent review (2012-2015)", Expert Opinion on Therapeutic Patents, 2016, vol. 26, No. 8 pp. 917-932 (17 pages); http://dx.doi.Org/10.1080/13543776.2016.1202926.
William T. Mcelroy, "Interleukin-1 receptor-associated kinase 4 (IRAK4) inhibitors: an updated patent review (2016-2018)", Expert Opinion on Therapeutic Patents, 2019, vol. 29, No. 4, pp. 243-259 (18 pages); https://doi.Org/10.1080/13543776.2019.1597850.

* cited by examiner

N-(1H-IMIDAZOL-2-YL)BENZAMIDE COMPOUND AND PHARMACEUTICAL COMPOSITION COMPRISING THE SAME AS ACTIVE INGREDIENT

CROSS REFERENCE TO RELATED APPLICATIONS

This application is a National Stage of International Application No. PCT/KR2020/013397, filed Sep. 29, 2020, claiming priority to U.S. Provisional Application No. 62/909,498, filed Oct. 2, 2019.

TECHNICAL FIELD

The present invention relates to N-(1H-imidazol-2-yl) benzamide compound, or a pharmaceutically acceptable salt, a prodrug, a solvate, or a stereoisomer thereof, and a pharmaceutical composition comprising the same as an active ingredient which inhibit IRAK-4 (interleukin-1 receptor-associated kinase 4) activity.

BACKGROUND ART

The interleukin-1 receptor-associated kinases (IRAKs) are critically involved in the regulation of intracellular signaling networks controlling inflammation. IRAKs are expressed in many cell types and can mediate signals from various cell receptors including Toll-like receptors (TLRs).

The IRAK family is comprised of four family members IRAK-1, IRAK-2, IRAK-3/M, and IRAK-4. These proteins are characterized by a typical N-terminal death domain that mediates interaction with MyD88 (myeloid differentiation primary response gene 88)-family adaptor proteins and a centrally located kinase domain.

MyD88 binds to a protein designated IRAK (IL-1 receptor binding kinase). IRAK is subsequently phosphorylated and dissociated from the receptor complex, interacting with tumor necrosis factor receptor-associated factor 6 (TRAF-6), which transmits signals to downstream effectors. TRAF6 activates the transcription factor NF-kappa B by triggering the NIK/IKK kinase cascade. NF-kappa B regulates a number of genes, thereby regulating immune and inflammatory reactions.

The IRAK proteins, as well as MyD88, have been shown to play a role in transducing signals other than those originating from IL-1R receptors, including signals triggered by activation of IL-18 receptors and LPS (lipopolysaccharide) receptors. Out of four members in the IRAK family, IRAK-4 is a key mediator of the innate immune response orchestrated by IL-1R (interleukin-1 receptor), IL-18R (interleukin-18 receptor), IL-33R (interleukin-33 receptor), and TLRs. Since IRAK-4 is a serine/threonine kinase enzyme that plays an essential role in signal transduction by Toll/IL-1 receptors (TIRs), it is considered the "master IRAK". Under overexpression conditions, all IRAKs can mediate the activation of nuclear factor-κB (NF-κB) and stress-induced mitogen activated protein kinase (MAPK)-signaling cascades. However, IRAK-2 and IRAK-3/M are catalytically inactive, whereas IRAK-1 and IRAK-4 have kinase activity.

While IRAK-1 kinase activity may not be essential to IL-1-induced NF-kB activation, IRAK-4 requires its kinase activity for signal transduction. Given the central role of IRAK-4 in Toll-like/IL-1R signalling and immunological protection, IRAK-4 inhibitors have been implicated as valuable therapeutics in inflammatory diseases, sepsis and immune-related disorders.

Meanwhile, although pyrazolo[1,5-a]pyrimidine and thieno[3,2-d]pyrimidine derivatives (WO 2012/007375), indazolyl triazole derivatives (WO2012/084704), indazole derivatives (WO 2015/104662), bicyclic heterocyclyl derivatives (WO 2015/104688), and thiazolo[5,4-d]pyrimidine derivatives (WO 2015/048281) have been developed as an IRAK-4 kinase inhibitor, it is still required to develop a novel IRAK-4 kinase inhibitor having excellent inhibitory activity.

DISCLOSURE OF INVENTION

Technical Problem

Accordingly, the present inventors endeavored to develop a novel compound exhibiting excellent inhibitory activity against IRAK-4, and have found that N-(1-imidazol-2-yl) benzamide derivatives can be used as a therapeutic agent for autoimmune diseases and lymphoma.

It is an object of the present invention to provide N-(1H-imidazol-2-yl)benzamide compound, or a pharmaceutically acceptable salt, a prodrug, a solvate, or a stereoisomer thereof which effectively inhibits the activity of IRAK-4.

It is another object of the present invention to provide a pharmaceutical composition for preventing or treating a disease mediated by IRAK-4, comprising N-(1H-imidazol-2-yl)benzamide compound, or a pharmaceutically acceptable salt, a prodrug, a solvate, or a stereoisomer thereof, as an active ingredient.

Solution to Problem

In accordance with one aspect of the present invention, there is provided a compound of formula (I), or a pharmaceutically acceptable salt, a prodrug, a solvate, or a stereoisomer thereof:

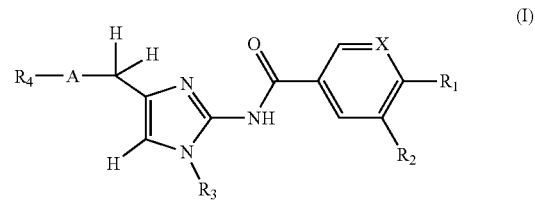

wherein $R_1$, $R_2$, $R_3$, $R_4$, A and X are as defined below.

In accordance with another aspect of the present invention, there is provided a pharmaceutical composition for preventing or treating a disease mediated by IRAK-4 (interleukin-1 receptor-associated kinase 4), comprising the compound of formula (I), or a pharmaceutically acceptable salt, a prodrug, a solvate or a stereoisomer thereof, as an active ingredient.

Advantageous Effects of Invention

The N-(1H-imidazol-2-yl)benzamide compound according to the present invention, or a pharmaceutically acceptable salt, a prodrug, a solvate, or a stereoisomer thereof which is a novel compound exhibiting excellent inhibitory activity against IRAK-4, can be used without side effects for efficient prevention and treatment of diseases mediated by IRAK-4 receptors, particularly autoimmune diseases or lymphomas.

BEST MODE FOR CARRYING OUT THE INVENTION

The present invention will be further described in detail herein below. Unless defined otherwise, all technical and scientific terms used herein have the same meaning as is commonly understood by one of skill in art to which the subject matter herein belongs. The descriptions of known functions and configurations that may unnecessarily obscure the subject matter of the present invention will be omitted.

The term "alkyl" refers to a monovalent linear- or branched-chain saturated hydrocarbon radical consisting of only carbon and hydrogen atoms, and exemplary alkyl radicals include methyl, ethyl, propyl, isopropyl, butyl, isobutyl, t-butyl, pentyl, hexyl, octyl, nonyl, or the like, but not limited thereto.

The term "aryl" refers to a monovalent radical of an aromatic ring derived from aromatic hydrocarbon by removal of a hydrogen atom, including a single- or fused ring system containing appropriately 4 to 20, preferably 5 or 10 ring atoms in each ring, and even a form in which a plurality of aryls are linked by a single bond. Exemplary aryl radicals include phenyl, naphthyl, biphenyl, anthryl, indenyl, fluorenyl, or the like, but not limited thereto.

The term "heteroaryl" refers to a monovalent radical of a heteroaromatic ring which is an aryl group containing at least one heteroatom selected from the group consisting of N, O, and S in the backbone, and carbon atoms in the rest of the backbone. The heteroaryl radical may be a 5- to 10-membered monocyclic or polycyclic ring, which is partially saturated for aromaticity. Exemplary heteroaryl radicals include pyrrolyl, pyrazolyl, quinolyl, isoquinolyl, pyridyl, pyrimidinyl, oxazolyl, thiazolyl, thiadiazolyl, triazolyl, imidazolyl, benzimidazolyl, isoxazolyl, benzisoxazolyl, thiophenyl, benzothiophenyl, furyl, benzofuryl, or the like, but not limited thereto.

The term "halo" or "halogen" refers to fluorine, chlorine, bromine or iodine atom.

The term "haloalkyl" refers to alkyl substituted by one or more halogens, and examples include trifluoromethyl or the like.

The term "arylalkyl" or "aralkyl" refers to alkyl substituted by aryl, and examples include benzyl or the like.

The term "hydroxyalkyl" refers to alkyl substituted by one or more hydroxyl groups, and examples include hydroxymethyl or the like.

The term "alkoxy" refers to an —O-alkyl radical, wherein the alkyl is as described above. Exemplary alkoxy radicals include methoxy, ethoxy, isopropoxy, butoxy, isobutoxy, t-butoxy, or the like, but not limited thereto.

The term "cycloalkyl" refers to a monovalent saturated carbocyclic radical composed of one or more rings. Exemplary cycloalkyl radicals include cyclopropyl, cyclobutyl, cyclopentyl, cyclohexyl, cycloheptyl, or the like, but not limited thereto.

The term "heterocycle" or "heterocyclic ring" refers to an aromatic or non-aromatic ring having at least one heteroatom selected from the group consisting of N, O, and S, which may be saturated or unsaturated, and a monocycle or polycycle.

The term "heterocycloalkyl" refers to a monovalent radical of a non-aromatic heterocycle containing at least one heteroatom selected from the group consisting of N, O, and S, and the non-aromatic heterocycle includes a saturated or unsaturated monocycle, polycycle or spirocycle form, and may be bonded via a heteroatom or a carbon atom. Exemplary heterocycloalkyl radicals include monovalent radicals of non-aromatic heterocycles such as aziridine, pyrrolidine, azetidine, piperidine, tetrahydropyridine, piperazine, morpholine, thiomorpholine, or the like, but not limited thereto.

In accordance with one aspect of the present invention, there is provided a compound of formula (I), or a pharmaceutically acceptable salt, a prodrug, a solvate, or a stereoisomer thereof:

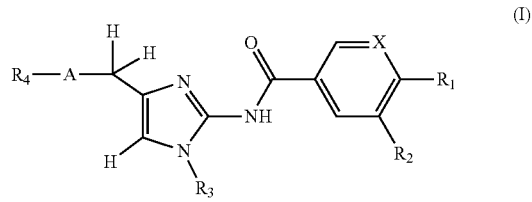

(I)

wherein

X is =CH— or =N—;

$R_1$ and $R_2$ are each independently H or 5-10 membered heteroaryl; or $R_1$ and $R_2$, together with the carbon atoms to which they are attached, form a 5-7 membered heterocyclic ring;

$R_3$ is $C_{6-10}$ aryl, 5-10 membered heteroaryl, $C_{6-10}$ aryl-$C_{1-3}$ alkyl, $C_{3-10}$ cycloalkyl, or $C_{3-10}$ cycloalkyl-$C_{1-3}$ alkyl;

A is a single bond, $C_{1-6}$ alkylene, —C(=O)—$(CH_2)_n$—, —O—C(=O)—$(CH_2)_n$—, —N(—Rx)-$(CH_2)_n$—, —N(—Rx)-C(=O)—$(CH_2)_n$—, —C(=O)—N(—Rx)-$(CH_2)_n$—, or —$(CH_2)_m$—N(—Rx)-C(=O)—$(CH_2)_n$—, wherein n is an integer of 0 to 6, m is an integer of 0 to 6, and Rx is H or $C_{1-6}$ alkyl;

$R_4$ is hydroxy, $C_{1-6}$ alkyl, hydroxy$C_{1-6}$ alkyl, $C_{1-10}$ alkoxy, amino, $C_{1-6}$ alkylamino, di$C_{1-6}$ alkylamino, $C_{6-10}$ aryl, $C_{3-10}$ cycloalkyl, 5-10 membered heteroaryl, 4-10 membered heterocycloalkyl, or $C_{6-10}$ aryl-$(CH_2)_p$-4-10 membered heterocycloalkyl, wherein p is an integer of 0 to 3;

the aryl, the cycloalkyl, the heteroaryl and the heterocycloalkyl each optionally have at least one substituent selected from the group consisting of halogen, $C_{1-6}$ alkyl, $C_{1-6}$ alkoxy, $C_{1-6}$ alkoxy-$C_{1-6}$ alkyl, halo$C_{1-3}$ alkoxy, hydroxycarbonyl, halo$C_{1-3}$ alkyl, oxido, amino, $C_{1-6}$ alkylamino, di$C_{1-6}$ alkylamino, $C_{3-6}$ cycloalkyl, 4-7 membered heterocycloalkyl, hydroxy$C_{1-6}$ alkyl, cyano, $C_{1-6}$ alkylcarbonyl, $C_{1-6}$ alkylsulfonyl, oxo, nitro, $C_{1-6}$ alkoxycarbonyloxy-$C_{1-6}$ alkyl, and trimethylsilylethoxymethyl; and the heterocyclic ring, the heteroaryl and the heterocycloalkyl each contain at least one heteroatom selected from the group consisting of N, O and S.

In an embodiment of the compound of formula (I), $R_1$ is H; and $R_2$ is H or 5-10 membered heteroaryl containing at least one nitrogen atom, wherein the heteroaryl optionally has one or two substituents selected from the group consisting of halogen, $C_{1-6}$ alkyl, $C_{1-6}$ alkoxy-$C_{1-6}$ alkyl, halo$C_{1-3}$ alkyl, amino, nitro, $C_{1-6}$ alkoxycarbonyloxy-$C_{1-6}$ alkyl, and trimethylsilylethoxymethyl; or $R_1$ and $R_2$, together with the carbon atoms to which they are attached, form a 5-7 membered heterocyclic ring containing one or two nitrogen atoms.

In an embodiment of $R_1$ and $R_2$, the heteroaryl is pyrazolyl, isoxazolyl, pyridinyl, indolyl, indazolyl, benzotriazolyl, or benzothiazolyl, each of which optionally has one or two substituents selected from the group consisting of fluoro, methyl, 1-ethoxyethyl, 2-ethoxypropan-2-yl, fluoromethyl, difluoromethyl, trifluoromethyl, amino, nitro, methoxycarbonyloxymethyl, ethoxycarbonyloxymethyl, and trimethylsilylethoxymethyl.

In an embodiment, $R_3$ is $C_{6-10}$ aryl, $C_{6-10}$ aryl-$C_{1-3}$ alkyl, 5-6 membered heteroaryl containing nitrogen atom, $C_{5-7}$ cycloalkyl, or $C_{5-7}$ cycloalkyl-$C_{1-3}$ alkyl, wherein the aryl optionally has one or two substituents selected from halogens.

In another embodiment of the compound of formula (I), $R_3$ is phenyl, fluorophenyl, difluorophenyl, chlorophenyl, bromophenyl, benzyl, pyridinyl, cyclohexyl, or cyclohexylmethyl.

In an embodiment of the compound of formula (I), $R_4$ is hydroxy, $C_{1-3}$ alkyl, hydroxy$C_{1-6}$ alkyl, hydroxy-halo$C_{1-6}$ alkyl, $C_{1-6}$ alkoxy, amino, $C_{1-3}$ alkylamino, di$C_{1-3}$ alkylamino, $C_{3-8}$ cycloalkyl, $C_{6-10}$ aryl, 5-9 membered heteroaryl, 4-9 membered heterocycloalkyl, phenyl-5-7 membered heterocycloalkyl, or benzyl-5-7 membered heterocycloalkyl, wherein the aryl, the cycloalkyl, the heteroaryl and the heterocycloalkyl each optionally have at least one substituent selected from the group consisting of halogen, $C_{1-6}$ alkyl, $C_{1-6}$ alkoxy, $C_{1-6}$ alkoxy-$C_{1-6}$ alkyl, halo$C_{1-3}$ alkoxy, hydroxycarbonyl, halo$C_{1-3}$ alkyl, oxido, amino, $C_{1-6}$ alkylamino, di$C_{1-6}$ alkylamino, $C_{3-6}$ cycloalkyl, 4-7 membered heterocycloalkyl, hydroxy$C_{1-6}$ alkyl, cyano, $C_{1-3}$ alkylcarbonyl, $C_{1-3}$ alkylsulfonyl and oxo, and the heteroaryl and the heterocycloalkyl each contain at least one heteroatom selected from the group consisting of N, O and S.

In an embodiment of $R_4$, the aryl is phenyl; the cycloalkyl is cyclopropyl, cyclobutyl, or cyclohexyl; the heteroaryl is pyridinyl, triazolyl, pyrazinyl, pyrazolyl, or indazolyl; and the heterocycloalkyl is piperidinyl, piperazinyl, pyrrolidinyl, morpholino, thiomorpholino, tetrahydropyranyl, tetrahydrofuranyl, azepanyl, or diazepanyl.

In another embodiment of $R_4$, the substituent is selected from the group consisting of fluoro, methyl, t-butoxy, methoxy, methoxymethyl, trifluoromethoxy, hydroxycarbonyl, trifluoromethyl, oxido, amino, methylamino, dimethylamino, cyclopropyl, cyclohexyl, pyrrolidinyl, hydroxyethyl, cyano, methylcarbonyl, methylsulfonyl, and oxo.

In an embodiment of the compound of formula (I), $R_4$ may have at least one N atom, in which case it may be connected to the group A through the N atom of either of them. Examples of such $R_4$ include ((1R,4R)-4-hydroxycyclohexyl)amino, ((tetrahydro-2H-pyran-4-yl)methyl)amino, ((tetrahydrofuran-3-yl)methyl)amino, (2-(4-methylpiperazin-1-yl)ethyl)amino, (2-(dimethylamino)ethyl)amino, (2-(piperidin-1-yl)ethyl)amino, (2-fluorophenyl)amino, (2-hydroxy-2-methylpropyl)amino, (2-hydroxyethyl)amino, (2-morpholinoethyl)amino, (2R,5R)-2,5-dimethylpyrrolidin-1-yl, (2S,6R)-2,6-dimethylpiperidin-1-yl, (3-(4-methylpiperazin-1-yl)propyl)amino, (3-(dimethylamino)propyl) amino, (3-(piperidin-1-yl)propyl)amino, (3-hydroxy-3-methylbutyl)amino, (3-hydroxypropyl)amino, (4-(dimethylamino)cyclohexyl)amino, (4-(dimethylamino) phenyl)amino, (4-(trifluoromethoxy)benzyl)piperazin-1-yl, (4-methoxycyclohexyl)amino, (4-methylpiperazin-1-yl) amino, piperidin-1-yl, (R)-(2-(methoxymethyl)pyrrolidin-1-yl)amino, (R)-(2-fluoro-3-hydroxy-3-methylbutyl)amino, (R)-(2-hydroxyethyl)piperidin-1-yl, (R)-2-(methoxymethyl) pyrrolidin-1-yl)amino, (R)-2-(trifluoromethyl)piperidin-1-yl, (R)-2-methylpiperidin-1-yl, (R)-3-aminopiperidin-1-yl, (R)-piperidin-1-yl-3-carboxylic acid, (S)-(2-(methoxymethyl)pyrrolidin-1-yl)amino, (S)-2-(methoxymethyl)pyrrolidin-1-yl, (S)-2-(methoxymethyl)pyrrolidin-1-yl)amino, (S)-2-(methoxymethyl)pyrrolidine, (S)-2-(trifluoromethyl) piperidin-1-yl, (S)-2-2-methylpiperidin-1-yl, (S)-2-methylpiperidin-1-yl, (S)-piperidin-1-yl-3-carboxylic acid, (S)-piperidin-1-yl-3-carboxylic acid, (S)-piperidin-1-yl-3-carboxylic acid, (S)-pyrrolidin-1-yl-3-carboxylic acid, (tetrahydrofuran-3-yl)amino, 2-methylpiperidin-1-yl, 2-oxopiperidin-1-yl, 2,5-dioxopyrrolidin-1-yl, 3-hydroxypiperidin-1-yl, 3,3-difluoropiperidin-1-yl, 3,3-dimethylpiperidin-1-yl, 4-(1-methylpiperidin-4-yl)amino, 4-(dimethylamino)piperidin-1-yl, 4-(methylsulfonyl)piperazin-1-yl, 4-(pyrrolidin-1-yl)piperidin-1-yl, 4-(tert-butyl)piperazin-1-yl, 4-acetylpiperazin-1-yl, 4-aminopiperidin-1-yl, 4-cyanopiperidin-1-yl, 4-cyclohexylpiperazin-1-yl, 4-cyclopropylpiperazin-1-yl, 4-ethylpiperazin-1-yl, 4-hydroxypiperidin-1-yl, 4-isopropylpiperazin-1-yl, 4-methoxypiperidin-1-yl, 4-methyl-1,4-diazepan-1-yl, 4-methylpiperazin-1-yl, 4-morpholino, 4-phenylpiperazin-1-yl, 4,4-dimethylpiperidin-1-yl, cyclobutylamino, cyclohexylamino, cyclopropanecarboxamido, cyclopropyl(methyl)amino, cyclopropylamino, methyl(4-methylpiperazin-1-yl)amino, methylamino, morpholino-N-oxide, N-morpholino, piperazin-1-yl, piperidin-1-yl-N-oxide, piperidin-1-ylamino, pyrrolidin-1-yl, pyrrolidin-1-ylamino, thiomorpholino, and the like, but are not limited thereto.

In an embodiment of the compound of formula (I), at least one of $R_1$, $R_2$, $R_3$, $R_4$ may include a heteroaryl containing one or more heteroatoms selected from N, S and O. Examples of such moiety include pyridin-4-yl, pyridin-3-yl, pyridin-2-yl, isoxazol-4-yl, benzo[d]thiazol-6-yl, benzo[d]thiazol-5-yl, 7-(5-fluoro-1H-pyrazole), 6-aminopyridin-3-yl, 5-fluoro-1H-pyrazol-4-yl, 5-fluoro-1H-pyrazol-4-yl, 5-fluoro-1-methyl-1H-pyrazol-4-yl, 5-(1H-indazole), 4-pyridyl, 4-(1H-pyrazole), 4-(1H-pyrazol-3-amine), 4-(1H-indazole), 4-(1-SEM-1H-pyrazole), 4-(1-methyl-1H-pyrazole), 4-(1-(1-ethoxyethyl)-1H-pyrazole), 4-((1H-pyrazol-1-yl)methyl methyl carbonate), 4-((1H-pyrazol-1-yl)methyl ethyl carbonate), 3-nitro-1H-pyrazol-4-yl, 3-(trifluoromethyl)-1H-pyrazol-4-yl, 1H-pyrazol-4-yl, 1H-indol-5-yl, 1H-indazol-6-yl, 1H-indazol-5-yl, 1H-indazol-4-yl, 1H-benzo[d][1,2,3]triazol-5-yl, 1-methyl-1H-pyrazol-4-yl, 1-methyl-1H-indazol-5-yl, 1-(trifluoromethyl)-1H-pyrazol-4-yl, 1-(fluoromethyl)-1H-pyrazol-4-yl, 1-(difluoromethyl)-1H-pyrazol-4-yl, 1-(2-ethoxypropan-2-yl)-1H-pyrazol-4-yl, 1-(1-ethoxyethyl)-1H-pyrazol-4-yl, and the like, but are not limited thereto.

Exemplary compounds of the present invention are:
1) 3-(3-nitro-1H-pyrazol-4-yl)-N-(4-(3-oxo-3-(phenylamino)propyl)-1-phenyl-1H-imidazol-2-yl)benzamide;
2) 3-(3-amino-1H-pyrazol-4-yl)-N-(4-(3-oxo-3-(phenylamino)propyl)-1-phenyl-1H-imidazol-2-yl)benzamide;
3) N-(4-(3-oxo-3-(phenylamino)propyl)-1-phenyl-1H-imidazol-2-yl)-3-(3-(trifluoromethyl)-1H-pyrazol-4-yl)benzamide;
4) N-(4-(3-oxo-3-(phenylamino)propyl)-1-phenyl-1H-imidazol-2-yl)-5-(1H-pyrazol-4-yl)nicotinamide;
5) 3-(isoxazol-4-yl)-N-(4-(3-oxo-3-(phenylamino)propyl)-1-phenyl-1H-imidazol-2-yl)benzamide;
6) N-(4-(3-oxo-3-(phenylamino)propyl)-1-phenyl-1H-imidazol-2-yl)-3-(1H-pyrazol-4-yl)benzamide;
7) 3-(2-(3-(1H-pyrazol-4-yl)benzamido)-1-phenyl-1H-imidazol-4-yl)propanoic acid;
8) N-(4-(3-oxo-3-(piperidin-1-ylamino)propyl)-1-phenyl-1H-imidazol-2-yl)-3-(1H-pyrazol-4-yl)benzamide;
9) N-(4-(3-((4-methylpiperazin-1-yl)amino)-3-oxopropyl)-1-phenyl-1H-imidazol-2-yl)-3-(1H-pyrazol-4-yl)benzamide;

10) N-(4-(3-((4-fluorophenyl)amino)-3-oxopropyl)-1-phenyl-1H-imidazol-2-yl)-3-(1H-pyrazol-4-yl)benzamide;
11) N-(4-(3-morpholino-3-oxopropyl)-1-phenyl-1H-imidazol-2-yl)-3-(1H-pyrazol-4-yl)benzamide;
12) N-(4-(3-oxo-3-(piperidin-1-yl)propyl)-1-phenyl-1H-imidazol-2-yl)-3-(1H-pyrazol-4-yl)benzamide;
13) (S)—N-(4-(3-((2-(methoxymethyl)pyrrolidin-1-yl)amino)-3-oxopropyl)-1-phenyl-1H-imidazol-2-yl)-3-(1H-pyrazol-4-yl)benzamide;
14) N-(4-(3-oxo-3-(4-(4-(trifluoromethoxy)benzyl)piperazin-1-yl)propyl)-1-phenyl-1H-imidazol-2-yl)-3-(1H-pyrazol-4-yl)benzamide;
15) N-(4-(3-oxo-3-(pyridin-2-ylamino)propyl)-1-phenyl-1H-imidazol-2-yl)-3-(1H-pyrazol-4-yl)benzamide;
16) N-(4-(3-((2,4-difluorophenyl)amino)-3-oxopropyl)-1-phenyl-1H-imidazol-2-yl)-3-(1H-pyrazol-4-yl)benzamide;
17) (R)—N-(4-(3-((2-(methoxymethyl)pyrrolidin-1-yl)amino)-3-oxopropyl)-1-phenyl-1H-imidazol-2-yl)-3-(1H-pyrazol-4-yl)benzamide;
18) methyl 3-(2-(3-(1H-pyrazol-4-yl)benzamido)-1-phenyl-1H-imidazol-4-yl)propanoate;
19) (S)—N-(4-(3-(2-(methoxymethyl)pyrrolidin-1-yl)-3-oxopropyl)-1-phenyl-1H-imidazol-2-yl)-3-(1H-pyrazol-4-yl)benzamide;
20) (R)—N-(4-(3-(2-(methoxymethyl)pyrrolidin-1-yl)-3-oxopropyl)-1-phenyl-1H-imidazol-2-yl)-3-(1H-pyrazol-4-yl)benzamide;
21) N-(4-(3-((4H-1,2,4-triazol-4-yl)amino)-3-oxopropyl)-1-phenyl-1H-imidazol-2-yl)-3-(1H-pyrazol-4-yl)benzamide;
22) N-(4-(3-oxo-3-(pyrazin-2-ylamino)propyl)-1-phenyl-1H-imidazol-2-yl)-3-(1H-pyrazol-4-yl)benzamide;
23) (R)—N-(4-(3-(2-methylpyrrolidin-1-yl)-3-oxopropyl)-1-phenyl-1H-imidazol-2-yl)-3-(1H-pyrazol-4-yl)benzamide;
24) (S)—N-(4-(3-(2-methylpyrrolidin-1-yl)-3-oxopropyl)-1-phenyl-1H-imidazol-2-yl)-3-(1H-pyrazol-4-yl)benzamide;
25) (R)-1-(3-(2-(3-(1H-pyrazol-4-yl)benzamido)-1-phenyl-1H-imidazol-4-yl)propanoyl)pyrrolidine-3-carboxylic acid;
26) (S)-1-(3-(2-(3-(1H-pyrazol-4-yl)benzamido)-1-phenyl-1H-imidazol-4-yl)propanoyl)pyrrolidine-3-carboxylic acid;
27) N-(4-(3-oxo-3-(pyrrolidin-1-ylamino)propyl)-1-phenyl-1H-imidazol-2-yl)-3-(1H-pyrazol-4-yl)benzamide;
28) N-(4-(3-oxo-3-(pyrrolidin-1-yl)propyl)-1-phenyl-1H-imidazol-2-yl)-3-(1H-pyrazol-4-yl)benzamide;
29) N-(4-(3-((2R,5R)-2,5-dimethylpyrrolidin-1-yl)-3-oxopropyl)-1-phenyl-1H-imidazol-2-yl)-3-(1H-pyrazol-4-yl)benzamide;
30) (R)—N-(4-(3-(2-methylpiperidin-1-yl)-3-oxopropyl)-1-phenyl-1H-imidazol-2-yl)-3-(1H-pyrazol-4-yl)benzamide;
31) (S)—N-(4-(3-(2-methylpiperidin-1-yl)-3-oxopropyl)-1-phenyl-1H-imidazol-2-yl)-3-(1H-pyrazol-4-yl)benzamide;
32) N-(4-(3-((2R,6S)-2,6-dimethylpiperidin-1-yl)-3-oxopropyl)-1-phenyl-1H-imidazol-2-yl)-3-(1H-pyrazol-4-yl)benzamide;
33) N-(4-(3-(methylamino)-3-oxopropyl)-1-phenyl-1H-imidazol-2-yl)-3-(1H-pyrazol-4-yl)benzamide;
34) N-(4-(3-(3,3-dimethylpiperidin-1-yl)-3-oxopropyl)-1-phenyl-1H-imidazol-2-yl)-3-(1H-pyrazol-4-yl)benzamide;
35) N-(4-(3-(4,4-dimethylpiperidin-1-yl)-3-oxopropyl)-1-phenyl-1H-imidazol-2-yl)-3-(1H-pyrazol-4-yl)benzamide;
36) (S)-1-(3-(2-(3-(1H-pyrazol-4-yl)benzamido)-1-phenyl-1H-imidazol-4-yl)propanoyl)piperidine-3-carboxylic acid;
37) (S)-1-(3-(2-(3-(1H-pyrazol-4-yl)benzamido)-1-phenyl-1H-imidazol-4-yl)propanoyl)piperidine-3-carboxylic acid;
38) (S)—N-(4-(3-oxo-3-(2-(trifluoromethyl)piperidin-1-yl)propyl)-1-phenyl-1H-imidazol-2-yl)-3-(1H-pyrazol-4-yl)benzamide;
39) (R)—N-(4-(3-oxo-3-(2-(trifluoromethyl)piperidin-1-yl)propyl)-1-phenyl-1H-imidazol-2-yl)-3-(1H-pyrazol-4-yl)benzamide;
40) (R)—N-(4-(3-(3-aminopiperidin-1-yl)-3-oxopropyl)-1-phenyl-1H-imidazol-2-yl)-3-(1H-pyrazol-4-yl)benzamide;
41) N-(4-(2-(methylamino)-2-oxoethyl)-1-phenyl-1H-imidazol-2-yl)-3-(1H-pyrazol-4-yl)benzamide;
42) methyl 2-(2-(3-(1H-pyrazol-4-yl)benzamido)-1-phenyl-1H-imidazol-4-yl)acetate;
43) 2-(2-(3-(1H-pyrazol-4-yl)benzamido)-1-phenyl-1H-imidazol-4-yl)acetic acid;
44) (S)—N-(4-(2-((2-(methoxymethyl)pyrrolidin-1-yl)amino)-2-oxoethyl)-1-phenyl-1H-imidazol-2-yl)-3-(1H-pyrazol-4-yl)benzamide;
45) (R)—N-(4-(2-((2-(methoxymethyl)pyrrolidin-1-yl)amino)-2-oxoethyl)-1-phenyl-1H-imidazol-2-yl)-3-(1H-pyrazol-4-yl)benzamide;
46) (S)—N-(4-(2-(2-(methoxymethyl)pyrrolidin-1-yl)-2-oxoethyl)-1-phenyl-1H-imidazol-2-yl)-3-(1H-pyrazol-4-yl)benzamide;
47) (R)—N-(4-(2-(2-(methoxymethyl)pyrrolidin-1-yl)-2-oxoethyl)-1-phenyl-1H-imidazol-2-yl)-3-(1H-pyrazol-4-yl)benzamide;
48) N-(4-(2-(methylamino)-2-oxoethyl)-1-phenyl-1H-imidazol-2-yl)-4-(1H-pyrazol-4-yl)benzamide;
49) N-(4-(2-(methylamino)-2-oxoethyl)-1-phenyl-1H-imidazol-2-yl)-1H-indazole-5-carboxamide;
50) N-(4-(2-(methylamino)-2-oxoethyl)-1-phenyl-1H-imidazol-2-yl)benzamide;
51) N-(4-(2-(methylamino)-2-oxoethyl)-1-phenyl-1H-imidazol-2-yl)nicotinamide;
52) N-(4-(4-oxo-4-(phenylamino)butyl)-1-phenyl-1H-imidazol-2-yl)-3-(1H-pyrazol-4-yl)benzamide;
53) (S)—N-(4-(4-((2-(methoxymethyl)pyrrolidin-1-yl)amino)-4-oxobutyl)-1-phenyl-1H-imidazol-2-yl)-3-(1H-pyrazol-4-yl)benzamide;
54) (R)—N-(4-(4-((2-(methoxymethyl)pyrrolidin-1-yl)amino)-4-oxobutyl)-1-phenyl-1H-imidazol-2-yl)-3-(1H-pyrazol-4-yl)benzamide;
55) (S)—N-(4-(4-(2-(methoxymethyl)pyrrolidin-1-yl)-4-oxobutyl)-1-phenyl-1H-imidazol-2-yl)-3-(1H-pyrazol-4-yl)benzamide;
56) (R)—N-(4-(4-(2-(methoxymethyl)pyrrolidin-1-yl)-4-oxobutyl)-1-phenyl-1H-imidazol-2-yl)-3-(1H-pyrazol-4-yl)benzamide;
57) 4-(2-(3-(1H-pyrazol-4-yl)benzamido)-1-phenyl-1H-imidazol-4-yl)butanoic acid;
58) methyl 4-(2-(3-(1H-pyrazol-4-yl)benzamido)-1-phenyl-1H-imidazol-4-yl)butanoate;
59) N-(4-(4-oxo-4-(piperidin-1-yl)butyl)-1-phenyl-1H-imidazol-2-yl)-3-(1H-pyrazol-4-yl)benzamide;
60) N-(4-(4-(methylamino)-4-oxobutyl)-1-phenyl-1H-imidazol-2-yl)-3-(1H-pyrazol-4-yl)benzamide;

61) (R)—N-(4-(4-(2-methylpiperidin-1-yl)-4-oxobutyl)-1-phenyl-1H-imidazol-2-yl)-3-(1H-pyrazol-4-yl)benzamide;
62) (S)—N-(4-(4-(2-methylpiperidin-1-yl)-4-oxobutyl)-1-phenyl-1H-imidazol-2-yl)-3-(1H-pyrazol-4-yl)benzamide;
63) N-(4-(4-((2R,6S)-2,6-dimethylpiperidin-1-yl)-4-oxobutyl)-1-phenyl-1H-imidazol-2-yl)-3-(1H-pyrazol-4-yl)benzamide;
64) N-(4-(4-((4-fluorophenyl)amino)-4-oxobutyl)-1-phenyl-1H-imidazol-2-yl)-3-(1H-pyrazol-4-yl)benzamide;
65) N-(4-(4-((2-fluorophenyl)amino)-4-oxobutyl)-1-phenyl-1H-imidazol-2-yl)-3-(1H-pyrazol-4-yl)benzamide;
66) N-(4-(4-((2,4-difluorophenyl)amino)-4-oxobutyl)-1-phenyl-1H-imidazol-2-yl)-3-(1H-pyrazol-4-yl)benzamide;
67) N-(4-(4-(cyclopropylamino)-4-oxobutyl)-1-phenyl-1H-imidazol-2-yl)-3-(1-((2-(trimethylsilyl)ethoxy)methyl)-1H-pyrazol-4-yl)benzamide;
68) N-(4-(4-(cyclopropylamino)-4-oxobutyl)-1-phenyl-1H-imidazol-2-yl)-3-(1H-pyrazol-4-yl)benzamide;
69) N-(4-(4-(cyclobutylamino)-4-oxobutyl)-1-phenyl-1H-imidazol-2-yl)-3-(1H-pyrazol-4-yl)benzamide;
70) isopropyl 4-(2-(3-(1H-pyrazol-4-yl)benzamido)-1-phenyl-1H-imidazol-4-yl)butanoate;
71) N-(4-(4-(cyclopropyl(methyl)amino)-4-oxobutyl)-1-phenyl-1H-imidazol-2-yl)-3-(1H-pyrazol-4-yl)benzamide;
72) N-(4-(4-(cyclopropylamino)-4-oxobutyl)-1-phenyl-1H-imidazol-2-yl)-3-(1-(1-ethoxyethyl)-1H-pyrazol-4-yl)benzamide;
73) N-(4-(4-(cyclopropylamino)-4-oxobutyl)-1-phenyl-1H-imidazol-2-yl)-3-(1-(2-ethoxypropan-2-yl)-1H-pyrazol-4-yl)benzamide;
74) (4-(3-((4-(4-(cyclopropylamino)-4-oxobutyl)-1-phenyl-1H-imidazol-2-yl)carbamoyl)phenyl)-1H-pyrazol-1-yl)methyl methyl carbonate;
75) (4-(3-((4-(4-(cyclopropylamino)-4-oxobutyl)-1-phenyl-1H-imidazol-2-yl)carbamoyl)phenyl)-1H-pyrazol-1-yl)methyl ethyl carbonate;
76) N-(4-(5-oxo-5-(phenylamino)pentyl)-1-phenyl-1H-imidazol-2-yl)-3-(1H-pyrazol-4-yl)benzamide;
77) methyl 5-(2-(3-(1H-pyrazol-4-yl)benzamido)-1-phenyl-1H-imidazol-4-yl)pentanoate;
78) 5-(2-(3-(1H-pyrazol-4-yl)benzamido)-1-phenyl-1H-imidazol-4-yl)pentanoic acid;
79) N-(4-(5-oxo-5-(piperidin-1-yl)pentyl)-1-phenyl-1H-imidazol-2-yl)-3-(1H-pyrazol-4-yl)benzamide;
80) N-(4-(5-(methylamino)-5-oxopentyl)-1-phenyl-1H-imidazol-2-yl)-3-(1H-pyrazol-4-yl)benzamide;
81) N-(4-(5-((2R,6S)-2,6-dimethylpiperidin-1-yl)-5-oxopentyl)-1-phenyl-1H-imidazol-2-yl)-3-(1H-pyrazol-4-yl)benzamide;
82) (S)—N-(4-(5-(2-methylpiperidin-1-yl)-5-oxopentyl)-1-phenyl-1H-imidazol-2-yl)-3-(1H-pyrazol-4-yl)benzamide;
83) (R)—N-(4-(5-(2-methylpiperidin-1-yl)-5-oxopentyl)-1-phenyl-1H-imidazol-2-yl)-3-(1H-pyrazol-4-yl)benzamide;
84) (S)—N-(4-(5-((2-(methoxymethyl)pyrrolidin-1-yl)amino)-5-oxopentyl)-1-phenyl-1H-imidazol-2-yl)-3-(1H-pyrazol-4-yl)benzamide;
85) (R)—N-(4-(5-((2-(methoxymethyl)pyrrolidin-1-yl)amino)-5-oxopentyl)-1-phenyl-1H-imidazol-2-yl)-3-(1H-pyrazol-4-yl)benzamide;
86) (S)—N-(4-(5-(2-(methoxymethyl)pyrrolidin-1-yl)-5-oxopentyl)-1-phenyl-1H-imidazol-2-yl)-3-(1H-pyrazol-4-yl)benzamide;
87) (R)—N-(4-(5-(2-(methoxymethyl)pyrrolidin-1-yl)-5-oxopentyl)-1-phenyl-1H-imidazol-2-yl)-3-(1H-pyrazol-4-yl)benzamide;
88) N-(4-(5-(cyclopropylamino)-5-oxopentyl)-1-phenyl-1H-imidazol-2-yl)-3-(1H-pyrazol-4-yl)benzamide;
89) N-(4-(5-(cyclohexylamino)-5-oxopentyl)-1-phenyl-1H-imidazol-2-yl)-3-(1H-pyrazol-4-yl)benzamide;
90) N-(4-(6-oxo-6-(phenylamino)hexyl)-1-phenyl-1H-imidazol-2-yl)-3-(1H-pyrazol-4-yl)benzamide;
91) methyl 6-(2-(3-(1H-pyrazol-4-yl)benzamido)-1-phenyl-1H-imidazol-4-yl)hexanoate;
92) 6-(2-(3-(1H-pyrazol-4-yl)benzamido)-1-phenyl-1H-imidazol-4-yl)hexanoic acid;
93) N-(4-(6-oxo-6-(piperidin-1-yl)hexyl)-1-phenyl-1H-imidazol-2-yl)-3-(1H-pyrazol-4-yl)benzamide;
94) N-(4-(6-(methylamino)-6-oxohexyl)-1-phenyl-1H-imidazol-2-yl)-3-(1H-pyrazol-4-yl)benzamide;
95) (S)—N-(4-(6-(2-methylpiperidin-1-yl)-6-oxohexyl)-1-phenyl-1H-imidazol-2-yl)-3-(1H-pyrazol-4-yl)benzamide;
96) (R)—N-(4-(6-(2-methylpiperidin-1-yl)-6-oxohexyl)-1-phenyl-1H-imidazol-2-yl)-3-(1H-pyrazol-4-yl)benzamide;
97) N-(4-(6-((2R,6S)-2,6-dimethylpiperidin-1-yl)-6-oxohexyl)-1-phenyl-1H-imidazol-2-yl)-3-(1H-pyrazol-4-yl)benzamide;
98) (S)—N-(4-(6-((2-(methoxymethyl)pyrrolidin-1-yl)amino)-6-oxohexyl)-1-phenyl-1H-imidazol-2-yl)-3-(1H-pyrazol-4-yl)benzamide;
99) (R)—N-(4-(6-((2-(methoxymethyl)pyrrolidin-1-yl)amino)-6-oxohexyl)-1-phenyl-1H-imidazol-2-yl)-3-(1H-pyrazol-4-yl)benzamide;
100) (S)—N-(4-(6-(2-(methoxymethyl)pyrrolidin-1-yl)-6-oxohexyl)-1-phenyl-1H-imidazol-2-yl)-3-(1H-pyrazol-4-yl)benzamide;
101) (R)—N-(4-(6-(2-(methoxymethyl)pyrrolidin-1-yl)-6-oxohexyl)-1-phenyl-1H-imidazol-2-yl)-3-(1H-pyrazol-4-yl)benzamide;
102) N-(1-phenyl-4-(6-(piperidin-1-yl)hexyl)-1H-imidazol-2-yl)-3-(1H-pyrazol-4-yl)benzamide;
103) N-(4-(2-hydroxyethyl)-1-phenyl-1H-imidazol-2-yl)-3-(1H-pyrazol-4-yl)benzamide;
104) N-(1-phenyl-4-(2-(piperidin-1-yl)ethyl)-1H-imidazol-2-yl)-3-(1H-pyrazol-4-yl)benzamide;
105) N-(4-(3-hydroxypropyl)-1-phenyl-1H-imidazol-2-yl)-3-(1H-pyrazol-4-yl)benzamide;
106) N-(1-phenyl-4-(3-(piperidin-1-yl)propyl)-1H-imidazol-2-yl)-3-(1H-pyrazol-4-yl)benzamide;
107) N-(4-(3-morpholinopropyl)-1-phenyl-1H-imidazol-2-yl)-3-(1H-pyrazol-4-yl)benzamide;
108) N-(4-(3-(4-methylpiperazin-1-yl)propyl)-1-phenyl-1H-imidazol-2-yl)-3-(1H-pyrazol-4-yl)benzamide;
109) N-(1-phenyl-4-(3-(phenylamino)propyl)-1H-imidazol-2-yl)-3-(1H-pyrazol-4-yl)benzamide;
110) N-(1-phenyl-4-(3-thiomorpholinopropyl)-1H-imidazol-2-yl)-3-(1H-pyrazol-4-yl)benzamide;
111) N-(4-(4-hydroxybutyl)-1-phenyl-1H-imidazol-2-yl)-3-(1H-pyrazol-4-yl)benzamide;
112) N-(1-phenyl-4-(4-(phenylamino)butyl)-1H-imidazol-2-yl)-3-(1H-pyrazol-4-yl)benzamide;
113) N-(1-phenyl-4-(4-(piperidin-1-yl)butyl)-1H-imidazol-2-yl)-3-(1H-pyrazol-4-yl)benzamide;
114) N-(4-(4-morpholinobutyl)-1-phenyl-1H-imidazol-2-yl)-3-(1H-pyrazol-4-yl)benzamide;

115) N-(1-phenyl-4-(4-thiomorpholinobutyl)-1H-imidazol-2-yl)-3-(1H-pyrazol-4-yl)benzamide;
116) N-(4-(5-hydroxypentyl)-1-phenyl-1H-imidazol-2-yl)-3-(1H-pyrazol-4-yl)benzamide;
117) N-(1-phenyl-4-(5-(phenylamino)pentyl)-1H-imidazol-2-yl)-3-(1H-pyrazol-4-yl)benzamide;
118) N-(1-phenyl-4-(5-(piperidin-1-yl)pentyl)-1H-imidazol-2-yl)-3-(1H-pyrazol-4-yl)benzamide;
119) N-(4-(5-morpholinopentyl)-1-phenyl-1H-imidazol-2-yl)-3-(1H-pyrazol-4-yl)benzamide;
120) N-(1-phenyl-4-(5-thiomorpholinopentyl)-1H-imidazol-2-yl)-3-(1H-pyrazol-4-yl)benzamide;
121) N-(4-(6-hydroxyhexyl)-1-phenyl-1H-imidazol-2-yl)-3-(1H-pyrazol-4-yl)benzamide;
122) N-(1-phenyl-4-(6-(phenylamino)hexyl)-1H-imidazol-2-yl)-3-(1H-pyrazol-4-yl)benzamide;
123) N-(4-(6-morpholinohexyl)-1-phenyl-1H-imidazol-2-yl)-3-(1H-pyrazol-4-yl)benzamide;
124) N-(1-phenyl-4-(6-thiomorpholinohexyl)-1H-imidazol-2-yl)-3-(1H-pyrazol-4-yl)benzamide;
125) 1-(6-(2-(3-(1H-pyrazol-4-yl)benzamido)-1-phenyl-1H-imidazol-4-yl)hexyl)piperidine 1-oxide;
126) 4-(3-(2-(3-(1H-pyrazol-4-yl)benzamido)-1-phenyl-1H-imidazol-4-yl)propyl)morpholine 4-oxide;
127) N-(1-phenyl-4-(6-(piperidin-1-yl)hexyl)-1H-imidazol-2-yl)-3-(1H-pyrazol-4-yl)benzamide hydrochloride;
128) N-(4-(3-morpholinopropyl)-1-phenyl-1H-imidazol-2-yl)-3-(1H-pyrazol-4-yl)benzamide hydrochloride;
129) 3-(1-methyl-TH-pyrazol-4-yl)-N-(4-(4-(4-methylpiperazin-1-yl)-4-oxobutyl)-1-phenyl-1H-imidazol-2-yl)benzamide hydrochloride;
130) N-(4-(4-(4-(dimethylamino)piperidin-1-yl)-4-oxobutyl)-1-phenyl-1H-imidazol-2-yl)-3-(1-methyl-1H-pyrazol-4-yl)benzamide hydrochloride;
131) N-(4-(4-((4-(dimethylamino)cyclohexyl)amino)-4-oxobutyl)-1-phenyl-1H-imidazol-2-yl)-3-(1-methyl-1H-pyrazol-4-yl)benzamide hydrochloride;
132) 3-(1-methyl-TH-pyrazol-4-yl)-N-(4-(4-((1-methylpiperidin-4-yl)amino)-4-oxobutyl)-1-phenyl-1H-imidazol-2-yl)benzamide hydrochloride;
133) 3-(1-methyl-TH-pyrazol-4-yl)-N-(4-(4-(4-methylpiperazin-1-yl)-4-oxobutyl)-1-phenyl-1H-imidazol-2-yl)benzamide citrate;
134) 3-(1-methyl-TH-pyrazol-4-yl)-N-(4-(4-(4-methylpiperazin-1-yl)-4-oxobutyl)-1-phenyl-1H-imidazol-2-yl)benzamide fumarate;
135) 3-(1-methyl-TH-pyrazol-4-yl)-N-(4-(4-(4-methylpiperazin-1-yl)-4-oxobutyl)-1-phenyl-1H-imidazol-2-yl)benzamide (2R,3R)-2,3-dihydroxysuccinate;
136) 3-(1-methyl-TH-pyrazol-4-yl)-N-(4-(4-(4-methylpiperazin-1-yl)-4-oxobutyl)-1-phenyl-1H-imidazol-2-yl)benzamide succinate;
137) N-(4-(4-(4-(dimethylamino)piperidin-1-yl)-4-oxobutyl)-1-phenyl-1H-imidazol-2-yl)-3-(1-methyl-1H-pyrazol-4-yl)benzamide fumarate;
138) 3-(1-(1-ethoxyethyl)-1H-pyrazol-4-yl)-N-(1-phenyl-4-(6-(piperidin-1-yl)hexyl)-1H-imidazol-2-yl)benzamide;
139) 3-(1-methyl-1H-pyrazol-4-yl)-N-(4-(4-(methylamino)-4-oxobutyl)-1-phenyl-1H-imidazol-2-yl)benzamide;
140) 4-(2-(3-(1-methyl-1H-pyrazol-4-yl)benzamido)-1-phenyl-1H-imidazol-4-yl)butanoic acid;
141) N-(4-(4-(cyclopropylamino)-4-oxobutyl)-1-phenyl-1H-imidazol-2-yl)-3-(1-methyl-1H-pyrazol-4-yl)benzamide;
142) 3-(1-methyl-TH-pyrazol-4-yl)-N-(4-(4-oxo-4-(piperidin-1-yl)butyl)-1-phenyl-1H-imidazol-2-yl)benzamide;
143) 3-(1-methyl-TH-pyrazol-4-yl)-N-(4-(4-(4-methylpiperazin-1-yl)-4-oxobutyl)-1-phenyl-1H-imidazol-2-yl)benzamide;
144) N-(4-(4-(4-ethylpiperazin-1-yl)-4-oxobutyl)-1-phenyl-1H-imidazol-2-yl)-3-(1-methyl-1H-pyrazol-4-yl)benzamide;
145) N-(4-(4-(4-isopropylpiperazin-1-yl)-4-oxobutyl)-1-phenyl-1H-imidazol-2-yl)-3-(1-methyl-1H-pyrazol-4-yl)benzamide;
146) N-(4-(4-(4-(dimethylamino)piperidin-1-yl)-4-oxobutyl)-1-phenyl-1H-imidazol-2-yl)-3-(1-methyl-1H-pyrazol-4-yl)benzamide;
147) N-(4-(4-((4-(dimethylamino)cyclohexyl)amino)-4-oxobutyl)-1-phenyl-1H-imidazol-2-yl)-3-(1-methyl-1H-pyrazol-4-yl)benzamide;
148) 3-(1-methyl-1H-pyrazol-4-yl)-N-(4-(4-((1-methylpiperidin-4-yl)amino)-4-oxobutyl)-1-phenyl-1H-imidazol-2-yl)benzamide;
149) N-(4-(4-(4-cyclopropylpiperazin-1-yl)-4-oxobutyl)-1-phenyl-1H-imidazol-2-yl)-3-(1-methyl-1H-pyrazol-4-yl)benzamide;
150) 3-(1-methyl-1H-pyrazol-4-yl)-N-(4-(4-oxo-4-(pyridin-4-ylamino)butyl)-1-phenyl-1H-imidazol-2-yl)benzamide;
151) 3-(1-methyl-1H-pyrazol-4-yl)-N-(4-(4-oxo-4-(pyrrolidin-1-ylamino)butyl)-1-phenyl-1H-imidazol-2-yl)benzamide;
152) 3-(1-methyl-1H-pyrazol-4-yl)-N-(4-(4-oxo-4-(piperidin-1-ylamino)butyl)-1-phenyl-1H-imidazol-2-yl)benzamide;
153) 3-(1-methyl-1H-pyrazol-4-yl)-N-(4-(4-((4-methylpiperazin-1-yl)amino)-4-oxobutyl)-1-phenyl-1H-imidazol-2-yl)benzamide;
154) 3-(1-methyl-1H-pyrazol-4-yl)-N-(4-(4-oxo-4-(4-(pyrrolidin-1-yl)piperidin-1-yl)butyl)-1-phenyl-1H-imidazol-2-yl)benzamide;
155) N-(4-(4-((4-(dimethylamino)phenyl)amino)-4-oxobutyl)-1-phenyl-1H-imidazol-2-yl)-3-(1-methyl-1H-pyrazol-4-yl)benzamide;
156) N-(4-(4-(((1R,4R)-4-hydroxycyclohexyl)amino)-4-oxobutyl)-1-phenyl-1H-imidazol-2-yl)-3-(1-methyl-1H-pyrazol-4-yl)benzamide;
157) 3-(1-methyl-1H-pyrazol-4-yl)-N-(4-(4-oxo-4-((tetrahydro-2H-pyran-4-yl)amino)butyl)-1-phenyl-1H-imidazol-2-yl)benzamide;
158) 3-(1-methyl-1H-pyrazol-4-yl)-N-(4-(4-oxo-4-((3-(piperidin-1-yl)propyl)amino)butyl)-1-phenyl-1H-imidazol-2-yl)benzamide;
159) 3-(1-methyl-1H-pyrazol-4-yl)-N-(4-(4-oxo-4-((2-(piperidin-1-yl)ethyl)amino)butyl)-1-phenyl-1H-imidazol-2-yl)benzamide;
160) 3-(1-methyl-1H-pyrazol-4-yl)-N-(4-(4-morpholino-4-oxobutyl)-1-phenyl-H-imidazol-2-yl)benzamide;
161) N-(4-(4-((4-methoxycyclohexyl)amino)-4-oxobutyl)-1-phenyl-1H-imidazol-2-yl)-3-(1-methyl-1H-pyrazol-4-yl)benzamide;
162) N-(4-(4-((2-(dimethylamino)ethyl)amino)-4-oxobutyl)-1-phenyl-1H-imidazol-2-yl)-3-(1-methyl-1H-pyrazol-4-yl)benzamide;
163) N-(4-(4-((3-(dimethylamino)propyl)amino)-4-oxobutyl)-1-phenyl-1H-imidazol-2-yl)-3-(1-methyl-1H-pyrazol-4-yl)benzamide;
164) N-(4-(4-((2-hydroxyethyl)amino)-4-oxobutyl)-1-phenyl-1H-imidazol-2-yl)-3-(1-methyl-1H-pyrazol-4-yl)benzamide;
165) N-(4-(4-((3-hydroxypropyl)amino)-4-oxobutyl)-1-phenyl-1H-imidazol-2-yl)-3-(1-methyl-1H-pyrazol-4-yl)benzamide;

166) 3-(1-methyl-1H-pyrazol-4-yl)-N-(4-(4-(2-methylpiperidin-1-yl)-4-oxobutyl)-1-phenyl-1H-imidazol-2-yl)benzamide;
167) N-(4-(4-(4,4-dimethylpiperidin-1-yl)-4-oxobutyl)-1-phenyl-1H-imidazol-2-yl)-3-(1-methyl-1H-pyrazol-4-yl)benzamide;
168) N-(4-(4-(4-cyanopiperidin-1-yl)-4-oxobutyl)-1-phenyl-1H-imidazol-2-yl)-3-(1-methyl-TH-pyrazol-4-yl)benzamide;
169) N-(4-(4-(4-hydroxypiperidin-1-yl)-4-oxobutyl)-1-phenyl-1H-imidazol-2-yl)-3-(1-methyl-1H-pyrazol-4-yl)benzamide;
170) N-(4-(4-((2-hydroxy-2-methylpropyl)amino)-4-oxobutyl)-1-phenyl-1H-imidazol-2-yl)-3-(1-methyl-1H-pyrazol-4-yl)benzamide;
171) N-(4-(4-((3-hydroxy-3-methylbutyl)amino)-4-oxobutyl)-1-phenyl-1H-imidazol-2-yl)-3-(1-methyl-1H-pyrazol-4-yl)benzamide;
172) 3-(1-methyl-1H-pyrazol-4-yl)-N-(4-(4-oxo-4-(((tetrahydro-2H-pyran-4-yl)methyl)amino)butyl)-1-phenyl-1H-imidazol-2-yl)benzamide;
173) 3-(1-methyl-1H-pyrazol-4-yl)-N-(4-(4-oxo-4-(4-(4-(trifluoromethoxy)benzyl)piperazin-1-yl)butyl)-1-phenyl-1H-imidazol-2-yl)benzamide;
174) (R)—N-(4-(4-(2-(2-hydroxyethyl)piperidin-1-yl)-4-oxobutyl)-1-phenyl-1H-imidazol-2-yl)-3-(1-methyl-1H-pyrazol-4-yl)benzamide;
175) N-(4-(4-(3,3-difluoropiperidin-1-yl)-4-oxobutyl)-1-phenyl-1H-imidazol-2-yl)-3-(1-methyl-1H-pyrazol-4-yl)benzamide;
176) (R)-3-(1-methyl-1H-pyrazol-4-yl)-N-(4-(4-oxo-4-(2-(trifluoromethyl)piperidin-1-yl)butyl)-1-phenyl-1H-imidazol-2-yl)benzamide;
177) N-(4-(4-(4-methoxypiperidin-1-yl)-4-oxobutyl)-1-phenyl-1H-imidazol-2-yl)-3-(1-methyl-1H-pyrazol-4-yl)benzamide;
178) N-(4-(4-(3-hydroxypiperidin-1-yl)-4-oxobutyl)-1-phenyl-1H-imidazol-2-yl)-3-(1-methyl-1H-pyrazol-4-yl)benzamide;
179) 3-(1-methyl-1H-pyrazol-4-yl)-N-(4-(4-oxo-4-((tetrahydrofuran-3-yl)amino)butyl)-1-phenyl-1H-imidazol-2-yl)benzamide;
180) 3-(1-methyl-1H-pyrazol-4-yl)-N-(4-(4-oxo-4-(((tetrahydrofuran-3-yl)methyl)amino)butyl)-1-phenyl-1H-imidazol-2-yl)benzamide;
181) N-(4-(4-(4-(tert-butyl)piperazin-1-yl)-4-oxobutyl)-1-phenyl-1H-imidazol-2-yl)-3-(1-methyl-1H-pyrazol-4-yl)benzamide;
182) N-(4-(4-(4-cyclohexylpiperazin-1-yl)-4-oxobutyl)-1-phenyl-1H-imidazol-2-yl)-3-(1-methyl-1H-pyrazol-4-yl)benzamide;
183) N-(4-(4-(4-methyl-1,4-diazepan-1-yl)-4-oxobutyl)-1-phenyl-1H-imidazol-2-yl)-3-(1-methyl-1H-pyrazol-4-yl)benzamide;
184) 3-(1-methyl-1H-pyrazol-4-yl)-N-(4-(4-((2-morpholinoethyl)amino)-4-oxobutyl)-1-phenyl-1H-imidazol-2-yl)benzamide;
185) (R)—N-(4-(4-((2-fluoro-3-hydroxy-3-methylbutyl)amino)-4-oxobutyl)-1-phenyl-1H-imidazol-2-yl)-3-(1-methyl-1H-pyrazol-4-yl)benzamide;
186) 3-(1-methyl-1H-pyrazol-4-yl)-N-(4-(4-((3-(4-methylpiperazin-1-yl)propyl)amino)-4-oxobutyl)-1-phenyl-1H-imidazol-2-yl)benzamide;
187) 3-(1-methyl-1H-pyrazol-4-yl)-N-(4-(4-((2-(4-methylpiperazin-1-yl)ethyl)amino)-4-oxobutyl)-1-phenyl-1H-imidazol-2-yl)benzamide;
188) 3-(1-methyl-1H-pyrazol-4-yl)-N-(4-(4-oxo-4-(4-phenylpiperazin-1-yl)butyl)-1-phenyl-1H-imidazol-2-yl)benzamide;
189) N-(4-(4-amino-4-oxobutyl)-1-phenyl-1H-imidazol-2-yl)-3-(1-methyl-1H-pyrazol-4-yl)benzamide;
190) N-(4-(4-(((1-methyl-1H-pyrazol-3-yl)amino)-4-oxobutyl)-1-phenyl-1H-imidazol-2-yl)-3-(1-methyl-1H-pyrazol-4-yl)benzamide;
191) N-(4-(4-(((1-methyl-1H-indazol-5-yl)amino)-4-oxobutyl)-1-phenyl-1H-imidazol-2-yl)-3-(1-methyl-1H-pyrazol-4-yl)benzamide;
192) 3-(1-methyl-1H-pyrazol-4-yl)-N-(4-(2-(methylamino)-2-oxoethyl)-1-phenyl-1H-imidazol-2-yl)benzamide;
193) 3-(1-methyl-1H-pyrazol-4-yl)-N-(4-(3-oxo-3-(phenylamino)propyl)-1-phenyl-1H-imidazol-2-yl)benzamide;
194) 3-(1-methyl-1H-pyrazol-4-yl)-N-(4-(3-(4-methylpiperazin-1-yl)-3-oxopropyl)-1-phenyl-1H-imidazol-2-yl)benzamide;
195) N-(4-(3-(4-methyl-1,4-diazepan-1-yl)-3-oxopropyl)-1-phenyl-1H-imidazol-2-yl)-3-(1-methyl-1H-pyrazol-4-yl)benzamide;
196) 3-(1-methyl-1H-pyrazol-4-yl)-N-(4-(5-(4-methylpiperazin-1-yl)-5-oxopentyl)-1-phenyl-1H-imidazol-2-yl)benzamide;
197) 3-(1-methyl-1H-pyrazol-4-yl)-N-(4-(5-oxo-5-((tetrahydro-2H-pyran-4-yl)amino)pentyl)-1-phenyl-1H-imidazol-2-yl)benzamide;
198) 3-(1-methyl-1H-pyrazol-4-yl)-N-(4-(5-((2-morpholinoethyl)amino)-5-oxopentyl)-1-phenyl-1H-imidazol-2-yl)benzamide;
199) N-(4-(6-(cyclopropylamino)-6-oxohexyl)-1-phenyl-1H-imidazol-2-yl)-3-(1-methyl-1H-pyrazol-4-yl)benzamide;
200) 3-(1-methyl-1H-pyrazol-4-yl)-N-(4-(6-oxo-6-(piperidin-1-yl)hexyl)-1-phenyl-1H-imidazol-2-yl)benzamide;
201) 3-(1-methyl-1H-pyrazol-4-yl)-N-(4-(6-(4-methylpiperazin-1-yl)-6-oxohexyl)-1-phenyl-1H-imidazol-2-yl)benzamide;
202) 3-(1-methyl-1H-pyrazol-4-yl)-N-(4-(4-oxo-4-(piperazin-1-yl)butyl)-1-phenyl-1H-imidazol-2-yl)benzamide;
203) 3-(1-methyl-1H-pyrazol-4-yl)-N-(4-(3-oxo-3-(piperazin-1-yl)propyl)-1-phenyl-1H-imidazol-2-yl)benzamide;
204) 3-(1-methyl-1H-pyrazol-4-yl)-N-(4-(5-oxo-5-(piperazin-1-yl)pentyl)-1-phenyl-1H-imidazol-2-yl)benzamide;
205) N-(4-(4-(4-acetylpiperazin-1-yl)-4-oxobutyl)-1-phenyl-1H-imidazol-2-yl)-3-(1-methyl-1H-pyrazol-4-yl)benzamide;
206) 3-(1-methyl-1H-pyrazol-4-yl)-N-(4-(4-(4-(methylsulfonyl)piperazin-1-yl)-4-oxobutyl)-1-phenyl-1H-imidazol-2-yl)benzamide;
207) (S)-1-(4-(2-(3-(1-methyl-1H-pyrazol-4-yl)benzamido)-1-phenyl-1H-imidazol-4-yl)butanoyl)piperidine-3-carboxylic acid;
208) (S)-1-(5-(2-(3-(1-methyl-1H-pyrazol-4-yl)benzamido)-1-phenyl-1H-imidazol-4-yl)pentanoyl)piperidine-3-carboxylic acid;
209) N-(4-(4-(4-aminopiperidin-1-yl)-4-oxobutyl)-1-phenyl-1H-imidazol-2-yl)-3-(1-methyl-1H-pyrazol-4-yl)benzamide;
210) (R)—N-(4-(4-(3-aminopiperidin-1-yl)-4-oxobutyl)-1-phenyl-1H-imidazol-2-yl)-3-(1-methyl-1H-pyrazol-4-yl)benzamide;
211) (S)—N-(4-(4-(3-aminopiperidin-1-yl)-4-oxobutyl)-1-phenyl-1H-imidazol-2-yl)-3-(1-methyl-1H-pyrazol-4-yl)benzamide;

212) (R)—N-(4-(4-(3-aminopyrrolidin-1-yl)-4-oxobutyl)-1-phenyl-1H-imidazol-2-yl)-3-(1-methyl-1H-pyrazol-4-yl)benzamide;
213) N-(4-(5-(4-aminopiperidin-1-yl)-5-oxopentyl)-1-phenyl-1H-imidazol-2-yl)-3-(1-methyl-1H-pyrazol-4-yl)benzamide;
214) 3-(1-methyl-1H-pyrazol-4-yl)-N-(4-(4-oxo-4-(piperidin-4-ylamino)butyl)-1-phenyl-1H-imidazol-2-yl)benzamide;
215) N-(4-(4-(((1R,4R)-4-aminocyclohexyl)amino)-4-oxobutyl)-1-phenyl-1H-imidazol-2-yl)-3-(1-methyl-1H-pyrazol-4-yl)benzamide;
216) 3-(1-methyl-1H-pyrazol-4-yl)-N-(4-(4-(4-(methylamino)piperidin-1-yl)-4-oxobutyl)-1-phenyl-1H-imidazol-2-yl)benzamide;
217) N-(4-(4-((1H-pyrazol-3-yl)amino)-4-oxobutyl)-1-phenyl-1H-imidazol-2-yl)-3-(1-methyl-1H-pyrazol-4-yl)benzamide;
218) N-(4-(4-(methyl(4-methylpiperazin-1-yl)amino)-4-oxobutyl)-1-phenyl-1H-imidazol-2-yl)-3-(1-methyl-1H-pyrazol-4-yl)benzamide;
219) 3-(1-methyl-1H-pyrazol-4-yl)-N-(1-phenyl-4-(4-(piperidin-1-yl)butyl)-1H-imidazol-2-yl)benzamide;
220) 3-(1-methyl-1H-pyrazol-4-yl)-N-(1-phenyl-4-(6-(piperidin-1-yl)hexyl)-1H-imidazol-2-yl)benzamide;
221) 3-(1-methyl-1H-pyrazol-4-yl)-N-(4-(4-(4-methylpiperazin-1-yl)butyl)-1-phenyl-1H-imidazol-2-yl)benzamide;
222) 3-(1-methyl-1H-pyrazol-4-yl)-N-(1-phenyl-4-(6-(pyrrolidin-1-yl)hexyl)-1H-imidazol-2-yl)benzamide;
223) N-(4-(6-(azepan-1-yl)hexyl)-1-phenyl-1H-imidazol-2-yl)-3-(1-methyl-1H-pyrazol-4-yl)benzamide;
224) 3-(1-methyl-1H-pyrazol-4-yl)-N-(4-(4-(2-oxopyrrolidin-1-yl)butyl)-1-phenyl-1H-imidazol-2-yl)benzamide;
225) 3-(1-methyl-1H-pyrazol-4-yl)-N-(4-(6-(2-oxopyrrolidin-1-yl)hexyl)-1-phenyl-1H-imidazol-2-yl)benzamide;
226) N-(4-(6-(2,5-dioxopyrrolidin-1-yl)hexyl)-1-phenyl-1H-imidazol-2-yl)-3-(1-methyl-1H-pyrazol-4-yl)benzamide;
227) N-(4-(4-(cyclopropanecarboxamido)butyl)-1-phenyl-1H-imidazol-2-yl)-3-(1-methyl-1H-pyrazol-4-yl)benzamide;
228) N-(4-(6-(cyclopropanecarboxamido)hexyl)-1-phenyl-1H-imidazol-2-yl)-3-(1-methyl-1H-pyrazol-4-yl)benzamide;
229) N-(4-(4-(cyclopropylamino)-4-oxobutyl)-1-phenyl-1H-imidazol-2-yl)-3-(5-fluoro-1H-pyrazol-4-yl)benzamide;
230) 3-(5-fluoro-1H-pyrazol-4-yl)-N-(4-(4-(4-methylpiperazin-1-yl)-4-oxobutyl)-1-phenyl-1H-imidazol-2-yl)benzamide;
231) 3-(5-fluoro-1H-pyrazol-4-yl)-N-(4-(4-oxo-4-(piperidin-1-yl)butyl)-1-phenyl-1H-imidazol-2-yl)benzamide;
232) N-(4-(4-(cyclopropylamino)-4-oxobutyl)-1-phenyl-1H-imidazol-2-yl)-3-(5-fluoro-1-methyl-1H-pyrazol-4-yl)benzamide;
233) N-(4-(4-(cyclopropyl(methyl)amino)-4-oxobutyl)-1-phenyl-1H-imidazol-2-yl)-3-(5-fluoro-1-methyl-1H-pyrazol-4-yl)benzamide;
234) N-(4-(4-(cyclopropylamino)-4-oxobutyl)-1-phenyl-1H-imidazol-2-yl)-3-(1-(fluoromethyl)-1H-pyrazol-4-yl)benzamide;
235) N-(4-(4-(cyclopropylamino)-4-oxobutyl)-1-phenyl-1H-imidazol-2-yl)-3-(1-(difluoromethyl)-1H-pyrazol-4-yl)benzamide;
236) N-(4-(4-(cyclopropylamino)-4-oxobutyl)-1-phenyl-1H-imidazol-2-yl)-3-(1-(trifluoromethyl)-1H-pyrazol-4-yl)benzamide;
237) 3-(1H-indazol-5-yl)-N-(4-(6-oxo-6-(piperidin-1-yl)hexyl)-1-phenyl-1H-imidazol-2-yl)benzamide;
238) N-(4-(6-(cyclopropylamino)-6-oxohexyl)-1-phenyl-1H-imidazol-2-yl)-3-(1H-indazol-5-yl)benzamide;
239) 3-(1H-indazol-5-yl)-N-(4-(6-(4-methylpiperazin-1-yl)-6-oxohexyl)-1-phenyl-1H-imidazol-2-yl)benzamide;
240) 3-(1H-indazol-5-yl)-N-(4-(6-oxo-6-(pyrrolidin-1-yl)hexyl)-1-phenyl-1H-imidazol-2-yl)benzamide;
241) N-(4-(6-(azepan-1-yl)-6-oxohexyl)-1-phenyl-1H-imidazol-2-yl)-3-(1H-indazol-5-yl)benzamide;
242) 3-(1H-benzo[d][1,2,3]triazol-5-yl)-N-(4-(6-oxo-6-(piperidin-1-yl)hexyl)-1-phenyl-1H-imidazol-2-yl)benzamide;
243) 3-(1H-indazol-5-yl)-N-(4-(2-(methylamino)-2-oxoethyl)-1-phenyl-1H-imidazol-2-yl)benzamide;
244) 3-(1H-indazol-5-yl)-N-(4-(4-(methylamino)-4-oxobutyl)-1-phenyl-1H-imidazol-2-yl)benzamide;
245) N-(4-(4-(cyclopropylamino)-4-oxobutyl)-1-phenyl-1H-imidazol-2-yl)-3-(1H-indazol-5-yl)benzamide;
246) 3-(1H-indazol-5-yl)-N-(4-(4-oxo-4-(piperidin-1-yl)butyl)-1-phenyl-1H-imidazol-2-yl)benzamide;
247) 3-(1H-indazol-5-yl)-N-(4-(4-(4-methylpiperazin-1-yl)-4-oxobutyl)-1-phenyl-1H-imidazol-2-yl)benzamide;
248) N-(4-(4-(cyclopropylamino)-4-oxobutyl)-1-phenyl-1H-imidazol-2-yl)-3-(1H-indazol-7-yl)benzamide;
249) N-(4-(4-(cyclopropylamino)-4-oxobutyl)-1-phenyl-1H-imidazol-2-yl)-3-(1H-indazol-4-yl)benzamide;
250) N-(4-(4-(cyclopropylamino)-4-oxobutyl)-1-phenyl-1H-imidazol-2-yl)-3-(1H-indazol-6-yl)benzamide;
251) 3-(1-methyl-1H-indazol-5-yl)-N-(4-(6-oxo-6-(piperidin-1-yl)hexyl)-1-phenyl-1H-imidazol-2-yl)benzamide;
252) 3-(1H-indazol-5-yl)-N-(1-phenyl-4-(6-(piperidin-1-yl)hexyl)-1H-imidazol-2-yl)benzamide;
253) 3-(1H-indol-5-yl)-N-(1-phenyl-4-(6-(piperidin-1-yl)hexyl)-1H-imidazol-2-yl)benzamide;
254) 3-(1H-indazol-5-yl)-N-(4-(6-morpholinohexyl)-1-phenyl-1H-imidazol-2-yl)benzamide;
255) 3-(1H-indazol-4-yl)-N-(1-phenyl-4-(6-(piperidin-1-yl)hexyl)-1H-imidazol-2-yl)benzamide;
256) 3-(1H-indazol-5-yl)-N-(1-phenyl-4-(4-(piperidin-1-yl)butyl)-1H-imidazol-2-yl)benzamide;
257) 3-(1H-indazol-4-yl)-N-(1-phenyl-4-(4-(piperidin-1-yl)butyl)-1H-imidazol-2-yl)benzamide;
258) 3-(1H-indazol-5-yl)-N-(4-(4-(2-oxopyrrolidin-1-yl)butyl)-1-phenyl-1H-imidazol-2-yl)benzamide;
259) 3-(1H-indazol-5-yl)-N-(4-(6-(2-oxopyrrolidin-1-yl)hexyl)-1-phenyl-1H-imidazol-2-yl)benzamide;
260) 3-(1H-indazol-5-yl)-N-(4-(6-(2-oxopiperidin-1-yl)hexyl)-1-phenyl-1H-imidazol-2-yl)benzamide;
261) N-(4-(4-(cyclopropanecarboxamido)butyl)-1-phenyl-1H-imidazol-2-yl)-3-(1H-indazol-5-yl)benzamide;
262) N-(4-(6-(cyclopropanecarboxamido)hexyl)-1-phenyl-1H-imidazol-2-yl)-3-(1H-indazol-5-yl)benzamide;
263) 3-(1-methyl-1H-indazol-5-yl)-N-(1-phenyl-4-(6-(piperidin-1-yl)hexyl)-1H-imidazol-2-yl)benzamide;
264) 3-(1-methyl-TH-indazol-5-yl)-N-(4-(6-morpholinohexyl)-1-phenyl-1H-imidazol-2-yl)benzamide;
265) N-(4-(2-(methylamino)-2-oxoethyl)-1-phenyl-1H-imidazol-2-yl)-3-(pyridin-4-yl)benzamide;
266) N-(4-(4-(methylamino)-4-oxobutyl)-1-phenyl-1H-imidazol-2-yl)-3-(pyridin-4-yl)benzamide;
267) N-(4-(4-(cyclopropylamino)-4-oxobutyl)-1-phenyl-1H-imidazol-2-yl)-3-(pyridin-4-yl)benzamide;
268) N-(1-phenyl-4-(6-(piperidin-1-yl)hexyl)-1H-imidazol-2-yl)-3-(pyridin-4-yl)benzamide;
269) N-(1-phenyl-4-(6-(piperidin-1-yl)hexyl)-1H-imidazol-2-yl)-3-(pyridin-2-yl)benzamide;

270) N-(1-phenyl-4-(6-(piperidin-1-yl)hexyl)-1H-imidazol-2-yl)-3-(pyridin-3-yl)benzamide;
271) 3-(6-aminopyridin-3-yl)-N-(4-(6-oxo-6-(piperidin-1-yl)hexyl)-1-phenyl-1H-imidazol-2-yl)benzamide;
272) 3-(6-aminopyridin-3-yl)-N-(4-(6-(4-methylpiperazin-1-yl)-6-oxohexyl)-1-phenyl-1H-imidazol-2-yl)benzamide;
273) 3-(6-aminopyridin-3-yl)-N-(4-(4-oxo-4-(piperidin-1-yl)butyl)-1-phenyl-1H-imidazol-2-yl)benzamide;
274) 3-(6-aminopyridin-3-yl)-N-(4-(4-(4-methylpiperazin-1-yl)-4-oxobutyl)-1-phenyl-1H-imidazol-2-yl)benzamide;
275) 3-(6-aminopyridin-3-yl)-N-(1-phenyl-4-(6-(piperidin-1-yl)hexyl)-1H-imidazol-2-yl)benzamide;
276) 3-(6-aminopyridin-3-yl)-N-(4-(6-(2-oxopyrrolidin-1-yl)hexyl)-1-phenyl-1H-imidazol-2-yl)benzamide;
277) 3-(6-aminopyridin-3-yl)-N-(4-(4-(2-oxopyrrolidin-1-yl)butyl)-1-phenyl-1H-imidazol-2-yl)benzamide;
278) 3-(6-aminopyridin-3-yl)-N-(4-(6-(cyclopropanecarboxamido)hexyl)-1-phenyl-1H-imidazol-2-yl)benzamide;
279) 3-(benzo[d]thiazol-6-yl)-N-(4-(4-(cyclopropylamino)-4-oxobutyl)-1-phenyl-1H-imidazol-2-yl)benzamide;
280) 3-(benzo[d]thiazol-6-yl)-N-(4-(4-(4-methylpiperazin-1-yl)-4-oxobutyl)-1-phenyl-1H-imidazol-2-yl)benzamide;
281) 3-(benzo[d]thiazol-6-yl)-N-(4-(4-(4-(dimethylamino)piperidin-1-yl)-4-oxobutyl)-1-phenyl-1H-imidazol-2-yl)benzamide;
282) 3-(benzo[d]thiazol-5-yl)-N-(4-(4-(4-(dimethylamino)piperidin-1-yl)-4-oxobutyl)-1-phenyl-1H-imidazol-2-yl)benzamide;
283) 3-(benzo[d]thiazol-5-yl)-N-(4-(4-(cyclopropylamino)-4-oxobutyl)-1-phenyl-1H-imidazol-2-yl)benzamide;
284) 3-(benzo[d]thiazol-5-yl)-N-(4-(4-(4-methylpiperazin-1-yl)-4-oxobutyl)-1-phenyl-1H-imidazol-2-yl)benzamide;
285) 3-(benzo[d]thiazol-6-yl)-N-(4-(6-(4-methylpiperazin-1-yl)-6-oxohexyl)-1-phenyl-1H-imidazol-2-yl)benzamide;
286) 3-(benzo[d]thiazol-6-yl)-N-(4-(6-(cyclopropylamino)-6-oxohexyl)-1-phenyl-1H-imidazol-2-yl)benzamide;
287) 3-(benzo[d]thiazol-6-yl)-N-(4-(6-(4-(dimethylamino)piperidin-1-yl)-6-oxohexyl)-1-phenyl-1H-imidazol-2-yl)benzamide;
288) 3-(benzo[d]thiazol-5-yl)-N-(4-(6-(4-methylpiperazin-1-yl)-6-oxohexyl)-1-phenyl-1H-imidazol-2-yl)benzamide;
289) N-(4-(6-(azepan-1-yl)-6-oxohexyl)-1-phenyl-1H-imidazol-2-yl)-3-(benzo[d]thiazol-5-yl)benzamide;
290) 3-(benzo[d]thiazol-5-yl)-N-(4-(6-(cyclopropylamino)-6-oxohexyl)-1-phenyl-1H-imidazol-2-yl)benzamide;
291) 3-(benzo[d]thiazol-5-yl)-N-(4-(6-(4-(dimethylamino)piperidin-1-yl)-6-oxohexyl)-1-phenyl-1H-imidazol-2-yl)benzamide;
292) N-(1-benzyl-4-(3-oxo-3-(phenylamino)propyl)-1H-imidazol-2-yl)-3-(1H-pyrazol-4-yl)benzamide;
293) N-(1-(3-chlorophenyl)-4-(3-oxo-3-(phenylamino)propyl)-1H-imidazol-2-yl)-3-(1H-pyrazol-4-yl)benzamide;
294) N-(1-(3-bromophenyl)-4-(3-oxo-3-(phenylamino)propyl)-1H-imidazol-2-yl)-3-(1H-pyrazol-4-yl)benzamide;
295) N-(1-(cyclohexylmethyl)-4-(3-oxo-3-(phenylamino)propyl)-1H-imidazol-2-yl)-3-(1H-pyrazol-4-yl)benzamide;
296) N-(1-cyclohexyl-4-(4-(methylamino)-4-oxobutyl)-1H-imidazol-2-yl)-3-(1H-pyrazol-4-yl)benzamide;
297) N-(1-(4-fluorophenyl)-4-(4-(methylamino)-4-oxobutyl)-1H-imidazol-2-yl)-3-(1H-pyrazol-4-yl)benzamide;
298) N-(1-(2,4-difluorophenyl)-4-(4-(methylamino)-4-oxobutyl)-1H-imidazol-2-yl)-3-(1H-pyrazol-4-yl)benzamide;
299) N-(1-(4-fluorophenyl)-4-(4-(4-methylpiperazin-1-yl)-4-oxobutyl)-1H-imidazol-2-yl)-3-(1-methyl-1H-pyrazol-4-yl)benzamide;
300) N-(4-(4-(cyclopropylamino)-4-oxobutyl)-1-(4-fluorophenyl)-1H-imidazol-2-yl)-3-(1-methyl-1H-pyrazol-4-yl)benzamide;
301) N-(1-(4-fluorophenyl)-4-(6-(piperidin-1-yl)hexyl)-1H-imidazol-2-yl)-3-(1H-pyrazol-4-yl)benzamide;
302) N-(1-(2,4-difluorophenyl)-4-(6-(piperidin-1-yl)hexyl)-1H-imidazol-2-yl)-3-(1H-pyrazol-4-yl)benzamide; and
303) N-(4-(3-oxo-3-(phenylamino)propyl)-1-(pyridin-4-yl)-1H-imidazol-2-yl)-3-(1H-pyrazol-4-yl)benzamide.

The N-(1H-imidazol-2-yl)benzamide compound according to the present invention may be used in the form of a pharmaceutically acceptable salt, a prodrug, a solvate, or a stereoisomer thereof for increasing in vivo absorption or increasing solubility. Thus the prodrug, the solvate, and the pharmaceutically acceptable salt also fall within the scope of the present invention. In addition, since the N-(1H-imidazol-2-yl)benzamide compound may have a chiral carbon, the stereoisomer thereof exists, and the stereoisomer also falls within the scope of the present invention.

The N-(1H-imidazol-2-yl)benzamide compound according to the present invention may be used in the form of a pharmaceutically acceptable salt, and the pharmaceutically acceptable salt may be prepared by a conventional method in the art, and may include for example, a salt with an inorganic acid such as a hydrochloric acid, a bromic acid, a sulfuric acid, sodium hydrogen sulfate, a phosphoric acid, a nitric acid, or a carbonic acid, a salt with an organic acid such as a formic acid, an acetic acid, a trifluoroacetic acid, a propionic acid, an oxalic acid, a succinic acid, a benzoic acid, a citric acid, a maleic acid, a malonic acid, a mandelic acid, a cinnamic acid, a stearic acid, a palmitic acid, a glycolic acid, a glutamic acid, a tartaric acid, a gluconic acid, a lactic acid, a fumaric acid, a lactobionic acid, an ascorbic acid, a salicylic acid, or an acetylsalicylic acid (aspirin), a salt with an amino acid such as glycine, alanine, vanillin, isoleucin, serine, cysteine, cystine, an asparaginic acid, glutamine, lysine, arginine, tyrosine, or proline, a salt with a sulfonic acid such as a methanesulfonic acid, an ethanesulfonic acid, a benzenesulfonic acid, or a toluenesulfonic acid, a metal salt by a reaction with an alkali metal such as sodium or potassium, a salt with an ammonium ion, or the like.

In an embodiment of the present invention, the pharmaceutically acceptable salt is a hydrochloride salt, a citrate salt, a fumarate salt, a dihydroxysuccinate salt or a succinate salt of the compound of formula (I).

The N-(TH-imidazol-2-yl)benzamide compound of the present invention may exist in a solvated form, for example, a hydrated form and a non-solvated form, and the solvate of the N-(1H-imidazol-2-yl)benzamide compound according to the present invention includes all solvated forms having a pharmaceutical activity.

The N-(1H-imidazol-2-yl)benzamide compound of the present invention may have a chiral center, and exist as a racemate, a racemic mixture, and individual enantiomer or diastereomer. These isomers may be separated or resolved by a common method, and an optional predetermined isomer may be obtained by a common synthesis method or stereospecific or asymmetric synthesis. These stereoisomer forms and mixtures thereof are all included in the scope of the present invention.

The N-(TH-imidazol-2-yl)benzamide compound of the present invention may be administered in the form of a prodrug which is decomposed in a human or animal body to provide the compound of the present invention. The prodrug may be used for modifying or improving a physical and (or) pharmacokinetic profile of a parent compound, and may be formed when the parent compound contains an appropriate group or substituent which may be derived to form the prodrug.

The N-(1H-imidazol-2-yl)benzamide compound according to the present invention is a novel compound which has a high inhibitory activity against IRAK4 (interleukin-1 receptor-associated kinase 4), and thus is useful as a therapeutic and prophylactic agent for diseases mediated by IRAK4, particularly autoimmune diseases or lymphoma.

In an embodiment of the present invention, the autoimmune disease may be selected from the group consisting of atopic dermatitis, alopecia areata, allergy, asthma, conjunctivitis, periodontitis, rhinitis, otitis media, pharyngitis, tonsillitis, pneumonia, gastric ulcer, gastritis, Crohn's disease, colitis, hemorrhoids, gout, ankylosing spondylitis, rheumatic fever, lupus, fibromyalgia, psoriasis, Arthritis, osteoarthritis, rheumatoid arthritis, frozen shoulder, tendinitis, tendonitis, peritonitis, myositis, hepatitis, cystitis, nephritis, Sjogren's syndrome, and multiple sclerosis.

In an embodiment of the present invention, the lymphoma may be activated B cell-like diffuse large B-cell lymphoma.

Accordingly, the present invention provides a compound of formula (I), or a pharmaceutically acceptable salt, a prodrug, a solvate or a stereoisomer thereof, for use in the prevention or the treatment of a disease mediated by IRAK4.

The present invention further provides a compound of formula (I), or a pharmaceutically acceptable salt, a prodrug, a solvate or a stereoisomer thereof, for use in the inhibition of IRAK4.

The present invention further provides a use of the compound of formula (I), or a pharmaceutically acceptable salt, a prodrug, a solvate or a stereoisomer thereof, in the manufacture of a medicament for the prevention or treatment of a disease mediated by IRAK4.

The present invention further provides a use of the compound of formula (I), or a pharmaceutically acceptable salt, a prodrug, a solvate or a stereoisomer thereof, in the manufacture of a medicament for the inhibition of IRAK4.

The present invention further provides a method of preventing or treating a disease mediated by IRAK4, which comprises administering a compound of formula (I), or a pharmaceutically acceptable salt, a prodrug, a solvate or a stereoisomer thereof, to a subject in need thereof.

The present invention further provides a method of inhibiting IRAK4, which comprises administering a compound of formula (I), or a pharmaceutically acceptable salt, a prodrug, a solvate or a stereoisomer thereof, to a subject in need thereof.

The present invention further provides a pharmaceutical composition for preventing or treating an IRAK4-mediated disease, comprising a compound of formula (I), or a pharmaceutically acceptable salt, a prodrug, a solvate, or a stereoisomer thereof as an active ingredient, and a pharmaceutically acceptable carrier or excipient.

The present invention further provides a pharmaceutical composition for preventing or treating a disease mediated by IRAK4, comprising a compound of formula (I), or a pharmaceutically acceptable salt, a prodrug, a solvate, or a stereoisomer thereof as an active ingredient.

In an embodiment of the present invention, the disease mediated by IRAK4 is an autoimmune disease or lymphoma. Specifically, the disease mediated by IRAK4 is selected from the group consisting of atopic dermatitis, alopecia areata, allergy, asthma, conjunctivitis, periodontitis, rhinitis, otitis media, pharyngitis, tonsillitis, pneumonia, gastric ulcer, gastritis, Crohn's disease, colitis, hemorrhoids, gout, ankylosing spondylitis, rheumatic fever, lupus, fibromyalgia, psoriasis, Arthritis, osteoarthritis, rheumatoid arthritis, frozen shoulder, tendinitis, tendonitis, peritonitis, myositis, hepatitis, cystitis, nephritis, Sjogren's syndrome, or multiple sclerosis, or activated B cell-like diffuse large B-cell lymphoma.

The pharmaceutical composition of the present invention inhibits the activity of the serine/threonine kinase IRAK-4.

According to the present invention, the N-(1H-imidazol-2-yl)benzamide compound represented by formula (I) effectively inhibits the activity of IRAK-4, which is involved in signaling the innate immune response from Toll-like receptor (TLR) and Toll/IL-1 receptor (TIR).

The term "inhibition" means reducing the expression level or biological activity of a target substance in vivo to a significant level.

In addition, the pharmaceutical composition of the present invention may be formulated into a conventional preparation in the pharmaceutical field, for example, a preparation for oral administration such as a tablet, a pill, a hard/soft capsule, a liquid, a suspension, an emulsion, syrup, granules, and elixirs, or a preparation for parenteral administration of a sterile aqueous or oily solvent for intravenous, subcutaneous, sublingual, or intramuscular administration, by adding conventional non-toxic pharmaceutically acceptable carrier, excipient, and the like to the N-(1H-imidazol-2-yl) benzamide compound represented by formula (I), or a pharmaceutically acceptable salt, a prodrug, a solvate, or a stereoisomer thereof.

The pharmaceutically acceptable carrier commonly used in formulations may be used in the pharmaceutical composition of the present invention, and includes lactose, dextrose, sucrose, sorbitol, mannitol, starch, acacia gum, calcium phosphate, alginate, gelatin, calcium silicate, microcrystalline cellulose, polyvinylpyrrolidone, cellulose, water, syrup, methyl cellulose, hydroxybenzoate, propylhydroxybenzoate, talc, magnesium stearate, and/or mineral oil, and the like, but not limited thereto.

The excipient which may be used in the pharmaceutical composition of the present invention may be a sweetener, a binder, a solubilizer, a solubilizing aid, a wetting agent, an emulsifier, an isotonic agent, an adsorbent, a disintegrant, an antioxidant, a preservative, a lubricant, a filler, a fragrance, or the like, and a ratio and properties of the excipient may be determined by solubility and chemical properties of a selected tablet, a selected administration route, and standard pharmaceutical practice. An example of the excipient may include lactose, dextrose, sucrose, mannitol, sorbitol, cellulose, glycine, silica, talc, stearic acid, sterin, magnesium stearate, magnesium aluminum silicate, starch, gelatin, tragacanth gum, alginic acid, sodium alginate, methyl cellulose, sodium carboxymethyl cellulose, agar, water, ethanol, polyethyleneglycol, polyvinylpyrrolidone, sodium chloride, calcium chloride, orange essence, strawberry essence, vanilla flavor, or the like.

In addition, the pharmaceutical composition of the present invention may be formulated into a parenteral administration form, and in this case, intravenous administration, intraperitoneal administration, intramuscular administration, subcutaneous administration, topical administration, or the like may be used, but not limited thereto. In a formulation for parenteral administration, the pharmaceutical composition may be produced into a solution or suspension by mixing the active ingredient, i.e., N-(1H-imidazol-2-yl)benzamide compound represented by formula (I), or a pharmaceutically acceptable salt, a prodrug, a solvate, or a stereoisomer thereof with a stabilizer or a buffer in water, and the solution or suspension may be prepared into a unit dosage form of an ampoule or vial.

In addition, the pharmaceutical composition of the present invention may be sterilized, or further include an adjuvant such as a preservative, a stabilizer, a hydrating agent or an emulsifying accelerator, a salt for regulating osmotic pressure, and/or a buffer, and other therapeutically useful materials, and may be formulated according to a conventional method of mixing, granulating or coating.

In addition, a dosage of N-(1H-imidazol-2-yl)benzamide compound represented by formula (I), or a pharmaceutically acceptable salt, a prodrug, a solvate, or a stereoisomer thereof as the active ingredient in the pharmaceutical composition according to the present invention for mammals including a human, may be varied depending on the age, weight, gender, dosage form, health status, and disease severity of a patient. The compound of the present invention may be included in the pharmaceutical composition in an effective amount of 0.001 to 500 mg/kg (body weight), preferably 0.01 to 100 mg/kg (body weight) per day, and the pharmaceutical composition may be administered via an oral or parenteral route in divided portions once or twice a day. However, the dosage may be increased or decreased according to the route of administration, the severity of the disease, sex, weight, age, etc., and thus the scope of the present invention is not limited thereto.

The N-(1H-imidazol-2-yl)benzamide compound according to the present invention can be prepared by various known methods depending on the substituent.

The following Schemes 1 and 2 may be illustrated, while they do not limit the scope of the method of preparing the compound of the present invention. It will be apparent to those skilled in the art that the preparation methods shown in Schemes 1 and 2 below can be easily modified according to specific substituents.

[Scheme 1]

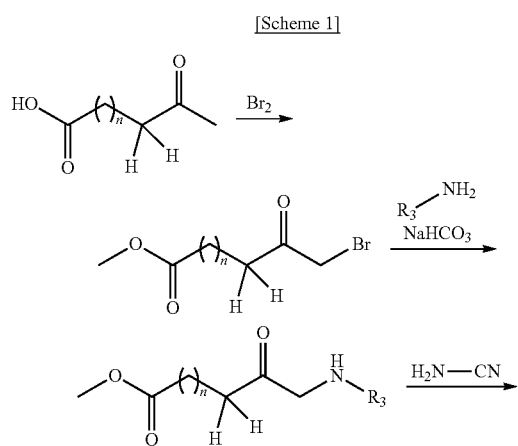

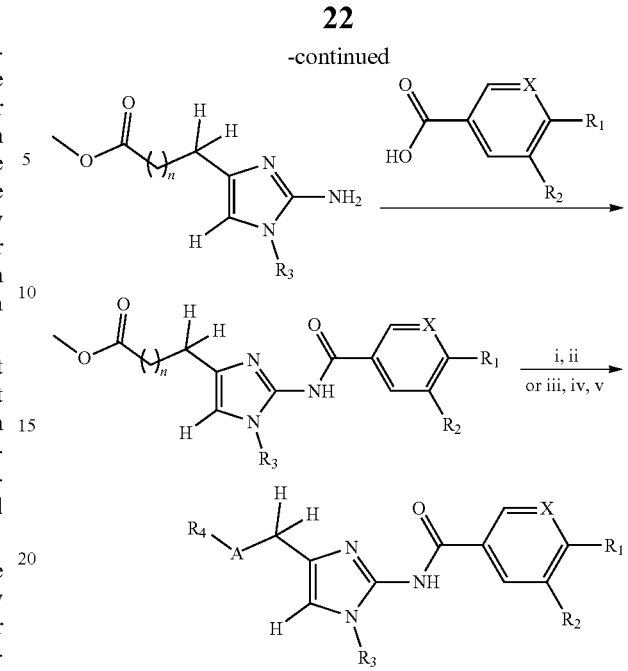

i) 1N-NaOH, MeOH, ii) HATU or HBTU, DIPEA, iii) LiAlH$_4$, THF, iv) oxalyl chloride, DMSO, TEA, MC, v) NaBH$_3$CN, THF

[Scheme 2]

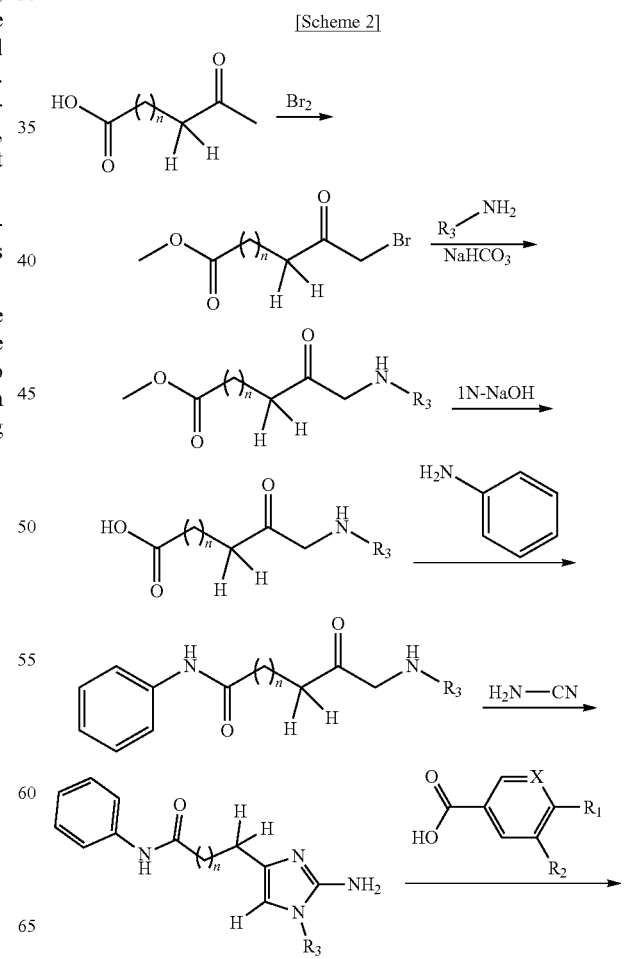

In Schemes 1 and 2, the definition of the substituents of the scheme is the same as the definition in formula (I).

MODE FOR THE INVENTION

Hereinafter, the present invention is described more specifically by the following examples, but these are provided only for illustration purposes and the present invention is not limited thereto.

Unless otherwise stated, all reactions were carried out under a nitrogen atmosphere. The progress of the reaction was observed through thin layer chromatography (TLC). All products were determined by $^1$H NMR spectra (BRUKER 300 MHz spectrometer).

The definition of the abbreviations of chemical material used in the examples as follows.

AcOH: acetic acid
ACN: acetonitrile
n-BuLi: n-butyllithium
DCM: dichloromethane
DIPEA: N,N-diisopropylethylamine
DMAP: 4-dimethylaminopyridine
DMF: dimethylformamide
DMSO: dimethyl sulfoxide
EA: ethyl acetate
EDCl: 1-ethyl-3-(3-dimethylaminopropyl)carbodiimide
EtOH: ethanol
HATU: hexafluorophosphate azabenzotriazole tetramethyl uronium
HBTU: hexafluorophosphate benzotriazole tetramethyl uronium
HOBt: hydroxybenzotriazole
KOAc: potassium acetate
LDA: lithium diisopropylamide
MeOH: methanol
NFSI: N-fluorobenzenesulfonimide
Pd(dppf)Cl$_2$: 1-cyclopenta-1,4-dienyl(diphenyl)phosphine
Pd(PPh$_3$)$_4$: tetrakis(triphenylphosphine)palladium(0)
SEM: 2-(trimethylsilyl)ethoxymethyl
TBAF: tetra-n-butylammonium fluoride
TEA: triethylamine
TFA: trifluoroacetic acid
THF: tetrahydrofuran

INTERMEDIATES

Intermediate 1. 3-(1-((2-(trimethylsilyl)ethoxy)methyl)-1H-pyrazol-4-yl)benzoic acid

Step 1: 4-bromo-1-((2-(trimethylsilyl)ethoxy)methyl)-1H-pyrazole

To a solution of 4-bromopyrazole (4.00 g, 27.2 mmol) in anhydrous THF (25 mL) was added NaH (60% dispersion in mineral oil, 1.63 g, 40.8 mmol) at 0° C. The reaction mixture was stirred at 0° C. for 30 min, and then 2-(trimethylsilyl)ethoxymethyl chloride (5.06 mL, 28.6 mmol) was added dropwise. The reaction mixture was stirred at room temperature for overnight, quenched with water and extracted with DCM, dried over anhydrous Na$_2$SO$_4$ and concentrated under reduced pressure. Purification by silica gel column chromatography using ethyl acetate/hexane as the eluent to afford the title compound (1.20 g, 50%). $^1$H NMR (CDCl$_3$, 400 MHz): δ 7.59 (s, 1H), 7.49 (s, 1H), 5.38 (s, 2H), 3.60-3.53 (m, 2H), 0.93-0.89 (m, 2H), −0.02 (s, 9H).

Step 2: methyl 3-(1-((2-(trimethylsilyl)ethoxy)methyl)-1H-pyrazol-4-yl)benzoate A mixture of 4-bromo-1-((2-(trimethylsilyl)ethoxy)methyl)-1H-pyrazole (20.4 g, 73.60 mmol), (3-(methoxycarbonyl)phenyl)boronic acid (13.25 g, 73.60 mmol), Pd(PPh$_3$)$_4$ (4.25 g, 3.68 mmol), and K$_2$CO$_3$ (30.52 g, 220.80 mmol) in 1,4-dioxane/H$_2$O (4/1, 500 mL) was stirred at 100° C. for overnight. The reaction mixture was diluted with ethyl acetate and washed with brine. The organic phase was dried over anhydrous Na$_2$SO$_4$ and concentrated under reduced pressure. Purification by silica gel column chromatography using ethyl acetate/hexane as the eluent to afford the title compound (15.6 g, 58%). $^1$H NMR (CDCl$_3$, 400 MHz): δ 8.19-8.15 (m, 1H), 7.94-7.85 (m, 3H), 7.72-7.65 (m, 1H), 7.49-7.41 (m, 1H), 5.46 (s, 2H), 3.65-3.54 (m, 2H), 0.98-0.87 (m, 2H), −0.02 (s, 9H)

Step 3: 3-(1-((2-(trimethylsilyl)ethoxy)methyl)-1H-pyrazol-4-yl)benzoic acid To a solution of methyl 3-(1-((2-(trimethylsilyl)ethoxy)methyl)-1H-pyrazol-4-yl)benzoate (15.6 g, 46.9 mmol) in MeOH (200 mL) was added 1N—NaOH (187.6 mL, 187.6 mmol). The reaction mixture was stirred at room temperature for overnight. The mixture was evaporated under reduced pressure and acidified with 1N—HCl, filtered the solid to get the title compound (13.6 g, 91%). $^1$H NMR (CDCl$_3$, 400 MHz): δ 8.29-8.22 (m, 1H), 8.04-7.96 (m, 1H), 7.95-7.88 (m, 2H), 7.79-7.71 (m, 1H), 7.54-7.445 (m, 1H), 5.50 (s, 2H), 3.62 (t, J=8.4 Hz, 2H), 0.94 (t, J=8.4 Hz, 2H), −0.01 (s, 9H)

Intermediate 2. 4-(1-((2-(trimethylsilyl)ethoxy)methyl)-1H-pyrazol-4-yl)benzoic acid

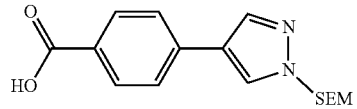

Step 1: methyl 4-(4,4,5,5-tetramethyl-1,3,2-dioxaborolan-2-yl)benzoate

A mixture of methyl 4-bromobenzoate (5.0 g, 23.25 mmol), Bis(pinacolato)diboron (7.67 g, 30.23 mmol), Pd(dppf)Cl$_2$·CH$_2$Cl$_2$ (950 mg, 1.16 mmol), and KOAc (6.84 g, 69.75 mmol) in DMF (50 mL) was stirred at 100° C. for overnight. The reaction mixture was diluted with ethyl acetate and washed with brine. The organic phase was dried over anhydrous Na$_2$SO$_4$ and concentrated under reduced pressure. Purification by silica gel column chromatography using ethyl acetate/hexane as the eluent to afford the title compound (4.4 g, 72%).

Step 2: methyl 4-(1-((2-(trimethylsilyl)ethoxy)methyl)-1H-pyrazol-4-yl)benzoate A mixture of methyl 4-(4,4,5,5-tetramethyl-1,3,2-dioxaborolan-2-yl)benzoate (2.0 g, 7.63 mmol), 4-bromo-1-((2-(trimethylsilyl)ethoxy)methyl)-1H-pyrazole (2.54 g, 9.15 mmol), Pd(PPh$_3$)$_4$ (440 mg, 0.38 mmol), and K$_2$CO$_3$ (3.2 g, 22.89 mmol) in 1,4-dioxane/H$_2$O (4/1, 50 mL) was stirred at 100° C. for 4 h. The reaction mixture was diluted with ethyl acetate and washed with brine. The organic phase was dried over anhydrous Na$_2$SO$_4$ and concentrated under reduced pressure. Purification by silica gel column chromatography using ethyl acetate/hexane as the eluent to afford the title compound (1.38 g, 54%). $^1$H NMR (CDCl$_3$, 400 MHz): δ 8.05-8.03 (m, 2H), 7.89 (s, 1H), 7.88 (s, 1H), 7.57-7.55 (m, 2H), 5.47 (s, 2H), 3.92 (s, 3H), 3.62-3.58 (m, 2H), 0.95-0.91 (m, 2H), −0.01 (s, 9H).

Step 3: 4-(1-((2-(trimethylsilyl)ethoxy)methyl)-1H-pyrazol-4-yl)benzoic acid To a solution of methyl 4-(1-((2-(trimethylsilyl)ethoxy)methyl)-1H-pyrazol-4-yl)benzoate (1.35 g, 4.06 mmol) in MeOH (30 mL) was added 1N—NaOH (8.12 mL, 8.12 mmol). The reaction mixture was stirred at room temperature for overnight. The mixture was evaporated under reduced pressure and acidified with 1N—HCl, extracted with DCM. The organic phase was dried over anhydrous Na$_2$SO$_4$ and concentrated under reduced pressure to afford the title compound (0.93 g, 72%).

Intermediate 3. 3-(3-nitro-1-((2-(trimethylsilyl)ethoxy)methyl)-1H-pyrazol-4-yl)benzoic acid

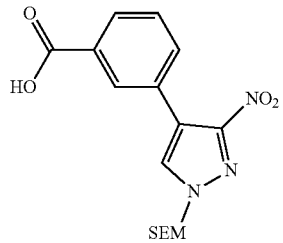 [SMILES: C[Si](C)(C)CCOCn1cc(-c2cccc(C(=O)O)c2)c([N+](=O)[O-])n1]

Step 1: 4-bromo-3-nitro-1H-pyrazole

To a solution of 3-nitropyrazole (500 mg, 4.42 mmol) in anhydrous DMF (10 mL) was added N-bromosuccimide (1.02 g, 5.75 mmol). The reaction mixture was stirred at 40° C. for 3 h. The mixture was diluted with ethyl acetate and washed with water (30 mL×3). The organic phase was dried over anhydrous Na$_2$SO$_4$ and concentrated under reduced pressure. Purification by silica gel column chromatography using ethyl acetate/hexane as the eluent to afford the title compound (710 mg, 84%).

Step 2: 4-bromo-3-nitro-1-((2-(trimethylsilyl)ethoxy)methyl)-1H-pyrazole

To a solution of 4-bromo-3-nitro-1H-pyrazole (700 mg, 3.65 mmol) in anhydrous THF (10 mL) was added NaH (60% dispersion in mineral oil, 220 mg, 5.47 mmol) at 0° C. The reaction mixture was stirred at 0° C. for 30 min, and then 2-(trimethylsilyl)ethoxymethyl chloride (0.75 mL, 3.83 mmol) was added dropwise. The reaction mixture was stirred at room temperature for 3 h, quenched with water and extracted with DCM, dried over anhydrous Na$_2$SO$_4$ and concentrated under reduced pressure. Purification by silica gel column chromatography using ethyl acetate/hexane as the eluent to afford the title compound (820 mg, 70%). $^1$H NMR (CDCl$_3$, 400 MHz): δ 7.74 (s, 1H), 5.45 (s, 2H), 3.61-3.57 (m, 2H), 0.93-0.89 (m, 2H), −0.02 (s, 9H).

Step 3: methyl 3-(3-nitro-1-((2-(trimethylsilyl)ethoxy)methyl)-1H-pyrazol-4-yl)benzoate A mixture of 4-bromo-3-nitro-1-((2-(trimethylsilyl)ethoxy)methyl)-1H-pyrazole (800 mg, 2.48 mmol), methyl 3-(4,4,5,5-tetramethyl-1,3,2-dioxaborolan-2-yl)benzoate (TCI) (750 mg, 2.85 mmol), Pd(PPh$_3$)$_4$ (143 mg, 0.124 mmol), and K$_2$CO$_3$ (1.03 g, 7.45 mmol) in 1,4-dioxane/H$_2$O (4/1, 20 mL) was stirred at 100° C. for overnight. The reaction mixture was diluted with ethyl acetate and washed with brine. The organic phase was dried over anhydrous Na$_2$SO$_4$ and concentrated under reduced pressure. Purification by silica gel column chromatography using ethyl acetate/hexane as the eluent to afford the title compound (850 mg, 91%). $^1$H NMR (CDCl$_3$, 400 MHz): δ 8.11-8.05 (m, 2H), 7.74 (s, 1H), 7.68-7.63 (m, 1H), 7.54-7.48 (m, 1H), 5.53 (s, 2H), 3.93 (s, 3H), 3.70-3.66 (m, 2H), 1.00-0.93 (m, 2H), 0.02 (s, 9H).

Step 4: 3-(3-nitro-1-((2-(trimethylsilyl)ethoxy)methyl)-1H-pyrazol-4-yl)benzoic acid To a solution of methyl 3-(3-nitro-1-((2-(trimethylsilyl)ethoxy)methyl)-1H-pyrazol-4-yl)benzoate (840 mg, 2.22 mmol) in MeOH (20 mL) was added 1N—NaOH (4.45 mL, 4.45 mmol). The reaction mixture was stirred at room temperature for overnight. The mixture was evaporated under reduced pressure and acidified with 1N—HCl, extracted with DCM. The organic phase was dried over anhydrous Na$_2$SO$_4$ and concentrated under reduced pressure to afford the title compound (730 mg, 90%). $^1$H NMR (DMSO-D$_6$, 400 MHz): δ 8.47 (s, 1H), 8.02 (s, 1H), 7.99-7.72 (m, 1H), 7.78-7.72 (m, 1H), 7.59-7.55 (m, 1H), 5.55 (s, 2H), 3.70-3.60 (m, 2H), 0.99-0.86 (m, 2H), −0.01 (s, 9H).

Intermediate 4. 3-(3-(trifluoromethyl)-1-((2-(trimethylsilyl)ethoxy)methyl)-1H-pyrazol-4-yl)benzoic acid

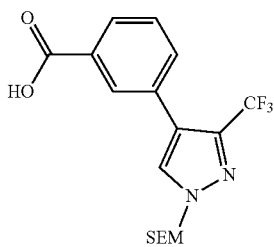 [SMILES: C[Si](C)(C)CCOCn1cc(-c2cccc(C(=O)O)c2)c(C(F)(F)F)n1]

Intermediate 4 was made in a manner similar with Intermediate 3 (350 mg, 87%).

Intermediate 5: 3-(5-fluoro-1-((2-(trimethylsilyl)ethoxy)methyl)-1H-pyrazol-4-yl)benzoic acid

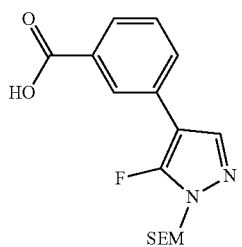 [SMILES: C[Si](C)(C)CCOCn1ncc(-c2cccc(C(=O)O)c2)c1F]

Step 1: 1-((2-(trimethylsilyl)ethoxy)methyl)-1H-pyrazole

To a solution of pyrazole (5.0 g, 73.44 mmol) in anhydrous THF (100 mL) was added NaH (60% dispersion in mineral oil, 4.4 g, 110.16 mmol) at 0° C. The reaction mixture was stirred at 0° C. for 30 min, and then 2-(trimethylsilyl)ethoxymethyl chloride (14.4 mL, 77.11 mmol) was added dropwise. The reaction mixture was stirred at room temperature for 3 h, quenched with water and extracted with ethyl acetate, dried over anhydrous Na$_2$SO$_4$ and concentrated under reduced pressure. Purification by silica gel column chromatography using ethyl acetate/hexane as the eluent to afford the title compound (13.2 g, 91%). $^1$H NMR (CDCl$_3$, 400 MHz): δ 7.57-7.55 (m, 1H), 7.55-7.53 (m, 1H), 6.33-6.31 (m, 1H), 5.43 (s, 2H), 3.56-3.52 (m, 2H), 0.91-0.87 (m, 2H), −0.02 (s, 9H).

Step 2: 5-fluoro-1-((2-(trimethylsilyl)ethoxy)methyl)-1H-pyrazole

A solution of 1-((2-(trimethylsilyl)ethoxy)methyl)-1H-pyrazole (1.0 g, 5.04 mmol) in anhydrous THF was cooled to −65° C. To the stirred solution LDA (1.0 M in THF, 6.0 mL, 6.0 mmol) was added dropwise, stirred for 45 min at the same temperature. Then, it was cooled to −78° C. and a solution of NFSI (1.67 g, 5.29 mmol) in anhydrous THF was added dropwise. The mixture was stirred at −78° C. for 2 h, and the mixture was stirred at room temperature for overnight, diluted with sat. aq. NH$_4$Cl and concentrated under reduced pressure. The residue was diluted with ethyl acetate and washed with sat. aq. NaHCO$_3$ (50 mL×3). The organic phase was dried over anhydrous Na$_2$SO$_4$ and concentrated under reduced pressure. Purification by silica gel column chromatography using DCM/MeOH as the eluent to afford the title compound (230 mg, 21%). $^1$H NMR (CDCl$_3$, 400 MHz): δ 7.41-7.37 (m, 1H), 5.78-5.72 (m, 1H), 5.34 (s, 2H), 3.63-3.59 (m, 2H), 0.93-0.88 (m, 2H), −0.02 (s, 9H).

Step 3: 4-bromo-5-fluoro-1-((2-(trimethylsilyl)ethoxy)methyl)-1H-pyrazole

To a solution of 5-fluoro-1-((2-(trimethylsilyl)ethoxy)methyl)-1H-pyrazole (197.5 mg, 0.91 mmol) in ACN (10 mL) was added N-bromosuccimide (170 mg, 0.95 mmol). The reaction mixture was stirred at room temperature for overnight. The mixture was evaporated under reduced pressure and extracted with sat. aq. NaHCO$_3$/DCM. The organic phase was dried over anhydrous Na$_2$SO$_4$ and concentrated under reduced pressure. Purification by silica gel column chromatography using ethyl acetate/hexane as the eluent to afford the title compound (63 mg, 23%).

Step 4: methyl 3-(5-fluoro-1-((2-(trimethylsilyl)ethoxy)methyl)-1H-pyrazol-4-yl)benzoate A mixture of 4-bromo-5-fluoro-1-((2-(trimethylsilyl)ethoxy)methyl)-1H-pyrazole (350 mg, 1.33 mmol), 4-bromo-1-methyl-1H-pyrazole (0.16 mL, 1.53 mmol), Pd(PPh$_3$)$_4$ (77 mg, 0.066 mmol), and K$_2$CO$_3$ (553 mg, 4.0 mmol) in 1,4-dioxane/H$_2$O (4/1, 10 mL) was stirred at 100° C. for overnight. The reaction mixture was diluted with ethyl acetate and washed with brine. The organic phase was dried over anhydrous Na$_2$SO$_4$ and concentrated under reduced pressure. Purification by silica gel column chromatography using ethyl acetate/hexane as the eluent to afford the title compound (150 mg, 52%). $^1$H NMR (CDCl$_3$, 400 MHz): δ 8.18 (s, 1H), 7.94-7.91 (m, 1H), 7.76-7.74 (m, 2H), 7.48-7.44 (m, 1H), 5.31 (s, 2H), 3.94 (s, 3H), 3.64-3.60 (m, 2H), 0.96-0.92 (m, 2H), −0.01 (s, 9H).

Step 5: 3-(5-fluoro-1-((2-(trimethylsilyl)ethoxy)methyl)-1H-pyrazol-4-yl)benzoic acid To a solution of methyl 3-(5-fluoro-1-((2-(trimethylsilyl)ethoxy)methyl)-1H-pyrazol-4-yl)benzoate (310 mg, 0.88 mmol) in MeOH (10 mL) was added 1N—NaOH (3.54 mL, 3.54 mmol). The reaction mixture was stirred at room temperature for overnight. The mixture was evaporated under reduced pressure and acidified with 1N—HCl, extracted with DCM. The organic phase was dried over anhydrous Na$_2$SO$_4$ and concentrated under reduced pressure to afford the title compound (290 mg, 97%). $^1$H NMR (CD$_3$OD, 400 MHz): δ 8.22 (s, 1H), 8.17-8.15 (m, 1H), 7.93-7.90 (m, 1H), 7.81-7.78 (m, 1H), 7.52-7.49 (m, 1H), 5.33 (s, 2H), 3.67-3.63 (m, 2H), 0.94-0.90 (m, 2H), −0.01 (s, 9H).

Intermediate 6. 5-(1-((2-(trimethylsilyl)ethoxy)methyl)-1H-pyrazol-4-yl)nicotinic acid

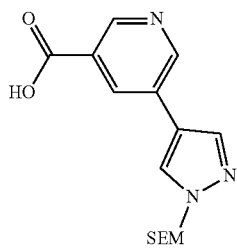 [SMILES: C[Si](C)(C)CCOCn1cc(-c2cncc(C(=O)O)c2)cn1]

Step 1: 4-(4,4,5,5-tetramethyl-1,3,2-dioxaborolan-2-yl)-1H-pyrazole

A mixture of 4-bromo-1H-pyrazole (1.0 g, 6.80 mmol), Bis(pinacolato)diboron (2.07 g, 8.16 mmol), Pd(dppf)Cl$_2$·CH$_2$Cl$_2$ (278 mg, 0.34 mmol), and KOAc (2.0 g, 20.41 mmol) in DMF (30 mL) was stirred at 100° C. for overnight. The reaction mixture was diluted with ethyl acetate and washed with brine. The organic phase was dried over anhydrous Na$_2$SO$_4$ and concentrated under reduced pressure. Purification by silica gel column chromatography using ethyl acetate/hexane as the eluent to afford the title compound (330 mg, 25%). $^1$H NMR (CDCl$_3$, 400 MHz): δ 7.90 (s, 2H), 1.33 (s, 12H).

Step 2: 4-(4,4,5,5-tetramethyl-1,3,2-dioxaborolan-2-yl)-1-((2-(trimethylsilyl)ethoxy)methyl)-1H-pyrazole To a solution of 4-(4,4,5,5-tetramethyl-1,3,2-dioxaborolan-2-yl)-1H-pyrazole (200 mg, 1.03 mmol) in anhydrous THF (10 mL) was added NaH (60% dispersion in mineral oil, 62 mg, 1.54 mmol) at 0° C. The reaction mixture was stirred at 0° C. for 30 min, and then 2-(trimethylsilyl)ethoxymethyl chloride (0.21 mL, 1.08 mmol) was added dropwise. The reaction mixture was stirred at room temperature for 3 h, quenched with water and extracted with DCM, dried over anhydrous Na$_2$SO$_4$ and concentrated under reduced pressure. Purification by silica gel column chromatography using ethyl acetate/hexane as the eluent to afford the title compound (153 mg, 46%). $^1$H NMR (CDCl$_3$, 400 MHz): δ 7.85 (s, 1H), 7.80 (s, 1H), 5.43 (s, 2H), 3.57-3.53 (m, 2H), 1.32 (s, 12H), 0.92-0.87 (m, 2H), −0.03 (s, 9H).

Step 3: methyl 5-(1-((2-(trimethylsilyl)ethoxy)methyl)-1H-pyrazol-4-yl)nicotinate A mixture of 4-(4,4,5,5-tetramethyl-1,3,2-dioxaborolan-2-yl)-1-((2-(trimethylsilyl)ethoxy)methyl)-1H-pyrazole (150 mg, 0.46 mmol), methyl 5-bromonicotinate (120 mg, 0.55 mmol), Pd(PPh$_3$)$_4$ (27 mg, 0.023 mmol), and K$_2$CO$_3$ (192 mg, 1.38 mmol) in 1,4-dioxane/H$_2$O (4/1, 5 mL) was stirred at 100° C. for overnight. The reaction mixture was diluted with ethyl acetate and washed with brine. The organic phase was dried over anhydrous Na$_2$SO$_4$ and concentrated under reduced pressure. Purification by silica gel column chromatography using ethyl acetate/hexane as the eluent to afford the title compound (123 mg, 80%). $^1$H NMR (CDCl$_3$, 400 MHz): δ 9.08 (s, 1H), 8.93 (s, 1H), 8.37 (s, 1H), 7.94 (s, 1H), 7.90 (s, 1H), 5.48 (s, 2H), 3.98 (s, 3H), 3.64-3.60 (m, 2H), 0.96-0.92 (m, 2H), −0.01 (s, 9H).

Step 4: 5-(1-((2-(trimethylsilyl)ethoxy)methyl)-1H-pyrazol-4-yl)nicotinic acid To a solution of methyl 5-(1-((2-(trimethylsilyl)ethoxy)methyl)-1H-pyrazol-4-yl)nicotinate (110 mg, 0.33 mmol) in MeOH (10 mL) was added 1N—NaOH (0.66 mL, 0.66 mmol). The reaction mixture was stirred at room temperature for overnight. The mixture was evaporated under reduced pressure and acidified with 1N—HCl, extracted with DCM. The organic phase was dried over anhydrous Na$_2$SO$_4$ and concentrated under reduced pressure to afford the title compound (84 mg, 79%).

Intermediate 7. 3-(1-methyl-1H-pyrazol-4-yl)benzoic acid

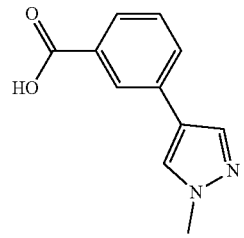

Step 1: methyl 3-(1-methyl-1H-pyrazol-4-yl)benzoate

A mixture of methyl 3-(4,4,5,5-tetramethyl-1,3,2-dioxaborolan-2-yl)benzoate (TCI) (350 mg, 1.33 mmol), 4-bromo-1-methyl-TH-pyrazole (0.16 mL, 1.53 mmol), Pd(PPh$_3$)$_4$ (77 mg, 0.066 mmol), and K$_2$CO$_3$ (553 mg, 4.0 mmol) in 1,4-dioxane/H$_2$O (4/1, 10 mL) was stirred at 100° C. for overnight. The reaction mixture was diluted with ethyl acetate and washed with brine. The organic phase was dried over anhydrous Na$_2$SO$_4$ and concentrated under reduced pressure. Purification by silica gel column chromatography using ethyl acetate/hexane as the eluent to afford the title compound (150 mg, 52%). $^1$H NMR (CDCl$_3$, 400 MHz): δ 8.16-8.12 (m, 1H), 7.91-7.85 (m, 1H), 7.80 (s, 1H), 7.68 (s, 1H), 7.67-7.62 (m, 1H), 7.44-7.38 (m, 1H), 3.95 (s, 3H), 3.93 (s, 3H).

Step 2: 3-(1-methyl-1H-pyrazol-4-yl)benzoic acid

To a solution of methyl 3-(1-methyl-TH-pyrazol-4-yl)benzoate (135 mg, 0.62 mmol) in MeOH (10 mL) was added 1N—NaOH (1.25 mL, 1.25 mmol). The reaction mixture was stirred at room temperature for overnight. The mixture was evaporated under reduced pressure and acidified with 1N—HCl, extracted with DCM. The organic phase was dried over anhydrous Na$_2$SO$_4$ and concentrated under reduced pressure to afford the title compound (85 mg, 67%). $^1$H NMR (DMSO-D$_6$, 400 MHz): δ 13.03 (s, 1H), 8.24 (s, 1H), 8.08 (s, 1H), 7.92 (s, 1H), 7.82-7.79 (s, 1H), 7.76-7.73 (s, 1H), 7.49-7.45 (s, 1H), 3.86 (s, 3H).

Intermediate 8:
3-(1-(fluoromethyl)-1H-pyrazol-4-yl)benzoic acid

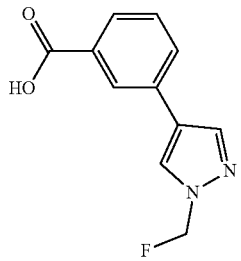 [SMILES: O=C(O)c1cccc(-c2cnn(CF)c2)c1]

Step 1: 4-bromo-1-(fluoromethyl)-1H-pyrazole

To a solution of 4-bromo-1H-pyrazole (500 mg, 3.40 mmol) in anhydrous THF (10 mL) was added NaH (60% dispersion in mineral oil, 204 mg, 5.10 mmol) at 0° C. The reaction mixture was stirred at 0° C. for 30 min, and then Iodofluoromethane (0.25 mL, 3.74 mmol) was added dropwise. The reaction mixture was stirred at room temperature for 3 h, quenched with water and extracted with ethyl acetate, dried over anhydrous $Na_2SO_4$ and concentrated under reduced pressure. Purification by silica gel column chromatography using ethyl acetate/hexane as the eluent to afford the title compound (420 mg, 69%). $^1$H NMR ($CDCl_3$, 400 MHz): δ 7.68 (s, 1H), 7.61 (s, 1H), 6.03-5.90 (m, 2H).

Step 2: methyl 3-(1-(fluoromethyl)-1H-pyrazol-4-yl)benzoate

A mixture of methyl 3-(4,4,5,5-tetramethyl-1,3,2-dioxaborolan-2-yl)benzoate (417 mg, 2.33 mmol), 4-bromo-1-(fluoromethyl)-1H-pyrazole (610 mg, 2.33 mmol), $Pd(PPh_3)_4$ (135 mg, 0.12 mmol), and $K_2CO_3$ (966 mg, 6.99 mmol) in 1,4-dioxane/$H_2O$ (4/1, 10 mL) was stirred at 100° C. for overnight. The reaction mixture was diluted with ethyl acetate and washed with brine. The organic phase was dried over anhydrous $Na_2SO_4$ and concentrated under reduced pressure. Purification by silica gel column chromatography using ethyl acetate/hexane as the eluent to afford the title compound (400 mg, 73%). $^1$H NMR ($CDCl_3$, 400 MHz): δ 8.17 (s, 1H), 7.98-7.93 (m, 3H), 7.70-7.67 (m, 1H), 7.49-7.45 (m, 1H), 6.13-6.00 (m, 2H), 3.94 (s, 3H).

Step 3: 3-(1-(fluoromethyl)-1H-pyrazol-4-yl)benzoic acid

To a solution of methyl 3-(1-(fluoromethyl)-1H-pyrazol-4-yl)benzoate (400 mg, 1.71 mmol) in MeOH (10 mL) was added 1N—NaOH (6.83 mL, 6.83 mmol). The reaction mixture was stirred at room temperature for overnight. The mixture was evaporated under reduced pressure and acidified with 1N—HCl, filtered the solid to get the title compound (309 mg, 82%).

Intermediate 9.
3-(1-(difluoromethyl)-1H-pyrazol-4-yl)benzoic acid

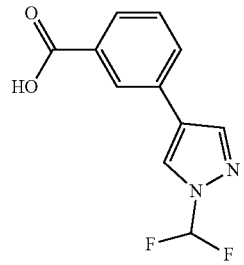 [SMILES: O=C(O)c1cccc(-c2cnn(C(F)F)c2)c1]

Intermediate 9 was made in a manner similar with Intermediate 8 (742.7 mg, 92.5%). $^1$H NMR ($CD_3OD$, 400 MHz) δ 8.50 (d, J=0.8 Hz, 1H), 8.29-8.24 (m, 1H), 8.14 (s, 1H), 7.95 (m, 1H), 7.866 (m, 1H), 7.52 (t, J=59.6 Hz, 1H), 7.52 (td, J=7.2, 0.4 Hz, 1H).

Intermediate 10.
3-(1-(trifluoromethyl)-1H-pyrazol-4-yl)benzoic acid

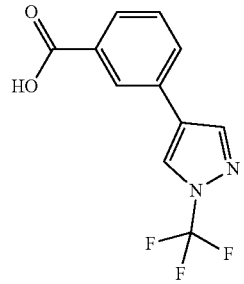 [SMILES: O=C(O)c1cccc(-c2cnn(C(F)(F)F)c2)c1]

Step 1: methyl 3-(1-(trifluoromethyl)-1H-pyrazol-4-yl)benzoate

A mixture of methyl 3-(4,4,5,5-tetramethyl-1,3,2-dioxaborolan-2-yl)benzoate (TCI) (500 mg, 2.33 mmol), 4-bromo-1-(trifluoromethyl)-1H-pyrazole (610 mg, 2.33 mmol), $Pd(PPh_3)_4$ (135 mg, 0.12 mmol), and $K_2CO_3$ (966 mg, 6.99 mmol) in 1,4-dioxane/$H_2O$ (4/1, 10 mL) was stirred at 100° C. for overnight. The reaction mixture was diluted with ethyl acetate and washed with brine. The organic phase was dried over anhydrous $Na_2SO_4$ and concentrated under reduced pressure. Purification by silica gel column chromatography using ethyl acetate/hexane as the eluent to afford the title compound (540 mg, 86%). $^1$H NMR ($CDCl_3$, 400 MHz): δ 8.18 (s, 1H), 8.10 (s, 1H), 8.08 (s, 1H), 8.00-7.98 (m, 1H), 7.71-7.68 (m, 1H), 7.52-7.47 (m, 1H), 3.95 (s, 3H).

Step 2: 3-(1-(trifluoromethyl)-1H-pyrazol-4-yl)benzoic acid

To a solution of methyl 3-(1-(trifluoromethyl)-1H-pyrazol-4-yl)benzoate (540 mg, 2.0 mmol) in MeOH (10 mL) was added 1N—NaOH (8.0 mL, 8.0 mmol). The reaction mixture was stirred at room temperature for overnight. The mixture was evaporated under reduced pressure and acidified with 1N—HCl, filtered the solid to get the title compound (470 mg, 92%).

Intermediate 11. 3-(1-((2-(trimethylsilyl)ethoxy)methyl)-1H-indazol-5-yl)benzoic acid

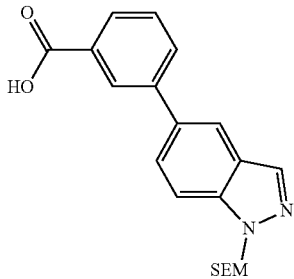 [SMILES: C[Si](C)(C)CCOCn1ncc2cc(-c3cccc(C(=O)O)c3)ccc21]

Step 1: 5-bromo-1-((2-(trimethylsilyl)ethoxy)methyl)-1H-indazole

To a solution of 5-bromoindazole (500 mg, 2.53 mmol) in anhydrous THF (20 mL) was added NaH (60% dispersion in mineral oil, 152 mg, 3.82 mmol) at 0° C. The reaction mixture was stirred at 0° C. for 30 min, and then 2-(trimethylsilyl)ethoxymethyl chloride (0.49 mL, 2.79 mmol) was added dropwise. The reaction mixture was stirred at room temperature for 3 h, quenched with water and extracted with DCM, dried over anhydrous $Na_2SO_4$ and concentrated under reduced pressure. Purification by silica gel column chromatography using ethyl acetate/hexane as the eluent to afford the title compound (581 mg, 70%). $^1$H NMR (CDCl$_3$, 400 MHz): δ 7.95 (s, 1H), 7.89 (s, 1H), 7.51-7.45 (m, 2H), 5.71 (s, 2H), 3.53-3.49 (m, 2H), 0.89-0.84 (m, 2H), −0.07 (s, 9H).

Step 2: methyl 3-(1-((2-(trimethylsilyl)ethoxy)methyl)-1H-indazol-5-yl)benzoate

A mixture of methyl 3-(4,4,5,5-tetramethyl-1,3,2-dioxaborolan-2-yl)benzoate (464 mg, 1.77 mmol), 5-bromo-1-((2-(trimethylsilyl)ethoxy)methyl)-1H-indazole (Intermediate 11, step 1) (580 mg, 1.77 mmol), Pd(PPh$_3$)$_4$ (102 mg, 0.088 mmol), and $K_2CO_3$ (735 mg, 5.31 mmol) in 1,4-dioxane/H$_2$O (4/1, 20 mL) was stirred at 100° C. for overnight. The reaction mixture was diluted with ethyl acetate and washed with brine. The organic phase was dried over anhydrous $Na_2SO_4$ and concentrated under reduced pressure. Purification by silica gel column chromatography using ethyl acetate/hexane as the eluent to afford the title compound (458 mg, 67%). $^1$H NMR (CDCl$_3$, 400 MHz): δ 8.35-8.30 (m, 1H), 8.10-8.06 (m, 1H), 8.05-8.00 (m, 1H), 7.99-7.95 (m, 1H), 7.86-7.80 (m, 1H), 7.74-7.63 (m, 2H), 7.57-7.49 (m, 1H), 5.77 (s, 2H), 3.96 (s, 3H), 3.61-3.53 (m, 2H), 0.95-0.85 (m, 2H), −0.06 (s, 9H)

Step 3: 3-(1-((2-(trimethylsilyl)ethoxy)methyl)-1H-indazol-5-yl)benzoic acid

To a solution of methyl 3-(1-((2-(trimethylsilyl)ethoxy)methyl)-1H-indazol-5-yl)benzoate (458 mg, 1.19 mmol) in MeOH (10 mL) was added 1N—NaOH (4.8 mL, 4.8 mmol). The reaction mixture was stirred at room temperature for overnight. The mixture was evaporated under reduced pressure and acidified with 1N—HCl, filtered the solid to get the title compound (430 mg, 97%). $^1$H NMR (CD$_3$OD, 400 MHz): δ 8.34-8.29 (m, 1H), 8.14 (s, 1H), 8.07-8.03 (m, 1H), 8.03-7.97 (m, 1H), 793-7.87 (m, 1H), 7.80-7.73 (m, 2H), 7.56 (t, J=7.6 Hz, 1H), 5.78 (s, 2H), 3.58 (t, J=8.0 Hz, 2H), 0.86 (t, J=8.0 Hz, 2H), −0.08 (s, 9H)

The following compounds were made in a manner similar with Intermediate 11.

TABLE 1

| No | Name | Structure |
|----|------|-----------|
| 12 | 3-(1-((2-(trimethylsilyl)ethoxy)methyl)-1H-indazol-4-yl)benzoic acid | |
| 13 | 3-(1-((2-(trimethylsilyl)ethoxy)methyl)-1H-indazol-6-yl)benzoic acid | |
| 14 | 3-(1-((2-(trimethylsilyl)ethoxy)methyl)-1H-indazol-7-yl)benzoic acid | |
| 15 | 3-(1-((2-(trimethylsilyl)ethoxy)methyl)-1H-benzo[d][1,2,3]triazol-5-yl)benzoic acid | |
| 16 | 3-(1-((2-(trimethylsilyl)ethoxy)methyl)-1H-indol-5-yl)benzoic acid | |

Intermediate 17.
3-(1-methyl-1H-indazol-5-yl)benzoic acid

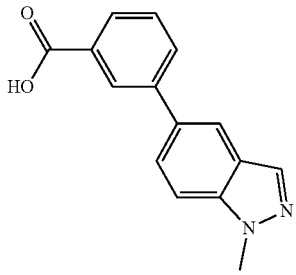 [SMILES: Cn1ncc2cc(-c3cccc(C(=O)O)c3)ccc21]

Step 1: methyl 3-(1-methyl-1H-indazol-5-yl)benzoate

A mixture of methyl 3-(4,4,5,5-tetramethyl-1,3,2-dioxaborolan-2-yl)benzoate (TCI) (2.0 g, 7.63 mmol), 5-bromo-1-methyl-1H-indazole (1.61 g, 7.63 mmol), Pd(PPh₃)₄ (441 mg, 0.38 mmol), and K₂CO₃ (3.16 g, 22.88 mmol) in 1,4-dioxane/H₂O (4/1, 50 mL) was stirred at 100° C. for overnight. The reaction mixture was diluted with ethyl acetate and washed with brine. The organic phase was dried over anhydrous Na₂SO₄ and concentrated under reduced pressure. Purification by silica gel column chromatography using ethyl acetate/hexane as the eluent to afford the title compound (1.44 g, 71%). ¹H NMR (CDCl₃, 400 MHz): 8.31 (s, 1H), 8.04 (s, 1H), 8.02-8.00 (m, 1H), 7.95 (s, 1H), 7.86-7.80 (m, 1H), 7.69-7.65 (m, 1H), 7.55-7.45 (m, 2H), 4.11 (s, 3H), 3.96 (s, 3H).

Step 2: 3-(1-methyl-1H-indazol-5-yl)benzoic acid

To a solution of methyl 3-(1-methyl-1H-indazol-5-yl)benzoate (1.44 g, 5.40 mmol) in MeOH (20 mL) was added 1N—NaOH (21.6 mL, 21.6 mmol). The reaction mixture was stirred at room temperature for overnight. The mixture was evaporated under reduced pressure and acidified with 1N—HCl, filtered the solid to get the title compound (1.2 g, 88%).

Intermediate 18. 3-(pyridin-3-yl)benzoic acid

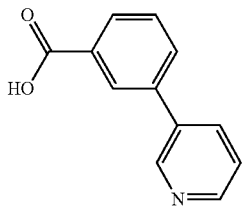 [SMILES: O=C(O)c1cccc(-c2cccnc2)c1]

Step 1: methyl 3-(pyridin-3-yl)benzoate

A mixture of methyl 3-(4,4,5,5-tetramethyl-1,3,2-dioxaborolan-2-yl)benzoate (TCI) (2.0 g, 7.63 mmol), 3-bromopyridine (1.20 g, 7.63 mmol), Pd(PPh₃)₄ (441 mg, 0.38 mmol), and K₂CO₃ (3.16 g, 22.88 mmol) in 1,4-dioxane/H₂O (4/1, 50 mL) was stirred at 100° C. for overnight. The reaction mixture was diluted with ethyl acetate and washed with brine. The organic phase was dried over anhydrous Na₂SO₄ and concentrated under reduced pressure. Purification by silica gel column chromatography using ethyl acetate/hexane as the eluent to afford the title compound (1.94 g, 98%). ¹H NMR (CDCl₃, 400 MHz): 8.87 (s, 1H), 8.63-8.60 (m, 1H), 8.26 (s, 1H), 8.09-8.06 (m, 1H), 7.92-7.88 (m, 1H), 7.79-7.76 (m, 1H), 7.58-7.54 (m, 1H), 7.40-7.37 (m, 1H), 3.95 (s, 3H).

Step 2: 3-(pyridin-3-yl)benzoic acid

To a solution of methyl 3-(pyridin-3-yl)benzoate (1.9 g, 5.40 mmol) in MeOH (30 mL) was added 1N—NaOH (35.6 mL, 35.6 mmol). The reaction mixture was stirred at room temperature for overnight. The mixture was evaporated under reduced pressure and acidified with 1N—HCl, filtered the solid to get the title compound (1.6 g, 90%).

The following compounds were made in a manner similar with Intermediate 18.

TABLE 2

| No | Name | Structure |
|----|------|-----------|
| 19 | 3-(pyridin-2-yl)benzoic acid | |
| 20 | 3-(pyridin-4-yl)benzoic acid | |

Intermediate 21. 3-(6-((tert-butoxycarbonyl)amino)pyridin-3-yl)benzoic acid

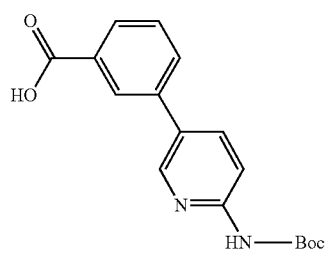 [SMILES: CC(C)(C)OC(=O)Nc1ccc(-c2cccc(C(=O)O)c2)cn1]

Step 1: tert-butyl (5-bromopyridin-2-yl)carbamate

A solution of 5-bromopyridin-2-amine (5.0 g, 28.9 mmol) in DCM (150 mL) was cooled to 0° C. and to it was added TEA (8.8 mL, 63.5 mmol), di-tert-butyl dicarbonate (8.6 mL, 37.5 mmol) and 4-(dimethylamino)pyridine (353 mg, 2.89 mmol). The reaction mixture was stirred at room temperature for 3 h. The reaction mixture was quenched with sat. aq. NaHCO₃ and extracted with DCM, dried over anhydrous Na$_2$SO$_4$. The solvent was concentrated to form the crude product which was recrystallized with hexane to yield the title compound (5.60 g, 70%). $^1$H NMR (CDCl$_3$, 400 MHz): δ 8.29-8.27 (m, 1H), 7.91-7.87 (m, 1H), 7.77-7.73 (m, 1H), 7.58 (bs, 1H), 1.53 (s, 9H).

Step 2: methyl 3-(6-((tert-butoxycarbonyl)amino)pyridin-3-yl)benzoate

A mixture of methyl 3-(4,4,5,5-tetramethyl-1,3,2-dioxaborolan-2-yl)benzoate (TCI) (2.5 g, 9.53 mmol), tert-butyl (5-bromopyridin-2-yl)carbamate (2.60 g, 9.53 mmol), Pd(PPh$_3$)$_4$ (1.10 g, 0.95 mmol), and K$_2$CO$_3$ (1.97 g, 14.29 mmol) in 1,4-dioxane/H$_2$O (4/1, 120 mL) was stirred at 100° C. for overnight. The reaction mixture was diluted with ethyl acetate and washed with brine. The organic phase was dried over anhydrous Na$_2$SO$_4$ and concentrated under reduced pressure. Purification by silica gel column chromatography using ethyl acetate/hexane as the eluent to afford the title compound (2.19 g, 70%). $^1$H NMR (CDCl$_3$, 400 MHz): δ 8.49-8.48 (m, 1H), 8.24-8.22 (m, 1H), 8.04-8.02 (m, 2H), 7.93-7.90 (m, 1H), 7.76-7.73 (m, 1H), 7.53-7.51 (m, 1H), 3.95 (s, 3H), 1.54 (s, 9H).

Step 3: 3-(6-((tert-butoxycarbonyl)amino)pyridin-3-yl)benzoic acid

To a solution of methyl 3-(6-((tert-butoxycarbonyl)amino)pyridin-3-yl)benzoate (2.0 g, 6.09 mmol) in MeOH (30 mL) was added 1N—NaOH (24.0 mL, 24.0 mmol). The reaction mixture was stirred at room temperature for overnight. The mixture was evaporated under reduced pressure and acidified with 1N—HCl, filtered the solid to get the title compound (1.5 g, 78%).

Intermediate 22. 3-(benzo[d]thiazol-6-yl)benzoic acid

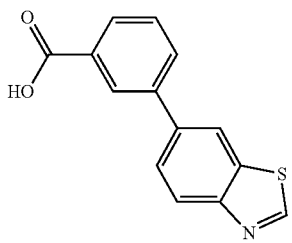 [SMILES: O=C(O)c1cccc(-c2ccc3ncsc3c2)c1]

Step 1: methyl 3-(benzo[d]thiazol-6-yl)benzoate

A mixture of 6-bromobenzo[d]thiazole (5.0 g, 23.35 mmol), (3-(methoxycarbonyl)phenyl)boronic acid (4.62 g, 25.69 mmol), Pd(PPh$_3$)$_4$ (1.35 g, 1.17 mmol), and K$_2$CO$_3$ (9.70 g, 70.07 mmol) in 1,4-dioxane/H$_2$O (4/1, 100 mL) was stirred at 100° C. for overnight. The reaction mixture was diluted with ethyl acetate and washed with brine. The organic phase was dried over anhydrous Na$_2$SO$_4$ and concentrated under reduced pressure. The residue was solidified with ethyl acetate and hexane, filtered to afford the title compound (5.2 g, 83%). $^1$H NMR (CDCl$_3$, 400 MHz): 9.03 (s, 1H), 8.34 (s, 1H), 8.24-8.18 (m, 2H), 8.08-8.02 (m, 1H), 7.88-7.87 (m, 1H), 7.82-7.77 (m, 1H), 7.58-7.50 (m, 1H), 3.95 (s, 3H).

Step 2: 3-(benzo[d]thiazol-6-yl)benzoic acid

To a solution of methyl 3-(benzo[d]thiazol-6-yl)benzoate (5.2 g, 5.40 mmol) in MeOH (70 mL) was added 1N—NaOH (77.0 mL, 77.0 mmol). The reaction mixture was stirred at room temperature for overnight. The mixture was evaporated under reduced pressure and acidified with 1N—HCl, filtered the solid to get the title compound (1.6 g, 32%).

Intermediate 23. 3-(benzo[d]thiazol-5-yl)benzoic acid

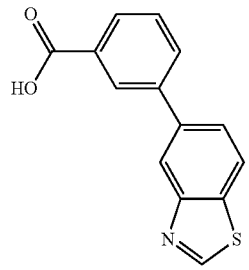 [SMILES: O=C(O)c1cccc(-c2ccc3scnc3c2)c1]

Intermediate 23 was made in a manner similar with Intermediate 22 (5.0 g, 42%).

Intermediate 24. methyl 3-(2-amino-1-phenyl-1H-imidazol-4-yl)propanoate

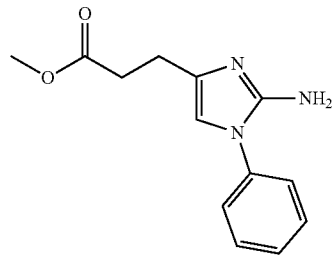 [SMILES: COC(=O)CCc1cn(-c2ccccc2)c(N)n1]

Step 1: methyl 5-bromo-4-oxopentanoate

To a stirred and heated (70° C.) solution of levulinic acid (10 g, 86.12 mmol) in MeOH (100 mL) was added a solution of Br$_2$ (4.43 mL, 86.12 mmol) in MeOH (20 mL) over 10 min and refluxed for 2 h. The reaction mixture was cooled to room temperature, and the solvent was removed under reduced pressure. The residue was diluted with DCM and washed with sat. aq. NaHCO$_3$ (50 mL×3). The organic phase was dried over anhydrous Na$_2$SO$_4$ and concentrated under reduced pressure to afford the title compound (crude obtained).

Step 2: methyl 4-oxo-5-(phenylamino)pentanoate

To a solution of methyl 5-bromo-4-oxopentanoate (1.9 g, 9.09 mmol) and Aniline (0.85 g, 9.09 mmol) in DMF (45 mL) was added NaHCO$_3$ (3.8 g, 27.26 mmol). The reaction mixture was stirred at room temperature for overnight. The mixture was diluted with ethyl acetate and washed with water (30 mL×3) and Brine (30 mL). The organic phase was dried over anhydrous Na₂SO₄ and concentrated under reduced pressure to afford the title compound (crude obtained).

Step 3: methyl 3-(2-amino-1-phenyl-1H-imidazol-4-yl)propanoate

A solution of methyl 4-oxo-5-(phenylamino)pentanoate (2.2 g, 7.75 mmol) and cyanamide (3.06 g, 72.91) in MeOH (20 mL) was refluxed for overnight. The solvent was removed under reduced pressure. The residue was diluted with DCM, washed with water (30 mL×3). The organic phase was dried over anhydrous Na₂SO₄ and concentrated under reduced pressure. Purification by silica gel column chromatography using DCM/MeOH as the eluent to afford the title compound (1.20 g, 50%). $^1$H NMR (CDCl$_3$, 400 MHz): δ 7.51-7.46 (m, 2H), 7.39-7.35 (m, 3H), 6.45 (s, 1H), 3.69 (s, 3H), 2.84-2.78 (m, 2H), 2.71-2.65 (m, 2H).

The following compounds were made in a manner similar with Intermediate 24.

TABLE 3

| No | Name | Structure |
|---|---|---|
| 25 | methyl 2-(2-amino-1-phenyl-1H-imidazol-4-yl)acetate | |
| 26 | methyl 4-(2-amino-1-phenyl-1H-imidazol-4-yl)butanoate | |
| 27 | methyl 5-(2-amino-1-phenyl-1H-imidazol-4-yl)pentanoate | |
| 28 | methyl 6-(2-amino-1-phenyl-1H-imidazol-4-yl)hexanoate | |

EXAMPLES

Example 1. 3-(3-nitro-1H-pyrazol-4-yl)-N-(4-(3-oxo-3-(phenylamino)propyl)-1-phenyl-1H-imidazol-2-yl)benzamide (2cheme 2)

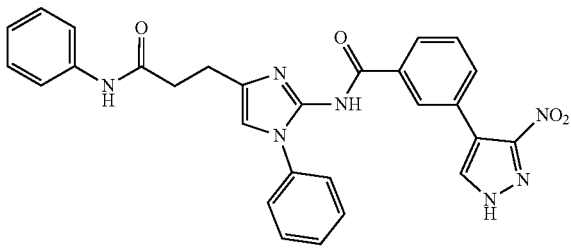 [SMILES: O=C(CCc1cn(-c2ccccc2)c(NC(=O)c2cccc(-c3c[nH]nc3[N+](=O)[O-])c2)n1)Nc1ccccc1]

Step 1: methyl 5-bromo-4-oxopentanoate

To a stirred and heated (70° C.) solution of levulinic acid (2 g, 17.22 mmol) in MeOH (20 mL) was added a solution of $Br_2$ (0.89 mL, 17.22 mmol) in MeOH (5 mL) over 10 min and refluxed for 2 h. The reaction mixture was cooled to room temperature, and the solvent was removed under reduced pressure. The residue was diluted with DCM and washed with sat. aq. $NaHCO_3$ (50 mL×3). The organic phase was dried over anhydrous $Na_2SO_4$ and concentrated under reduced pressure to afford the title compound (crude obtained).

Step 2: methyl 4-oxo-5-(phenylamino)pentanoate

To a solution of methyl 5-bromo-4-oxopentanoate (1.9 g, 9.09 mmol) and aniline (0.85 g, 9.09 mmol) in DMF (45 mL) was added $NaHCO_3$ (3.8 g, 27.26 mmol). The reaction mixture was stirred at room temperature for overnight. The mixture was diluted with ethyl acetate and washed with water (30 mL×3) and brine (30 mL). The organic phase was dried over anhydrous $Na_2SO_4$ and concentrated under reduced pressure to afford the title compound (crude obtained).

Step 3: 4-oxo-5-(phenylamino)pentanoic acid

To a solution of methyl 4-oxo-5-(phenylamino)pentanoate (970 mg, 4.38 mmol) in MeOH (10 mL) was added 1N—NaOH (5.70 mL, 5.70 mmol). The reaction mixture was stirred at room temperature for 3 h. The mixture was evaporated under reduced pressure and acidified with 1N—HCl, extracted with DCM. The organic phase was dried over anhydrous $Na_2SO_4$ and concentrated under reduced pressure to afford the title compound (710 mg, 78%). $^1$H NMR (CDCl$_3$, 400 MHz): δ 7.50-7.43 (m, 2H), 7.40 (bs, 1H), 7.35-7.28 (m, 2H), 7.22-7.15 (m, 2H), 7.13-7.07 (m, 1H), 6.75-6.71 (m, 1H), 6.62-6.56 (m, 2H), 4.53 (bs, 1H), 4.10 (s, 2H), 2.94-2.91 (m, 2H), 2.78-2.73 (m, 2H).

Step 4: 4-oxo-N-phenyl-5-(phenylamino)pentanamide

A mixture of 4-oxo-5-(phenylamino)pentanoic acid (4.126 g, 19.91 mmol), aniline (1.73 mL, 18.96 mmol), HBTU (10.78 g, 228.44 mmol) and DIPEA (10.2 mL, 56.88 mmol) in DCM was stirred at room temperature for overnight. The reaction mixture was quenched with water and extracted with ethyl acetate, dried over anhydrous $Na_2SO_4$ and concentrated under reduced pressure. Purification by silica gel column chromatography using ethyl acetate/hexane as the eluent to afford the title compound (2.19 g, 41%).

Step 5: 3-(2-amino-1-phenyl-1H-imidazol-4-yl)-N-phenylpropanamide

A solution of 4-oxo-N-phenyl-5-(phenylamino)pentanamide (200 mg, 0.708 mmol) and cyanamide (280 mg, 6.66 mmol) in MeOH (10 mL) was refluxed for overnight. The solvent was removed under reduced pressure. The residue was diluted with DCM, washed with water (30 mL×3). The organic phase was dried over anhydrous $Na_2SO_4$ and concentrated under reduced pressure. Purification by silica gel column chromatography using DCM/MeOH as the eluent to afford the title compound (70 mg, 32%). $^1$H NMR (CDCl$_3$, 400 MHz): δ 9.19 (bs, 1H), 7.55-7.53 (m, 2H), 7.53-7.46 (m, 2H), 7.45-7.43 (m, 1H), 7.43-7.20 (m, 4H), 7.10-6.99 (m, 1H), 2.88-2.85 (m, 2H), 2.75-2.71 (m, 2H).

Step 6: 3-(3-nitro-1-((2-(trimethylsilyl)ethoxy)methyl)-1H-pyrazol-4-yl)-N-(4-(3-oxo-3-(phenylamino)propyl)-1-phenyl-1H-imidazol-2-yl)benzamide A mixture of 3-(2-amino-1-phenyl-1H-imidazol-4-yl)-N-phenylpropanamide (135 mg, 0.44 mmol) and 3-(3-nitro-1-((2-(trimethylsilyl)ethoxy)methyl)-1H-pyrazol-4-yl)benzoic acid (Intermediate 3) (208 mg, 0.57 mmol) EDCI (126.7 mg, 0.66 mmol), HOBt (89.3 mg, 0.66 mmol) and DIPEA (0.23 mL, 1.32 mmol) in DMF was stirred at room temperature for overnight. The reaction mixture was quenched with water and extracted with ethyl acetate, dried over anhydrous $Na_2SO_4$ and concentrated under reduced pressure. Purification by silica gel column chromatography using DCM/MeOH as the eluent to afford the title compound (187 mg, 65%). $^1$H NMR (CDCl$_3$, 400 MHz): δ 8.29 (s, 1H), 8.23-8.18 (m, 1H), 7.68 (s, 1H), 7.67-7.64 (m, 2H), 7.55-7.48 (m, 5H), 7.48-7.39 (m, 2H), 7.39-7.25 (m, 5H), 7.12-7.08 (m, 1H), 6.69 (s, 1H), 5.50 (s, 2H), 3.65-3.60 (m, 2H), 3.08-3.00 (m, 2H), 2.78-2.70 (m, 2H), 1.00-0.90 (m, 2H), −0.02 (s, 9H).

Step 7: 3-(3-nitro-1H-pyrazol-4-yl)-N-(4-(3-oxo-3-(phenylamino)propyl)-1-phenyl-1H-imidazol-2-yl)benzamide TFA (1.0 mL) was added to the solution of 3-(3-nitro-1-((2-(trimethylsilyl)ethoxy)methyl)-1H-pyrazol-4-yl)-N-(4-(3-oxo-3-(phenylamino)propyl)-1-phenyl-1H-imidazol-2-yl)benzamide (80 mg, 0.12 mmol) in DCM and stirred at room temperature for overnight. The reaction mixture was quenched with sat. aq. $NaHCO_3$ and extracted with DCM, dried over anhydrous $Na_2SO_4$ and concentrated under reduced pressure. Purification by silica gel column chromatography using DCM/MeOH as the eluent to afford the title compound (40 mg, 62%). $^1$H NMR (DMSO-D$_6$, 400 MHz): δ 10.03 (s, 1H), 8.20-8.00 (m, 2H), 7.75-7.58 (m, 4H), 7.50-7.36 (m, 5H), 7.31-7.27 (m, 2H), 7.20 (s, 1H), 7.05-7.01 (m, 1H), 2.95-2.85 (m, 2H), 2.74-2.70 (m, 2H).

Example 2. 3-(3-amino-1H-pyrazol-4-yl)-N-(4-(3-oxo-3-(phenylamino)propyl)-1-phenyl-1H-imidazol-2-yl)benzamide

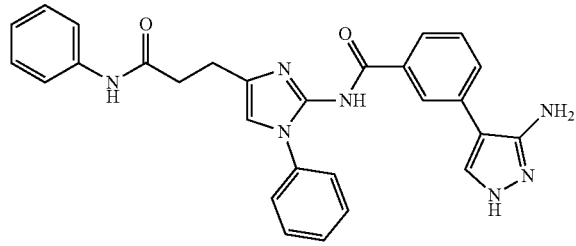 [SMILES: Nc1n[nH]cc1-c1cccc(C(=O)Nc2nc(CCC(=O)Nc3ccccc3)cn2-c2ccccc2)c1]

Step 1: 3-(3-amino-1-((2-(trimethylsilyl)ethoxy)methyl)-1H-pyrazol-4-yl)-N-(4-(3-oxo-3-(phenylamino)propyl)-1-phenyl-1H-imidazol-2-yl)benzamide To a solution of 3-(3-nitro-1-((2-(trimethylsilyl)ethoxy)methyl)-1H-pyrazol-4-yl)-N-(4-(3-oxo-3-(phenylamino)propyl)-1-phenyl-1H-imidazol-2-yl)benzamide (Example 1, Step 6) (150 mg, 0.23 mmol) in MeOH was added palladium on carbon (15 mg). The mixture was flushed with hydrogen via a hydrogen-filled balloon and then stirred at room temperature for overnight. The reaction mixture was filtered through celite, washed through with MeOH and concentrated under reduced pressure to afford the title compound (145 mg, 99%).

Step 2: 3-(3-amino-1H-pyrazol-4-yl)-N-(4-(3-oxo-3-(phenylamino)propyl)-1-phenyl-1H-imidazol-2-yl)benzamide TFA (1.0 mL) was added to the solution of 3-(3-amino-1-((2-(trimethylsilyl)ethoxy)methyl)-1H-pyrazol-4-yl)-N-(4-(3-oxo-3-(phenylamino)propyl)-1-phenyl-1H-imidazol-2-yl)benzamide (140 mg, 0.22 mmol) in DCM (5 mL) and stirred at room temperature for overnight. The reaction mixture was quenched with sat. aq. NaHCO$_3$ and extracted with DCM, dried over anhydrous Na$_2$SO$_4$ and concentrated under reduced pressure. Purification by silica gel column chromatography using DCM/MeOH as the eluent to afford the title compound (10 mg, 10%). $^1$H NMR (CD$_3$OD, 400 MHz): δ 8.28 (s, 1H), 7.89-7.87 (m, 1H), 7.80-7.76 (m, 2H), 7.57-7.42 (m, 7H), 7.39-7.36 (m, 1H), 7.31-7.27 (m, 2H), 7.09-7.04 (m, 2H), 5.56-5.53 (m, 1H), 5.00-4.97 (m, 1H), 3.01-2.98 (m, 2H), 2.79-2.76 (m, 2H).

Example 3. N-(4-(3-oxo-3-(phenylamino)propyl)-1-phenyl-1H-imidazol-2-yl)-3-(3-(trifluoromethyl)-1H-pyrazol-4-yl)benzamide

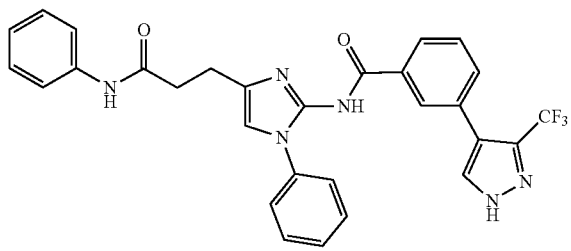 [SMILES: O=C(CCc1cn(-c2ccccc2)c(NC(=O)c2cccc(-c3c[nH]nc3C(F)(F)F)c2)n1)Nc1ccccc1]

Step 1: N-(4-(3-oxo-3-(phenylamino)propyl)-1-phenyl-1H-imidazol-2-yl)-3-(3-(trifluoromethyl)-1-((2-(trimethylsilyl)ethoxy)methyl)-1H-pyrazol-4-yl)benzamide A mixture of 3-(2-amino-1-phenyl-1H-imidazol-4-yl)-N-phenylpropanamide (Example 1, Step 5) (150 mg, 0.49 mmol), 3-(3-(trifluoromethyl)-1-((2-(trimethylsilyl)ethoxy)methyl)-1H-pyrazol-4-yl)benzoic acid (Intermediate 3) (208 mg, 0.54 mmol), HBTU (278.5 mg, 0.73 mmol) and DIPEA (0.26 mL, 1.47 mmol) in DCM (10 mL) was stirred at room temperature for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (275 mg, 83%). $^1$H NMR (CDCl$_3$, 400 MHz): δ 8.28 (s, 1H), 8.17-8.14 (m, 1H), 7.84 (s, 1H), 7.70-7.62 (m, 3H), 7.60-7.52 (m, 2H), 7.52-7.30 (m, 7H), 7.15-7.07 (m, 1H), 6.68 (s, 1H), 5.48 (s, 2H), 3.67-3.62 (m, 2H), 3.08-3.00 (m, 2H), 2.78-2.70 (m, 2H), 1.00-0.90 (m, 2H), 0.01 (s, 9H).

Step 2: N-(4-(3-oxo-3-(phenylamino)propyl)-1-phenyl-1H-imidazol-2-yl)-3-(3-(trifluoromethyl)-1H-pyrazol-4-yl)benzamide TFA (2.0 mL) was added to the solution of N-(4-(3-oxo-3-(phenylamino)propyl)-1-phenyl-1H-imidazol-2-yl)-3-(3-(trifluoromethyl)-1-((2-(trimethylsilyl)ethoxy)methyl)-1H-pyrazol-4-yl)benzamide (265 mg, 0.39 mmol) in DCM (10 mL) and stirred at room temperature for overnight. The reaction mixture was quenched with sat. aq. NaHCO$_3$ and extracted with DCM, dried over anhydrous Na$_2$SO$_4$ and concentrated under reduced pressure. Purification by silica gel column chromatography using DCM/MeOH as the eluent to afford the title compound (58 mg, 27%). $^1$H NMR (DMSO-D$_6$, 400 MHz): δ 13.78 (s, 1H), 12.65 (bs, 0.6H), 10.52 (bs, 0.4H), 10.00 (s, 1H), 8.22-7.65 (m, 4H), 7.60-7.15 (m, 10H), 7.05-7.01 (m, 1H), 2.95-2.80 (m, 2H), 2.74-2.70 (m, 2H).

Example 4. N-(4-(3-oxo-3-(phenylamino)propyl)-1-phenyl-1H-imidazol-2-yl)-5-(1H-pyrazol-4-yl)nicotinamide

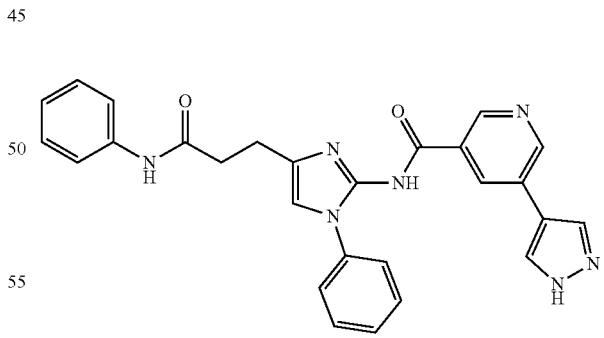

Step 1: N-(4-(3-oxo-3-(phenylamino)propyl)-1-phenyl-1H-imidazol-2-yl)-5-(1-((2-(trimethylsilyl)ethoxy)methyl)-1H-pyrazol-4-yl)nicotinamide A mixture of 3-(2-amino-1-phenyl-1H-imidazol-4-yl)-N-phenylpropanamide (Example 1, Step 5) (73 mg, 0.238 mmol), 5-(1-((2-(trimethylsilyl)ethoxy)methyl)-1H-pyrazol-4-yl)nicotinic acid (Intermediate 6) (83.6 mg, 0.26 mmol), HBTU (135 mg, 0.35 mmol) and DIPEA (0.12 mL, 0.71 mmol) in DCM (10 mL) was stirred at room temperature for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (77 mg, 53%). $^1$H NMR (CDCl$_3$, 400 MHz): δ 9.24 (s, 1H), 8.79 (s, 1H), 8.52 (s, 1H), 7.90-7.87 (m, 2H), 7.70-7.65 (m, 2H), 7.56-7.48 (m, 4H), 7.42-7.30 (m, 4H), 7.16-7.10 (m, 1H), 6.69 (s, 1H), 5.47 (s, 2H), 3.63-3.59 (m, 2H), 3.07-3.03 (m, 2H), 2.78-2.75 (m, 2H), 0.96-0.91 (m, 2H), −0.02 (s, 9H).

Step 2: N-(4-(3-oxo-3-(phenylamino)propyl)-1-phenyl-1H-imidazol-2-yl)-5-(1H-pyrazol-4-yl)nicotinamide TFA (0.5 mL) was added to the solution of N-(4-(3-oxo-3-(phenylamino)propyl)-1-phenyl-1H-imidazol-2-yl)-5-(1-((2-(trimethylsilyl)ethoxy)methyl)-1H-pyrazol-4-yl)nicotinamide (77 mg, 0.126 mmol) in DCM (5 mL) and stirred at room temperature for overnight. The reaction mixture was quenched with sat. aq. NaHCO$_3$ and extracted with DCM, dried over anhydrous Na$_2$SO$_4$ and concentrated under reduced pressure. Purification by silica gel column chromatography using DCM/MeOH as the eluent to afford the title compound (45 mg, 75%). $^1$H NMR (CD$_3$OD, 400 MHz): δ 8.95-8.94 (m, 1H), 8.82-8.81 (m, 1H), 8.54 (s, 1H), 8.07 (s, 2H), 7.64-7.41 (m, 8H), 7.32-7.27 (m, 2H), 7.10-7.06 (m, 1H), 7.02 (s, 1H), 3.05-3.00 (m, 2H), 2.82-2.78 (m, 2H).

Example 5. 3-(isoxazol-4-yl)-N-(4-(3-oxo-3-(phenylamino)propyl)-1-phenyl-1H-imidazol-2-yl)benzamide

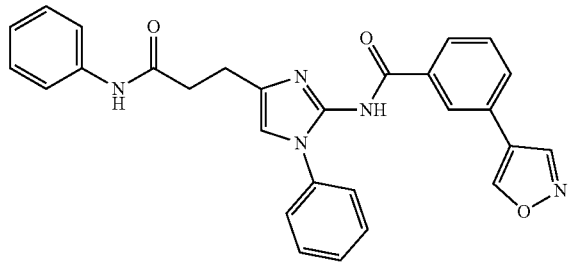 [SMILES: O=C(CCc1cn(-c2ccccc2)c(NC(=O)c2cncc(-c3cn[nH]c3)c2)n1)Nc1ccccc1]

Step 1: 3-bromo-N-(4-(3-oxo-3-(phenylamino)propyl)-1-phenyl-1H-imidazol-2-yl)benzamide A mixture of 3-(2-amino-1-phenyl-1H-imidazol-4-yl)-N-phenylpropanamide (Example 1, Step 5) (200 mg, 0.653 mmol), 3-bromobenzoic acid (144 mg, 0.718 mmol), HBTU (371 mg, 0.98 mmol) and DIPEA (0.34 mL, 1.96 mmol) in DCM (10 mL) was stirred at room temperature for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (150 mg, 47%).

Step 2: 3-(isoxazol-4-yl)-N-(4-(3-oxo-3-(phenylamino)propyl)-1-phenyl-1H-imidazol-2-yl)benzamide A mixture of 3-bromo-N-(4-(3-oxo-3-(phenylamino)propyl)-1-phenyl-1H-imidazol-2-yl)benzamide (70 mg, 0.14 mmol), 4-(4,4,5,5-tetramethyl-1,3,2-dioxaborolan-2-yl)isoxazole (Alfa Aesar) (33 mg, 0.17 mmol), Pd(PPh$_3$)$_4$ (8.0 mg, 0.007 mmol), and K$_2$CO$_3$ (38 mg, 0.28 mmol) in 1,4-dioxane/H$_2$O (4/1, 100 mL). The reaction mixture was heated to 100° C. in a sealed tube for 2 h in a microwave. The reaction mixture was diluted with DCM and washed with water. The organic phase was dried over anhydrous Na$_2$SO$_4$ and concentrated under reduced pressure. Purification by silica gel column chromatography using DCM/MeOH as the eluent to afford the title compound (2.8 mg, 4%). $^1$H NMR (CDCl$_3$, 400 MHz): δ 8.68 (s, 1H), 8.57 (s, 1H), 8.33 (s, 1H), 8.16-8.13 (m, 1H), 7.70-7.60 (m, 2H), 7.58-7.47 (m, 4H), 7.43-7.38 (m, 2H), 7.38-7.29 (m, 3H), 7.18-7.09 (m, 1H), 6.69 (s, 1H), 3.10-3.03 (m, 2H), 2.78-72.73 (m, 2H).

Example 6. N-(4-(3-oxo-3-(phenylamino)propyl)-1-phenyl-1H-imidazol-2-yl)-3-(1H-pyrazol-4-yl)benzamide (Scheme 1)

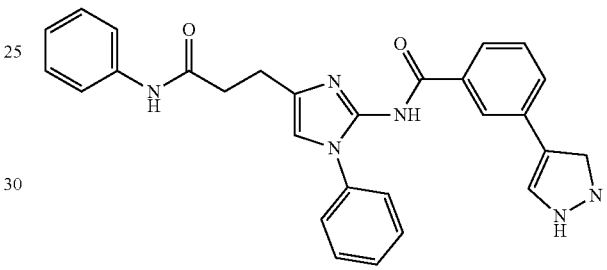

Step 1: methyl 3-(1-phenyl-2-(3-(1-((2-(trimethylsilyl)ethoxy)methyl)-1H-pyrazol-4-yl)benzamido)-1H-imidazol-4-yl)propanoate A mixture of methyl 3-(2-amino-1-phenyl-1H-imidazol-4-yl)propanoate (Intermediate 24) (2 g, 8.15 mmol), 3-(1-((2-(trimethylsilyl)ethoxy)methyl)-1H-pyrazol-4-yl)benzoic acid (Intermediate 1) (2.85 g, 8.96 mmol), HATU (4.65 g, 12.22 mmol) and DIPEA (4.25 mL, 24.45 mmol) in DCM was stirred at room temperature for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (3.0 g, 67%). $^1$H NMR (400 MHz, CDCl$_3$) δ 8.41-8.34 (m, 1H), 8.11-8.02 (m, 1H), 7.90-7.82 (m, 2H), 7.79-7.70 (m, 2H), 7.61-7.49 (m, 3H), 7.45-7.34 (m, 2H), 6.63 (s, 1H), 5.46 (s, 2H), 3.71 (s, 3H), 3.64-3.59 (m, 2H), 2.75-2.62 (m, 2H), 2.52-2.39 (m, 2H), 1.00-0.87 (m, 2H), −0.02 (s, 9H).

Step 2: 3-(1-phenyl-2-(3-(1-((2-(trimethylsilyl)ethoxy)methyl)-1H-pyrazol-4-yl)benzamido)-1H-imidazol-4-yl)propanoic acid To a solution of methyl 3-(1-phenyl-2-(3-(1-((2-(trimethylsilyl)ethoxy)methyl)-1H-pyrazol-4-yl)benzamido)-1H-imidazol-4-yl)propanoate (3.0 g, 5.50 mmol) in MeOH (20 mL) was added 1N—NaOH (22 mL, 22 mmol). The reaction mixture was stirred at room temperature for overnight. The mixture was evaporated under reduced pressure and acidified with 1N—HCl, filtered the solid to get the title compound (2.5 g, 85%). ¹H NMR (400 MHz, CDCl₃) δ 8.35-8.24 (m, 1H), 8.02-7.91 (m, 1H), 7.89-7.77 (m, 2H), 7.71-7.59 (m, 2H), 7.59-7.44 (m, 3H), 7.44-7.28 (m, 2H), 6.62 (s, 1H), 5.43 (s, 2H), 3.65-3.52 (m, 2H), 2.84-2.67 (m, 2H), 2.58-2.42 (m, 2H), 1.00-0.87 (m, 2H), −0.02 (s, 9H).

Step 3: N-(4-(3-oxo-3-(phenylamino)propyl)-1-phenyl-1H-imidazol-2-yl)-3-(1-((2-(trimethylsilyl)ethoxy)methyl)-1H-pyrazol-4-yl)benzamide A mixture of 3-(1-phenyl-2-(3-(1-((2-(trimethylsilyl)ethoxy)methyl)-1H-pyrazol-4-yl)benzamido)-1H-imidazol-4-yl)propanoic acid (2 g, 8.15 mmol), aniline (2.85 g, 8.96 mmol), HATU (4.65 g, 12.22 mmol) and DIPEA (4.25 mL, 24.45 mmol) in DCM was stirred at room temperature for overnight. The reaction mixture was quenched with water and extracted with DCM, dried over anhydrous Na₂SO₄ and concentrated under reduced pressure. Purification by silica gel column chromatography using DCM/MeOH as the eluent to afford the title compound (3.0 g, 67%). ¹H NMR (400 MHz, CDCl₃): δ 8.39-8.33 (m, 1H), 8.08-8.01 (m, 1H), 7.89-7.81 (m, 2H), 7.75-7.66 (m, 2H), 7.60-7.48 (m, 5H), 7.47-7.35 (m, 3H), 7.35-7.28 (m, 2H), 7.15-7.07 (m, 1H), 6.66 (s, 1H), 5.45 (s, 2H), 3.59 (t, J=8.4 Hz, 2H), 2.78-2.68 (m, 2H), 2.54-2.42 (m, 2H), 0.93 (t, J=8.4 Hz, 2H), −0.02 (s, 9H).

Step 4: N-(4-(3-oxo-3-(phenylamino)propyl)-1-phenyl-1H-imidazol-2-yl)-3-(1H-pyrazol-4-yl)benzamide TFA (0.5 mL) was added to the solution of N-(4-(3-oxo-3-(phenylamino)propyl)-1-phenyl-1H-imidazol-2-yl)-3-(1-((2-(trimethylsilyl)ethoxy)methyl)-1H-pyrazol-4-yl)benzamide (77 mg, 0.126 mmol) in DCM (5 mL) and stirred at room temperature for overnight. The reaction mixture was quenched with sat. aq. NaHCO₃ and extracted with DCM, dried over anhydrous Na₂SO₄ and concentrated under reduced pressure. Purification by silica gel column chromatography using DCM/MeOH as the eluent to afford the title compound (50 mg, 83%). ¹H NMR (CD₃OD, 400 MHz): δ 8.26-7.83 (m, 3H), 7.83-7.62 (m, 2H), 7.62-7.34 (m, 8H), 7.34-7.23 (m, 2H), 7.18-7.02 (m, 2H), 3.01-2.98 (m, 2H), 2.79-2.76 (m, 2H).

The following compounds were made in a similar manner to that described in Example 6 and in general scheme 1.

TABLE 4

| Ex. | Structure | Analytical data |
| --- | --- | --- |
| 7 | | ¹H NMR (CD₃OD, 400 MHz): δ 8.24-8.15 (m, 1H), 7.97-7.93 (m, 2H), 7.85-7.76 (m, 1H), 7.74-7.68 (m, 1H), 7.65-7.57 (m, 2H), 7.55-7.50 (m, 2H), 7.44-7.37 (m, 2H), 7.05-6.97 (m, 1H), 2.92-2.86 (m, 2H), 2.68-2.62 (m, 2H). |
| 8 | | ¹H NMR (CD₃OD, 400 MHz): δ 8.22-8.10 (m, 1H), 7.97-7.93 (m, 2H), 7.80-7.68 (m, 2H), 7.60-7.47 (m, 4H), 7.44-7.36 (m, 2H), 7.05-7.00 (m, 1H), 2.92-2.83 (m, 2H), 2.70-2.53 (m, 3H), 2.49-2.42 (m, 3H), 1.69-1.56 (m, 4H), 1.39-1.30 (2H). |
| 9 | | ¹H NMR (CD₃OD, 400 MHz): δ 8.14-8.09 (m, 1H), 7.99-7.97 (m, 2H), 7.77-7.73 (m, 2H), 7.53-7.47 (m, 4H), 7.44-7.38 (m, 2H), 7.08 (s, 1H), 3.95-3.90 (m, 4H), 2.95-2.88 (m, 2H), 2.82-2.75 (m, 2H), 2.66-2.57 (m, 4H), 2.33-2.27 (3H). |

TABLE 4-continued

| Ex. | Structure | Analytical data |
|---|---|---|
| 10 | | ¹H NMR (CD₃OD, 400 MHz): δ 8.00-7.96 (m, 2H), 7.90-7.87 (m, 1H), 7.77-7.72 (m, 2H), 7.57-7.54 (m, 2H), 7.52-7.46 (m, 3H), 7.44-7.39 (m, 3H), 7.13-7.08 (m, 1H), 7.07-7.03 (m, 2H), 3.04-2.98 (m, 2H), 2.81-2.75 (m, 2H). |
| 11 | | ¹H NMR (CD₃OD, 400 MHz): δ 8.08-8.01 (m, 2H), 7.95-7.90 (m, 1H), 7.82-7.75 (m, 2H), 7.67-7.62 (m, 1H), 7.50-7.37 (m, 5H), 7.16 (s, 1H), 3.67-3.60 (m, 6H), 3.58-3.55 (m, 2H), 2.98-2.92 (m, 2H), 2.83-2.78 (m, 2H). |
| 12 | | ¹H NMR (CD₃OD, 400 MHz): δ 8.38 (s, 1H), 8.08-8.04 (m, 1H), 7.93-7.88 (m, 2H), 7.74-7.70 (m, 2H), 7.59-7.57 (m, 1H), 7.55-7.50 (m, 2H), 7.42-7.37 (m, 2H), 6.66 (s, 1H), 3.64-3.61 (m, 2H), 3.41-3.37 (m, 2H), 2.99-2.95 (m, 2H), 2.72-2.67 (m, 2H), 1.70-1.55 (m, 6H). |
| 13 | | ¹H NMR (CD₃OD, 400 MHz): δ 8.12-8.08 (m, 1H), 8.00-7.97 (m, 2H), 7.78-7.70 (m, 2H), 7.60-7.50 (m, 4H), 7.47-7.42 (m, 2H), 7.13 (s, 1H), 3.43-3.39 (m, 1H), 3.27-3.23 (m, 4H), 3.19-3.13 (m, 1H), 2.98-2.88 (m, 4H), 2.71-2.62 (m, 1H), 2.55-2.51 (m, 1H), 2.03-1.95 (m, 1H), 1.83-1.75 (m, 2H), 1.63-1.58 (m, 1H). |
| 14 | | ¹H NMR (CD₃OD, 400 MHz): δ 8.08-7.92 (m, 3H), 7.80-7.65 (m, 3H), 7.55-7.48 (m, 3H), 7.47-7.42 (m, 4H), 7.24-7.18 (m, 2H), 7.15-7.09 (m, 1H), 3.67-3.62 (m, 2H), 3.61-3.56 (m, 4H), 2.97-2.92 (m, 2H), 2.83-2.78 (m, 2H), 2.50-2.45 (m, 4H). |

TABLE 4-continued

| Ex. | Structure | Analytical data |
| --- | --- | --- |
| 15 | | ¹H NMR (CD₃OD, 400 MHz): δ 8.32-8.27 (m, 1H), 8.11-8.04 (m, 2H), 7.99-7.96 (m, 2H), 7.85-7.68 (m, 3H), 7.58-7.52 (m, 4H), 7.48-7.43 (m, 2H), 7.19 (s, 1H), 7.16-7.12 (m, 1H), 3.09-3.04 (m, 2H), 2.92-2.87 (m, 2H). |
| 16 | | ¹H NMR (CD₃OD, 400 MHz): δ 8.13-8.07 (m, 1H), 8.01-7.96 (m, 2H), 7.85-7.68 (m, 3H), 7.52-7.39 (m, 6H), 7.13-7.10 (m, 1H), 7.16-6.99 (m, 1H), 6.97-6.92 (m, 1H), 3.04-2.98 (m, 2H), 2.87-2.82 (m, 2H). |
| 17 | | ¹H NMR (CD₃OD, 400 MHz): δ 8.09 (s, 1H), 7.98-7.93 (m, 2H), 7.78-7.72 (m, 2H), 7.60-7.50 (m, 4H), 7.47-7.42 (m, 2H), 7.14 (s, 1H), 3.43-3.37 (m, 1H), 3.28-3.24 (m, 4H), 3.20-3.16 (m, 1H), 2.99-2.90 (m, 4H), 2.72-2.65 (m, 1H), 2.57-2.53 (m, 1H), 2.24-1.90 (m, 1H), 1.83-1.75 (m, 2H), 1.64-1.56 (m, 1H). |
| 18 | | ¹H NMR (CD₃OD, 400 MHz): δ 8.10-7.87 (m, 3H), 7.83-7.75 (m, 1H), 7.67-7.62 (m, 2H), 7.50-7.37 (m, 5H), 7.14 (s, 1H), 3.75-3.68 (m, 3H), 2.97-2.91 (m, 2H), 2.79-2.72 (m, 2H). |
| 19 | | ¹H NMR (CD₃OD, 400 MHz): δ 8.09 (s, 1H), 8.00-7.93 (m, 2H), 7.82-7.77 (m, 1H), 7.74-7.71 (m, 1H), 7.61-7.55 (m, 4H), 7.53-7.43 (m, 2H), 7.19 (s, 1H), 4.27-4.18 (m, 1H), 3.55-3.42 (m, 4H), 3.38-3.35 (m, 3H), 3.02-2.95 (m, 2H), 2.90-2.83 (m, 1H), 2.80-2.75 (m, 1H), 2.09-2.03 (m, 1H), 2.00-1.90 (m, 3H). |

TABLE 4-continued

| Ex. | Structure | Analytical data |
|---|---|---|
| 20 | | ¹H NMR (CD₃OD, 400 MHz): δ 8.06-7.90 (m, 3H), 7.83-7.62 (m, 3H), 7.57-7.42 (m, 5H), 7.16-7.06 (m, 1H), 4.25-4.17 (m, 1H), 3.53-3.46 (m, 4H), 3.42-3.32 (m, 3H), 2.99-2.92 (m, 2H), 2.90-2.83 (m, 1H), 2.77-2.73 (m, 1H), 2.07-2.02 (m, 1H), 2.00-1.88 (m, 3H). |
| 21 | | ¹H NMR (CD₃OD, 400 MHz): δ 8.64 (s, 1H), 8.07-7.90 (m, 3H), 7.83-7.63 (m, 3H), 7.52-7.40 (m, 6H), 7.23-7.15 (m, 1H), 3.05-3.00 (m, 2H), 2.84-2.77 (m, 2H). |
| 22 | | ¹H NMR (CD₃OD, 400 MHz): δ 9.43-9.41 (m, 1H), 8.37-8.35 (m, 1H), 8.29-8.25 (m, 1H), 8.15-7.91 (m, 3H), 7.83-7.63 (m, 3H), 7.52-7.38 (m, 5H), 7.20-7.15 (m, 1H), 3.07-3.03 (m, 2H), 2.93-2.87 (m, 2H). |
| 23 | | ¹H NMR (CD₃OD, 400 MHz): δ 8.08 (s, 1H), 8.01-7.98 (m, 2H), 7.83-7.78 (m, 1H), 7.74-7.68 (m, 1H), 7.60-7.56 (m, 4H), 7.55-7.45 (m, 2H), 7.23 (s, 1H), 4.22-4.11 (m, 1H), 3.61-3.45 (m, 2H), 3.03-2.95 (m, 2H), 2.79-2.73 (m, 2H), 2.10-1.91 (m, 3H), 1.67-1.61 (m, 1H), 1.24-1.18 (m, 3H). |
| 24 | | ¹H NMR (CD₃OD, 400 MHz): δ 8.08 (s, 1H), 8.01-7.98 (m, 2H), 7.83-7.78 (m, 1H), 7.73-7.69 (m, 1H), 7.59-7.57 (m, 4H), 7.56-7.44 (m, 2H), 7.22 (s, 1H), 4.24-4.12 (m, 1H), 3.60-3.45 (m, 2H), 3.04-2.97 (m, 2H), 2.79-2.76 (m, 2H), 2.10-1.93 (m, 3H), 1.67-1.63 (m, 1H), 1.24-1.18 (m, 3H). |

TABLE 4-continued

| Ex. | Structure | Analytical data |
|---|---|---|
| 25 | | ¹H NMR (CD₃OD, 400 MHz): δ 8.20-8.10 (m, 1H), 8.00-7.90 (m, 2H), 7.78-7.58 (m, 3H), 7.55-7.48 (m, 3H), 7.43-7.35 (m, 2H), 7.09-7.02 (m, 1H), 3.76-3.48 (m, 4H), 3.04-2.99 (m, 1H), 2.95-2.89 (m, 2H), 2.77-2.70 (m, 2H), 2.24-2.09 (m, 2H). |
| 26 | | ¹H NMR (CD₃OD, 400 MHz): δ 8.11 (s, 1H), 7.97-7.96 (m, 2H), 7.77-7.72 (m, 2H), 7.57-7.50 (m, 4H), 7.45-7.41 (m, 2H), 7.08 (s, 1H), 3.78-3.46 (m, 4H), 3.06-3.02 (m, 1H), 2.97-2.92 (m, 2H), 2.77-2.72 (m, 2H), 2.24-2.12 (m, 2H). |
| 27 | | ¹H NMR (CD₃OD, 400 MHz): δ 8.04-8.02 (m, 1H), 7.99-7.93 (m, 2H), 7.80-7.77 (m, 1H), 7.67-7.63 (m, 1H), 7.59-7.51 (m, 5H), 7.41-7.35 (m, 1H), 7.36 (s, 1H), 3.28-3.26 (m, 4H), 3.05-2.99 (m, 2H), 2.79-2.74 (m, 2H), 1.97-1.95 (m, 4H). |
| 28 | | ¹H NMR (CD₃OD, 400 MHz): δ 8.08 (s, 1H), 7.99-7.97 (m, 2H), 7.81-7.78 (m, 1H), 7.73-7.70 (m, 1H), 7.59-7.56 (m, 4H), 7.52-7.44 (m, 2H), 7.20 (s, 1H), 3.53-3.45 (m, 4H), 3.02-2.97 (m, 2H), 2.80-2.75 (m, 2H), 2.01-1.97 (m, 2H), 1.92-1.86 (m, 2H). |
| 29 | | ¹H NMR (CD₃OD, 400 MHz): δ 8.07 (s, 1H), 8.01-7.99 (m, 2H), 7.84-7.80 (m, 1H), 7.72-7.68 (m, 1H), 7.61-7.52 (m, 5H), 7.50-7.45 (m, 1H), 7.26 (s, 1H), 4.24-4.14 (m, 2H), 3.06-2.99 (m, 2H), 2.94-2.84 (m, 1H), 2.81-2.74 (m, 1H), 2.30-2.14 (m, 2H), 1.68-1.55 (m, 2H), 1.23-1.14 (m, 6H). |
| 30 | | ¹H NMR (CD₃OD, 400 MHz): δ 8.09-7.90 (m, 3H), 7.82-7.62 (m, 3H), 7.55-7.37 (m, 5H), 7.17-7.05 (m, 1H), 4.34-4.28 (m, 1H), 3.82-3.77 (m, 1H), 2.93-2.87 (m, 3H), 2.82-2.72 (m, 2H), 1.76-1.58 (m, 6H), 1.30-1.27 (m, 1H), 1.18-1.14 (m, 2H). |

TABLE 4-continued

| Ex. | Structure | Analytical data |
|---|---|---|
| 31 | | $^1$H NMR (CD$_3$OD, 400 MHz): δ 8.09 (s, 1H), 8.00-7.98 (m, 2H), 7.81-7.78 (m, 1H), 7.74-7.71 (m, 1H), 7.59-7.55 (m, 4H), 7.51-7.43 (m, 2H), 7.17 (s, 1H), 4.52-4.46 (m, 1H), 3.81-3.76 (m, 1H), 2.99-2.94 (m, 3H), 2.83-2.72 (m, 2H), 1.76-1.58 (m, 6H), 1.30-1.27 (m, 1H), 1.19-1.16 (m, 2H). |
| 32 | | $^1$H NMR (CD$_3$OD, 400 MHz,) δ 8.09 (s, 1H), 7.99-7.97 (m, 2H), 7.81-7.78 (m, 1H), 7.73-7.70 (m, 1H), 7.59-7.55 (m, 4H), 7.52-7.43 (m, 2H), 7.19 (s, 1H), 4.80-4.74 (m, 1H), 4.26-4.19 (m, 1H), 3.02-2.92 (m, 3H), 2.79-2.70 (m, 1H), 1.93-1.82 (m, 1H), 1.70-1.58 (m, 4H), 1.52-1.46 (m, 1H), 1.34-1.20 (m, 6H). |
| 33 | | $^1$H NMR (CD$_3$OD, 400 MHz): δ 8.08 (s, 1H), 7.99-7.96 (m, 2H), 7.80-7.76 (m, 1H), 7.72-7.69 (m, 1H), 7.58-7.53 (m, 4H), 7.51-7.42 (m, 2H), 7.18 (s, 1H), 3.00-2.95 (m, 2H), 2.76-2.73 (m, 3H), 2.64-2.59 (m, 2H). |
| 34 | | $^1$H NMR (CD$_3$OD, 400 MHz): δ 8.06 (s, 1H), 8.02-8.00 (m, 2H), 7.87-7.84 (m, 1H), 7.71-7.67 (m, 1H), 7.65-7.59 (m, 5H), 7.52-7.48 (m, 1H), 7.38 (s, 1H), 3.59-3.55 (m, 1H), 3.49-3.46 (m, 1H), 3.31 (s, 1H), 3.23 (s, 1H), 3.07-3.03 (m, 2H), 2.93-2.90 (m, 1H), 2.87-2.83 (m, 1H), 1.67-1.58 (m, 2H), 1.49-1.45 (m, 2H), 0.97 (s, 3H), 0.92 (s, 3H). |
| 35 | | $^1$H NMR (CD$_3$OD, 400 MHz): δ 8.06 (s, 1H), 8.02-8.00 (m, 2H), 7.87-7.84 (m, 1H), 7.70-7.67 (m, 1H), 7.66-7.61 (m, 5H), 7.53-7.48 (m, 1H), 7.39 (s, 1H), 3.64-3.60 (m, 2H), 3.55-3.51 (m, 2H), 3.07-3.03 (m, 2H), 2.90-2.86 (m, 2H), 1.44-1.41 (m, 2H), 1.38-1.35 (m, 2H), 1.01 (s, 6H). |

TABLE 4-continued

| Ex. | Structure | Analytical data |
|---|---|---|
| 36 | | ¹H NMR (CD₃OD, 400 MHz): δ 8.13 (s, 1H), 7.97-7.94 (m, 2H), 7.77-7.73 (m, 2H), 7.56-7.49 (m, 4H), 7.46-7.40 (m, 2H), 7.05 (s, 1H), 3.92-3.76 (m, 2H), 3.64-3.51 (m, 2H), 2.98-2.90 (m, 2H), 2.81-2.74 (m, 2H), 2.45-2.36 (1H), 2.02-1.82 (m, 2H), 1.70-1.59 (m, 1H), 1.53-1.42 (m, 1H). |
| 37 | | ¹H NMR (CD₃OD, 400 MHz): δ 8.09 (s, 1H), 8.01-7.99 (m, 2H), 7.82-7.79 (m, 1H), 7.73-7.71 (m, 1H), 7.61-7.56 (m, 4H), 7.53-7.44 (m, 2H), 7.23 (s, 1H), 3.88-3.74 (m, 2H), 3.69-3.62 (m, 1H), 3.46-3.38 (m, 1H), 3.21-3.13 (m, 1H), 3.03-2.96 (m, 2H), 2.92-2.83 (m, 1H), 2.48-2.40 (1H), 2.04-1.97 (m, 1H), 1.86-1.78 (m, 1H), 1.74-1.64 (m, 1H), 1.57-1.47 (1H). |
| 38 | | ¹H NMR (CD₃OD, 400 MHz): δ 8.10 (s, 1H), 8.01-7.96 (m, 2H), 7.78-7.72 (m, 2H), 7.56-7.49 (m, 4H), 7.45-7.41 (m, 2H), 7.11 (s, 1H), 5.37-5.31 (m, 1H), 4.02-3.96 (m, 1H), 3.72-3.69 (m, 1H), 3.28-3.20 (m, 1H), 2.98-2.89 (m, 2H), 2.78-2.75 (m, 1H), 2.09-2.04 (m, 1H), 1.81-1.69 (m, 4H), 1.56-1.46 (m, 1H). |
| 39 | | ¹H NMR (CD₃OD, 400 MHz): δ 8.07 (s, 1H), 8.01-8.00 (m, 2H), 7.86-7.83 (m, 1H), 7.71-7.68 (m, 1H), 7.64-7.56 (m, 5H), 7.51-7.47 (m, 1H), 7.34 (s, 1H), 5.36-5.28 (m, 1H), 4.02-3.96 (m, 2H), 3.28-3.23 (m, 1H), 3.08-3.04 (m, 2H), 2.98-2.93 (m, 1H), 2.09-2.05 (m, 1H), 1.83-1.72 (m, 4H), 1.59-1.50 (m, 1H). |
| 40 | | ¹H NMR (CD₃OD, 400 MHz): δ 8.11 (s, 1H), 8.01-8.00 (m, 2H), 7.82-7.77 (m, 1H), 7.74-7.71 (m, 1H), 7.59-7.54 (m, 4H), 7.51-7.42 (m, 2H), 7.22 (s, 1H), 4.23-4.20 (m, 1H), 4.14-4.02 (m, 1H), 3.74-3.68 (m, 1H), 3.43-3.37 (m, 1H), 3.01-2.97 (m, 2H), 2.89-2.85 (m, 2H), 2.15-2.08 (m, 1H), 1.88-1.82 (m, 1H), 1.74-1.58 (m, 2H). |

Example 41. N-(4-(2-(methylamino)-2-oxoethyl)-1-phenyl-1H-imidazol-2-yl)-3-(1H-pyrazol-4-yl)benzamide

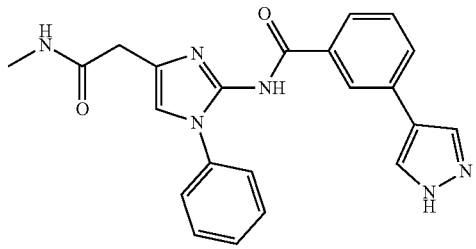 [SMILES: CNC(=O)Cc1cn(-c2ccccc2)c(NC(=O)c2cccc(-c3cn[nH]c3)c2)n1]

Step 1: methyl 2-(1-phenyl-2-(3-(1-((2-(trimethylsilyl)ethoxy)methyl)-1H-pyrazol-4-yl)benzamido)-1H-imidazol-4-yl)acetate A mixture of methyl 2-(2-amino-1-phenyl-1H-imidazol-4-yl)acetate (Intermediate 25) (2.62 g, 11.35 mmol), 3-(1-((2-(trimethylsilyl)ethoxy)methyl)-1H-pyrazol-4-yl)benzoic acid (Intermediate 1) (3.8 g, 11.92 mmol), HBTU (6.45 g, 17.02 mmol) and DIPEA (5.9 mL, 34.05 mmol) in DCM was stirred at room temperature for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (5.7 g, 95%). $^1$H NMR (CDCl$_3$, 400 MHz): δ 8.33 (s, 1H), 8.03-8.01 (s, 1H), 7.85 (s, 1H), 7.84 (s, 1H), 7.76-7.66 (m, 2H), 7.58-7.48 (m, 3H), 7.42-7.34 (m, 2H), 6.84 (s, 1H), 5.45 (s, 2H), 3.80 (s, 3H), 3.67 (s, 2H), 3.60-3.57 (m, 2H), 0.95-0.91 (m, 2H), −0.02 (s, 9H).

Step 2: 2-(1-phenyl-2-(3-(1-((2-(trimethylsilyl)ethoxy)methyl)-1H-pyrazol-4-yl)benzamido)-1H-imidazol-4-yl)acetic acid To a solution of methyl 2-(1-phenyl-2-(3-(1-((2-(trimethylsilyl)ethoxy)methyl)-1H-pyrazol-4-yl)benzamido)-1H-imidazol-4-yl)acetate (2.84 g, 5.34 mmol) in MeOH (30 mL) was added 1N—NaOH (10.7 mL, 10.7 mmol). The reaction mixture was stirred at room temperature for overnight. The mixture was evaporated under reduced pressure and acidified with 1N—HCl, filtered the solid to get the title compound (2.41 g, 87%). $^1$H NMR (DMSO-D$_6$, 400 MHz): δ 8.34 (s, 1H), 8.30-8.10 (m, 1H), 7.97 (s, 1H), 7.88-7.30 (m, 8H), 7.26 (s, 1H), 5.43 (s, 2H), 3.60-3.55 (m, 4H), 0.87-0.83 (m, 2H), −0.04 (s, 9H).

Step 3: N-(4-(2-(methylamino)-2-oxoethyl)-1-phenyl-1H-imidazol-2-yl)-3-(1-((2-(trimethylsilyl)ethoxy)methyl)-1H-pyrazol-4-yl)benzamide A mixture of 2-(1-phenyl-2-(3-(1-((2-(trimethylsilyl)ethoxy)methyl)-1H-pyrazol-4-yl)benzamido)-1H-imidazol-4-yl)acetic acid (150 mg, 0.29 mmol), methylamine hydrochloride (23.5 mg, 0.35 mmol), EDCI (83.3 mg, 0.43 mmol), HOBt (58.7 mg, 0.43 mmol) and DIPEA (0.3 mL, 1.73 mmol) in DMF was stirred at room temperature for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (111 mg, 72%). $^1$H NMR (CDCl$_3$, 400 MHz): δ 8.21 (s, 1H), 7.91-7.83 (m, 1H), 7.79 (s, 1H), 7.78 (s, 1H), 7.61-7.51 (m, 3H), 7.48-7.40 (m, 2H), 7.39-7.30 (m, 2H), 6.85 (s, 1H), 6.80-6.70 (m, 1H), 5.41 (s, 2H), 3.60-3.55 (m, 2H), 3.53 (s, 2H), 2.75 (s, 3H), 0.93-0.89 (m, 2H), −0.02 (s, 9H).

Step 4: N-(4-(2-(methylamino)-2-oxoethyl)-1-phenyl-1H-imidazol-2-yl)-3-(1H-pyrazol-4-yl)benzamide TFA (0.5 mL) was added to the solution of N-(4-(2-(methylamino)-2-oxoethyl)-1-phenyl-1H-imidazol-2-yl)-3-(1-((2-(trimethylsilyl)ethoxy)methyl)-1H-pyrazol-4-yl)benzamide (110 mg, 0.21 mmol) in DCM (10 mL) and stirred at room temperature for overnight. The reaction mixture was quenched with sat. aq. NaHCO$_3$ and extracted with DCM, dried over anhydrous Na$_2$SO$_4$ and concentrated under reduced pressure. Purification by silica gel column chromatography using DCM/MeOH as the eluent to afford the title compound (37 mg, 45%). $^1$H NMR (CD$_3$OD, 400 MHz): δ 8.18-7.85 (m, 3H), 7.85-7.35 (m, 8H), 7.27 (s, 1H), 3.56 (s, 2H), 2.78 (s, 3H).

The following compounds were made in a similar manner to that described in Example 41 and in general scheme 1.

TABLE 5

| Ex. | Structure | Analytical data |
|---|---|---|
| 42 | (structure) | $^1$H NMR (CDCl$_3$, 400 MHz): δ 8.31 (s, 1H), 7.99 (s, 1H), 7.90-7.82 (m, 2H), 7.62-7.32 (m, 7H), 6.90 (s, 1H), 3.79 (s, 3H), 3.71 (s, 2H). |

TABLE 5-continued

| Ex. | Structure | Analytical data |
|---|---|---|
| 43 | | ¹H NMR (CD₃OD, 400 MHz): δ 8.07 (s, 1H), 7.98 (s, 2H), 7.76-7.70 (m, 1H), 7.70-7.65 (m, 1H), 7.55-7.47 (m, 4H), 7.47-7.39 (m, 2H), 7.24 (s, 1H), 3.68 (s, 2H). |
| 44 | | ¹H NMR (CD₃OD, 400 MHz): δ 8.18-7.85 (m, 3H), 7.85-7.35 (m, 8H), 7.27 (s, 1H), 3.53-3.46 (m, 3H), 3.36-3.30 (m, 2H), 3.28 (s, 2H), 3.25-3.18 (m, 1H), 3.03-2.96 (m, 1H), 2.78-2.71 (m, 1H), 2.10-1.95 (m, 1H), 1.90-1.78 (m, 2H), 1.71-1.58 (m, 1H). |
| 45 | | ¹H NMR (CD₃OD, 400 MHz): δ 8.15-7.85 (m, 3H), 7.85-7.37 (m, 8H), 7.27 (s, 1H), 3.53-3.44 (m, 3H), 3.36-3.30 (m, 2H), 3.28 (s, 2H), 3.25-3.18 (m, 1H), 3.03-2.96 (m, 1H), 2.78-2.71 (m, 1H), 2.10-1.95 (m, 1H), 1.90-1.78 (m, 2H), 1.71-1.58 (m, 1H). |
| 46 | | ¹H NMR (CDCl₃, 400 MHz): δ 8.31 (s, 1H), 8.02-7.90 (m, 1H), 7.92-7.82 (m, 2H), 7.71-7.64 (m, 2H), 7.60-7.57 (m, 1H), 7.52-7.43 (m, 2H), 7.41-7.35 (m, 2H), 6.91 (s, 1H), 4.39-4.18 (m, 1H), 3.94-3.70 (m, 1H), 3.64 (s, 2H), 3.62-3.48 (m, 3H), 3.41-3.33 (m, 3H), 2.20-1.90 (m, 4H). |
| 47 | | ¹H NMR (CDCl₃, 400 MHz): δ 8.31 (s, 1H), 8.02-7.90 (m, 1H), 7.92-7.87 (m, 2H), 7.71-7.64 (m, 2H), 7.60-7.57 (m, 1H), 7.52-7.43 (m, 2H), 7.41-7.35 (m, 2H), 6.91 (s, 1H), 4.39-4.18 (m, 1H), 3.94-3.70 (m, 1H), 3.64 (s, 2H), 3.62-3.48 (m, 3H), 3.41-3.33 (m, 3H), 2.20-1.90 (m, 4H). |

Example 48. N-(4-(2-(methylamino)-2-oxoethyl)-1-phenyl-1H-imidazol-2-yl)-4-(1H-pyrazol-4-yl)benzamide

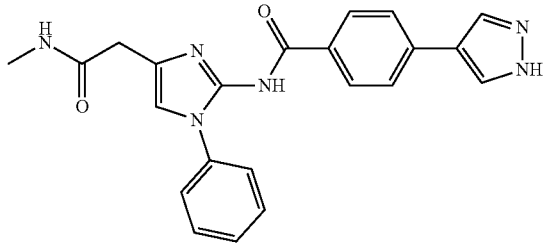 [SMILES: CNC(=O)Cc1cn(-c2ccccc2)c(NC(=O)c2ccc(-c3cn[nH]c3)cc2)n1]

Step 1: methyl 2-(1-phenyl-2-(4-(1-((2-(trimethylsilyl)ethoxy)methyl)-1H-pyrazol-4-yl)benzamido)-1H-imidazol-4-yl)acetate A mixture of methyl 2-(2-amino-1-phenyl-1H-imidazol-4-yl)acetate (Intermediate 25) (300 mg, 1.29 mmol), 4-(1-((2-(trimethylsilyl)ethoxy)methyl)-1H-pyrazol-4-yl)benzoic acid (Intermediate 2) (495 mg, 1.55 mmol), HBTU (738 mg, 1.93 mmol) and DIPEA (0.68 mL, 3.89 mmol) in DCM was stirred at room temperature for overnight. The reaction mixture was quenched with water and extracted with DCM, dried over anhydrous $Na_2SO_4$ and concentrated under reduced pressure. Purification by silica gel column chromatography using DCM/MeOH as the eluent to afford the title compound (472 mg, 68%). $^1$H NMR ($CDCl_3$, 400 MHz): δ 8.18-8.10 (m, 2H), 7.85 (s, 2H), 7.71-7.65 (m, 2H), 7.52-7.48 (m, 4H), 7.41-7.38 (m, 1H), 6.84 (s, 1H), 5.45 (s, 2H), 3.77 (s, 3H), 3.66 (s, 2H), 3.62-3.55 (m, 2H), 0.94-0.90 (m, 2H), −0.03 (s, 9H).

Step 2: 2-(1-phenyl-2-(4-(1-((2-(trimethylsilyl)ethoxy)methyl)-1H-pyrazol-4-yl)benzamido)-1H-imidazol-4-yl)acetic acid To a solution of methyl 2-(1-phenyl-2-(4-(1-((2-(trimethylsilyl)ethoxy)methyl)-1H-pyrazol-4-yl)benzamido)-1H-imidazol-4-yl)acetate (460 mg, 0.86 mmol) in MeOH (10 mL) was added 1N—NaOH (3.5 mL, 3.5 mmol). The reaction mixture was stirred at room temperature for overnight. The mixture was evaporated under reduced pressure and acidified with 1N—HCl, filtered the solid to get the title compound (320 mg, 71%).

Step 3: N-(4-(2-(methylamino)-2-oxoethyl)-1-phenyl-1H-imidazol-2-yl)-4-(1-((2-(trimethylsilyl)ethoxy)methyl)-1H-pyrazol-4-yl)benzamide A mixture of 2-(1-phenyl-2-(4-(1-((2-(trimethylsilyl)ethoxy)methyl)-1H-pyrazol-4-yl)benzamido)-1H-imidazol-4-yl)acetic acid (150 mg, 0.29 mmol), methylamine hydrochloride (23.5 mg, 0.35 mmol), EDCI (83.3 mg, 0.43 mmol), HOBt (58.7 mg, 0.43 mmol) and DIPEA (0.3 mL, 1.73 mmol) in DMF was stirred at room temperature for overnight. The reaction mixture was quenched with water and extracted with DCM, dried over anhydrous $Na_2SO_4$ and concentrated under reduced pressure. Purification by silica gel column chromatography using DCM/MeOH as the eluent to afford the title compound (102 mg, 68%). $^1$H NMR ($CDCl_3$, 400 MHz): δ 8.08-7.98 (m, 2H), 7.85 (s, 2H), 7.61-7.58 (m, 2H), 7.52-7.48 (m, 4H), 7.41-7.38 (m, 1H), 6.89 (s, 1H), 6.36 (bs, 1H), 5.45 (s, 2H), 3.63-3.56 (m, 2H), 3.54 (s, 2H), 2.84-2.80 (m, 3H), 0.94-0.90 (m, 2H), −0.03 (s, 9H).

Step 4: N-(4-(2-(methylamino)-2-oxoethyl)-1-phenyl-1H-imidazol-2-yl)-4-(1H-pyrazol-4-yl)benzamide TFA (1.0 mL) was added to the solution of N-(4-(2-(methylamino)-2-oxoethyl)-1-phenyl-1H-imidazol-2-yl)-4-(1-((2-(trimethylsilyl)ethoxy)methyl)-1H-pyrazol-4-yl)benzamide (95 mg, 0.18 mmol) in DCM (10 mL) and stirred at room temperature for overnight. The reaction mixture was quenched with sat. aq. $NaHCO_3$ and extracted with DCM, dried over anhydrous $Na_2SO_4$ and concentrated under reduced pressure. Purification by silica gel column chromatography using DCM/MeOH as the eluent to afford the title compound (13.2 mg, 18%). $^1$H NMR ($CD_3OD$, 400 MHz): δ 8.10-8.02 (m, 2H), 7.90-7.80 (m, 2H), 7.69-7.67 (m, 2H), 7.53-7.40 (m, 5H), 7.26 (s, 1H), 3.56 (s, 2H), 2.77 (s, 3H).

Example 49. N-(4-(2-(methylamino)-2-oxoethyl)-1-phenyl-1H-imidazol-2-yl)-1H-indazole-5-carboxamide

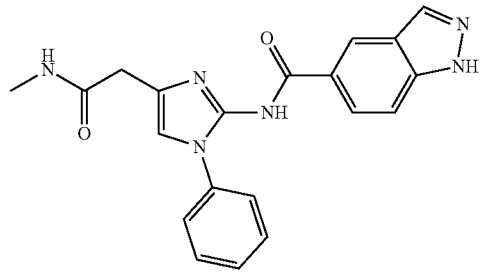 [SMILES: CNC(=O)Cc1cn(-c2ccccc2)c(NC(=O)c2ccc3[nH]ncc3c2)n1]

Step 1: ethyl 1-((2-(trimethylsilyl)ethoxy)methyl)-1H-indazole-5-carboxylate To a solution of ethyl 1H-indazole-5-carboxylate (500 mg, 2.63 mmol) in anhydrous THF (20 mL) was added NaH (60% dispersion in mineral oil, 158 mg, 3.94 mmol) at 0° C. The reaction mixture was stirred at 0° C. for 30 min, and then 2-(trimethylsilyl)ethoxymethyl chloride (0.51 mL, 2.76 mmol) was added dropwise. The reaction mixture was stirred at room temperature for 3 h, quenched with water and extracted with ethyl acetate, dried over anhydrous $Na_2SO_4$ and concentrated under reduced pressure. Purification by silica gel column chromatography using ethyl acetate/hexane as the eluent to afford the title compound (285 mg, 34%). $^1$H NMR ($CDCl_3$, 400 MHz): δ 8.53 (s, 1H), 8.14-8.08 (m, 2H), 7.61-7.56 (m, 1H), 5.76 (s, 2H), 4.42-4.39 (m, 2H), 3.62-3.52 (m, 2H), 1.44-1.40 (m, 2H), 0.90-0.85 (m, 2H), −0.07 (s, 9H).

Step 2: 1-((2-(trimethylsilyl)ethoxy)methyl)-1H-indazole-5-carboxylic acid

To a solution of ethyl 1-((2-(trimethylsilyl)ethoxy)methyl)-1H-indazole-5-carboxylate (285 mg, 0.89 mmol) in MeOH (10 mL) was added 1N—NaOH (3.6 mL, 3.6 mmol). The reaction mixture was stirred at room temperature for overnight. The mixture was evaporated under reduced pressure and acidified with 1N—HCl, filtered the solid to get the title compound (235 mg, 90%).

Step 3: methyl 2-(1-phenyl-2-(1-((2-(trimethylsilyl)ethoxy)methyl)-1H-indazole-5-carboxamido)-1H-imidazol-4-yl)acetate A mixture of methyl 2-(2-amino-1-phenyl-1H-imidazol-4-yl)acetate (Intermediate 25) (186 mg, 0.80 mmol), 1-((2-(trimethylsilyl)ethoxy)methyl)-1H-indazole-5-carboxylic acid (235 mg, 0.80 mmol), HATU (305 mg, 1.20 mmol) and DIPEA (0.42 mL, 2.41 mmol) in DCM was stirred at room temperature for overnight. The reaction mixture was quenched with water and extracted with DCM, dried over anhydrous $Na_2SO_4$ and concentrated under reduced pressure. Purification by silica gel column chromatography using DCM/MeOH as the eluent to afford the title compound (307 mg, 76%). $^1$H NMR ($CDCl_3$, 400 MHz): δ 8.60 (s, 1H), 8.32-8.25 (m, 1H), 8.07 (s, 1H), 7.77-7.68 (m, 2H), 7.60-7.51 (m, 3H), 7.46-7.39 (m, 1H), 6.82 (s, 1H), 5.72 (s, 2H), 3.80 (s, 3H), 3.67 (s, 2H), 3.60-3.52 (m, 2H), 0.90-0.80 (m, 2H), −0.10 (s, 9H).

Step 4: 2-(1-phenyl-2-(1-((2-(trimethylsilyl)ethoxy)methyl)-1H-indazole-5-carboxamido)-1H-imidazol-4-yl)acetic acid To a solution of methyl 2-(1-phenyl-2-(1-((2-(trimethylsilyl)ethoxy)methyl)-1H-indazole-5-carboxamido)-1H-imidazol-4-yl)acetate (307 mg, 0.607 mmol) in MeOH (10 mL) was added 1N—NaOH (2.43 mL, 2.43 mmol). The reaction mixture was stirred at room temperature for overnight. The mixture was evaporated under reduced pressure and acidified with 1N—HCl, extracted with DCM. The organic phase was dried over anhydrous $Na_2SO_4$ and concentrated under reduced pressure to afford the title compound (290 mg, 97%).

Step 5: N-(4-(2-(methylamino)-2-oxoethyl)-1-phenyl-1H-imidazol-2-yl)-1-((2-(trimethylsilyl)ethoxy)methyl)-1H-indazole-5-carboxamide A mixture of 2-(1-phenyl-2-(1-((2-(trimethylsilyl)ethoxy)methyl)-1H-indazole-5-carboxamido)-1H-imidazol-4-yl) acetic acid (300 mg, 0.61 mmol), methylamine hydrochloride (49 mg, 0.73 mmol), EDCI (175 mg, 0.92 mmol), HOBt (124 mg, 0.92 mmol) and DIPEA (0.53 mL, 3.05 mmol) in DMF was stirred at room temperature for overnight. The reaction mixture was quenched with water and extracted with DCM, dried over anhydrous $Na_2SO_4$ and concentrated under reduced pressure. Purification by silica gel column chromatography using DCM/MeOH as the eluent to afford the title compound (206 mg, 67%). $^1$H NMR ($CDCl_3$, 400 MHz): δ 8.51 (s, 1H), 8.21-8.14 (m, 2H), 8.05 (s, 1H), 7.68-7.62 (m, 2H), 7.56-7.48 (m, 3H), 7.42-7.38 (m, 1H), 6.87 (s, 1H), 5.73 (s, 2H), 3.60-3.51 (m, 4H), 0.88-0.83 (m, 2H), −0.06 (s, 9H).

Step 6: N-(4-(2-(methylamino)-2-oxoethyl)-1-phenyl-1H-imidazol-2-yl)-1H-indazole-5-carboxamide TFA (1.0 mL) was added to the solution of N-(4-(2-(methylamino)-2-oxoethyl)-1-phenyl-1H-imidazol-2-yl)-1-((2-(trimethylsilyl)ethoxy)methyl)-1H-indazole-5-carboxamide (206 mg, 0.41 mmol) in DCM (10 mL) and stirred at room temperature for overnight. The reaction mixture was quenched with sat. aq. $NaHCO_3$ and extracted with DCM, dried over anhydrous $Na_2SO_4$ and concentrated under reduced pressure. Purification by silica gel column chromatography using DCM/MeOH as the eluent to afford the title compound (50.4 mg, 33%). $^1$H NMR ($CD_3OD$, 400 MHz): δ 8.35 (s, 1H), 8.17 (s, 1H), 7.98-7.80 (m, 1H), 7.78-7.38 (m, 6H), 7.29 (s, 1H), 5.81 (s, 1H), 3.58 (s, 2H), 2.77 (s, 3H).

Example 50. N-(4-(2-(methylamino)-2-oxoethyl)-1-phenyl-1H-imidazol-2-yl)benzamide

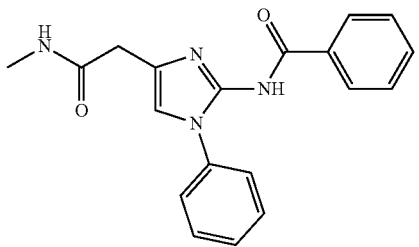 [SMILES: CNC(=O)Cc1cn(-c2ccccc2)c(NC(=O)c2ccccc2)n1]

Step 1: methyl 2-(2-benzamido-1-phenyl-1H-imidazol-4-yl)acetate

A mixture of methyl 2-(2-amino-1-phenyl-1H-imidazol-4-yl)acetate (Intermediate 25) (300 mg, 1.29 mmol), benzoic acid (190 mg, 1.55 mmol), HBTU (738 mg, 1.94 mmol) and DIPEA (0.68 mL, 3.89 mmol) in DCM was stirred at room temperature for overnight. The reaction mixture was quenched with water and extracted with DCM, dried over anhydrous $Na_2SO_4$ and concentrated under reduced pressure. Purification by silica gel column chromatography using DCM/MeOH as the eluent to afford the title compound (382 mg, 88%). $^1$H NMR ($CDCl_3$, 400 MHz): δ 8.18-8.10 (m, 2H), 7.72-7.65 (m, 2H), 7.55-7.48 (m, 2H), 7.48-7.33 (m, 4H), 6.84 (s, 1H), 3.79 (s, 3H), 3.66 (s, 2H).

Step 2: 2-(2-benzamido-1-phenyl-1H-imidazol-4-yl)acetic acid

To a solution of methyl 2-(2-benzamido-1-phenyl-1H-imidazol-4-yl)acetate (370 mg, 1.10 mmol) in MeOH (10 mL) was added 1N—NaOH (4.4 mL, 4.4 mmol). The reaction mixture was stirred at room temperature for overnight. The mixture was evaporated under reduced pressure and acidified with 1N—HCl, extracted with DCM. The organic phase was dried over anhydrous $Na_2SO_4$ and concentrated under reduced pressure to afford the title compound (340 mg, 96%).

Step 3: N-(4-(2-(methylamino)-2-oxoethyl)-1-phenyl-1H-imidazol-2-yl)benzamide A mixture of 2-(2-benzamido-1-phenyl-1H-imidazol-4-yl)acetic acid (150 mg, 0.29 mmol), methylamine hydrochloride (38.0 mg, 0.56 mmol), EDCI (134 mg, 0.70 mmol), HOBt (95 mg, 0.70 mmol) and DIPEA (0.4 mL, 2.33 mmol) in DMF was stirred at room temperature for overnight. The reaction mixture was quenched with water and extracted with DCM, dried over anhydrous $Na_2SO_4$ and concentrated under reduced pressure. Purification by silica gel column chromatography using DCM/MeOH as the eluent to afford the title compound (65 mg, 42%). ¹H NMR (CDCl₃, 400 MHz): δ 7.99-7.97 (m, 2H), 7.55-7.53 (m, 2H), 7.46-7.41 (m, 3H), 7.37-7.32 (m, 3H), 6.86 (s, 1H), 6.77 (bs, 1H), 3.52 (s, 2H), 2.74 (d, 2H).

Example 51. N-(4-(2-(methylamino)-2-oxoethyl)-1-phenyl-1H-imidazol-2-yl)nicotinamide

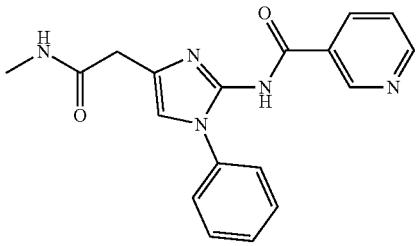 [SMILES: CNC(=O)Cc1cn(-c2ccccc2)c(NC(=O)c2cccnc2)n1]

Step 1: methyl 2-(2-(nicotinamido)-1-phenyl-1H-imidazol-4-yl)acetate

A mixture of methyl 2-(2-amino-1-phenyl-1H-imidazol-4-yl)acetate (Intermediate 25) (300 mg, 1.29 mmol), nicotinic acid (191.6 mg, 1.55 mmol), HBTU (738 mg, 1.94 mmol) and DIPEA (0.68 mL, 3.89 mmol) in DCM was stirred at room temperature for overnight. The reaction mixture was quenched with water and extracted with DCM, dried over anhydrous Na₂SO₄ and concentrated under reduced pressure. Purification by silica gel column chromatography using DCM/MeOH as the eluent to afford the title compound (320 mg, 73%). ¹H NMR (CDCl₃, 400 MHz): δ 8.70-8.63 (m, 2H), 8.00-7.92 (m, 2H), 7.70-7.62 (m, 2H), 7.58-7.50 (m, 2H), 7.48-7.40 (m, 1H), 6.84 (s, 1H), 3.80 (s, 3H), 3.68 (m, 2H).

Step 2: 2-(2-(nicotinamido)-1-phenyl-1H-imidazol-4-yl)acetic acid

To a solution of methyl 2-(2-(nicotinamido)-1-phenyl-1H-imidazol-4-yl)acetate (313 mg, 0.93 mmol) in MeOH (10 mL) was added 1N—NaOH (3.72 mL, 3.72 mmol). The reaction mixture was stirred at room temperature for overnight. The mixture was evaporated under reduced pressure and acidified with 1N—HCl, filtered the solid to get the title compound (200 mg, 67%).

Step 3: N-(4-(2-(methylamino)-2-oxoethyl)-1-phenyl-1H-imidazol-2-yl)nicotinamide A mixture of 2-(2-(nicotinamido)-1-phenyl-1H-imidazol-4-yl)acetic acid (100 mg, 0.31 mmol), methylamine hydrochloride (25.1 mg, 0.37 mmol), EDCI (89 mg, 0.465 mmol), HOBt (63 mg, 0.465 mmol) and DIPEA (0.16 mL, 0.93 mmol) in DMF was stirred at room temperature for overnight. The reaction mixture was quenched with water and extracted with DCM, dried over anhydrous Na₂SO₄ and concentrated under reduced pressure. Purification by silica gel column chromatography using DCM/MeOH as the eluent to afford the title compound (40 mg, 40%). ¹H NMR (CD₃OD, 400 MHz): δ 9.17 (s, 1H), 8.62-8.42 (m, 2H), 7.71-7.46 (m, 6H), 7.13 (s, 1H), 3.61 (s, 2H), 2.78 (s, 3H).

Example 52. N-(4-(4-oxo-4-(phenylamino)butyl)-1-phenyl-1H-imidazol-2-yl)-3-(1H-pyrazol-4-yl)benzamide (Scheme 1)

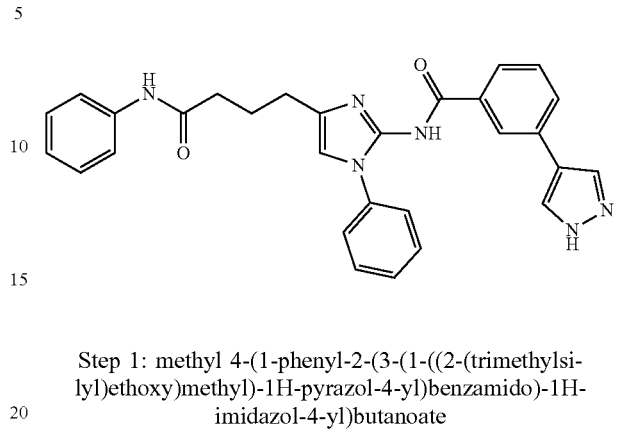

Step 1: methyl 4-(1-phenyl-2-(3-(1-((2-(trimethylsilyl)ethoxy)methyl)-1H-pyrazol-4-yl)benzamido)-1H-imidazol-4-yl)butanoate A mixture of methyl 4-(2-amino-1-phenyl-1H-imidazol-4-yl)butanoate (Intermediate 26) (5.35 g, 20.67 mmol), 3-(1-((2-(trimethylsilyl)ethoxy)methyl)-1H-pyrazol-4-yl)benzoic acid (Intermediate 1) (6.72 g, 21.09 mmol), HATU (12.03 g, 31.63 mmol) and DIPEA (11.02 mL, 63.27 mmol) in DCM was stirred at room temperature for overnight. The reaction mixture was quenched with water and extracted with DCM, dried over anhydrous Na₂SO₄ and concentrated under reduced pressure. Purification by silica gel column chromatography using DCM/MeOH as the eluent to afford the title compound (8.6 g, 74%). ¹H NMR (400 MHz, CDCl₃) δ 8.41-8.34 (m, 1H), 8.11-8.02 (m, 1H), 7.90-7.82 (m, 2H), 7.79-7.70 (m, 2H), 7.61-7.49 (m, 3H), 7.45-7.34 (m, 2H), 6.63 (s, 1H), 5.46 (s, 2H), 3.71 (s, 3H), 3.64-3.59 (m, 2H), 2.75-2.62 (m, 2H), 2.52-2.39 (m, 2H), 2.12-1.96 (m, 2H), 1.00-0.87 (m, 2H), −0.02 (s, 9H).

Step 2: 4-(1-phenyl-2-(3-(1-((2-(trimethylsilyl)ethoxy)methyl)-1H-pyrazol-4-yl)benzamido)-1H-imidazol-4-yl)butanoic acid To a solution of methyl 4-(1-phenyl-2-(3-(1-((2-(trimethylsilyl)ethoxy)methyl)-1H-pyrazol-4-yl)benzamido)-1H-imidazol-4-yl)butanoate (6.00 g, 10.72 mmol) in MeOH (54 mL) was added 1N—NaOH (53.60 mL, 53.60 mmol). The reaction mixture was stirred at room temperature for overnight. The mixture was evaporated under reduced pressure and acidified with 1N—HCl, filtered the solid to get the title compound (3.35 g, 57%). ¹H NMR (400 MHz, CDCl₃) δ 8.35-8.24 (m, 1H), 8.02-7.91 (m, 1H), 7.89-7.77 (m, 2H), 7.71-7.59 (m, 2H), 7.59-7.44 (m, 3H), 7.44-7.28 (m, 2H), 6.62 (s, 1H), 5.43 (s, 2H), 3.65-3.52 (m, 2H), 2.84-2.67 (m, 2H), 2.58-2.42 (m, 2H), 2.16-1.98 (m, 2H), 1.00-0.87 (m, 2H), −0.02 (s, 9H).

Step 3: N-(4-(4-oxo-4-(phenylamino)butyl)-1-phenyl-1H-imidazol-2-yl)-3-(1-((2-(trimethylsilyl)ethoxy)methyl)-1H-pyrazol-4-yl)benzamide A mixture of 4-(1-phenyl-2-(3-(1-((2-(trimethylsilyl)ethoxy)methyl)-1H-pyrazol-4-yl)benzamido)-1H-imidazol-4-yl)butanoic acid (500 mg, 0.916 mmol), aniline (93.9 mg, 1.008 mmol), HATU (525 mg, 1.374 mmol) and DIPEA (0.48 mL, 2.749 mmol) in DCM was stirred at room temperature for overnight. The reaction mixture was quenched with water and extracted with DCM, dried over anhydrous Na₂SO₄ and concentrated under reduced pressure. Purification by silica gel column chromatography using DCM/MeOH as the eluent to afford the title compound (438 mg, 77%). ¹H NMR (400 MHz, CDCl₃): δ 8.39-8.33 (m, 1H), 8.08-8.01 (m, 1H), 7.89-7.81 (m, 2H), 7.75-7.66 (m, 2H), 7.60-7.48 (m, 5H), 7.47-7.35 (m, 3H), 7.35-7.28 (m, 2H), 7.15-7.07 (m, 1H), 6.66 (s, 1H), 5.45 (s, 2H), 3.59 (t, J=8.4 Hz, 2H), 2.78-2.68 (m, 2H), 2.54-2.42 (m, 2H), 2.17-2.07 (m, 2H), 0.93 (t, J=8.4 Hz, 2H), −0.02 (s, 9H).

Step 4: N-(4-(4-oxo-4-(phenylamino)butyl)-1-phenyl-1H-imidazol-2-yl)-3-(1H-pyrazol-4-yl)benzamide TFA (1.0 mL) was added to the solution of N-(4-(4-oxo-4-(phenylamino)butyl)-1-phenyl-1H-imidazol-2-yl)-3-(1-((2-(trimethylsilyl)ethoxy)methyl)-1H-pyrazol-4-yl)benzamide (87 mg, 0.140 mmol) in DCM (5.0 mL) and stirred at room temperature for overnight. The reaction mixture was quenched with sat. aq. NaHCO₃ and extracted with DCM, dried over anhydrous Na₂SO₄ and concentrated under reduced pressure. Purification by silica gel column chromatography using DCM/MeOH as the eluent to afford the title compound (18 mg, 27%). 1H NMR (CD₃OD, 400 MHz): δ 8.26-7.83 (m, 3H), 7.83-7.62 (m, 2H), 7.62-7.34 (m, 8H), 7.34-7.23 (m, 2H), 7.18-7.02 (m, 2H), 2.79-2.67 (m, 2H), 2.55-2.45 (m, 2H), 2.17-2.05 (m, 2H).

The following compounds were made in a similar manner to that described in Example 52 and in general scheme 1.

TABLE 6

| Ex. | Structure | Analytical data |
|---|---|---|
| 53 | | ¹H NMR (CD₃OD, 400 MHz): δ 8.30-8.05 (m, 1H), 7.98 (s, 2H), 7.82-7.66 (m, 2H), 7.64-7.46 (m, 4H), 7.46-7.34 (m, 2H), 7.11 (s, 1H), 3.50-3.42 (m, 1H), 3.30 (s, 3H), 3.24-3.14 (m, 1H), 3.00-2.88 (m, 1H), 2.76-2.64 (m, 3H), 2.30-2.20 (m, 2H), 2.10-1.93 (m, 3H), 1.88-1.71 (m, 2H), 1.67-1.53 (m, 1H), 1.36-1.25 (m, 1H). |
| 54 | | ¹H NMR (CD₃OD, 400 MHz): δ 8.40-7.84 (m, 3H), 7.84-7.64 (m, 2H), 7.63-7.27 (m, 6H), 7.10 (s, 1H), 3.51-3.38 (m, 1H), 3.31 (s, 3H), 3.23-3.08 (m, 1H), 3.02-2.80 (m, 1H), 2.80-2.50 (m, 3H), 2.33-2.13 (m, 2H), 2.12-1.90 (m, 3H), 1.88-1.67 (m, 2H), 1.67-1.47 (m, 1H), 1.36-1.23 (m, 1H). |
| 55 | | ¹H NMR (CD₃OD, 400 MHz): δ 8.37-7.83 (m, 3H), 7.83-7.65 (m, 2H), 7.65-7.31 (m, 6H), 7.06 (s, 1H), 4.24-3.98 (m, 1H), 3.58-3.34 (m, 3H), 3.29 (s, 3H), 2.80-2.20 (m, 4H), 2.14-1.63 (m, 6H), 1.40-1.25 (m, 1H). |

TABLE 6-continued

| Ex. | Structure | Analytical data |
|---|---|---|
| 56 | | $^1$H NMR (CD$_3$OD, 400 MHz): δ 8.39-7.83 (m, 3H), 7.83-7.64 (m, 2H), 7.64-7.32 (m, 6H), 7.10 (s, 1H), 4.25-4.01 (m, 1H), 3.62-3.35 (m, 3H), 3.31 (s, 3H), 2.83-2.30 (m, 4H), 2.13-1.78 (m, 6H), 1.43-1.23 (m, 1H). |
| 57 | | $^1$H NMR (CD$_3$OD, 400 MHz): δ 8.14-8.06 (m, 1H), 8.00-7.94 (m, 2H), 7.78-7.67 (m, 2H), 7.60-7.46 (m, 4H), 7.46-7.38 (m, 2H), 7.11 (s, 1H), 2.71 (t, J = 7.6 Hz, 2H), 2.42 (t, J = 7.6 Hz, 2H), 2.07-1.96 (m, 2H). |
| 58 | | $^1$H NMR (CDCl$_3$, 400 MHz): δ 8.40 (s, 1H), 8.09-8.02 (m, 2H), 7.89 (s, 2H), 7.76-7.68 (m, 2H), 7.62-7.48 (m, 3H), 7.44-7.35 (m, 2H), 6.67-6.60 (m, 1H), 3.70 (s, 3H), 2.67 (t, J = 7.2 Hz, 2H), 2.45 (t, J = 7.2 Hz, 2H), 2.10-1.97 (m, 2H). |
| 59 | | $^1$H NMR (CDCl$_3$, 400 MHz): δ 8.41-8.35 (m, 1H), 8.10-8.03 (m, 1H), 7.90 (s, 2H), 7.79-7.70 (m, 2H), 7.62-7.48 (m, 3H), 7.44-7.35 (m, 2H), 6.68-6.62 (m, 1H), 3.62-3.53 (m, 2H), 3.44-3.35 (m, 2H), 2.70 (t, J = 7.2 Hz, 2H), 2.44 (t, J = 7.2 Hz, 2H), 2.10-1.97 (m, 2H), 1.69-1.60 (m, 2H), 1.60-1.50 (m, 4H). |
| 60 | | $^1$H NMR (CDCl$_3$, 400 MHz): δ 8.21 (s, 1H), 7.96-7.84 (m, 2H), 7.80 (s, 2H), 7.68-7.56 (m, 2H), 7.56-7.41 (m, 3H), 7.39-7.28 (m, 2H), 6.67 (s, 1H), 2.72 (s, 3H), 2.61 (t, J = 7.2 Hz, 2H), 2.24 (t, J = 7.2 Hz, 2H), 2.04-1.90 (m, 2H). |

TABLE 6-continued

| Ex. | Structure | Analytical data |
|---|---|---|
| 61 | | ¹H NMR (CDCl₃, 400 MHz): δ 8.39 (s, 1H), 8.12-8.02 (m, 1H), 7.90 (s, 2H), 7.79-7.68 (m, 2H), 7.62-7.47 (m, 3H), 7.46-7.30 (m, 2H), 6.65 (s, 1H), 4.19-4.04 (m, 1H), 3.67-3.53 (m, 1H), 2.76-2.59 (m, 2H), 2.58-2.31 (m, 2H), 2.12-1.94 (m, 2H), 1.74-1.48 (m, 5H), 1.48-1.30 (m, 1H), 1.28-1.08 (m, 3H), 0.92-0.76 (m, 1H). |
| 62 | | ¹H NMR (CDCl₃, 400 MHz): δ 8.38 (s, 1H), 8.11-8.02 (m, 1H), 7.89 (s, 2H), 7.77-7.66 (m, 2H), 7.61-7.47 (m, 3H), 7.44-7.31 (m, 2H), 6.65 (s, 1H), 4.18-4.02 (m, 1H), 3.66-3.52 (m, 1H), 2.77-2.59 (m, 2H), 2.59-2.30 (m, 2H), 2.13-1.91 (m, 2H), 1.74-1.46 (m, 5H), 1.46-1.29 (m, 1H), 1.27-1.06 (m, 3H), 1.02-0.76 (m, 1H). |
| 63 | | ¹H NMR (CDCl₃, 400 MHz): δ 8.38 (s, 1H), 8.11-8.02 (m, 1H), 7.90 (s, 2H), 7.78-7.68 (m, 2H), 7.62-7.48 (m, 3H), 7.43-7.34 (m, 2H), 6.65 (s, 1H), 4.89-4.69 (m, 1H), 4.18-3.96 (m, 1H), 2.76-2.65 (m, 2H), 2.13-1.97 (m, 2H), 1.87-1.72 (m, 1H), 1.67-1.53 (m, 3H), 1.34-1.11 (m, 8H), 0.97-0.75 (m, 2H). |
| 64 | | ¹H NMR (CDCl₃, 400 MHz): δ 8.27-8.11 (m, 1H), 7.94-7.82 (m, 1H), 7.82-7.75 (m, 2H), 7.64-7.51 (m, 3H), 7.51-7.40 (m, 4H), 7.38-7.30 (m, 2H), 6.98-6.87 (m, 2H), 6.70 (s, 1H), 2.74-2.61 (m, 2H), 2.48-2.35 (m, 2H), 2.11-2.00 (m, 2H). |
| 65 | | ¹H NMR (CD₃OD, 400 MHz): δ 8.22-7.83 (m, 4H), 7.83-7.60 (m, 2H), 7.60-7.30 (m, 6H), 7.22-7.02 (m, 4H), 2.85-2.65 (m, 2H), 2.61-2.49 (m, 2H), 2.17-2.06 (m, 2H). |

| Ex. | Structure | Analytical data |
|---|---|---|
| 66 | | ¹H NMR (CD₃OD, 400 MHz): δ 8.24-7.86 (m, 3H), 7.87-7.66 (m, 3H), 7.60-7.32 (3, 6H), 7.20-7.07 (m, 1H), 7.06-6.98 (m, 1H), 6.97-6.90 (m, 1H), 2.81-2.66 (m, 2H), 2.62-2.47 (m, 2H), 2.17-2.04 (m, 2H). |
| 67 | | ¹H NMR (CDCl₃, 400 MHz): δ 8.40-8.35 (m, 1H), 8.09-8.02 (m, 1H), 7.88-7.83 (m, 2H), 7.77-7.70 (m, 2H), 7.60-7.45 (m, 3H), 7.44-7.35 (m, 2H), 6.67-6.62 (m, 1H), 5.71 (s, 1H), 5.46 (s, 2H), 3.64-3.35 (m, 2H), 2.77-2.62 (m, 3H), 2.29-2.20 (m, 2H), 2.10-1.98 (m, 2H), 0.98-0.89 (m, 2H, SEM), 0.81-0.74 (m, 2H), 0.55-0.46 (m, 2H), -0.01 (s, 9H). |
| 68 | | ¹H NMR (CD₃OD, 400 MHz): δ 8.14-7.92 (m, 3H), 7.78-7.73 (m, 2H), 7.53-7.47 (m, 3H), 7.43-7.38 (m, 3H), 7.09 (s, 1H), 2.68-2.63 (m, 3H), 2.28-2.24 (m, 2H), 2.03-1.96 (m, 2H), 0.73-0.69 (m, 2H), 0.50-0.46 (m, 2H). |
| 69 | | ¹H NMR (CD₃OD, 400 MHz): δ 8.09-7.88 (m, 3H), 7.83-7.62 (m, 3H), 7.54-7.38 (m, 5H), 7.16-7.08 (m, 1H), 4.33-4.25 (m, 1H), 2.70-2.63 (m, 2H), 2.31-2.24 (m, 4H), 2.03-1.89 (m, 4H), 1.76-1.68 (m, 2H). |

Example 70. isopropyl 4-(2-(3-(1H-pyrazol-4-yl)benzamido)-1-phenyl-1H-imidazol-4-yl)butanoate

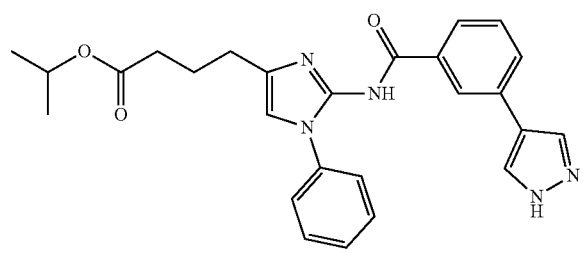 [SMILES: CC(C)OC(=O)CCCc1cn(-c2ccccc2)c(NC(=O)c2cccc(-c3cn[nH]c3)c2)n1]

Step 1: isopropyl 4-(1-phenyl-2-(3-(1-((2-(trimethylsilyl)ethoxy)methyl)-1H-pyrazol-4-yl)benzamido)-1H-imidazol-4-yl)butanoate A mixture of phenyl-2-(3-(1-((2-(trimethylsilyl)ethoxy)methyl)-1H-pyrazol-4-yl)benzamido)-1H-imidazol-4-yl)butanoic acid (100 mg, 0.183 mmol), DMAP (22 mg, 0.183 mmol) and EDCl (35 mg, 0.183 mmol) in isopropyl alcohol (2 mL) and stirred at room temperature for 30 min. The reaction mixture was concentrated under reduced pressure. The reaction mixture was extracted ethyl acetate, dried over Na₂SO₄ and concentrated under reduced pressure. Purification by silica gel column chromatography using DCM/MeOH as the eluent to afford the title compound (38 mg, 36%). ¹H NMR (CDCl₃, 400 MHz): δ 8.41-3.36 (m, 1H), 8.10-8.03 (m, 1H), 7.89-7.83 (m, 2H), 7.78-7.71 (m, 2H), 7.60-7.50 (m, 3H), 7.43-7.35 (m, 2H), 6.66-6.60 (m, 1H), 5.46 (s, 2H), 5.10-4.99 (m, 1H), 3.60 (t, J=8.4 Hz, 2H), 2.72-2.62 (m, 2H), 2.45-2.35 (m, 2H), 2.09-1.96 (m, 2H), 1.26 (s, 3H), 1.25 (s, 3H), 0.93 (t, J=8.4 Hz, 2H), -0.01 (s, 9H).

Step 2: isopropyl 4-(2-(3-(1H-pyrazol-4-yl)benzamido)-1-phenyl-1H-imidazol-4-yl)butanoate TFA (1.0 mL) was added to the solution of isopropyl 4-(1-phenyl-2-(3-(1-((2-(trimethylsilyl)ethoxy)methyl)-1H-pyrazol-4-yl)benzamido)-1H-imidazol-4-yl)butanoate (36 mg, 0.061 mmol) in DCM (1.0 mL) and stirred at room temperature for overnight. The reaction mixture was quenched with sat. aq. NaHCO₃ and extracted with DCM, dried over anhydrous Na₂SO₄ and concentrated under reduced pressure. Purification by silica gel column chromatography using DCM/MeOH as the eluent to afford the title compound (24 mg, 85%). ¹H NMR (CDCl₃, 400 MHz): δ 8.38 (s, 1H), 8.12-8.01 (m, 1H), 7.95-7.82 (m, 2H), 7.78-7.69 (m, 2H), 7.64-7.49 (m, 3H), 7.47-7.30 (m, 2H), 6.63 (s, 1H), 5.11-4.97 (m, 1H), 2.67 (t, J=7.2 Hz, 2H), 2.40 (t, J=7.2 Hz, 2H), 2.09-1.94 (m, 2H), 1.26 (s, 3H), 1.24 (s, 3H).

Example 71. N-(4-(4-(cyclopropyl(methyl)amino)-4-oxobutyl)-1-phenyl-1H-imidazol-2-yl)-3-(1H-pyrazol-4-yl)benzamide

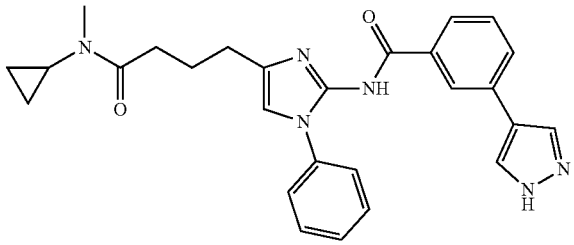 [SMILES: CN(C(=O)CCCc1cn(-c2ccccc2)c(NC(=O)c2cccc(-c3cn[nH]c3)c2)n1)C1CC1]

Step 1: tert-butyl cyclopropylcarbamate

To a solution of cyclopropylamine (1.0 g, 17.51 mmol) in DCM (150 mL) was added di-tert-butyl dicarbonate (4.4 mL, 19.26 mmol) at 0° C. The reaction mixture was stirred at room temperature for 2 h. The reaction mixture was quenched with water and extracted with DCM, dried over anhydrous Na₂SO₄ and concentrated under reduced pressure. Purification by silica gel column chromatography using ethyl acetate/hexane as the eluent to afford the title compound (2.61 g, 95%). ¹H NMR (CDCl₃, 400 MHz): δ 4.70 (bs, 1H), 2.55-2.49 (m, 1H), 1.44 (s, 9H), 0.72-0.67 (m, 2H), 0.52-0.46 (m, 2H).

Step 2: tert-butyl cyclopropyl(methyl)carbamate

To a solution of tert-butyl cyclopropylcarbamate (1.0 g 6.36 mmol) in THF (12 mL) was added n-BuLi in hexanes (2.5 M, 2.8 mL, 6.99 mmol) and methyl iodide (0.8 mL, 12.72 mmol) at −78° C. The mixture was stirred at room temperature for overnight. The reaction mixture was quenched with water and extracted with EA, dried over anhydrous Na₂SO₄ and concentrated under reduced pressure. Purification by silica gel column chromatography using ethyl acetate/hexane as the eluent to afford the title compound (700 mg, 64%). ¹H NMR (CDCl₃, 400 MHz): δ 2.83 (s, 3H), 2.53-2.46 (m, 1H), 1.46 (s, 9H), 0.75-0.68 (m, 2H), 0.62-0.57 (m, 2H).

Step 3: N-methylcyclopropanamine hydrochloride

Acetyl chloride (0.27 mL) was added to a solution of tert-butyl cyclopropyl(methyl)carbamate (131 mg, 0.76 mmol) in MeOH (2 mL) and stirred at room temperature for 4 h. The mixture was evaporated under reduced pressure to afford the title compound (80 mg, 98%).

Step 4: N-(4-(4-(cyclopropyl(methyl)amino)-4-oxobutyl)-1-phenyl-1H-imidazol-2-yl)-3-(1-((2-(trimethylsilyl)ethoxy)methyl)-1H-pyrazol-4-yl)benzamide A mixture of 4-(1-phenyl-2-(3-(1-((2-(trimethylsilyl)ethoxy)methyl)-1H-pyrazol-4-yl)benzamido)-1H-imidazol-4-yl)butanoic acid (140 mg, 0.25 mmol), N-methylcyclopropanamine hydrochloride (80 mg, 0.74 mmol), HBTU (195 mg, 0.51 mmol) and DIPEA (0.22 mL, 1.28 mmol) in DCM (3 mL) was stirred at room temperature for overnight. The reaction mixture was quenched with water and extracted with DCM, dried over anhydrous Na₂SO₄ and concentrated under reduced pressure. Purification by silica gel column chromatography using DCM/MeOH as the eluent to afford the title compound (105 mg, 68%). ¹H NMR (CDCl₃, 400 MHz): δ 8.38 (bs, 1H), 8.08-8.05 (m, 1H), 8.02 (s, 1H), 7.88-7.85 (m, 2H), 7.78-7.73 (m, 2H), 7.59-7.52 (m, 3H), 7.43-7.37 (m, 2H), 6.65 (s, 1H), 5.46 (s, 2H), 3.63-3.56 (m, 2H), 2.96 (s, 3H), 2.70-2.62 (m, 5H), 2.10-2.03 (m, 2H), 0.97-0.86 (m, 4H), 0.76-0.72 (m, 2H), −0.02 (s, 9H).

Step 5: N-(4-(4-(cyclopropyl(methyl)amino)-4-oxobutyl)-1-phenyl-1H-imidazol-2-yl)-3-(1H-pyrazol-4-yl)benzamide TFA (3.0 mL) was added to a solution of N-(4-(4-(cyclopropyl(methyl)amino)-4-oxobutyl)-1-phenyl-1H-imidazol-2-yl)-3-(1-((2-(trimethylsilyl)ethoxy)methyl)-1H-pyrazol-4-yl)benzamide (105 mg, 0.17 mmol) in DCM (6 mL) and stirred at room temperature for overnight. The reaction mixture was quenched with sat. aq. NaHCO₃ and extracted with DCM, dried over anhydrous Na₂SO₄ and concentrated under reduced pressure. Purification by silica gel column chromatography using DCM/MeOH as the eluent to afford the title compound (48 mg, 58%). ¹H NMR (CD₃OD, 400 MHz): δ 8.07 (s, 1H), 8.01-7.99 (m, 2H), 7.86-7.83 (m, 1H), 7.72-7.69 (m, 1H), 7.64-7.57 (m, 5H), 7.52-7.47 (m, 1H), 7.42-7.38 (m, 1H), 2.93 (s, 3H), 2.83-2.78 (m, 3H), 2.76-2.72 (m, 2H), 2.11-2.02 (m, 2H), 0.95-0.90 (m, 2H), 0.82-0.79 (m, 2H).

Example 72. N-(4-(4-(cyclopropylamino)-4-oxobutyl)-1-phenyl-1H-imidazol-2-yl)-3-(1-(1-ethoxyethyl)-1H-pyrazol-4-yl)benzamide

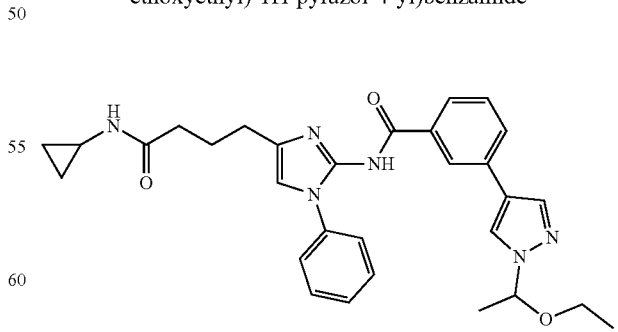

To a solution of N-(4-(4-(cyclopropylamino)-4-oxobutyl)-1-phenyl-1H-imidazol-2-yl)-3-(1H-pyrazol-4-yl)benzamide (Example 68) (40 mg, 0.08 mmol) in DCM (4 mL) was added TFA (2 mg, 0.01 mmol) and ethyl vinyl ether and stirred at room temperature for overnight. The reaction mixture was quenched with sat. aq. NaHCO₃ and extracted with DCM, dried over anhydrous Na₂SO₄ and concentrated under reduced pressure. Purification by silica gel column chromatography using DCM/MeOH as the eluent to afford the title compound (13 mg, 28%). ¹H NMR (CDCl₃, 400 MHz): δ 8.38 (s, 1H), 8.06-8.04 (m, 1H), 7.89 (s, 1H), 7.83 (s, 1H), 7.76-7.73 (m, 2H), 7.59-7.51 (m, 3H), 7.42-7.37 (m, 2H), 6.65 (s, 1H), 5.65 (bs, 1H), 5.56-5.51 (m, 1H), 3.53-3.46 (m, 1H), 3.42-3.36 (m, 1H), 2.76-2.66 (m, 3H), 2.27-2.23 (m, 2H), 2.08-2.00 (m, 2H), 1.73-1.70 (m, 3H), 1.19-1.15 (m, 3H), 0.81-0.77 (m, 2H), 0.54-0.50 (m, 2H).

Example 73. N-(4-(4-(cyclopropylamino)-4-oxobutyl)-1-phenyl-1H-imidazol-2-yl)-3-(1-(2-ethoxypropan-2-yl)-1H-pyrazol-4-yl)benzamide

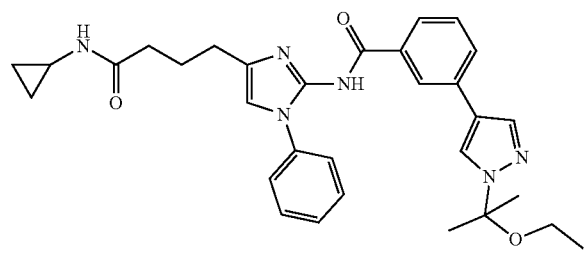 [SMILES: CCOC(C)(C)n1cc(-c2cccc(C(=O)Nc3nc(CCCC(=O)NC4CC4)cn3-c3ccccc3)c2)cn1]

To a solution of N-(4-(4-(cyclopropylamino)-4-oxobutyl)-1-phenyl-1H-imidazol-2-yl)-3-(1H-pyrazol-4-yl)benzamide (Example 68) (50 mg, 0.110 mmol) in chloroform (1.1 mL) was added 2-ethoxy-1-propene (19 mg, 0.220 mmol). p-Toluenesulonic acid (1.4 mg, 0.006 mmol) was added to reaction solution at 0° C. then stirred for 1 h. TEA (55.7 mg, 0.550 mmol) was added to the reaction solution at same temperature then stirred for 30 min. The reaction mixture was stirred at room temperature for 30 min. The reaction mixture was extracted with DCM/water, dried over Na₂SO₄ and concentrated under reduced pressure. Purification by silica gel column chromatography using DCM/MeOH as the eluent to afford the title compound (18 mg, 30%). ¹H NMR (CDCl₃, 400 MHz): δ 8.40-8.35 (m, 1H), 8.09-8.01 (m, 1H), 7.97 (d, J=0.8 Hz, 1H), 7.82 (d, J=0.8 Hz, 1H), 7.77-7.71 (m, 2H), 7.60-7.50 (m, 3H), 7.44-7.35 (m, 2H), 6.64 (s, 1H), 5.71 (s, 1H), 3.28 (q, J=6.8 Hz, 2H), 2.68-2.62 (m, 2H), 2.28-2.17 (m, 2H), 2.11-1.94 (m, 2H), 1.83 (s, 6H), 1.14 (t, J=6.8 Hz, 3H), 0.80-0.71 (m, 2H), 0.52-0.44 (m, 2H).

Example 74. (4-(3-((4-(4-(cyclopropylamino)-4-oxobutyl)-1-phenyl-1H-imidazol-2-yl)carbamoyl)phenyl)-1H-pyrazol-1-yl)methyl methyl carbonate

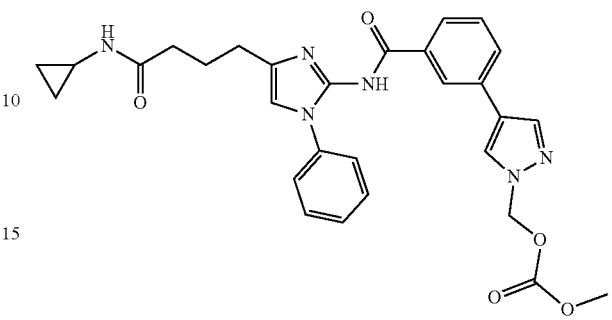

To a solution of chloromethyl chloroformate (62 mg, 0.48 mmol) in THF (3 mL) was added MeOH (17 mg, 0.53 mmol), and DIPEA (0.25 mL, 1.45 mmol) at 0° C. and stirred for 1 h. N-(4-(4-(cyclopropylamino)-4-oxobutyl)-1-phenyl-1H-imidazol-2-yl)-3-(1H-pyrazol-4-yl)benzamide (Example 68) (100 mg, 0.22 mmol) and DMAP (5.3 mg, 0.04 mmol) were added to the reaction mixture. The reaction mixture was stirred at room temperature for overnight. The reaction mixture was quenched with water and extracted with DCM, dried over anhydrous Na₂SO₄ and concentrated under reduced pressure. Purification by silica gel column chromatography using DCM/MeOH as the eluent to afford the title compound (40 mg, 33%). ¹H NMR (CDCl₃, 400 MHz): δ 8.36 (s, 1H), 8.08-8.05 (m, 1H), 7.97 (s, 1H), 7.92 (s, 1H), 7.75-7.72 (m, 2H), 7.57-7.53 (m, 3H), 7.43-7.37 (m, 2H), 6.65 (s, 1H), 6.07 (s, 2H), 5.67 (bs, 1H), 3.83 (s, 3H), 2.75-2.66 (m, 3H), 2.27-2.23 (m, 2H), 2.08-2.01 (m, 2H), 0.81-0.76 (m, 2H), 0.53-0.50 (m, 2H).

Example 75. (4-(3-((4-(4-(cyclopropylamino)-4-oxobutyl)-1-phenyl-1H-imidazol-2-yl)carbamoyl)phenyl)-1H-pyrazol-1-yl)methyl ethyl carbonate

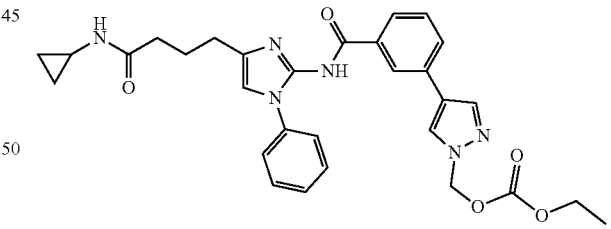

To a solution of chloromethyl chloroformate (90 mg, 0.70 mmol) in THF (3 mL) was added EtOH (45 mg, 0.98 mmol), and DIPEA (0.37 mL, 2.11 mmol) at 0° C. and stirred for 1 h. N-(4-(4-(cyclopropylamino)-4-oxobutyl)-1-phenyl-1H-imidazol-2-yl)-3-(1H-pyrazol-4-yl)benzamide (Example 68) (80 mg, 0.17 mmol) and DMAP (4.3 mg, 0.03 mmol) were added to the reaction mixture. The reaction mixture was stirred at room temperature for overnight. The reaction mixture was quenched with water and extracted with DCM, dried over anhydrous Na₂SO₄ and concentrated under reduced pressure. Purification by silica gel column chromatography using DCM/MeOH as the eluent to afford the title compound (38 mg, 40%). ¹H NMR (CDCl₃, 400 MHz): δ

8.36 (s, 1H), 8.07-8.05 (m, 1H), 7.97 (s, 1H), 7.91 (s, 1H), 7.75-7.72 (m, 2H), 7.57-7.52 (m, 3H), 7.44-7.36 (m, 2H), 6.64 (s, 1H), 6.06 (s, 2H), 5.73 (bs, 1H), 4.59-4.53 (m, 1H), 4.27-4.22 (m, 1H), 2.75-2.65 (m, 3H), 2.27-2.22 (m, 2H), 2.07-1.99 (m, 2H), 1.33-1.29 (m, 3H), 0.81-0.76 (m, 2H), 0.53-0.49 (m, 2H).

Example 76. N-(4-(5-oxo-5-(phenylamino)pentyl)-1-phenyl-1H-imidazol-2-yl)-3-(1H-pyrazol-4-yl) benzamide

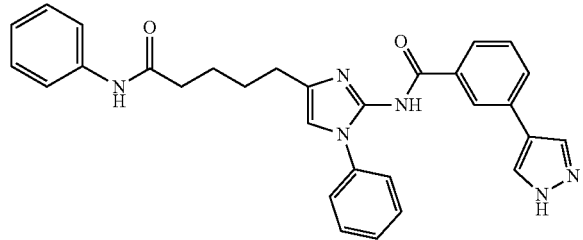 [SMILES: O=C(CCCCc1cn(-c2ccccc2)c(NC(=O)c2cccc(-c3cn[nH]c3)c2)n1)Nc1ccccc1]

Step 1: methyl 5-(1-phenyl-2-(3-(1-((2-(trimethylsilyl)ethoxy)methyl)-1H-pyrazol-4-yl)benzamido)-1H-imidazol-4-yl)pentanoate A mixture of methyl 5-(2-amino-1-phenyl-1H-imidazol-4-yl)pentanoate (Intermediate 27) (2.5 g, 9.14 mmol), 3-(1-((2-(trimethylsilyl)ethoxy)methyl)-1H-pyrazol-4-yl)benzoic acid (Intermediate 1) (2.7 g, 8.46 mmol), HBTU (4.81 g, 12.69 mmol) and DIPEA (3.68 mL, 21.15 mmol) in DCM (100 mL) was stirred at room temperature for overnight. The reaction mixture was quenched with water and extracted with DCM, dried over anhydrous $Na_2SO_4$ and concentrated under reduced pressure. Purification by silica gel column chromatography using DCM/MeOH as the eluent to afford the title compound (3.0 g, 63%). $^1$H NMR (CDCl$_3$, 400 MHz): δ 8.38 (s, 1H), 8.08-8.04 (m, 1H), 7.88-7.84 (m, 2H), 7.77-7.72 (m, 2H), 7.58-7.51 (m, 3H), 7.43-7.36 (m, 2H), 6.62 (s, 1H), 5.45 (s, 2H), 3.69 (s, 3H), 3.62-3.56 (m, 2H), 2.66-2.60 (m, 2H), 2.43-2.37 (m, 2H), 1.79-1.72 (m, 4H), 0.98-0.91 (m, 2H), −0.01 (s, 9H).

Step 2: 5-(1-phenyl-2-(3-(1-((2-(trimethylsilyl)ethoxy)methyl)-1H-pyrazol-4-yl)benzamido)-1H-imidazol-4-yl)pentanoic acid To a solution of methyl 5-(1-phenyl-2-(3-(1-((2-(trimethylsilyl)ethoxy)methyl)-1H-pyrazol-4-yl)benzamido)-1H-imidazol-4-yl)pentanoate (2.0 g, 3.48 mmol) in MeOH (35 mL) was added 1N—NaOH (17.0 mL, 17.0 mmol). The reaction mixture was stirred at room temperature for overnight. The mixture was evaporated under reduced pressure and acidified with 1N—HCl, filtered the solid to get the title compound (1.3 g, 67%). $^1$H NMR (CDCl$_3$, 400 MHz): δ 8.34-8.32 (m, 1H), 8.04-7.98 (m, 1H), 7.86-7.84 (m, 2H), 7.73-7.68 (m, 2H), 7.58-7.48 (m, 3H), 7.43-7.36 (m, 2H), 6.64 (s, 1H), 5.45 (s, 2H), 3.63-3.56 (m, 2H), 2.74-2.67 (m, 2H), 2.48-2.43 (m, 2H), 1.84-1.78 (m, 4H), 0.97-0.91 (m, 2H), −0.01 (s, 9H).

Step 3: N-(4-(5-oxo-5-(phenylamino)pentyl)-1-phenyl-1H-imidazol-2-yl)-3-(1-((2-(trimethylsilyl)ethoxy)methyl)-1H-pyrazol-4-yl)benzamide A mixture of 5-(1-phenyl-2-(3-(1-((2-(trimethylsilyl)ethoxy)methyl)-1H-pyrazol-4-yl)benzamido)-1H-imidazol-4-yl)pentanoic acid (100 mg, 0.17 mmol), aniline (24 mg, 0.26 mmol), EDCI (51 mg, 0.26 mmol), HOBt (36 mg, 0.26 mmol) and DIPEA (0.07 mL, 0.44 mmol) in DMF (2.0 mL) was stirred at room temperature for overnight. The reaction mixture was quenched with water and extracted with ethyl acetate, dried over anhydrous $Na_2SO_4$ and concentrated under reduced pressure. Purification by silica gel column chromatography using DCM/MeOH as the eluent to afford the title compound (60 mg, 53%). $^1$H NMR (CDCl$_3$, 400 MHz): δ 8.37 (s, 1H), 8.08-8.03 (m, 2H), 7.84 (s, 1H), 7.79 (s, 1H), 7.72-7.67 (m, 2H), 7.58-7.53 (m, 3H), 7.53-7.47 (m, 2H), 7.39-7.34 (m, 2H), 7.32-7.25 (m, 1H), 7.10-7.03 (m, 1H), 6.65 (s, 1H), 5.42 (s, 2H), 3.61-3.57 (m, 2H), 2.56-2.50 (m, 2H), 2.37-2.31 (m, 2H), 1.80-1.64 (m, 4H), 0.96-0.91 (m, 2H), −0.02 (s, 9H).

Step 4: N-(4-(5-oxo-5-(phenylamino)pentyl)-1-phenyl-1H-imidazol-2-yl)-3-(1H-pyrazol-4-yl)benzamide TFA (1.8 mL) was added to the solution N-(4-(5-oxo-5-(phenylamino)pentyl)-1-phenyl-1H-imidazol-2-yl)-3-(1-((2-(trimethylsilyl)ethoxy)methyl)-1H-pyrazol-4-yl)benzamide (66 mg, 0.09 mmol) in DCM (3.6 mL) and stirred at room temperature for overnight. The reaction mixture was quenched with sat. aq. NaHCO$_3$ and extracted with DCM, dried over anhydrous $Na_2SO_4$ and concentrated under reduced pressure. Purification by silica gel column chromatography using DCM/MeOH as the eluent to afford the title compound (23.7 mg, 50%). $^1$H NMR (CD$_3$OD, 400 MHz): δ 8.08 (s, 1H), 8.00-7.98 (m, 2H), 7.83-7.79 (m, 1H), 7.72-7.69 (m, 1H), 7.59-7.52 (m, 7H), 7.49-7.44 (m, 1H), 7.31-7.26 (m, 3H), 7.09-7.05 (m, 1H), 2.79-2.75 (m, 2H), 2.48-2.43 (m, 2H), 1.85-1.80 (m, 4H)

The following compounds were made in a similar manner to that described in Example 76 and in general scheme 1.

TABLE 7

| Ex. | Structure | Analytical data |
|---|---|---|
| 77 | ![structure] | $^1$H NMR (CDCl$_3$, 400 MHz): δ 8.35 (s, 1H), 8.05-8.03 (m, 1H), 7.86 (s, 2H), 7.72-7.67 (m, 2H), 7.58-7.55 (m, 1H), 7.52-7.47 (m, 2H), 7.39-7.34 (m, 2H), 6.60 (s, 1H), 3.66 (s, 3H), 2.63-2.59 (m, 2H), 2.38-2.34 (m, 2H), 1.75-1.71 (m, 4H). |

TABLE 7-continued

| Ex. | Structure | Analytical data |
|---|---|---|
| 78 | | ¹H NMR (CD₃OD, 400 MHz): δ 8.08 (s, 1H), 7.98-7.97 (m, 2H), 7.80-7.77 (m, 1H), 7.73-7.70 (m, 1H), 7.61-7.55 (m, 4H), 7.53-7.43 (m, 2H), 7.25 (s, 1H), 2.76-2.72 (m, 2H), 2.40-2.36 (m, 2H), 1.82-1.72 (m, 4H). |
| 79 | | ¹H NMR (CD₃OD, 400 MHz): δ 8.09 (s, 1H), 7.99-7.97 (m, 2H), 7.80-7.78 (m, 1H), 7.73-7.70 (m, 1H), 7.60-7.54 (m, 4H), 7.52-7.43 (m, 2H), 7.27 (s, 1H), 3.55-3.47 (m, 4H), 2.76-2.71 (m, 2H), 2.47-2.43 (m, 2H), 1.80-1.63 (m, 6H), 1.61-1.56 (m, 2H), 1.54-1.49 (m, 2H). |
| 80 | | ¹H NMR (CD₃OD, 400 MHz): δ 8.08 (s, 1H), 7.99-7.98 (m, 2H), 7.81-7.79 (m, 1H), 7.72-7.69 (m, 1H), 7.61-7.55 (m, 4H), 7.53-7.51 (m, 1H), 7.48-7.43 (m, 1H), 7.28 (s, 1H), 2.73-2.70 (m, 5H), 2.27-2.23 (m, 2H), 1.75-1.70 (m, 4H). |
| 81 | | ¹H NMR (CD₃OD, 400 MHz): δ 8.08 (s, 1H), 8.01-7.99 (m, 2H), 7.84-7.82 (m, 1H), 7.72-7.69 (m, 1H), 7.63-7.61 (m, 4H), 7.59-7.53 (m, 1H), 7.51-7.46 (m, 1H), 7.37 (s, 1H), 4.74-4.66 (m, 1H), 4.26-4.19 (m, 1H), 2.81-2.76 (m, 2H), 2.63-2.56 (m, 1H), 2.42-2.34 (m, 1H), 1.92-1.85 (m, 1H), 1.82-1.72 (m, 4H), 1.70-1.59 (m, 4H), 1.52-1.46 (m, 1H), 1.34-1.29 (m, 3H), 1.23-1.19 (m, 3H). |
| 82 | | ¹H NMR (CD₃OD, 400 MHz): δ 8.08 (s, 1H), 8.01-7.99 (m, 2H), 7.85-7.82 (m, 1H), 7.72-7.69 (m, 1H), 7.63-7.61 (m, 4H), 7.59-7.55 (m, 1H), 7.51-7.47 (m, 1H), 7.38 (s, 1H), 4.44-4.38 (m, 1H), 3.79-3.73 (m, 1H), 3.24-3.16 (m, 1H), 2.81-2.76 (m, 2H), 2.59-2.51 (m, 1H), 2.48-2.40 (m, 1H), 1.84-1.68 (m, 7H), 1.66-1.56 (m, 3H), 1.31-1.27 (m, 1H), 1.17-1.14 (m, 2H). |
| 83 | | ¹H NMR (CD₃OD, 400 MHz): δ 8.13 (s, 1H), 8.00-7.94 (m, 2H), 7.77-7.72 (m, 2H), 7.60-7.46 (m, 4H), 7.44-7.38 (m, 2H), 7.07 (s, 1H), 4.42-4.36 (m, 1H), 3.76-3.70 (m, 1H), 3.21-3.13 (m, 1H), 2.74-2.63 (m, 2H), 2.54-2.48 (m, 1H), 2.44-2.34 (m, 1H), 1.78-1.65 (m, 7H), 1.62-1.54 (m, 3H), 1.28-1.24 (m, 1H), 1.16-1.12 (m, 2H). |

TABLE 7-continued

| Ex. | Structure | Analytical data |
|---|---|---|
| 84 | | ¹H NMR (CD₃OD, 400 MHz): δ 8.09 (s, 1H), 8.00-7.99 (m, 2H), 7.81-7.78 (m, 1H), 7.73-7.70 (m, 1H), 7.60-7.54 (m, 4H), 7.50-7.43 (m, 2H), 7.22 (s, 1H), 3.45-3.34 (m, 2H), 3.28 (s, 3H), 3.22-3.17 (m, 1H), 2.97-2.90 (m, 1H), 2.75-2.65 (m, 3H), 2.23-2.18 (m, 2H), 2.04-1.93 (m, 1H), 1.85-1.73 (m, 6H), 1.66-1.57 (m, 1H). |
| 85 | | ¹H NMR (CD₃OD, 400 MHz): δ 8.08 (s, 1H), 8.00-7.99 (m, 2H), 7.83-7.80 (m, 1H), 7.72-7.70 (m, 1H), 7.61-7.58 (m, 4H), 7.55-7.52 (m, 1H), 7.49-7.45 (m, 1H), 7.29 (s, 1H), 3.45-3.34 (m, 2H), 3.28 (s, 3H), 3.22-3.17 (m, 1H), 2.98-2.91 (m, 1H), 2.78-2.66 (m, 3H), 2.23-2.19 (m, 2H), 2.04-1.93 (m, 1H), 1.85-1.73 (m, 6H), 1.67-1.58 (m, 1H). |
| 86 | | ¹H NMR (CD₃OD, 400 MHz): δ 8.02-7.95 (m, 2H), 7.76-7.71 (m, 2H), 7.60-7.48 (m, 4H), 7.44-7.38 (m, 2H), 7.08 (s, 1H), 4.19-4.14 (m, 1H), 3.53-3.46 (m, 3H), 3.42-3.32 (m, 4H), 2.69-2.64 (m, 2H), 2.41-2.36 (m, 2H), 2.06-1.86 (m, 4H), 1.80-1.68 (m, 4H). |
| 87 | | ¹H NMR (CD₃OD, 400 MHz): δ 8.09 (s, 1H), 8.00-7.98 (m, 2H), 7.82-7.79 (m, 1H), 7.73-7.70 (m, 1H), 7.62-7.56 (m, 4H), 7.54-7.44 (m, 2H), 7.29 (s, 1H), 4.20-4.14 (m, 1H), 3.55-3.46 (m, 3H), 3.43-3.34 (m, 4H), 2.76-2.72 (m, 2H), 2.43-2.39 (m, 2H), 2.06-1.86 (m, 4H), 1.83-1.70 (m, 4H). |
| 88 | | ¹H NMR (CD₃OD, 400 MHz): δ 8.10-7.88 (m, 3H), 7.80-7.64 (m, 2H), 7.55-7.38 (m, 6H), 7.08 (s, 1H), 2.68-2.62 (m, 3H), 2.23-2.18 (m, 2H), 1.75-1.69 (m, 4H), 0.73-0.68 (m, 2H), 0.49-0.45 (m, 2H). |

| Ex. | Structure | Analytical data |
|---|---|---|
| 89 | ![structure] | $^1$H NMR (CD$_3$OD, 400 MHz): δ 8.10 (s, 1H), 8.00-7.98 (m, 2H), 7.80-7.77 (m, 1H), 7.74-7.70 (m, 1H), 7.58-7.52 (m, 4H), 7.49-7.43 (m, 2H), 7.18 (s, 1H), 3.67-3.59 (m, 1H), 2.72-2.68 (m, 2H), 2.25-2.21 (m, 2H), 1.88-1.82 (m, 2H), 1.78-1.71 (m, 6H), 1.66-1.60 (m, 2H), 1.40-1.29 (m, 2H), 1.25-1.15 (m, 2H). |

Example 90. N-(4-(6-oxo-6-(phenylamino)hexyl)-1-phenyl-1H-imidazol-2-yl)-3-(1H-pyrazol-4-yl)benzamide

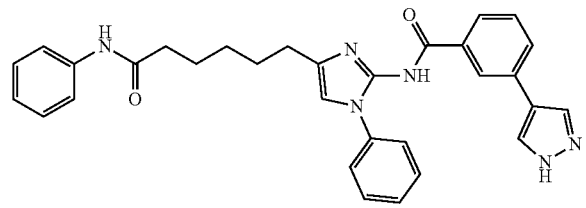 [SMILES: O=C(CCCCCc1cn(-c2ccccc2)c(NC(=O)c2cccc(-c3cn[nH]c3)c2)n1)Nc1ccccc1]

Step 1: methyl 6-(1-phenyl-2-(3-(1-((2-(trimethylsilyl)ethoxy)methyl)-1H-pyrazol-4-yl)benzamido)-1H-imidazol-4-yl)hexanoate A mixture of methyl 6-(2-amino-1-phenyl-1H-imidazol-4-yl)hexanoate (Intermediate 28) (2.0 g, 6.69 mmol), 3-(1-((2-(trimethylsilyl)ethoxy)methyl)-1H-pyrazol-4-yl)benzoic acid (Intermediate 1) (2.43 g, 7.65 mmol), HATU (3.97 g, 10.44 mmol) and DIPEA (3.63 mL, 20.88 mmol) in DCM was stirred at room temperature for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (2.0 g, 49%). $^1$H NMR (CDCl$_3$, 400 MHz): δ 8.38 (s, 1H), 8.07-8.04 (m, 1H), 7.86 (s, 1H), 7.85 (s, 1H), 7.75-7.00 (m, 2H), 7.57-7.50 (m, 3H), 7.42-7.32 (m, 2H), 6.58 (s, 1H), 5.43 (s, 2H), 3.67 (s, 3H), 3.62-3.57 (m, 2H), 2.60-2.55 (m, 2H), 2.38-2.30 (m, 2H), 1.74-1.62 (m, 4H), 1.50-1.40 (m, 2H), 0.99-0.90 (m, 2H), -0.01 (s, 9H).

Step 2: 6-(1-phenyl-2-(3-(1-((2-(trimethylsilyl)ethoxy)methyl)-1H-pyrazol-4-yl)benzamido)-1H-imidazol-4-yl)hexanoic acid To a solution of methyl 6-(1-phenyl-2-(3-(1-((2-(trimethylsilyl)ethoxy)methyl)-1H-pyrazol-4-yl)benzamido)-1H-imidazol-4-yl)hexanoate (2.0 g, 3.40 mmol) in MeOH (20 mL) was added 1N—NaOH (6.80 mL, 6.80 mmol). The reaction mixture was stirred at room temperature for overnight. The mixture was evaporated under reduced pressure and acidified with 1N—HCl, extracted with DCM. The organic phase was dried over anhydrous Na$_2$SO$_4$ and concentrated under reduced pressure to afford the title compound (900 mg, 46%). $^1$H NMR (CDCl$_3$, 400 MHz): δ 8.31 (s, 1H), 7.99-7.96 (m, 1H), 7.88-7.85 (m, 2H), 7.71-7.65 (m, 2H), 7.58-7.56 (m, 1H), 7.56-7.48 (m, 2H), 7.41-7.35 (m, 2H), 6.62 (s, 1H), 5.46 (s, 1H), 3.62-3.56 (m, 2H), 2.69-2.62 (m, 2H), 2.48-2.41 (m, 2H), 1.82-1.75 (m, 4H), 1.60-1.51 (m, 2H), 0.95-0.91 (m, 2H), -0.01 (s, 9H).

Step 3: N-(4-(6-oxo-6-(phenylamino)hexyl)-1-phenyl-1H-imidazol-2-yl)-3-(1-((2-(trimethylsilyl)ethoxy)methyl)-1H-pyrazol-4-yl)benzamide A mixture of 6-(1-phenyl-2-(3-(1-((2-(trimethylsilyl)ethoxy)methyl)-1H-pyrazol-4-yl)benzamido)-1H-imidazol-4-yl)hexanoic acid (120 mg, 0.21 mmol), aniline (23.4 mg, 0.25 mmol), EDCI (60 mg, 0.31 mmol), HOBt (42.4 mg, 0.31 mmol) and DIPEA (0.15 mL, 0.83 mmol) in DMF was stirred at room temperature for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (3.0 g, 67%). $^1$H NMR (CDCl$_3$, 400 MHz): δ 8.37 (s, 1H), 8.10-8.06 (m, 1H), 7.85 (s, 1H), 7.80 (s, 1H), 7.77-7.71 (m, 2H), 7.60-7.50 (m, 6H), 7.43-7.38 (m, 2H), 7.32-7.24 (m, 2H), 6.62 (s, 1H), 5.44 (s, 1H), 3.62-3.56 (m, 2H), 2.69-2.62 (m, 2H), 2.48-2.41 (m, 2H), 1.90-1.70 (m, 4H), 1.58-1.48 (m, 2H), 0.95-0.91 (m, 2H), -0.01 (s, 9H).

Step 4: N-(4-(6-oxo-6-(phenylamino)hexyl)-1-phenyl-1H-imidazol-2-yl)-3-(1H-pyrazol-4-yl)benzamide TFA (1.0 mL) was added to the solution N-(4-(6-oxo-6-(phenylamino)hexyl)-1-phenyl-1H-imidazol-2-yl)-3-(1-((2-(trimethylsilyl)ethoxy)methyl)-1H-pyrazol-4-yl)benzamide (84 mg, 0.129 mmol) in DCM (10 mL) and stirred at room temperature for overnight. The reaction mixture was quenched with sat. aq. NaHCO$_3$ and extracted with DCM, dried over anhydrous Na$_2$SO$_4$ and concentrated under reduced pressure. Purification by silica gel column chromatography using DCM/MeOH as the eluent to afford the title compound (24 mg, 36%). $^1$H NMR (CDCl$_3$, 400 MHz): δ 8.37 (s, 1H), 8.07-8.05 (m, 1H), 7.87 (s, 2H), 7.73-7.71 (m, 2H), 7.64 (s, 1H), 7.60-7.50 (m, 5H), 7.41-7.37 (m, 2H), 7.30-7.27 (m, 2H), 7.09-7.06 (m, 1H), 6.61 (s, 1H), 2.64-2.61 (m, 2H), 2.42-2.38 (m, 2H), 1.83-1.70 (m, 4H), 1.52-1.48 (m, 2H).

The following compounds were made in a similar manner to that described in Example 90 and in general scheme 1.

TABLE 8

| Ex. | Structure | Analytical data |
|---|---|---|
| 91 | | ¹H NMR (CDCl₃, 400 MHz): δ 8.36 (s, 1H), 8.10-8.03 (m, 1H), 7.88 (s, 2H), 7.73-7.71 (m, 2H), 7.56-7.53 (m, 1H), 7.51-7.49 (m, 2H), 7.40-7.36 (m, 2H), 6.59 (s, 1H), 3.66 (s, 3H), 2.61-2.58 (m, 2H), 2.35-2.31 (m, 2H), 1.70-1.66 (m, 4H), 1.48-1.39 (m, 2H). |
| 92 | | ¹H NMR (CD₃OD, 400 MHz): δ 8.15 (s, 1H), 7.94 (s, 2H), 7.81 (s, 1H), 7.72-7.68 (m, 1H), 7.62-7.54 (m, 2H), 7.52-7.48 (m, 2H), 4.42-7.38 (m, 2H), 6.99 (s, 1H), 2.67-2.64 (m, 2H), 2.26-2.24 (m, 2H), 1.76-1.63 (m, 4H), 1.52-1.46 (m, 2H). |
| 93 | | ¹H NMR (CDCl₃, 400 MHz): δ 8.38 (s, 1H), 8.08-8.06 (m, 1H), 7.90 (s, 2H), 7.76-7.74 (m, 2H), 7.60-7.58 (m, 1H), 7.57-7.53 (m, 2H), 7.41-7.37 (m, 2H), 6.61 (s, 1H), 3.58-3.54 (m, 2H), 3.42-3.38 (m, 2H), 2.63-2.60 (m, 2H), 2.36-2.32 (m, 2H), 1.75-1.25 (m, 12H). |
| 94 | | ¹H NMR (CDCl₃, 400 MHz): δ 8.37 (s, 1H), 8.07-8.05 (m, 1H), 7.90 (s, 2H), 7.75-7.73 (m, 2H), 7.59-7.57 (m, 1H), 7.57-7.50 (m, 2H), 7.41-7.37 (m, 2H), 6.60 (s, 1H), 5.60 (bs, 1H), 2.80 (d, 2H), 2.62-2.58 (m, 2H), 2.21-2.18 (m, 2H), 1.74-1.67 (m, 4H), 1.47-1.42 (m, 2H). |
| 95 | | ¹H NMR (CDCl₃, 400 MHz): δ 8.38 (s, 1H), 8.08-8.06 (m, 1H), 7.90 (s, 2H), 7.75-7.74 (m, 2H), 7.60-7.57 (m, 1H), 7.57-7.50 (m, 2H), 7.41-7.37 (m, 2H), 6.61 (s, 1H), 4.98-4.90 (m, 0.5H), 4.53-4.49 (m, 0.5H), 4.22-4.10 (m, 0.5H), 3.64-3.60 (m, 0.5H), 3.15-3.08 (m, 0.5H), 2.70-2.59 (m, 2.5H), 2.48-2.31 (m, 2H), 1.78-1.65 (m, 7H), 1.53-1.30 (m, 4H), 1.25-1.22 (m, 2H), 1.13-1.11 (m, 2H). |
| 96 | | ¹H NMR (CDCl₃, 400 MHz): δ 8.38 (s, 1H), 8.08-8.06 (m, 1H), 7.90 (s, 2H), 7.75-7.74 (m, 2H), 7.60-7.57 (m, 1H), 7.57-7.50 (m, 2H), 7.41-7.37 (m, 2H), 6.61 (s, 1H), 4.98-4.90 (m, 0.5H), 4.53-4.49 (m, 0.5H), 4.22-4.10 (m, 0.5H), 3.64-3.60 (m, 0.5H), 3.15-3.08 (m, 0.5H), 2.70-2.59 (m, 2.5H), 2.48-2.31 (m, 2H), 1.78-1.65 (m, 7H), 1.53-1.30 (m, 4H), 1.25-1.22 (m, 2H), 1.13-1.11 (m, 2H). |

TABLE 8-continued

| Ex. | Structure | Analytical data |
|---|---|---|
| 97 | | ¹H NMR (CDCl₃, 400 MHz): δ 8.38 (s, 1H), 8.08-8.06 (m, 1H), 7.89 (s, 2H), 7.75-7.73 (m, 2H), 7.60-7.57 (m, 1H), 7.57-7.50 (m, 2H), 7.41-7.37 (m, 2H), 6.61 (s, 1H), 4.82-4.75 (m, 1H), 4.20-4.13 (m, 1H), 2.63-2.58 (m, 2H), 2.50-2.20 (m, 2H), 1.83-1.68 (m, 6H), 1.62-1.40 (m, 6H), 1.30-1.10 (m, 6H). |
| 98 | | ¹H NMR (CDCl₃, 400 MHz): δ 8.37 (s, 1H), 8.05-8.00 (m, 1H), 7.89 (s, 2H), 7.72-7.68 (m, 2H), 7.58-7.56 (m, 1H), 7.57-7.47 (m, 2H), 7.38-7.35 (m, 2H), 6.59 (s, 1H), 6.48 (bs, 1H), 3.46-3.37 (m, 2H), 3.36-3.30 (m, 3H), 3.20-3.00 (m, 1H), 2.79-2.72 (m, 1H), 2.62-2.42 (m, 4H), 2.13-2.09 (m, 1H), 1.98-1.89 (m, 1H), 1.82-1.52 (m, 7H), 1.50-1.39 (m, 2H). |
| 99 | | ¹H NMR (CDCl₃, 400 MHz): δ 8.37 (s, 1H), 8.05-8.00 (m, 1H), 7.89 (s, 2H), 7.72-7.68 (m, 2H), 7.58-7.56 (m, 1H), 7.57-7.47 (m, 2H), 7.38-7.35 (m, 2H), 6.59 (s, 1H), 6.48 (bs, 1H), 3.46-3.37 (m, 2H), 3.36-3.30 (m, 3H), 3.20-3.00 (m, 1H), 2.79-2.72 (m, 1H), 2.62-2.42 (m, 4H), 2.13-2.09 (m, 1H), 1.98-1.89 (m, 1H), 1.82-1.52 (m, 7H), 1.50-1.39 (m, 2H). |
| 100 | | ¹H NMR (CDCl₃, 400 MHz): δ 8.38 (s, 1H), 8.07-8.06 (m, 1H), 7.90 (s, 2H), 7.75-7.73 (m, 2H), 7.59-7.57 (m, 1H), 7.55-7.51 (m, 2H), 7.40-7.37 (m, 2H), 6.61 (s, 1H), 4.26-4.02 (m, 1H), 3.60-3.20 (m, 7H), 2.63-2.59 (m, 2H), 2.42-2.36 (m, 2H), 2.28-1.85 (m, 4H), 1.78-1.66 (m, 4H), 1.49-1.41 (m, 2H). |
| 101 | | ¹H NMR (CDCl₃, 400 MHz): δ 8.38 (s, 1H), 8.07-8.06 (m, 1H), 7.90 (s, 2H), 7.75-7.73 (m, 2H), 7.59-7.57 (m, 1H), 7.55-7.51 (m, 2H), 7.40-7.37 (m, 2H), 6.61 (s, 1H), 4.26-4.02 (m, 1H), 3.60-3.20 (m, 7H), 2.63-2.59 (m, 2H), 2.42-2.36 (m, 2H), 2.28-1.85 (m, 4H), 1.78-1.66 (m, 4H), 1.49-1.41 (m, 2H). |

Example 102. N-(1-phenyl-4-(6-(piperidin-1-yl)hexyl)-1H-imidazol-2-yl)-3-(1H-pyrazol-4-yl)benzamide

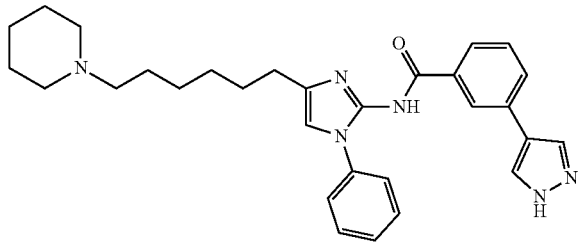 [SMILES: O=C(Nc1nc(CCCCCCN2CCCCC2)cn1-c1ccccc1)c1cccc(-c2cn[nH]c2)c1]

Step 1: N-(4-(6-hydroxyhexyl)-1-phenyl-1H-imidazol-2-yl)-3-(1-((2-(trimethylsilyl)ethoxy)methyl)-1H-pyrazol-4-yl)benzamide To a solution of methyl 6-(1-phenyl-2-(3-(1-((2-(trimethylsilyl)ethoxy)methyl)-1H-pyrazol-4-yl)benzamido)-1H-imidazol-4-yl)hexanoate (Example 90, Step 1) (1.36 g, 2.3 mmol) in anhydrous THF (25 mL) was added LiAlH$_4$ (1.0 M in THF, 2.3 mL, 2.3 mmol) at −78° C. The reaction mixture was stirred at room temperature for 1 h, quenched with water, 15%-NaOH and stirred for 1 h. The mixture filtered through celite, filtrate was concentrated under reduced pressure. Purification by silica gel column chromatography using DCM/MeOH as the eluent to afford the title compound (814 mg, 63%). $^1$H NMR (CDCl$_3$, 400 MHz): δ 8.38 (s, 1H), 8.10-8.04 (m, 1H), 7.86 (s, 1H), 7.85 (s, 1H), 7.80-7.70 (m, 2H), 7.59-7.50 (m, 3H), 7.42-7.35 (m, 2H), 6.59 (s, 1H), 5.46 (s, 2H), 3.70-3.65 (m, 2H), 3.61-3.55 (m, 2H), 2.64-2.57 (m, 2H), 1.78-1.68 (m, 2H), 1.66-1.56 (m, 2H), 1.50-1.40 (m, 4H), 0.95-0.91 (m, 2H), −0.02 (s, 9H).

Step 2: N-(4-(6-oxohexyl)-1-phenyl-1H-imidazol-2-yl)-3-(1-((2-(trimethylsilyl)ethoxy)methyl)-1H-pyrazol-4-yl)benzamide To a solution of oxalyl chloride (92 μL, 1.072 mmol) in anhydrous DCM was added dropwise a solution of DMSO (0.15 mL, 2.14 mmol) in DCM at −78° C. After 15 min, to the mixture was added dropwise a solution of N-(4-(6-hydroxyhexyl)-1-phenyl-1H-imidazol-2-yl)-3-(1-((2-(trimethylsilyl)ethoxy)methyl)-1H-pyrazol-4-yl)benzamide (500 mg, 0.893 mmol) in DCM over 10 min. After 1 h, TEA (0.62 mL, 4.46 mmol) was added and the reaction mixture was warmed to room temperature. The reaction mixture was quenched with water extracted with DCM. The organic phase was washed with 1N—HCl, sat. aq. NaHCO$_3$, brine, dried over anhydrous Na$_2$SO$_4$ and concentrated under reduced pressure to afford the title compound (480 mg, 96%).

Step 3: N-(1-phenyl-4-(6-(piperidin-1-yl)hexyl)-1H-imidazol-2-yl)-3-(1-((2-(trimethylsilyl)ethoxy)methyl)-1H-pyrazol-4-yl)benzamide To a solution of N-(4-(6-oxohexyl)-1-phenyl-1H-imidazol-2-yl)-3-(1-((2-(trimethylsilyl)ethoxy)methyl)-1H-pyrazol-4-yl)benzamide (250 mg, 0.448 mmol) and piperidine (88.5 μL, 0.896 mmol) in THF was added NaBH$_3$CN (56.3 mg, 0.896 mmol). The reaction mixture was stirred at room temperature for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (126 mg, 45%). $^1$H NMR (CDCl$_3$, 400 MHz): δ 8.38 (s, 1H), 8.10-8.04 (m, 1H), 7.87 (s, 1H), 7.85 (s, 1H), 7.76-7.72 (m, 2H), 7.59-7.50 (m, 3H), 7.42-7.35 (m, 2H), 6.58 (s, 1H), 5.45 (s, 2H), 3.62-3.54 (m, 2H), 2.62-2.58 (m, 2H), 2.48-2.22 (m, 6H), 1.75-1.65 (m, 2H), 1.62-1.48 (m, 6H), 1.48-1.30 (m, 6H), 0.95-0.88 (m, 2H), −0.02 (s, 9H).

Step 4: N-(1-phenyl-4-(6-(piperidin-1-yl)hexyl)-1H-imidazol-2-yl)-3-(1H-pyrazol-4-yl)benzamide TFA (1.0 mL) was added to the solution N-(1-phenyl-4-(6-(piperidin-1-yl)hexyl)-1H-imidazol-2-yl)-3-(1-((2-(trimethylsilyl)ethoxy)methyl)-1H-pyrazol-4-yl)benzamide (126 mg, 0.20 mmol) in DCM (10 mL) and stirred at room temperature for overnight. The reaction mixture was quenched with sat. aq. NaHCO$_3$ and extracted with DCM, dried over anhydrous Na$_2$SO$_4$ and concentrated under reduced pressure. Purification by silica gel column chromatography using DCM/MeOH as the eluent to afford the title compound (24 mg, 36%). $^1$H NMR (CDCl$_3$, 400 MHz): δ 8.33 (s, 1H), 8.08-8.02 (m, 1H), 7.87 (s, 2H), 7.74-7.68 (m, 2H), 7.60-7.58 (m, 1H), 7.54-7.50 (m, 2H), 7.43-7.37 (m, 2H), 6.66 (s, 1H), 3.05-2.88 (m, 6H), 2.64-2.58 (m, 2H), 1.92-1.80 (m, 4H), 1.80-1.63 (m, 5H), 1.50-1.38 (m, 5H).

The following compounds were made in a similar manner to that described in Example 102 and in general scheme 1.

TABLE 9

| Ex. | Structure | Analytical data |
|---|---|---|
| 103 | ![structure] | $^1$H NMR (CD$_3$OD, 400 MHz): δ 8.10 (s, 1H), 7.96 (s, 2H), 7.80-7.70 (m, 2H), 7.62-7.48 (m, 4H), 7.43-7.39 (m, 2H), 7.11 (s, 1H), 4..64 (s, 1H), 8.87 (t, 3H), 2.84 (t, 3H) |

TABLE 9-continued

| Ex. | Structure | Analytical data |
|---|---|---|
| 104 | | $^1$H NMR (CDCl$_3$, 400 MHz): δ 8.40-8.28 (m, 1H), 8.10-7.98 (m, 1H), 7.92-7.82 (m, 2H), 7.77-7.64 (m, 2H), 7.60-7.47 (m, 3H), 6.62 (s, 1H), 5.56 (s, 1H), 2.80-2.72 (m, 2H), 2.70-2.62 (m, 2H), 2.59-2.42 (m, 4H), 1.78-1.68 (m, 4H), 1.56-1.45 (m, 2H) |
| 105 | | $^1$H NMR (DMSO-D$_6$, 400 MHz): δ 13.00 (s, 1H), 12.55 (bs, 0.5H), 10.46 (bs, 0.5H), 8.33-7.98 (m, 2H), 7.94-7.27 (m, 9H), 7.22-7.09 (m, 1H), 4.70-4.44 (m, 1H), 3.54-3.42 (m, 2H), 2.73-2.52 (m, 2H), 1.85-1.72 (m, 2H) |
| 106 | | $^1$H NMR (CDCl$_3$, 400 MHz): δ 8.36 (s, 1H), 8.08-8.01 (m, 1H), 7.88 (s, 2H), 7.75-7.67 (m, 2H), 7.60-7.54 (m, 1H), 7.54-7.46 (m, 2H), 7.40-7.33 (m, 2H), 6.59 (s, 1H), 2.66-2.55 (m, 2H), 2.40-2.26 (m, 6H), 1.93-1.81 (m, 2H), 1.66-1.53 (m, 4H), 1.50-1.36 (m, 2H) |
| 107 | | $^1$H NMR (CDCl$_3$, 400 MHz): δ 8.36 (s, 1H), 8.08-8.01 (m, 1H), 7.87 (s, 2H), 7.75-7.67 (m, 2H), 7.60-7.54 (m, 1H), 7.54-7.46 (m, 2H), 7.40-7.33 (m, 2H), 6.60 (s, 1H), 3.83-3.66 (m, 4H), 2.67-2.63 (m, 2H), 2.46-2.40 (m, 6H), 1.88-1.85 (m, 2H) |
| 108 | | $^1$H NMR (CDCl$_3$, 400 MHz): δ 8.35 (s, 1H), 8.06-7.98 (m, 1H), 7.83 (s, 2H), 7.71-7.60 (m, 2H), 7.56-7.49 (m, 1H), 7.49-7.40 (m, 2H), 7.37-7.28 (m, 2H), 6.54 (s, 1H), 2.70-2.32 (m, 12H), 2.28 (s, 3H), 1.90-1.76 (m, 2H) |
| 109 | | $^1$H NMR (CD$_3$OD, 400 MHz): δ 8.13 (s, 1H), 7.93-7.81 (m, 2H), 7.80-7.69 (m, 1H), 7.69-7.59 (m, 1H), 7.53-7.28 (m, 6H), 7.07-6.95 (m, 2H), 6.94-6.84 (m, 1H), 6.62-6.44 (m, 3H), 3.10-2.98 (m, 2H), 2.64-2.52 (m, 2H), 1.90-1.80 (m, 2H) |

TABLE 9-continued

| Ex. | Structure | Analytical data |
|---|---|---|
| 110 | | $^1$H NMR (CD$_3$OD, 400 MHz): δ 8.03 (s, 1H), 8.00-7.98 (m, 2H), 7.82-7.79 (m, 1H), 7.67-7.65 (m, 1H), 7.54-7.42 (m, 6H), 7.23 (s, 1H), 3.62-3.48 (m, 4H), 3.29-3.27 (m, 2H), 3.02-2.98 (m, 4H), 2.83-2.78 (m, 2H), 2.20-2.13 (m, 2H). |
| 111 | | $^1$H NMR (CD$_3$OD, 400 MHz): δ 8.30-7.88 (m, 3H), 7.85-7.66 (m, 2H), 7.65-7.45 (m, 4H), 7.45-7.32 (m, 2H), 7.07 (s, 1H), 3.62 (t, J = 6.4 Hz, 2H), 2.67 (t, J = 7.2 Hz, 2H), 1.86-1.73 (m, 2H), 1.72-1.60 (m, 2H). |
| 112 | | $^1$H NMR (CDCl$_3$, 400 MHz): δ 8.41-8.33 (m, 1H), 8.11-8.04 (m, 1H), 7.87 (s, 2H), 7.76-7.65 (m, 2H), 7.62-7.45 (m, 2H), 7.44-7.35 (m, 2H), 7.22-7.10 (m, 2H), 6.75-6.66 (m, 1H), 6.65-6.53 (m, 3H), 3.23-3.11 (m, 2H), 2.70-2.53 (m, 2H), 1.90-1.60 (m, 4H). |
| 113 | | $^1$H NMR (CDCl$_3$, 400 MHz): δ 8.33 (s, 1H), 8.06-7.96 (m, 1H), 7.85 (s, 2H), 7.76-7.64 (m, 2H), 7.60-7.45 (m, 3H), 7.43-7.32 (m, 2H), 6.61 (s, 1H), 2.67-2.55 (m, 2H), 2.50-2.26 (m, 6H), 1.76-1.52 (m, 8H), 1.50-1.36 (m, 2H). |
| 114 | | $^1$H NMR (CD$_3$OD, 400 MHz): δ 8.32-7.89 (m, 3H), 7.89-7.62 (m, 2H), 7.62-7.30 (m, 5H), 7.19-6.99 (m, 1H), 5.49-5.22 (m, 1H), 3.81-3.67 (m, 3H), 2.80-2.43 (m, 4H), 2.24-2.2.16 (m, 1H), 2.12-1.93 (m, 3H), 1.83-1.52 (m, 4H). |
| 115 | | $^1$H NMR (CD$_3$OD, 400 MHz): δ 8.32-8.07 (m, 1H), 8.07-7.87 (m, 2H), 7.87-7.67 (m, 2H), 7.67-7.46 (m, 4H), 7.46-7.32 (m, 2H), 7.06 (s, 1H), 3.05-2.20 (m, 12H), 1.86-1.41 (m, 4H). |

TABLE 9-continued

| Ex. | Structure | Analytical data |
|---|---|---|
| 116 | | ¹H NMR (CD₃OD, 400 MHz): δ 8.12 (s, 1H), 7.96-7.94 (m, 2H), 7.77-7.72 (m, 2H), 7.60-7.51 (m, 4H), 7.48-7.39 (m, 2H), 7.12 (s, 1H), 3.58-3.54 (m, 2H), 2.70-2.65 (m, 2H), 1.76-1.71 (m, 2H), 1.62-1.55 (m, 2H), 1.51-1.44 (m, 2H). |
| 117 | | ¹H NMR (CD₃OD, 400 MHz): δ 8.18-8.08 (m, 1H), 8.02-7.93 (m, 2H), 7.90-7.89 (m, 1H), 7.77-7.70 (m, 2H), 7.53-7.39 (m, 5H), 7.10-7.06 (m, 2H), 7.05-7.01 (m, 1H), 6.65-6.57 (m, 3H), 3.13-3.08 (m, 2H), 2.69-2.64 (m, 2H), 1.81-1.74 (m, 2H), 1.73-1.65 (m, 2H), 1.59-1.52 (m, 2H). |
| 118 | | ¹H NMR (CD₃OD, 400 MHz): δ 8.12 (s, 1H), 8.02-7.95 (m, 2H), 7.77-7.72 (m, 2H), 7.56-7.47 (m, 4H), 7.45-7.39 (m, 2H), 7.07 (s, 1H), 3.16-3.05 (m, 4H), 3.01-2.94 (m, 2H), 2.68-2.62 (m, 2H), 1.84-1.72 (m, 8H), 1.65-1.58 (m, 2H), 1.50-1.43 (m, 2H). |
| 119 | | ¹H NMR (CD₃OD, 400 MHz): δ 8.08-8.01 (m, 2H), 7.95-7.90 (m, 1H), 7.80-7.68 (m, 2H), 7.55-7.38 (m, 6H), 7.07 (s, 1H), 3.74-3.69 (m, 4H), 2.68-2.62 (m, 2H), 2.59-2.51 (m, 4H), 2.48-2.41 (m, 2H), 1.81-1.73 (m, 2H), 1.65-1.58 (m, 2H), 1.50-1.43 (m, 2H). |
| 120 | | ¹H NMR (CD₃OD, 400 MHz): δ 8.16-8.02 (m, 2H), 7.96-7.90 (m, 1H), 7.78-7.71 (m, 2H), 7.54-7.48 (m, 3H), 7.44-7.38 (m, 3H), 7.07 (s, 1H), 2.84-2.79 (m, 4H), 2.72-2.63 (m, 6H), 2.51-2.46 (m, 2H), 1.79-1.72 (m, 2H), 1.65-1.57 (m, 2H), 1.47-1.42 (m, 2H). |
| 121 | | ¹H NMR (CDCl₃, 400 MHz): δ 8.37 (s, 1H), 8.07-8.05 (m, 1H), 7.89 (s, 2H), 7.73-7.71 (m, 2H), 7.59-7.57 (m, 1H), 7.57-7.50 (m, 2H), 7.41-7.37 (m, 2H), 6.59 (s, 1H), 4.35 (t, 3H), 2.62-2.58 (m, 2H), 1.78-1.69 (m, 4H), 1.46-1.42 (m, 4H) |

TABLE 9-continued

| Ex. | Structure | Analytical data |
|---|---|---|
| 122 | | ¹H NMR (CDCl₃, 400 MHz): δ 8.38 (s, 1H), 8.08-8.06 (m, 1H), 7.88 (s, 2H), 7.73-7.71 (m, 2H), 7.59-7.57 (m, 1H), 7.54-7.50 (m, 2H), 7.40-7.37 (m, 2H), 7.18-7.14 (m, 2H), 6.70-6.66 (m, 1H), 6.61-6.59 (m, 2H), 6.57 (s, 1H), 3.10 (t, 2H), 2.61-2.57 (m, 2H), 1.72-1.61 (m, 4H), 1.50-1.40 (m, 4H) |
| 123 | | ¹H NMR (CDCl₃, 400 MHz): δ 8.38 (s, 1H), 8.08-8.06 (m, 1H), 7.90 (s, 2H), 7.75-7.73 (m, 2H), 7.60-7.58 (m, 1H), 7.57-7.51 (m, 2H), 7.42-7.37 (m, 2H), 6.58 (s, 1H), 3.73-3.70 (m, 4H), 2.61-2.57 (m, 2H), 2.50-2.40 (m, 4H), 2.38-2.30 (m, 2H), 1.72-1.59 (m, 2H), 1.53-1.36 (m, 6H) |
| 124 | | ¹H NMR (CDCl₃, 400 MHz): δ 8.38 (s, 1H), 8.08-8.06 (m, 1H), 7.90 (s, 2H), 7.75-7.73 (m, 2H), 7.60-7.58 (m, 1H), 7.57-7.51 (m, 2H), 7.42-7.37 (m, 2H), 6.58 (s, 1H), 2.74-2.62 (m, 8H), 2.61-2.57 (m, 2H), 2.37-2.34 (m, 2H), 1.71-1.65 (m, 2H), 1.52-1.32 (m, 6H) |

Example 125. 1-(6-(2-(3-(1H-pyrazol-4-yl)benzamido)-1-phenyl-1H-imidazol-4-yl)hexyl)piperidine 1-oxide

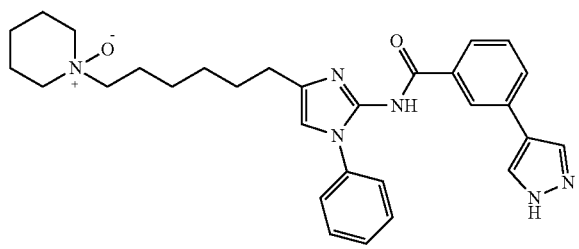

Step 1: 1-(6-(1-phenyl-2-(3-(1-((2-(trimethylsilyl) ethoxy)methyl)-1H-pyrazol-4-yl)benzamido)-1H-imidazol-4-yl)hexyl)piperidine 1-oxide To a solution of N-(1-phenyl-4-(6-(piperidin-1-yl)hexyl)-1H-imidazol-2-yl)-3-(1-((2-(trimethylsilyl)ethoxy)methyl)-1H-pyrazol-4-yl)benzamide (Example 102, Step 3) (266 mg, 0.424 mmol) in DCM was added m-CPBA (125 mg, 0.509 mmol) at 0° C. The reaction mixture was stirred at 0° C. for 1 h. The mixture was evaporated under reduced pressure. Purification by silica gel column chromatography using DCM/MeOH as the eluent to afford the title compound (223 mg, 82%).

Step 2: 1-(6-(2-(3-(1H-pyrazol-4-yl)benzamido)-1-phenyl-1H-imidazol-4-yl)hexyl)piperidine 1-oxide TFA (1.0 mL) was added to the solution 1-(6-(1-phenyl-2-(3-(1-((2-(trimethylsilyl)ethoxy)methyl)-1H-pyrazol-4-yl)benzamido)-1H-imidazol-4-yl)hexyl)piperidine 1-oxide (117 mg, 0.182 mmol) in DCM (10 mL) and stirred at room temperature for overnight. The reaction mixture was quenched with sat. aq. NaHCO₃ and extracted with DCM, dried over anhydrous Na₂SO₄ and concentrated under reduced pressure. Purification by silica gel column chromatography using DCM/MeOH as the eluent to afford the title compound (60 mg, 64%). ¹H NMR (CD₃OD, 400 MHz): δ 8.22-7.82 (m, 3H), 7.80-7.68 (m, 2H), 7.62-7.32 (m, 6H), 7.07 (s, 1H), 3.30-3.10 (m, 6H), 2.67-2.64 (m, 2H), 2.18-2.09 (m, 2H), 1.92-1.80 (m, 2H), 1.80-1.60 (m, 5H), 1.60-1.40 (m, 5H).

Example 126. 4-(3-(2-(3-(1H-pyrazol-4-yl)benzamido)-1-phenyl-1H-imidazol-4-yl)propyl)morpholine 4-oxide

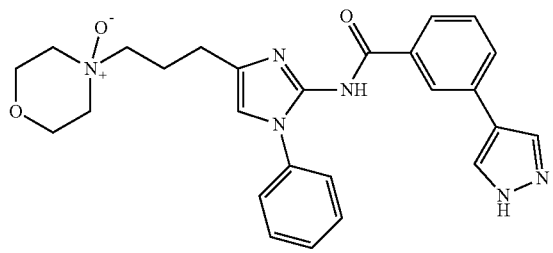

Example 126 was made in a manner similar with Example 125 (26.8 mg, 410%). ¹H NMR (CD₃OD, 400 MHz): δ 8.08 (s, 1H), 7.99 (s, 2H), 7.80-7.70 (m, 1H), 7.70-7.62 (m, 1H), 7.54-7.41 (m, 6H), 7.21 (s, 1H), 4.22-4.18 (m, 2H), 3.85-3.81 (m, 2H), 3.56-3.48 (m, 4H), 3.30-3.17 (m, 2H), 2.32-2.28 (m, 2H).

Example 127. N-(1-phenyl-4-(6-(piperidin-1-yl)hexyl)-1H-imidazol-2-yl)-3-(1H-pyrazol-4-yl)benzamide hydrochloride

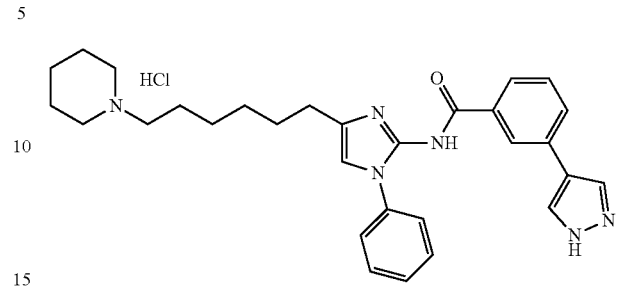

To a solution of acetyl chloride (8.5 μL, 0.12 mmol) in MeOH (25.5 μL) was added a solution of N-(1-phenyl-4-(6-(piperidin-1-yl)hexyl)-1H-imidazol-2-yl)-3-(1H-pyrazol-4-yl)benzamide (Example 102) (40 mg, 0.08 mmol) in MeOH (1.0 mL) at 0° C. The reaction mixture was stirred at room temperature for 1 h. The mixture was evaporated under reduced pressure. The residue was washed with DCM and freeze dried to afford the title compound (30 mg, 70%). ¹H NMR (D₂O, 400 MHz): δ 7.99 (s, 2H), 7.84 (s, 1H), 7.79-7.77 (m, 1H), 7.62-7.55 (m, 3H), 7.52-7.48 (m, 2H), 7.45-7.40 (m, 1H), 7.21 (s, 1H), 3.44-3.41 (m, 2H), 3.01-2.97 (m, 2H), 2.84-2.78 (m, 2H), 2.70-2.60 (m, 2H), 1.86-1.82 (m, 2H), 1.78-1.58 (m, 7H), 1.40-1.38 (m, 5H).

The following compounds were made in a similar manner to that described in Example 127 and in general scheme 1.

TABLE 10

| Ex. | Structure | Analytical data |
|---|---|---|
| 128 | (structure shown) | ¹H NMR (D₂O, 400 MHz): δ 8.04-7.96 (m, 2H), 7.89 (s, 1H), 7.88-7.74 (m, 1H), 7.60-7.50 (m, 5H), 7.50-7.40 (m, 2H), 7.30 (s, 1H), 4.10-4.00 (m, 2H), 3.80-3.70 (m, 2H), 3.52-3.36 (m, 2H), 3.28-3.20 (m, 2H), 3.20-3.19 (m, 2H), 2.84-2.78 (m, 2H), 2.20-2.06 (m, 2H). |
| 129 | (structure shown) | ¹H NMR (D₂O, 400 MHz): δ 7.94 (s, 1H), 7.85-7.80 (m, 2H), 7.78-7.76 (m, 1H), 7.63-7.58(m, 3H), 7.57-7.51(m, 3H), 7.47-7.42(m, 1H), 7.30(s, 1H), 4.59-4.51 (m, 1H), 4.20-4.12 (m, 1H), 3.85 (s, 3H), 3.61-3.47(m, 3H), 3.17-2.98 (m, 3H), 2.89 (s, 3H), 2.79-2.62 (m, 2H), 2.60-2.56 (M, 2H), 2.02-1.91(m, 2H). |

| Ex. | Structure | Analytical data |
|---|---|---|
| 130 | | $^1$H NMR (D$_2$O, 400 MHz): δ 7.87 (s, 1H), 7.78-7.75 (m, 2H), 7.68-7.74(m, 1H), 7.62-7.55 (m, 3H), 7.52-7.48 (m, 3H), 7.42-7.38 (m, 1H), 7.24 (s, 1H), 4.52-4.48 (m, 1H), 4.10-4.02 (m, 1H), 3.81 (s, 3H), 3.50-3.38 (m, 1H), 3.18-3.08 (m, 1H), 2.78 (s, 6H), 2.73-2.58 (m, 3H), 2.57-2.42 (m, 2H), 2.16-2.04 (m, 2H), 1.96-1.85 (m, 2H), 1.70-1.45 (m, 2H). |
| 131 | | $^1$H NMR (D$_2$O, 400 MHz): δ 7.90 (s, 1H), 7.82-7.78 (m, 2H), 7.74-7.70 (m, 1H), 7.62-7.55 (m, 3H), 7.54-7.46 (m, 3H), 7.42-7.36 (m, 1H), 7.25-7.22 (m, 1H), 3.88-3.80 (m, 3.5H), 3.53-3.48 (m, 0.5H), 3.20-3.08 (m, 1H), 2.78-2.65 (m, 8H), 2.35-2.20 (m, 2H), 2.02-1.87 (m, 4H), 1.85-1.75 (m, 2H), 1.68-1.58 (m, 2H), 1.58-1.40 (m, 1H), 1.31-1.20 (m, 1H). |
| 132 | | $^1$H NMR (D$_2$O, 400 MHz): δ 7.81 (s, 1H), 7.72-7.68 (m, 2H), 7.68-7.62 (m, 1H), 7.58-7.51 (m, 3H), 7.51-7.41 (m, 3H), 7.40-7.31 (m, 1H), 7.20 (s, 1H), 3.95-3.77 (m, 4H), 3.50-3.30 (m, 2H), 3.10-2.97 (m, 2H), 2.72 (s, 3H), 2.70-2.60 (m, 2H), 2.38-2.22 (m, 2H), 2.10-2.0 (m, 1.5H), 1.98-1.80 (m, 3H), 1.70-1.55 (m, 1.5H). |

Example 133. 3-(1-methyl-1H-pyrazol-4-yl)-N-(4-(4-(4-methylpiperazin-1-yl)-4-oxobutyl)-1-phenyl-1H-imidazol-2-yl)benzamide citrate

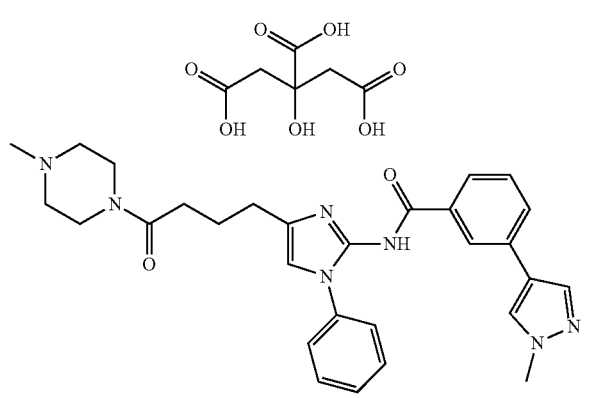

A mixture of 3-(1-methyl-1H-pyrazol-4-yl)-N-(4-(4-(4-methylpiperazin-1-yl)-4-oxobutyl)-1-phenyl-1H-imidazol-2-yl)benzamide (Example 143) (1.0 g, 1.95 mmol) and citric acid (0.36 g, 1.85 mmol) in MeOH (5 mL) was heated. The reaction mixture was evaporated under reduced pressure. To residue was added acetone (10 mL), stirred for 30 min, filtered the solid to get the title compound (1.14 g, 83%). $^1$H NMR (D$_2$O, 400 MHz): δ 7.63 (s, 2H), 7.56 (s, 1H), 7.48-7.46 (d, 1H), 7.39-7.37 (s, 1H), 7.31-7.29 (m, 5H), 7.23-7.19 (t, 1H), 6.86 (s, 1H), 4.42-4.40 (br, 1H), 4.02-3.99 (br, 1H), 3.38 (br, 3H), 2.95-2.87 (m, 3H), 2.73 (s, 3H), 2.69-2.65 (d, 2H), 2.57-2.54 (d, 2H), 2.46 (br, 2H), 2.37 (br, 2H), 1.74 (m, 2H).

The following compounds were made in a similar manner to that described in Example 133.

TABLE 11
| Ex. | Structure | Analytical data |
|---|---|---|
| 134 | 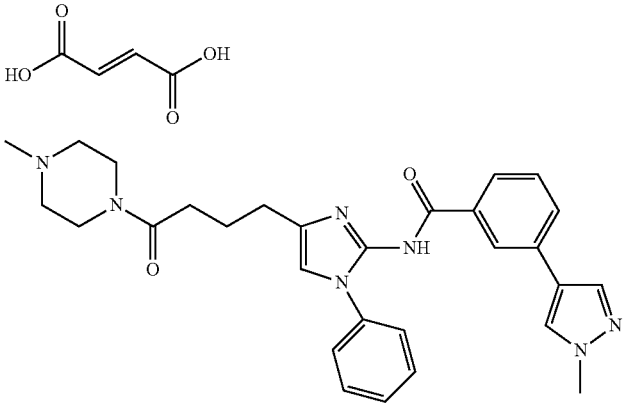 [SMILES: O=C(O)/C=C/C(=O)O ; CN1CCN(C(=O)CCCc2cn(-c3ccccc3)c(NC(=O)c3cccc(-c4cnn(C)c4)c3)n2)CC1] | ¹H NMR (D₂O, 400 MHz): δ 7.54 (s, 1H), 7.45-7.42 (d, 2H), 7.33-7.31 (d, 2H), 7.24-7.19 (m, 5H), 7.12-7.08 (t, 1H), 4.41 (br, 1H), 3.99 (br, 1H), 3.59 (s, 3H), 3.39-3.32 (m, 3H), 2.93-2.86 (m, 3H), 2.73 (s, 3H), 2.36-2.31 (m, 4H), 1.69-1.64 (m, 2H). |
| 135 | 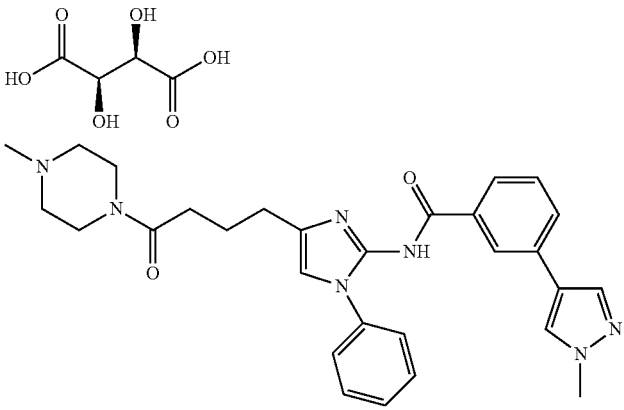 | ¹H NMR (D₂O, 400 MHz): δ 7.73-7.65 (m, 3H), 7.57 (d, 1H), 7.41-7.26 (m, 7H), 6.98 (s, 1H), 4.46 (br, 1H), 4.28 (s, 2H), 4.05 (br, 1H), 3.71 (s, 3H), 3.40 (br, 3H), 2.98-2.90 (m, 3H), 2.75 (s, 3H), 2.55 (t, 2H), 2.43 (t, 2H), 1.82 (t, 2H). |
| 136 | 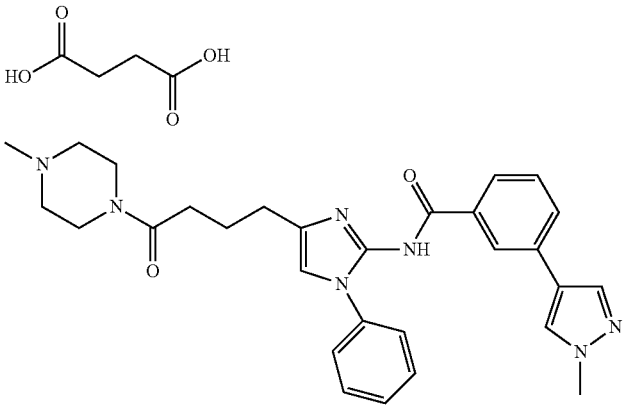 [SMILES: O=C(O)CCC(=O)O ; CN1CCN(C(=O)CCCc2cn(-c3ccccc3)c(NC(=O)c3cccc(-c4cnn(C)c4)c3)n2)CC1] | ¹H NMR (D₂O, 400 MHz): δ 7.56 (s, 1H), 7.39-7.25 (m, 4H), 7.16 (s, 5H), 7.08 (t, 1H), 6.55 (s, 1H), 4.36 (br, 1H), 3.96 (br, 1H), 3.58 (s, 3H), 3.31 (br, 3H), 2.90 (br, 3H), 2.72 (s, 3H), 2.34-2.26 (m, 8H), 1.65 (t, 2H). |

TABLE 11-continued

| Ex. | Structure | Analytical data |
|---|---|---|
| 137 | 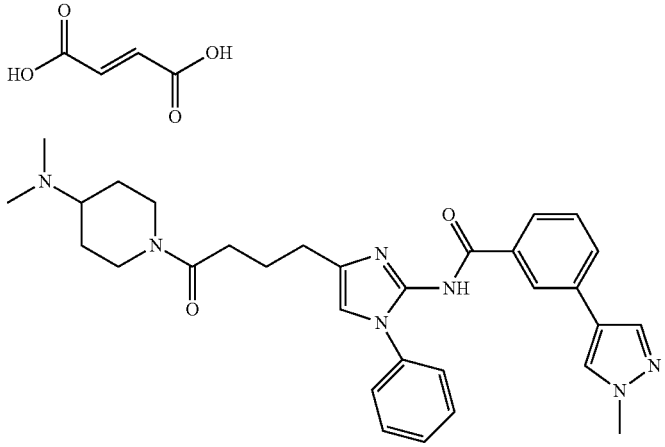 [SMILES: O=C(O)/C=C/C(=O)O ; CN(C)C1CCN(C(=O)CCCc2cn(-c3ccccc3)c(NC(=O)c3cccc(-c4cnn(C)c4)c3)n2)CC1] | $^1$H NMR (D$_2$O, 400 MHz): δ 7.75-7.70 (m, 2H), 7.67 (s, 1H), 7.62-7.56 (m, 1H), 7.54-7.48 (m, 1H), 7.47-7.36 (m, 5H), 7.38-7.30 (m, 1H), 6.96 (s, 1H), 6.54 (s, 2H), 4.53-4.48 (m, 1H), 4.08-3.98 (m, 1H), 3.76 (s, 3H), 3.45-3.38 (m, 1H), 3.12-3.00 (m, 1H), 2.76 (s, 6H), 2.688-2.50 (m, 3H), 2.50-2.40 (m, 2H), 2.12-2.00 (m, 2H), 1.92-1.80 (m, 2H), 1.62-1.40 (m, 2H). |

Example 138. 3-(1-(1-ethoxyethyl)-1H-pyrazol-4-yl)-N-(1-phenyl-4-(6-(piperidin-1-yl)hexyl)-1H-imidazol-2-yl)benzamide

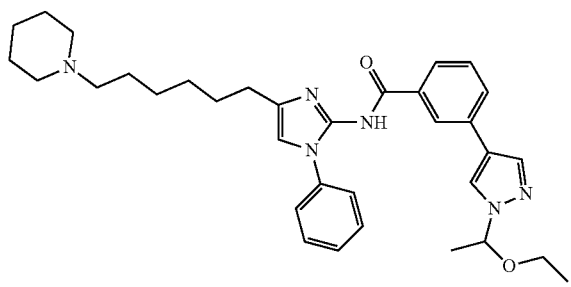 [SMILES: CCOC(C)n1cc(-c2cccc(C(=O)Nc3nc(CCCCCCN4CCCCC4)cn3-c3ccccc3)c2)cn1]

To a solution of N-(1-phenyl-4-(6-(piperidin-1-yl)hexyl)-1H-imidazol-2-yl)-3-(1H-pyrazol-4-yl)benzamide (Example 102) (80 mg, 0.161 mmol) in DCM (10 mL) was added TFA (15 μL, 0.193 mmol) and ethyl vinyl ether (46 μL, 0.483 mmol). The reaction mixture was stirred at room temperature for 1 h. The reaction mixture was quenched with sat. aq. NaHCO$_3$ and extracted with DCM, dried over anhydrous Na$_2$SO$_4$ and concentrated under reduced pressure. Purification by silica gel column chromatography using DCM/MeOH as the eluent to afford the title compound (62 mg, 68%). $^1$H NMR (CDCl$_3$, 400 MHz): δ 8.38 (s, 1H), 8.06-8.04 (m, 1H), 7.88 (s, 1H), 7.82 (s, 1H), 7.76-7.74 (m, 2H), 7.57-7.51 (m, 3H), 7.41-7.36 (m, 2H), 6.60 (s, 1H), 5.53-5.52 (m, 1H), 3.51-3.47 (m, 1H), 3.39-3.35 (m, 1H), 2.90-2.50 (m, 8H), 1.82-1.78 (m, 2H), 1.78-1.60 (m, 8H), 1.60-1.50 (m, 2H), 1.50-1.30 (m, 4H), 1.18-1.15 (m, 3H).

Example 139. 3-(1-methyl-1H-pyrazol-4-yl)-N-(4-(4-(methylamino)-4-oxobutyl)-1-phenyl-1H-imidazol-2-yl)benzamide

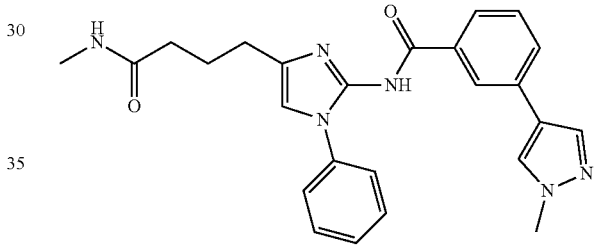

Step 1: methyl 4-(2-(3-(1-methyl-1H-pyrazol-4-yl)benzamido)-1-phenyl-1H-imidazol-4-yl)butanoate A mixture of methyl 4-(2-amino-1-phenyl-1H-imidazol-4-yl)butanoate (Intermediate 26) (10.0 g, 38.57 mmol), 3-(1-methyl-1H-pyrazol-4-yl)benzoic acid (Intermediate 7) (6.0 g, 29.67 mmol), HATU (16.90 g, 44.51 mmol) and DIPEA (15.5 mL, 89.02 mmol) in DCM was stirred at room temperature for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (10.0 g, 76%). $^1$H NMR (CDCl$_3$, 400 MHz): δ 8.33 (s, 1H), 8.03-8.01 (s, 1H), 7.85 (s, 1H), 7.84 (s, 1H), 7.76-7.66 (m, 2H), 7.58-7.48 (m, 3H), 7.42-7.34 (m, 2H), 6.84 (s, 1H), 5.45 (s, 2H), 3.80 (s, 3H), 3.67 (s, 2H), 3.60-3.57 (m, 2H), 0.95-0.91 (m, 2H), -0.02 (s, 9H).

Step 2: 4-(2-(3-(1-methyl-1H-pyrazol-4-yl)benzamido)-1-phenyl-1H-imidazol-4-yl)butanoic acid To a solution of methyl 4-(2-(3-(1-methyl-1H-pyrazol-4-yl)benzamido)-1-phenyl-1H-imidazol-4-yl)butanoate (10.0 g, 22.54 mmol) in MeOH (90 mL) was added 1N—NaOH (90.2 mL, 90.2 mmol). The reaction mixture was stirred at room temperature for overnight. The mixture was evaporated under reduced pressure and acidified with 1N—HCl, filtered the solid to get the title compound (9.0 g, 93%). $^1$H NMR (DMSO-D$_6$, 400 MHz): δ 8.04 (s, 1H), 8.00 (s, 1H), 7.83 (s, 1H), 7.78-7.75 (s, 1H), 7.73-7.68 (m, 1H), 7.62-7.50 (m, 5H), 7.48-7.44 (m, 1H), 7.28 (s, 1H), 3.94 (s, 3H), 2.78-2.75 (m, 2H), 2.48-2.43 (m, 2H), 2.08-2.01 (m, 2H), Step 3: 3-(1-methyl-1H-pyrazol-4-yl)-N-(4-(4-(methylamino)-4-oxobutyl)-1-phenyl-1H-imidazol-2-yl)benzamide A mixture of 4-(2-(3-(1-methyl-1H-pyrazol-4-yl)benzamido)-1-phenyl-1H-imidazol-4-yl)butanoic acid (150 mg, 0.349 mmol), methylamine hydrochloride (28.0 mg, 0.42 mmol), HATU (200 mg, 0.52 mmol) and DIPEA (0.3 mL, 1.75 mmol) in DCM was stirred at room temperature for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (111 mg, 72%). $^1$H NMR (CDCl$_3$, 400 MHz): δ 8.34 (s, 1H), 8.03-8.01 (m, 1H), 7.79 (s, 1H), 7.74-7.72 (m, 2H), 7.64 (s, 1H), 7.55-7.51 (m, 3H), 7.42-7.33 (m, 2H), 6.64 (s, 1H), 5.52 (bs, 1H), 3.94 (s, 3H), 2.83 (d, 3H), 2.68-2.65 (m, 2H), 2.30-2.26 (m, 2H), 2.06-2.02 (m, 2H).

The following compounds were made in a similar manner to that described in Example 139 and in general scheme 1.

TABLE 12

| Ex. | Structure | Analytical data |
| --- | --- | --- |
| 140 | | $^1$H NMR (CD$_3$OD, 400 MHz): δ 8.04-8.00 (m, 2H), 7.88-7.81 (m, 2H), 7.68-7.63 (m, 6H), 7.52-7.47 (m, 2H), 3.94 (s, 3H), 2.88-2.83 (m, 2H), 2.50-2.44 (m, 2H), 2.08-2.02 (m, 2H). |
| 141 | | $^1$H NMR (CDCl$_3$, 400 MHz): δ 8.33 (s, 1H), 8.04-8.02 (m, 1H), 7.80 (s, 1H), 7.76-7.72 (m, 2H), 7.64 (s, 1H), 7.56-7.51 (m, 3H), 7.42-7.35 (m, 2H), 6.64 (s, 1H), 5.68 (bs, 1H), 3.95 (s, 3H), 2.76-2.65 (m, 3H), 2.27-2.23 (m, 2H), 2.07-2.01 (m, 2H), 0.81-0.76 (m, 2H), 0.53-0.50 (m, 2H). |
| 142 | | $^1$H NMR (CDCl$_3$, 400 MHz): δ 8.33 (s, 1H), 8.04-8.01 (m, 1H), 7.78 (s, 1H), 7.74-7.72 (m, 2H), 7.62 (s, 1H), 7.53-7.49 (m, 3H), 7.39-7.32 (m, 2H), 6.62 (s, 1H), 3.92 (s, 3H), 3.58-3.52 (m, 2H), 3.40-3.36 (m, 2H), 2.68-2.65 (m, 2H), 2.43-2.40 (m, 2H), 2.03-1.98 (m, 2H), 1.66-1.50 (m, 6H). |
| 143 | | $^1$H NMR (CDCl$_3$, 400 MHz): δ 8.34 (s, 1H), 8.05-8.03 (m, 1H), 7.79 (s, 1H), 7.75-7.73 (m, 2H), 7.64 (s, 1H), 7.55-7.51 (m, 3H), 7.41-7.34 (m, 2H), 6.64 (s, 1H), 3.94 (s, 3H), 3.68-3.62 (m, 2H), 3.50-3.45 (m, 2H), 2.70-2.66 (m, 2H), 2.44-2.38 (m, 6H), 2.31 (s, 3H), 2.03-2.01 (m, 2H). |

TABLE 12-continued

| Ex. | Structure | Analytical data |
|---|---|---|
| 144 | | $^1$H NMR (CDCl$_3$, 400 MHz): δ 8.34 (s, 1H), 8.05-8.03 (m, 1H), 7.80 (s, 1H), 7.75-7.70 (m, 2H), 7.64 (s, 1H), 7.55-7.51 (m, 3H), 7.41-7.34 (m, 2H), 6.62 (s, 1H), 3.92 (s, 3H), 3.70-3.60 (m, 2H), 3.52-3.42 (m, 2H), 2.71-2.63 (m, 2H), 2.52-2.37 (m, 8H), 2.10-2.00 (m, 2H), 1.12-1.06 (m, 3H). |
| 145 | | $^1$H NMR (CDCl$_3$, 400 MHz): δ 8.34 (s, 1H), 8.05-8.03 (m, 1H), 7.80 (s, 1H), 7.75-7.70 (m, 2H), 7.64 (s, 1H), 7.55-7.51 (m, 3H), 7.41-7.34 (m, 2H), 6.64 (s, 1H), 3.92 (s, 3H), 3.70-3.60 (m, 2H), 3.50-3.40 (m, 2H), 2.71-2.63 (m, 2H), 2.52-2.37 (m, 7H), 2.10-2.00 (m, 2H), 1.10-0.09 (m, 6H). |
| 146 | | $^1$H NMR (CDCl$_3$, 400 MHz): δ 8.34 (s, 1H), 8.05-8.03 (m, 1H), 7.80 (s, 1H), 7.79-7.74 (m, 2H), 7.64 (s, 1H), 7.55-7.51 (m, 3H), 7.41-7.34 (m, 2H), 6.64 (s, 1H), 4.70-4.60 (m, 1H), 3.94 (s, 3H), 3.90-3.80 (s, 1H), 3.03-2.98 (m, 1H), 2.74-2.68 (m, 2H), 2.64-2.58 (m, 1H), 2.48-2.42 (m, 2H), 2.40-2.30 (m, 1H), 2.25 (s, 6H), 2.08-1.98 (m, 2H), 1.92-1.80 (m, 2H), 1.42-1.30 (m, 2H). |
| 147 | | $^1$H NMR (CDCl$_3$, 400 MHz): δ 8.34 (s, 1H), 8.05-8.03 (m, 1H), 7.80 (s, 1H), 7.79-7.74 (m, 2H), 7.64 (s, 1H), 7.55-7.51 (m, 3H), 7.41-7.34 (m, 2H), 6.64 (s, 1H), 5.30 (bs, 1H), 4.08-4.00 (m, 1H), 3.94 (s, 3H), 2.72-2.62 (m, 2H), 2.32-2.20 (m, 8H), 2.10-2.00 (m, 3H), 1.78-1.50 (m, 8H). |
| 148 | | $^1$H NMR (CDCl$_3$, 400 MHz): δ 8.33 (s, 1H), 8.05-8.03 (m, 1H), 7.80 (s, 1H), 7.79-7.74 (m, 2H), 7.64 (s, 1H), 7.55-7.51 (m, 3H), 7.41-7.34 (m, 2H), 6.64 (s, 1H), 5.40 (bs, 1H), 3.94 (s, 3H), 3.82-3.78 (m, 1H), 2.82-2.78 (m, 2H), 2.72-2.62 (m, 2H), 2.32-2.20 (m, 5H), 2.10-2.00 (m, 4H), 1.92-1.88 (m, 2H), 1.58-1.40 (m, 2H). |

TABLE 12-continued

| Ex. | Structure | Analytical data |
|---|---|---|
| 149 | | ¹H NMR (CDCl₃, 400 MHz): δ 8.35 (s, 1H), 8.05-8.03 (m, 1H), 7.80 (s, 1H), 7.79-7.74 (m, 2H), 7.64 (s, 1H), 7.55-7.51 (m, 3H), 7.41-7.34 (m, 2H), 6.65 (s, 1H), 3.94 (s, 3H), 3.62-3.58 (m, 2H), 3.41-3.38 (m, 2H), 2.75-2.72 (m, 2H), 2.62-2.58 (, 5H), 2.44-2.40 (m, 2H), 2.04-2.00 (m, 2H), 0.58-0.38 (m, 4H). |
| 150 | | ¹H NMR (CDCl₃, 400 MHz): δ 8.46-8.41 (m, 2H), 8.32-8.28 (m, 1H), 8.24 (s, 1H), 7.96-7.92 (m, 1H), 7.76 (s, 1H), 7.66-7.59 (m, 3H), 7.56-7.49 (m, 4H), 7.43-7.34 (m, 2H), 6.68 (s, 1H), 3.92 (s, 3H), 2.73-2.67 (m, 2H), 2.53-2.46 (m, 2H), 2.13-2.06 (m, 2H). |
| 151 | | ¹H NMR (CDCl₃, 400 MHz): δ 8.35 (s, 1H), 8.05-8.03 (m, 1H), 7.80 (s, 1H), 7.79-7.76 (m, 2H), 7.64 (s, 1H), 7.55-7.51 (m, 3H), 7.41-7.34 (m, 2H), 6.64 (s, 1H), 5.02 (bs, 1H), 3.94 (s, 3H), 2.92-2.86 (m, 2H), 2.72-2.64 (m, 2H), 2.64-2.59 (m, 2H), 2.22-2.18 (m, 2H), 2.08-2.00 (m, 2H), 1.90-1.80 (m, 4H). |
| 152 | | ¹H NMR (CDCl₃, 400 MHz): δ 8.35 (s, 1H), 8.05-8.03 (m, 1H), 7.80 (s, 1H), 7.79-7.76 (m, 2H), 7.64 (s, 1H), 7.55-7.51 (m, 3H), 7.41-7.34 (m, 2H), 6.64 (s, 1H), 6.12 (bs, 1H), 3.94 (s, 3H), 3.04-2.96 (m, 2H), 2.72-2.64 (m, 2H), 2.62-2.58 (m, 2H), 2.30-2.18 (m, 2H), 2.08-1.98 (m, 2H), 1.70-1.56 (m, 6H). |
| 153 | | ¹H NMR (CDCl₃, 400 MHz): δ 8.35 (s, 1H), 8.05-8.03 (m, 1H), 7.80 (s, 1H), 7.79-7.76 (m, 2H), 7.64 (s, 1H), 7.55-7.51 (m, 3H), 7.41-7.34 (m, 2H), 6.64 (s, 1H), 6.15 (bs, 1H), 3.94 (s, 3H), 3.00-2.52 (m, 10H), 2.28 (s, 3H), 2.26-2.19 (m, 2H), 2.10-2.00 (m, 2H). |

TABLE 12-continued

| Ex. | Structure | Analytical data |
| --- | --- | --- |
| 154 | | $^{1}$H NMR (CDCl$_3$, 400 MHz): δ 8.34 (s, 1H), 8.05-8.03 (m, 1H), 7.80 (s, 1H), 7.79-7.74 (m, 2H), 7.64 (s, 1H), 7.55-7.51 (m, 3H), 7.41-7.34 (m, 2H), 6.64 (s, 1H), 4.60-4.50 (m, 1H), 3.94 (s, 3H), 3.85-3.78 (s, 1H), 3.10-3.04 (m, 1H), 2.74-2.64 (m, 3H), 2.64-2.52 (m, 4H), 2.48-2.42 (m, 2H), 2.30-2.18 (m, 1H), 2.10-1.90 (m, 4H), 1.85-1.76 (m, 4H), 1.52-1.40 (m, 2H). |
| 155 | | $^{1}$H NMR (CDCl$_3$, 400 MHz): δ 8.31 (s, 1H), 8.05-7.97 (m, 1H), 7.80 (s, 1H), 7.74-7.62 (m, 2H), 7.54-7.45 (m, 4H), 7.42-7.29 (m, 4H), 6.78-6.63 (m, 2H), 6.54-6.48 (m, 1H), 3.94 (s, 3H), 2.94-2.88 (m, 2H), 2.81-2.70 (m, 6H), 2.50-2.41 (m, 1H), 2.23-2.18 (m, 1H), 2.04-1.94 (m, 2H). |
| 156 | | $^{1}$H NMR (CDCl$_3$, 400 MHz): δ 8.33 (s, 1H), 8.03-8.01 (m, 1H), 7.79 (s, 1H), 7.73-7.70 (m, 2H), 7.64 (s, 1H), 7.54-7.51 (m, 3H), 7.41-7.34 (m, 2H), 6.63 (s, 1H), 5.42-5.38 (m, 1H), 3.94 (s, 3H), 3.81-3.70 (m, 1H), 3.66-3.58 (m, 1H), 2.68-2.62 (m, 2H), 2.26-2.22 (m, 2H), 2.05-1.92 (m, 6H), 1.48-1.34 (m, 2H), 1.28-1.12 (m, 2H). |
| 157 | | $^{1}$H NMR (CDCl$_3$, 400 MHz): δ 8.33 (s, 1H), 8.03-8.01 (m, 1H), 7.79 (s, 1H), 7.73-7.70 (m, 2H), 7.64 (s, 1H), 7.54-7.51 (m, 3H), 7.41-7.34 (m, 2H), 6.63 (s, 1H), 5.51-5.48 (m, 1H), 4.10-3.90 (m, 6H), 3.50-3.40 (m, 2H), 2.68-2.64 (m, 2H), 2.29-2.25 (m, 2H), 2.05-2.01 (m, 2H), 1.92-1.88 (m, 2H), 1.52-1.42 (m, 2H). |
| 158 | | $^{1}$H NMR (CDCl$_3$, 400 MHz): δ 8.34 (s, 1H), 8.06-8.02 (m, 1H), 7.80 (s, 1H), 7.76-7.72 (m, 2H), 7.64 (s, 1H), 7.56-7.51 (m, 3H), 7.42-7.34 (m, 2H), 6.65 (s, 1H), 3.94 (s, 3H), 3.39-3.34 (m, 2H), 2.70-2.65 (m, 2H), 2.52-2.40 (m, 4H), 2.29-2.25 (m, 2H), 2.08-2.00 (m, 2H), 1.73-1.66 (m, 2H), 1.60-1.54 (m, 4H), 1.46-1.41 (m, 2H), 1.31-1.27 (m, 2H). |

TABLE 12-continued

| Ex. | Structure | Analytical data |
|---|---|---|
| 159 | | ¹H NMR (CDCl₃, 400 MHz): δ 8.34 (s, 1H), 8.05-8.01 (m, 1H), 7.80 (s, 1H), 7.72-7.66 (m, 3H), 7.56-7.48 (m, 3H), 7.41-7.35 (m, 2H), 6.67 (s, 1H), 3.94 (s, 3H), 3.48-3.41 (m, 2H), 2.69-2.64 (m, 2H), 2.62-2.42 (m, 4H), 2.32-2.28 (m, 2H), 2.07-1.99 (m, 2H), 1.64-1.56 (m, 4H), 1.49-1.42 (m, 2H), 1.32-1.26 (m, 2H). |
| 160 | | ¹H NMR (CDCl₃, 400 MHz): δ 8.34 (s, 1H), 8.05-8.03 (m, 1H), 7.80 (s, 1H), 7.79-7.74 (m, 2H), 7.64 (s, 1H), 7.55-7.51 (m, 3H), 7.41-7.34 (m, 2H), 6.64 (s, 1H), 3.94 (s, 3H), 3.71-3.60 (m, 6H), 3.48-3.42 (m, 2H), 2.71-2.67 (m, 2H), 2.46-2.40 (m, 2H), 2.10-2.00 (m, 2H). |
| 161 | | ¹H NMR (CDCl₃, 400 MHz): δ 8.33 (s, 1H), 8.04-8.01 (m, 1H), 7.79 (s, 1H), 7.74-7.72 (m, 2H), 7.64 (s, 1H), 7.54-7.51 (m, 3H), 7.41-7.34 (m, 2H), 6.64 (s, 1H), 5.51-5.38 (m, 1H), 3.94 (s, 3H), 3.91-3.80 (m, 1H), 3.40-3.32 (m, 1H), 3.30 (s, 3H), 2.70-2.60 (m, 2H), 2.30-2.20 (m, 2H), 2.10-1.98 (m, 2H), 1.80-1.40 (m, 8H). |
| 162 | | ¹H NMR (CDCl₃, 400 MHz): δ 8.34 (s, 1H), 8.06-8.02 (m, 1H), 7.80 (s, 1H), 7.76-7.69 (m, 2H), 7.64 (s, 1H), 7.55-7.49 (m, 3H), 7.41-7.35 (m, 2H), 6.65 (s, 1H), 3.94 (s, 3H), 3.44-3.39 (m, 2H), 2.68-2.63 (m, 2H), 2.56-2.52 (m, 2H), 2.32-2.28 (m, 8H), 2.07-1.99 (m, 2H). |
| 163 | | ¹H NMR (CDCl₃, 400 MHz): δ 8.34 (s, 1H), 8.05-8.02 (m, 1H), 7.80 (s, 1H), 7.76-7.72 (m, 2H), 7.64 (s, 1H), 7.56-7.51 (m, 3H), 7.42-7.34 (m, 2H), 7.11 (bs, 1H), 6.64 (s, 1H), 3.95 (s, 3H), 3.39-3.34 (m, 2H), 2.70-2.65 (m, 2H), 2.43-2.39 (m, 2H), 2.29-2.23 (m, 8H), 2.07-1.99 (m, 2H), 1.71-1.65 (m, 2H). |
| 164 | | ¹H NMR (CDCl₃, 400 MHz): δ 8.22 (s, 1H), 7.92-7.88 (m, 1H), 7.75 (s, 1H), 7.68-7.60 (m, 3H), 7.54-7.38 (m, 3H), 7.42-7.32 (m, 2H), 6.68 (m, 1H), 3.92 (s, 3H), 3.72-3.68 (m, 2H), 3.42-3.38 (m, 2H), 2.68-2.60 (m, 2H), 2.33-2.30 (m, 2H), 2.06-1.98 (m, 2H). |

TABLE 12-continued

| Ex. | Structure | Analytical data |
|---|---|---|
| 165 | | $^1$H NMR (CDCl$_3$, 400 MHz): δ 8.32 (s, 1H), 8.02-8.00 (m, 1H), 7.79 (s, 1H), 7.73-7.71 (m, 2H), 7.64 (s, 1H), 7.55-7.51 (m, 3H), 7.42-7.36 (m, 2H), 6.65 (s, 1H), 6.24 (bs, 1H), 3.93 (s, 3H), 3.72-3.68 (m, 2H), 3.48-3.42 (m, 2H), 2.68-2.62 (m, 2H), 2.33-2.30 (m, 2H), 2.06-1.98 (m, 2H), 1.76-1.70 (m, 2H). |
| 166 | | $^1$H NMR (CDCl$_3$, 400 MHz): δ 8.35 (s, 1H), 8.08-8.03 (m, 1H), 7.80 (s, 1H), 7.77-7.73 (m, 2H), 7.65 (s, 1H), 7.58-7.50 (m, 3H), 7.46-7.33 (m, 2H), 6.65 (s, 1H), 4.56-4.50 (m, 1H), 3.94 (s, 3H), 3.80-3.74 (m, 1H), 3.18-3.10 (m, 1H), 2.84-2.76 (m, 1H), 2.72-2.66 (m, 1H), 2.52-2.38 (m, 2H), 2.12-2.01 (m, 2H), 1.90-1.82 (m, 1H), 1.70-1.56 (m, 4H), 1.46-1.36 (m, 2H), 1.30-1.22 (m, 2H). |
| 167 | | $^1$H NMR (CDCl$_3$, 400 MHz): δ 8.35 (s, 1H), 8.07-8.03 (m, 1H), 7.80 (s, 1H), 7.77-7.73 (m, 2H), 7.65 (s, 1H), 7.58-7.50 (m, 3H), 7.46-7.34 (m, 2H), 6.64 (s, 1H), 3.94 (s, 3H), 3.62-3.57 (m, 1H), 3.42-3.35 (m, 2H), 3.04-2.97 (m, 2H), 2.72-2.67 (m, 1H), 2.46-2.42 (m, 1H), 2.14-2.10 (m, 1H), 2.06-2.02 (m, 1H), 1.89-1.82 (m, 1H), 1.38-1.32 (m, 2H), 1.28-1.24 (m, 1H), 1.19-1.15 (m, 1H), 0.97 (s, 3H), 0.82 (s, 3H). |
| 168 | | $^1$H NMR (CDCl$_3$, 400 MHz): δ 8.33 (s, 1H), 8.04-8.02 (m, 1H), 7.79 (s, 1H), 7.75-7.73 (m, 2H), 7.64 (s, 1H), 7.55-7.51 (m, 3H), 7.41-7.34 (m, 2H), 6.63 (s, 1H), 3.93 (s, 3H), 3.88-3.70 (m, 1H), 3.70-3.56 (m, 2H), 3.50-3.38 (m, 1H), 2.92-2.88 (m, 1H), 2.72-2.64 (m, 2H), 2.49-2.40 (m, 2H), 2.12-2.00 (m, 2H), 2.00-1.76 (m, 4H). |
| 169 | | $^1$H NMR (CDCl$_3$, 400 MHz): δ 8.33 (s, 1H), 8.04-8.02 (m, 1H), 7.79 (s, 1H), 7.75-7.73 (m, 2H), 7.64 (s, 1H), 7.55-7.51 (m, 3H), 7.41-7.34 (m, 2H), 6.64 (s, 1H), 4.18-4.10 (m, 1H), 4.00-3.90 (m, 4H), 3.79-3.61 (m, 1H), 3.24-3.16 (m, 2H), 2.71-2.42 (m, 2H), 2.50-2.40 (m, 2H), 2.10-1.98 (m, 2H), 1.96-1.85 (m, 2H), 1.60-1.46 (m, 2H) |

TABLE 12-continued

| Ex. | Structure | Analytical data |
|---|---|---|
| 170 | | ¹H NMR (CDCl₃, 400 MHz): δ 8.22 (s, 1H), 7.94-7.90 (m, 1H), 7.76 (s, 1H), 7.68-7.60 (m, 3H), 7.54-7.38 (m, 3H), 7.42-7.32 (m, 2H), 6.68 (m, 1H), 3.92 (s, 3H), 3.25 (s, 2H), 2.68-2.60 (m, 2H), 2.33-2.30 (m, 2H), 2.06-1.98 (m, 2H), 1.20 (s, 6H) |
| 171 | | ¹H NMR (CDCl₃, 400 MHz): δ 8.22 (s, 1H), 7.94-7.90 (m, 1H), 7.76 (s, 1H), 7.68-7.60 (m, 3H), 7.54-7.38 (m, 3H), 7.42-7.32 (m, 2H), 6.67 (m, 1H), 3.92 (s, 3H), 3.17 (s, 2H), 3.08 (s, 2H), 2.68-2.60 (m, 2H), 2.33-2.30 (m, 2H), 2.06-1.98 (m, 2H), 0.85 (s, 6H) |
| 172 | | ¹H NMR (CDCl₃, 400 MHz): δ 8.33 (s, 1H), 8.04-8.02 (m, 1H), 7.79 (s, 1H), 7.75-7.73 (m, 2H), 7.64 (s, 1H), 7.55-7.51 (m, 3H), 7.41-7.34 (m, 2H), 6.64 (s, 1H), 5.64 (bs, 1H), 4.00-3.90 (m, 5H), 3.39-3.00 (m, 2H), 3.20-3.14 (M, 2H), 2.70-2.62 (m, 2H), 2.31-2.26 (m, 2H), 2.10-2.00 (m, 2H), 1.80-1.90 (m, 1H), 1.58-1.52 (m, 2H), 1.38-1.22 (m, 2H) |
| 173 | | ¹H NMR (CDCl₃, 400 MHz): δ 8.34 (s, 1H), 8.05-8.03 (m, 1H), 7.80 (s, 1H), 7.75-7.73 (m, 2H), 7.64 (s, 1H), 7.55-7.51 (m, 3H), 7.41-7.30 (m, 4H), 7.16-7.14 (m, 2H), 6.64 (s, 1H), 3.94 (s, 3H), 3.68-3.60 (m, 2H), 3.49 (s, 2H), 3.48-3.42 (m, 2H), 2.71-2.65 (m, 2H), 2.44-2.40 (m, 6H), 2.08-2.00 (m, 2H) |
| 174 | | ¹H NMR (CDCl₃, 400 MHz): δ 8.34 (s, 1H), 8.06-8.02 (m, 1H), 7.79 (s, 1H), 7.76-7.72 (m, 2H), 7.64 (s, 1H), 7.56-7.50 (m, 3H), 7.42-7.34 (m, 2H), 6.64 (s, 1H), 4.92-4.86 (m, 1H), 3.94 (s, 3H), 3.71-3.59 (m, 2H), 3.30-3.23 (m, 1H), 3.00-2.92 (m, 1H), 2.73-2.67 (m, 2H), 2.52-2.46 (m, 2H), 2.08-2.01 (m, 2H), 1.98-1.90 (m, 2H), 1.76-1.56 (m, 4H), 1.52-1.42 (m, 2H). |

TABLE 12-continued

| Ex. | Structure | Analytical data |
|---|---|---|
| 175 | | ¹H NMR (CDCl₃, 400 MHz): δ 8.35 (s, 1H), 8.07-8.03 (m, 1H), 7.80 (s, 1H), 7.76-7.72 (m, 2H), 7.64 (s, 1H), 7.57-7.51 (m, 3H), 7.42-7.34 (m, 2H), 6.64 (s, 1H), 3.94 (s, 3H), 3.90-3.82 (m, 1H), 3.68-3.60 (m, 2H), 3.46-3.42 (m, 1H), 2.72-2.66 (m, 2H), 2.50-2.44 (m, 2H), 2.16-2.02 (m, 2H), 1.90-1.74 (m, 4H). |
| 176 | | ¹H NMR (CDCl₃, 400 MHz): δ 8.35 (s, 1H), 8.06-8.02 (m, 1H), 7.80 (s, 1H), 7.76-7.72 (m, 2H), 7.64 (s, 1H), 7.57-7.51 (m, 3H), 7.44-7.34 (m, 2H), 6.64 (s, 1H), 5.40-5.32 (m, 1H), 3.94 (s, 3H), 3.80-3.74 (m, 1H), 3.30-3.22 (m, 1H), 2.72-2.66 (m, 2H), 2.50-2.44 (m, 2H), 2.10-2.00 (m, 2H), 1.80-1.64 (m, 6H). |
| 177 | | ¹H NMR (CDCl₃, 400 MHz): δ 8.34 (s, 1H), 8.06-8.02 (m, 1H), 7.79 (s, 1H), 7.76-7.72 (m, 2H), 7.64 (s, 1H), 7.56-7.50 (m, 3H), 7.42-7.34 (m, 2H), 6.64 (s, 1H), 3.96-3.90 (m, 4H), 3.70-3.62 (m, 1H), 3.46-3.41 (m, 1H), 3.38-3.31 (m, 3H), 3.28-3.22 (m, 1H), 3.20-3.14 (m, 1H), 2.72-2.66 (m, 2H), 2.48-2.42 (m, 2H), 2.07-2.01 (m, 2H), 1.90-1.82 (m, 2H), 1.62-1.54 (m, 2H). |
| 178 | | ¹H NMR (CDCl₃, 400 MHz): δ 8.34 (s, 1H), 8.06-7.99 (m, 1H), 7.78 (s, 1H), 7.76-7.71 (m, 2H), 7.63 (s, 1H), 7.56-7.50 (m, 3H), 7.43-7.34 (m, 2H), 6.65 (s, 1H), 3.94 (s, 3H), 3.87-3.76 (m, 1H), 3.72-3.62 (m, 1H), 3.60-3.50 (m, 1H), 3.44-3.36 (m, 1H), 3.32-3.24 (m, 1H), 2.74-2.68 (m, 2H), 2.52-2.42 (m, 2H), 2.10-2.00 (m, 2H), 1.90-1.78 (m, 2H), 1.74-1.60 (m, 2H). |
| 179 | | ¹H NMR (CDCl₃, 400 MHz): δ 8.33 (s, 1H), 8.04-8.02 (m, 1H), 7.79 (s, 1H), 7.75-7.73 (m, 2H), 7.64 (s, 1H), 7.55-7.51 (m, 3H), 7.41-7.34 (m, 2H), 6.64 (s, 1H), 5.88 (bs, 1H), 4.60-4.50 (m, 1H), 4.05-3.90 (m, 4H), 3.90-3.66 (m, 3H), 2.72-2.62 (m, 2H), 2.34-2.20 (m, 3H), 2.10-2.00 (m, 2H), 1.88-1.78 (m, 1H). |

TABLE 12-continued

| Ex. | Structure | Analytical data |
| --- | --- | --- |
| 180 | | $^1$H NMR (CDCl$_3$, 400 MHz): δ 8.32 (s, 1H), 8.04-8.02 (m, 1H), 7.79 (s, 1H), 7.75-7.73 (m, 2H), 7.64 (s, 1H), 7.55-7.51 (m, 3H), 7.41-7.34 (m, 2H), 6.65 (s, 1H), 5.77 (bs, 1H), 3.94 (s, 3H), 3.90-3.82 (m, 1H), 3.82-3.78 (m, 1H), 3.78-7.70 (m, 1H), 3.58-3.52 (m, 1H), 3.34-3.28 (m, 2H), 2.71-2.62 (m, 2H), 2.52-2.44 (m, 1H), 2.32-2.28 (m, 2H), 2.10-2.00 (m 3H), 1.70-1.52 (m, 1H). |
| 181 | | $^1$H NMR (CDCl$_3$, 400 MHz): δ 8.35 (s, 1H), 8.07-8.03 (m, 1H), 7.80 (s, 1H), 7.77-7.73 (m, 2H), 7.64 (s, 1H), 7.57-7.51 (m, 3H), 7.42-7.34 (m, 2H), 6.64 (s, 1H), 3.94 (s, 3H), 3.66-3.61 (m, 2H), 3.48-3.42 (m, 2H), 2.72-2.66 (m, 2H), 2.58-2.52 (m, 4H), 2.46-2.40 (m, 2H), 2.08-2.00 (m, 2H), 1.06 (s, 9H). |
| 182 | | $^1$H NMR (CDCl$_3$, 400 MHz): δ 8.32 (s, 1H), 8.04-8.00 (m, 1H), 7.80-7.72 (m, 3H), 7.64 (s, 1H), 7.56-7.51 (m, 3H), 7.42-7.31 (m, 2H), 6.64 (s, 1H), 3.93 (s, 3H), 3.70-3.64 (m, 2H), 3.52-3.47 (m, 2H), 2.71-2.59 (m, 5H), 2.48-2.30 (m, 4H), 2.05-1.99 (m, 2H), 1.90-1.72 (m, 8H), 1.64-1.59 (m, 2H). |
| 183 | | $^1$H NMR (CDCl$_3$, 400 MHz): δ 8.34 (s, 1H), 8.06-8.03 (m, 1H), 7.80 (s, 1H), 7.77-7.73 (m, 2H), 7.64 (s, 1H), 7.56-7.51 (m, 3H), 7.42-7.34 (m, 2H), 6.65 (s, 1H), 3.94 (s, 3H), 3.74-3.70 (m, 1H), 3.67-3.63 (m, 1H), 3.56-3.50 (m, 2H), 2.73-2.67 (m, 2H), 2.65-2.61 (m, 2H), 2.59-2.54 (m, 2H), 2.46-2.41 (m, 2H), 2.36 (s, 3H), 2.10-2.02 (m, 2H), 1.98-1.87 (m, 2H). |
| 184 | | $^1$H NMR (CDCl$_3$, 400 MHz): δ 8.31 (s, 1H), 8.03-7.99 (m, 1H), 7.78 (s, 1H), 7.74-7.70 (m, 2H), 7.65 (s, 1H), 7.55-7.50 (m, 3H), 7.42-7.33 (m, 2H), 6.64 (s, 1H), 6.17 (bs, 1H), 3.93 (s, 3H), 3.70-3.66 (m, 4H), 3.42-3.37 (m, 2H), 2.69-2.64 (m, 2H), 2.52-2.42 (m, 6H), 2.33-2.28 (m, 2H), 2.07-2.00 (m, 2H). |

TABLE 12-continued

| Ex. | Structure | Analytical data |
|---|---|---|
| 185 | | ¹H NMR (CDCl₃, 400 MHz): δ 8.32 (s, 1H), 8.03-7.99 (m, 1H), 7.78 (s, 1H), 7.74-7.70 (m, 2H), 7.63 (s, 1H), 7.55-7.50 (m, 3H), 7.42-7.33 (m, 2H), 6.63 (s, 1H), 6.34 (bs, 1H), 4.44-4.28 (m, 1H), 4.03-3.89 (m, 4H), 3.40-3.28 (m, 1H), 2.69-2.64 (m, 2H), 2.35-2.30 (m, 2H), 2.09-2.00 (m, 2H), 1.33-1.25 (m, 6H). |
| 186 | | ¹H NMR (CDCl₃, 400 MHz): δ 8.33 (s, 1H), 8.05-8.02 (m, 1H), 7.79 (s, 1H), 7.76-7.72 (m, 2H), 7.64 (s, 1H), 7.56-7.51 (m, 3H), 7.42-7.35 (m, 2H), 6.65 (s, 1H), 3.95 (s, 3H), 3.39-3.34 (m, 2H), 2.71-2.67 (m, 2H), 2.54-2.47 (m, 8H), 2.30-2.24 (m, 5H), 2.07-2.02 (m, 2H), 1.82-1.66 (m, 4H). |
| 187 | | ¹H NMR (CDCl₃, 400 MHz): δ 8.33 (s, 1H), 8.05-8.02 (m, 1H), 7.79 (s, 1H), (m, 2H), 7.64 (s, 1H), 7.56-7.51 (m, 3H), 7.43-7.35 (m, 2H), 6.65 (s, 1H), 6.25 (bs, 1H), 3.95 (s, 3H), 3.42-3.37 (m, 2H), 2.71-2.67 (m, 2H), 2.54-2.42 (m, 10H), 2.33-2.29 (m, 2H), 2.26 (s, 3H), 2.09-2.03 (m, 2H). |
| 188 | | ¹H NMR (CDCl₃, 400 MHz): δ 8.35 (s, 1H), 8.06-8.03 (m, 1H), 7.80-7.73 (m, 3H), 7.64-7.62 (m, 1H), 7.56-7.51 (m, 3H), 7.43-7.33 (m, 2H), 7.29-7.23 (m, 2H), 6.95-6.88 (m, 2H), 6.82-6.65 (m, 2H), 3.94 (s, 3H), 3.83-3.78 (m, 1H), 3.63-3.54 (m, 2H), 3.18 (s, 3H), 2.98-2.94 (m, 1H), 2.78-2.69 (m, 2H), 2.52-2.46 (m, 2H), 2.15-2.05 (m, 2H), 1.93-1.85 (m, 1H). |
| 189 | | ¹H NMR (CDCl₃, 400 MHz): δ 8.22 (s, 1H), 7.93-7.88 (m, 1H), 7.74 (s, 1H), 7.66-7.60 (m, 3H), 7.51-7.47 (m, 3H), 7.39-7.30 (m, 2H), 6.67 (s, 1H), 3.90 (s, 3H), 2.70-2.55 (m, 4H), 2.32-2.28 (m, 2H), 2.04-1.96 (m, 2H). |

TABLE 12-continued
| Ex. | Structure | Analytical data |
|---|---|---|
| 190 | 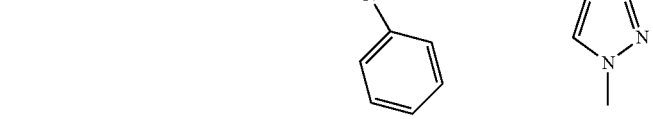 | ¹H NMR (CDCl₃, 400 MHz): δ 8.31 (s, 1H), 8.12-8.00 (m, 2H), 7.78 (s, 1H), 7.72-7.66 (M, 2H), 7.63 (s, 1H), 7.54-7.49 (m, 3H), 7.41-7.33 (m, 2H), 7.23-7.22 (m, 1H), 6.65-6.60 (m, 2H), 3.93 (s, 3H), 3.75 (s, 3H), 2.72-2.65 (m, 2H), 2.47-2.41 (m, 2H), 2.13-1.98 (m, 2H). |
| 191 | 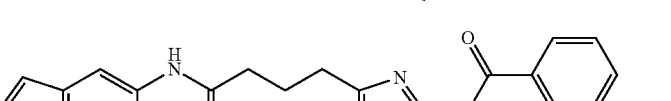 | ¹H NMR (CDCl₃, 400 MHz): δ 8.31 (s, 1H), 8.04-8.18 (m, 2H), 7.90 (s, 1H), 7.78 (s, 1H), 7.72-7.66 (m, 2H), 7.61 (s, 1H), 7.56-7.48 (m, 4H), 7.41-7.31 (m, 4H), 6.67 (s, 1H), 4.04 (s, 3H), 3.93 (s, 3H), 2.75-2.70 (m, 2H), 2.52-2.48 (m, 2H), 2.18-2.10 (m, 2H). |
| 192 | 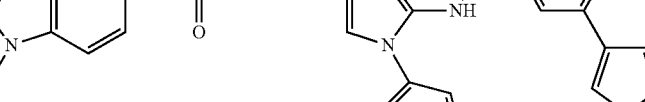 | ¹H NMR (CDCl₃, 400 MHz): δ 8.16 (s, 1H), 7.86-7.82 (m, 1H), 7.74 (s, 1H), 7.60-7.52 (m, 4H), 7.49-7.45 (m, 2H), 7.39-7.33 (m, 2H), 6.89 (s, 1H), 6.42 (bs, 1H), 3.90 (s, 3H), 3.54 (s, 2H), 2.80 (d, 3H). |
| 193 |  | ¹H NMR (CDCl₃, 400 MHz): δ 8.25 (s, 1H), 7.97-7.95 (m, 1H), 7.82 (s, 1H), 7.73 (s, 1H), 7.63-7.61 (m, 2H), 7.54-7.44 (m, 6H), 7.37-7.24 (m, 5H), 7.09-7.07 (m, 1H), 6.64 (s, 1H), 3.88 (s, 3H), 2.99-2.95 (m, 2H), 2.71-2.68 (m, 2H) |
| 194 | 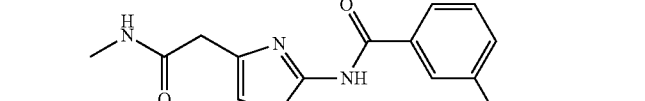 | ¹H NMR (CDCl₃, 400 MHz): δ 8.31-8.25 (m, 1H), 8.02-7.93 (m, 1H), 7.77 (s, 1H), 7.72-7.65 (m, 3H), 7.55-7.48 (m, 3H), 7.43-7.32 (m, 2H), 6.71 (s, 1H), 3.94 (s, 3H), 3.71-3.66 (m, 2H), 3.52-3.47 (m, 2H), 2.99-2.94 (m, 2H), 2.76-2.71 (m, 2H), 2.45-2.40 (m, 4H), 2.31 (s, 3H). |
| 195 | 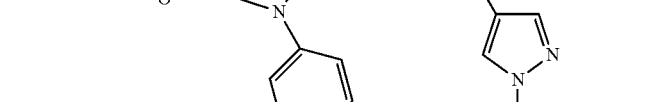 | ¹H NMR (CDCl₃, 400 MHz): δ 8.34 (s, 1H), 8.07-8.02 (m, 1H), 7.79 (s, 1H), 7.75-7.72 (m, 2H), 7.64 (s, 1H), 7.55-7.50 (m, 3H), 7.42-7.33 (m, 2H), 6.65 (s, 1H), 3.94 (s, 3H), 3.77-3.73 (m, 1H), 3.72-3.67 (m, 1H), 3.57-3.50 (m, 2H), 3.02-2.96 (m, 2H), 2.74-2.62 (m, 4H), 2.58-2.52 (m, 2H), 2.36 (s, 3H), 2.00-1.88 (m, 2H). |

TABLE 12-continued

| Ex. | Structure | Analytical data |
|---|---|---|
| 196 | | ¹H NMR (CDCl₃, 400 MHz): δ 8.34 (s, 1H), 8.06-8.02 (m, 1H), 7.80 (s, 1H), 7.76-7.72 (m, 2H), 7.64 (s, 1H), 7.56-7.51 (m, 3H), 7.42-7.34 (m, 2H), 6.64 (s, 1H), 3.94 (s, 3H), 3.67-3.62 (m, 2H), 3.50-3.46 (m, 2H), 2.67-2.62 (m, 2H), 2.42-2.36 (m, 6H), 2.30 (s, 3H), 1.78-1.73 (m, 4H). |
| 197 | | ¹H NMR (CDCl₃, 400 MHz): δ 8.34 (s, 1H), 8.06-8.02 (m, 1H), 7.80 (s, 1H), 7.76-7.73 (m, 2H), 7.64 (s, 1H), 7.55-7.51 (m, 3H), 7.42-7.34 (m, 2H), 6.62 (s, 1H), 5.43-5.39 (m, 1H), 4.06-3.92 (m, 8H), 3.50-3.43 (m, 2H), 2.65-2.60 (m, 2H), 2.24-2.19 (m, 2H), 1.92-1.86 (m, 2H), 1.78-1.72 (m, 4H), 1.52-1.41 (m, 2H). |
| 198 | | ¹H NMR (CDCl₃, 400 MHz) δ 8.34 (s, 1H), 8.08-8.03 (m, 1H), 7.81-7.72 (m, 3H), 7.64 (s, 1H), 7.58-7.51 (m, 3H), 7.46-7.35 (m, 2H), 6.62 (s, 1H), 6.00 (bs, 1H), 3.94 (s, 3H), 3.72-3.68 (m, 3H), 3.62-3.58 (m, 1H), 3.39-3.34 (m, 1H), 3.13-3.06 (m, 1H), 2.66-2.62 (m, 1H), 2.51-2.43 (m, 5H), 2.34-2.21 (m, 4H), 1.86-1.64 (m, 4H). |
| 199 | | ¹H NMR (CDCl₃, 400 MHz) δ 8.34 (s, 1H), 8.05-8.02 (m, 1H), 7.80 (s, 1H), 7.76-7.73 (m, 2H), 7.64 (s, 1H), 7.55-7.51 (m, 3H), 7.42-7.34 (m, 2H), 6.60 (s, 1H), 3.94 (s, 3H), 2.72-2.67 (m, 1H), 2.62-2.58 (m, 2H), 2.17-2.12 (m, 2H), 1.75-1.66 (m, 4H), 1.46-1.40 (m, 2H), 0.77-0.72 (m, 2H), 0.50-0.46 (m, 2H). |
| 200 | | ¹H NMR (CDCl₃, 400 MHz) δ 8.36 (s, 1H), 8.06-8.03 (m, 1H), 7.80-7.73 (m, 3H), 7.64 (s, 1H), 7.57-7.50 (m, 3H), 7.44-7.32 (m, 2H), 6.61 (s, 1H), 3.93 (s, 3H), 3.57-3.52 (m, 1H), 3.45-3.37 (m, 2H), 3.15-3.09 (m, 1H), 2.63-2.58 (m, 1H), 2.41-2.31 (m, 2H), 2.08-2.01 (m, 1H), 1.75-1.61 (m, 4H), 1.50-1.35 (m, 6H), 1.23-1.17 (m, 2H). |

TABLE 12-continued

| Ex. | Structure | Analytical data |
|---|---|---|
| 201 | | ¹H NMR (CDCl₃, 400 MHz) δ 8.34 (s, 1H), 8.05-8.02 (m, 1H), 7.80 (s, 1H), 7.76-7.73 (m, 2H), 7.65 (s, 1H), 7.56-7.51 (m, 3H), 7.42-7.35 (m, 2H), 6.61 (s, 1H), 3.95 (s, 3H), 3.66-3.62 (m, 2H), 3.50-3.47 (m, 2H), 2.64-2.59 (m, 2H), 2.42-2.33 (m, 6H), 2.31 (s, 3H), 1.76-1.66 (m, 4H), 1.50-1.42 (m, 2H). |

Example 202. 3-(1-methyl-1H-pyrazol-4-yl)-N-(4-(4-oxo-4-(piperazin-1-yl)butyl)-1-phenyl-1H-imidazol-2-yl)benzamide

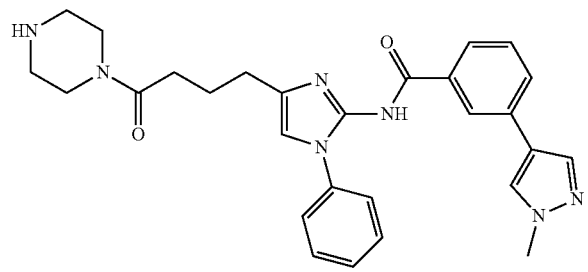 [SMILES: Cn1cc(-c2cccc(C(=O)Nc3nc(CCCC(=O)N4CCNCC4)cn3-c3ccccc3)c2)cn1]

Step 1: tert-butyl 4-(4-(2-(3-(1-methyl-1H-pyrazol-4-yl)benzamido)-1-phenyl-1H-imidazol-4-yl)butanoyl)piperazine-1-carboxylate A mixture of 4-(2-(3-(1-methyl-1H-pyrazol-4-yl)benzamido)-1-phenyl-1H-imidazol-4-yl)butanoic acid (Example 139, Step 2) (600 mg, 1.397 mmol) tert-butyl piperazine-1-carboxylate (312 mg, 1.076 mmol), HATU (800 mg, 2.095 mmol) and DIPEA (0.73 mL, 4.191 mmol) in DCM was stirred at room temperature for overnight. The reaction mixture was quenched with water and extracted with DCM, dried over anhydrous Na₂SO₄ and concentrated under reduced pressure. Purification by silica gel column chromatography using DCM/MeOH as the eluent to afford the title compound (770 mg, 92%). ¹H NMR (CDCl₃, 400 MHz): δ 8.34 (s, 1H), 8.05-8.02 (m, 1H), 7.79 (s, 1H), 7.78-7.71 (m, 2H), 7.64 (s, 1H), 7.58-7.50 (m, 3H), 7.41-7.32 (m, 2H), 6.64 (s, 1H), 3.94 (s, 3H), 3.68-3.56 (m, 4H), 3.50-3.40 (m, 4H), 2.72-2.64 (m, 2H), 2.50-2.40 (m, 2H), 2.10-2.00 (m, 2H), 1.44 (s, 9H).

Step 2: 3-(1-methyl-1H-pyrazol-4-yl)-N-(4-(4-oxo-4-(piperazin-1-yl)butyl)-1-phenyl-1H-imidazol-2-yl)benzamide TFA (0.5 mL) was added to the solution of tert-butyl 4-(4-(2-(3-(1-methyl-1H-pyrazol-4-yl)benzamido)-1-phenyl-1H-imidazol-4-yl)butanoyl)piperazine-1-carboxylate (770 mg, 1.288 mmol) in DCM (20 mL) and stirred at room temperature for overnight. The reaction mixture was quenched with sat. aq. NaHCO₃ and extracted with DCM, dried over anhydrous Na₂SO₄ and concentrated under reduced pressure. Purification by silica gel column chromatography using DCM/MeOH as the eluent to afford the title compound (400 mg, 62%). ¹H NMR (CDCl₃, 400 MHz): δ 8.34 (s, 1H), 8.04-8.02 (m, 1H), 7.80 (s, 1H), 7.75-7.73 (m, 2H), 7.64 (s, 1H), 7.55-7.51 (m, 3H), 7.41-7.34 (m, 2H), 6.65 (s, 1H), 3.94 (s, 3H), 3.64-3.60 (m, 2H), 3.46-3.41 (m, 2H), 2.90-2.82 (m, 4H), 2.72-2.64 (2H), 2.48-2.40 (m, 2H), 2.10-2.00 (m, 2H).

The following compounds were made in a similar manner to that described in Example 202 and in general scheme 1.

TABLE 13

| Ex. | Structure | Analytical data |
|---|---|---|
| 203 | | ¹H NMR (CDCl₃, 400 MHz): δ 8.28 (s, 1H), 8.00-7.95 (m, 1H), 7.78 (s, 1H), 7.70-7.65 (m, 3H), 7.55-7.50 (m, 3H), 7.43-7.34 (m, 2H), 6.69 (s, 1H), 3.94 (s, 3H), 3.72-3.67 (m, 2H), 3.52-3.47 (m, 2H), 3.02-2.94 (m, 2H), 2.92-2.86 (m, 4H), 2.74-2.69 (m, 2H). |

TABLE 13-continued

| Ex. | Structure | Analytical data |
|---|---|---|
| 204 | | $^1$H NMR (CDCl$_3$, 400 MHz): δ 8.34 (s, 1H), 8.06-8.02 (m, 1H), 7.80 (s, 1H), 7.76-7.72 (m, 2H), 7.64 (s, 1H), 7.56-7.50 (m, 3H), 7.42-7.34 (m, 2H), 6.64 (s, 1H), 3.94 (s, 3H), 3.62-3.58 (m, 2H), 3.46-3.42 (m, 2H), 2.88-2.82 (m, 4H), 2.67-2.62 (m, 2H), 2.40-2.35 (m, 2H), 1.79-1.74 (m, 4H). |

Example 205. N-(4-(4-(4-acetylpiperazin-1-yl)-4-oxobutyl)-1-phenyl-1H-imidazol-2-yl)-3-(1-methyl-1H-pyrazol-4-yl)benzamide

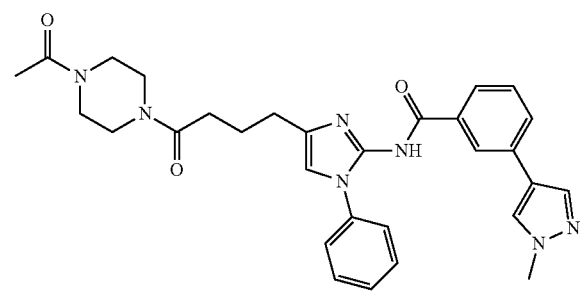 [SMILES: CC(=O)N1CCN(C(=O)CCCc2cn(-c3ccccc3)c(NC(=O)c3cccc(-c4cnn(C)c4)c3)n2)CC1]

To a solution of 3-(1-methyl-1H-pyrazol-4-yl)-N-(4-(5-oxo-5-(piperazin-1-yl)pentyl)-1-phenyl-1H-imidazol-2-yl)benzamide (Example 202) (150 mg, 0.3 mmol) in DCM was added TEA (63 μL, 0.45 mmol). The reaction mixture was cooled 0° C. and then acetyl chloride (26 μL, 0.36 mmol) was added at 0° C. The reaction mixture was stirred at room temperature for 1 h. The reaction mixture was quenched with sat. aq. NaHCO$_3$ and extracted with DCM, dried over anhydrous Na$_2$SO$_4$ and concentrated under reduced pressure. Purification by silica gel column chromatography using DCM/MeOH as the eluent to afford the title compound (59 mg, 36%). $^1$H NMR (CDCl$_3$, 400 MHz): δ 8.34 (s, 1H), 8.05-8.02 (m, 1H), 7.80 (s, 1H), 7.75-7.73 (m, 2H), 7.65 (s, 1H), 7.55-7.51 (m, 3H), 7.41-7.34 (m, 2H), 6.64 (s, 1H), 3.94 (s, 3H), 3.72-3.58 (m, 4H), 3.50-3.40 (m, 4H), 2.74-2.66 (m, 2H), 2.50-2.39 (m, 2H), 2.18-2.00 (m, 5H).

Example 206. 3-(1-methyl-1H-pyrazol-4-yl)-N-(4-(4-(4-(methylsulfonyl)piperazin-1-yl)-4-oxobutyl)-1-phenyl-1H-imidazol-2-yl)benzamide

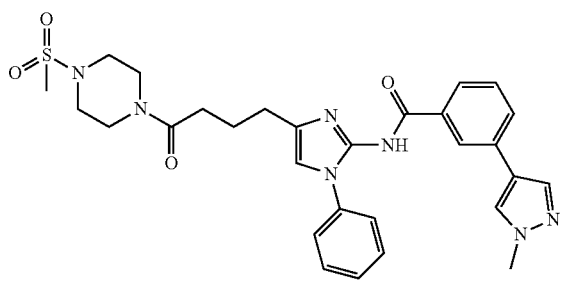 [SMILES: Cn1cc(-c2cccc(C(=O)Nc3nc(CCCC(=O)N4CCN(S(C)(=O)=O)CC4)cn3-c3ccccc3)c2)cn1]

To a solution of 3-(1-methyl-1H-pyrazol-4-yl)-N-(4-(4-oxo-4-(piperazin-1-yl)butyl)-1-phenyl-1H-imidazol-2-yl)benzamide (Example 202) (150 mg, 0.3 mmol) in DCM was added TEA (63 μL, 0.45 mmol). The reaction mixture was cooled 0° C. and then methanesulfonyl chloride (28 μL, 0.36 mmol) was added at 0° C. The reaction mixture was stirred at room temperature for 1 h. The reaction mixture was quenched with sat. aq. NaHCO$_3$ and extracted with DCM, dried over anhydrous Na$_2$SO$_4$ and concentrated under reduced pressure. Purification by silica gel column chromatography using DCM/MeOH as the eluent to afford the title compound (118 mg, 68%). $^1$H NMR (CDCl$_3$, 400 MHz): δ 8.33 (s, 1H), 8.03-8.01 (m, 1H), 7.80 (s, 1H), 7.75-7.73 (m, 2H), 7.65 (s, 1H), 7.55-7.51 (m, 3H), 7.41-7.34 (m, 2H), 6.65 (s, 1H), 3.95 (s, 3H), 3.80-3.72 (m, 2H), 3.60-3.52 (m, 2H), 3.26-2.59 (m, 4H), 2.76 (s, 3H), 2.72-2.68 (m, 2H), 2.46-2.42 (m, 2H), 2.07-2.02 (m, 2H).

Example 207. (S)-1-(4-(2-(3-(1-methyl-1H-pyrazol-4-yl)benzamido)-1-phenyl-1H-imidazol-4-yl)butanoyl)piperidine-3-carboxylic acid

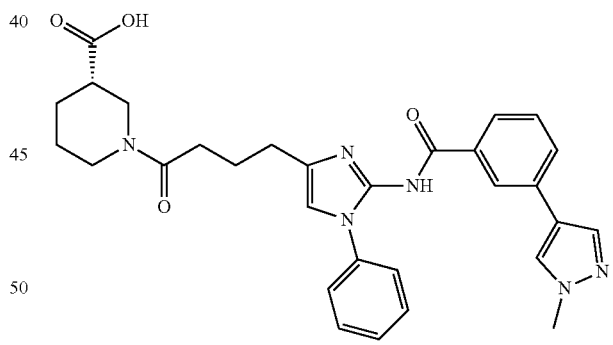

Step 1: (S)-ethyl 1-(4-(2-(3-(1-methyl-1H-pyrazol-4-yl)benzamido)-1-phenyl-1H-imidazol-4-yl)butanoyl)piperidine-3-carboxylate A mixture of 4-(2-(3-(1-methyl-1H-pyrazol-4-yl)benzamido)-1-phenyl-1H-imidazol-4-yl)butanoic acid (Example 139, Step 2) (140 mg, 0.32 mmol), ethyl (S)-(+)-3-piperidinecarboxylate (102 mg, 0.65 mmol), HATU (186 mg, 0.48 mmol) and DIPEA (0.14 mL, 0.81 mmol) in DCM (3 mL) was stirred at room temperature for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (80 mg, 44%). $^1$H NMR (CDCl$_3$, 400 MHz): δ 8.33 (s, 1H), 8.07-8.02 (m, 1H), 7.80-7.73 (m, 3H), 7.65 (s, 1H), 7.57-7.50 (m, 3H), 7.46-7.33 (m, 2H), 6.66 (s, 1H), 4.20-4.06 (m, 2H), 3.94 (s, 3H), 3.76-3.68 (m, 1H), 3.50-3.33 (m, 1H), 3.22-3.10 (m, 1H), 3.00-2.92 (m, 1H), 2.72-2.66 (m, 1H), 2.51-2.41 (m, 2H), 2.28-2.14 (m, 1H), 2.10-2.00 (m, 1H), 1.93-1.80 (m, 2H), 1.70-1.44 (m, 4H), 1.28-1.20 (m, 3H).

Step 2: (S)-1-(4-(2-(3-(1-methyl-1H-pyrazol-4-yl)benzamido)-1-phenyl-1H-imidazol-4-yl)butanoyl)piperidine-3-carboxylic acid To a solution of (S)-ethyl 1-(4-(2-(3-(1-methyl-1H-pyrazol-4-yl)benzamido)-1-phenyl-1H-imidazol-4-yl)butanoyl)piperidine-3-carboxylate (80 mg, 0.14 mmol) in MeOH (2 mL) was added 1N—NaOH (0.7 mL, 0.70 mmol). The reaction mixture was stirred at room temperature for overnight. The mixture was evaporated under reduced pressure and acidified with 1N—HCl, filtered the solid to get the title compound (45 mg, 59%). $^1$H NMR (CDCl$_3$, 400 MHz): δ 8.13 (s, 1H), 7.83-7.79 (m, 1H), 7.73 (s, 1H), 7.71-7.68 (m, 1H), 7.58-7.54 (m, 2H), 7.52-7.44 (m, 3H), 7.40-7.30 (m, 2H), 6.80 (s, 1H), 3.80 (s, 3H), 3.72-3.64 (m, 1H), 3.60-3.50 (m, 3H), 2.73-2.58 (m, 3H), 2.54-2.36 (m, 2H), 2.02-1.88 (m, 4H), 1.80-1.74 (m, 1H), 1.68-1.62 (m, 1H).

Example 208. (S)-1-(5-(2-(3-(1-methyl-1H-pyrazol-4-yl)benzamido)-1-phenyl-1H-imidazol-4-yl)pentanoyl)piperidine-3-carboxylic acid

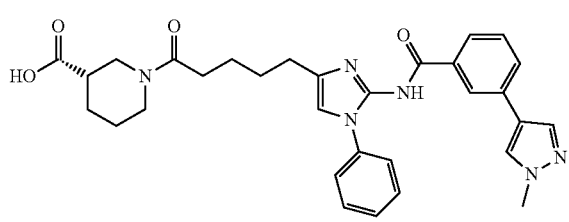

Example 208 was made in a similar manner with example 207 (50 mg, 20% for 2 steps). $^1$H NMR (CDCl$_3$, 400 MHz): δ 8.25 (s, 1H), 7.97-7.93 (m, 1H), 7.77 (s, 1H), 7.70-7.67 (m, 2H), 7.62 (s, 1H), 7.54-7.50 (m, 3H), 7.42-7.33 (m, 2H), 6.62 (s, 1H), 4.76-4.72 (m, 1H), 4.57-4.52 (m, 1H), 3.95 (s, 3H), 3.40-3.34 (m, 1H), 3.14-3.09 (m, 1H), 2.87-2.77 (m, 2H), 2.56-2.48 (m, 3H), 2.32-2.24 (m, 1H), 2.09-2.02 (m, 1H), 1.84-1.70 (m, 2H), 1.66-1.57 (m, 3H), 1.53-1.44 (m, 1H).

Example 209. N-(4-(4-(4-aminopiperidin-1-yl)-4-oxobutyl)-1-phenyl-1H-imidazol-2-yl)-3-(1-methyl-1H-pyrazol-4-yl)benzamide

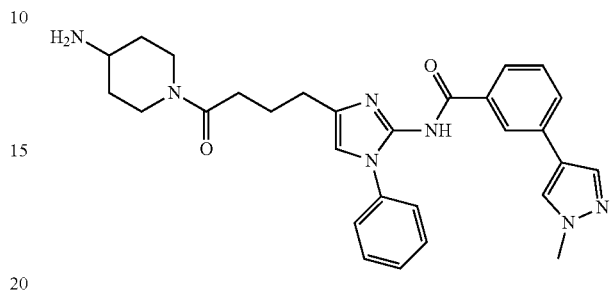

Step 1: tert-butyl (1-(4-(2-(3-(1-methyl-1H-pyrazol-4-yl)benzamido)-1-phenyl-1H-imidazol-4-yl)butanoyl)piperidin-4-yl)carbamate A mixture of 4-(2-(3-(1-methyl-1H-pyrazol-4-yl)benzamido)-1-phenyl-1H-imidazol-4-yl)butanoic acid (Example 139, Step 2) (140 mg, 0.32 mmol) 4-(tert-butoxycarbonylamino)piperidine (130 mg, 0.65 mmol), HATU (186 mg, 0.48 mmol) and DIPEA (0.14 mL, 0.81 mmol) in DCM (3 mL) was stirred at room temperature for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (75 mg, 38%).

Step 2: N-(4-(4-(4-aminopiperidin-1-yl)-4-oxobutyl)-1-phenyl-1H-imidazol-2-yl)-3-(1-methyl-1H-pyrazol-4-yl)benzamide TFA (0.5 mL) was added to the solution of tert-butyl (1-(4-(2-(3-(1-methyl-1H-pyrazol-4-yl)benzamido)-1-phenyl-1H-imidazol-4-yl)butanoyl)piperidin-4-yl)carbamate (75 mg, 0.12 mmol) in DCM (3 mL) and stirred at room temperature for overnight. The reaction mixture was quenched with sat. aq. NaHCO$_3$ and extracted with DCM, dried over anhydrous Na$_2$SO$_4$ and concentrated under reduced pressure. Purification by silica gel column chromatography using DCM/MeOH as the eluent to afford the title compound (45 mg, 73%). $^1$H NMR (CDCl$_3$, 400 MHz): δ 8.34 (s, 1H), 8.06-8.02 (m, 1H), 7.80 (s, 1H), 7.76-7.73 (m, 2H), 7.65 (s, 1H), 7.56-7.51 (m, 3H), 7.42-7.34 (m, 2H), 6.65 (s, 1H), 4.56-4.50 (m, 1H), 3.94 (s, 3H), 3.84-3.78 (m, 1H), 3.11-3.03 (m, 1H), 2.97-2.89 (m, 1H), 2.76-2.66 (m, 3H), 2.47-2.42 (m, 2H), 2.08-1.99 (m, 2H), 1.92-1.82 (m, 4H).

The following compounds were made in a similar manner to that described in Example 209 and in general scheme 1.

TABLE 14

| Ex. | Structure | Analytical data |
|---|---|---|
| 210 | | ¹H NMR (CD₃OD, 400 MHz): δ 8.06 (s, 1H), 7.96 (s, 1H), 7.81(s, 1H), 7.73-7.67 (m, 2H), 7.55-7.42 (m, 4H), 7.41-7.36 (m, 2H), 7.10 (s, 1H), 4.33-4.19 (m, 1H), 3.92 (s, 1H), 3.89-3.70 (m, 1H), 3.12-2.80 (m, 1H), 2.79-2.60 (m, 4H), 2.52-2.42 (m, 2H), 2.03-1.92 (m, 3H), 1.80-1.70 (m, 1H), 1.60-1.10 (m, 2H). |
| 211 | | ¹H NMR (CD₃OD, 400 MHz): δ 8.06 (s, 1H), 7.96 (s, 1H), 7.81(s, 1H), 7.73-7.67 (m, 2H), 7.55-7.42 (m, 4H), 7.41-7.36 (m, 2H), 7.10 (s, 1H), 4.33-4.19 (m, 1H), 3.92 (s, 1H), 3.89-3.70 (m, 1H), 3.12-2.80 (m, 1H), 2.79-2.60 (m, 4H), 2.52-2.42 (m, 2H), 2.03-1.92 (m, 3H), 1.80-1.70 (m, 1H), 1.60-1.10 (m, 2H). |
| 212 | | ¹H NMR (CDCl₃, 400 MHz): δ 8.34 (s, 1H), 8.08-8.00 (m, 1H), 7.79 (s, 1H), 7.76-7.70 (m, 2H), 7.63 (s, 1H), 7.55-7.48 (m, 3H), 7.41-7.30 (m, 2H), 6.65 (s, 1H), 3.94 (s, 3H), 3.70-3.58 (m, 3H), 3.57-3.40 (m, 1H), 3.30-3.05 (m, 1H), 2.72-2.64 (m, 2H), 2.41-2.62 (m, 2H), 2.40-2.30 (m, 2H), 2.18-2.00 (m, 3H), 1.82-1.70 (m, 1H). |
| 213 | | ¹H NMR (CDCl₃, 400 MHz) δ 8.32 (s, 1H), 8.04-8.01 (m, 1H), 7.79 (s, 1H), 7.75-7.71 (m, 2H), 7.64 (s, 1H), 7.55-7.50 (m, 3H), 7.43-7.33 (m, 2H), 6.62 (s, 1H), 4.52-4.48 (m, 1H), 3.93 (s, 3H), 3.83-3.79 (m, 1H), 3.07-3.01 (m, 1H), 2.96-2.91 (m, 1H), 2.71-2.63 (m, 3H), 2.40-2.37 (m, 2H), 1.90-1.82 (m, 3H), 1.77-1.72 (m, 5H). |
| 214 | | ¹H NMR (CDCl₃, 400 MHz) δ 8.30 (s, 1H), 8.02-7.95 (m, 1H), 7.78 (s, 1H), 7.72-7.66 (m, 2H), 7.63 (s, 1H), 7.52-7.48 (m, 3H), 7.40-7.30 (m, 2H), 6.64 (s, 1H), 5.92 (br, 1H), 4.00-3.80 (m, 4H), 3.18-3.10 (m, 2H), 2.78-2.68 (m, 2H), 2.68-2.60 (m, 2H), 2.31-2.20 (m, 2H), 2.08-1.96 (m, 2H), 1.95-1.90 (m, 2H), 1.50-1.38 (m, 2H). |

TABLE 14-continued

| Ex. | Structure | Analytical data |
|---|---|---|
| 215 | | $^1$H NMR (CDCl$_3$, 400 MHz) δ 8.33 (s, 1H), 8.05-1.98 (m, 1H), 7.79 (s, 1H), 7.74-7.70 (m, 2H), 7.63 (s, 1H), 7.55-7.49 (m, 3H), 7.41-7.32 (m, 2H), 6.63 (s, 1H), 5.40-5.29 (m, 1H), 3.94 (s, 1H), 3.80-3.65 (m, 1H), 2.70-2.48 (m, 3H), 2.26-2.20 (m, 2H), 2.08-1.98 (m, 4H), 1.97-1.80 (m, 2H), 1.28-1.16 (m, 5H). |
| 216 | | $^1$H NMR (CDCl$_3$, 400 MHz) δ 8.33 (s, 1H), 8.06-8.00 (m, 1H), 7.79 (s, 1H), 7.78-7.71 (m, 2H), 7.65 (s, 1H), 7.56-7.50 (m, 3H), 7.42-7.32 (m, 2H), 6.64 (s, 1H), 4.52-4.42 (m, 1H), 3.94 (s, 3H), 3.82-3.72 (m, 1H), 3.16-3.02 (m, 1H), 2.82-2.72 (m, 1H), 2.71-2.67 (m, 2H), 2.66-2.58 (m, 1H), 2.49-2.40 (m, 5H), 2.10-2.00 (m, 2H), 1.98-1.90 (m, 2H), 1.32-1.20 (m, 2H). |
| 217 | | $^1$H NMR (CDCl$_3$, 400 MHz) δ 8.23 (s, 1H), 7.98-7.88 (m, 1H), 7.76 (s, 1H), 7.65-7.55 (m, 3H), 7.54-7.42 (m, 3H), 7.41-7.38 (m, 1H), 7.37-7.30 (m, 2H), 6.65 (s, 1H), 6.58 (br, 1H), 3.91 (s, 3H), 2.71-2.62 (m, 2H), 2.52-2.42 (m, 2H), 2.15-2.00 (m, 2H). |

Example 218. N-(4-(4-(methyl(4-methylpiperazin-1-yl)amino)-4-oxobutyl)-1-phenyl-1H-imidazol-2-yl)-3-(1-methyl-1H-pyrazol-4-yl)benzamide

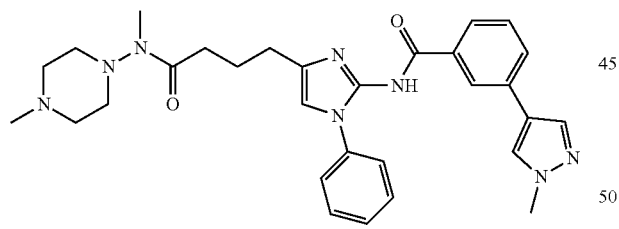

Step 1: 4-methyl-N-methylenepiperazin-1-amine

To a solution of 4-methylpiperazin-1-amine (1.0 g, 8.68 mmol), Na$_2$SO$_4$ (1.0 g) in DCM (10 mL) was added paraformaldehyde (217 mg, 7.23 mmol). The reaction mixture was stirred at room temperature for overnight. The mixture filtered through celite, filtrate was concentrated under reduced pressure to afford the title compound (797 mg, 72%).

Step 2: N,4-dimethylpiperazin-1-amine

To a solution of 4-methyl-N-methylenepiperazin-1-amine (600 mg, 4.72 mmol) in anhydrous THF (20 mL) was added LiAlH$_4$ (1.0 M in THF, 4.72 mL, 4.72 mmol) at −78° C. The reaction mixture was stirred at 80° C. for 1 h, quenched with water, 15%-NaOH and stirred for 1 h. The mixture filtered through celite, filtrate was concentrated under reduced pressure to afford the title compound (crude obtained).

Step 3: N-(4-(4-(methyl(4-methylpiperazin-1-yl)amino)-4-oxobutyl)-1-phenyl-1H-imidazol-2-yl)-3-(1-methyl-1H-pyrazol-4-yl)benzamide A mixture of 4-(2-(3-(1-methyl-1H-pyrazol-4-yl)benzamido)-1-phenyl-1H-imidazol-4-yl)butanoic acid (Example 139, Step 2) (200 mg, 0.465 mmol) N,4-dimethylpiperazin-1-amine (120 mg, 0.93 mmol), HATU (265 mg, 0.698 mmol) and DIPEA (0.25 mL, 1.39 mmol) in DCM was stirred at room temperature for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (60 mg, 24%). $^1$H NMR (CDCl$_3$, 400 MHz): δ 8.34 (s, 1H), 8.05-8.03 (m, 1H), 7.79 (s, 1H), 7.76-7.74 (m, 2H), 7.64 (s, 1H), 7.55-7.51 (m, 3H), 7.41-7.34 (m, 2H), 6.64 (s, 1H), 3.94 (s, 3H), 3.00-2.90 (m, 5H), 2.82-2.74 (m, 2H), 2.70-2.60 (m, 6H), 2.30-2.20 (m, 5H), 2.22-1.94 (m, 2H).

Example 219. 3-(1-methyl-1H-pyrazol-4-yl)-N-(1-phenyl-4-(4-(piperidin-1-yl)butyl)-1H-imidazol-2-yl)benzamide

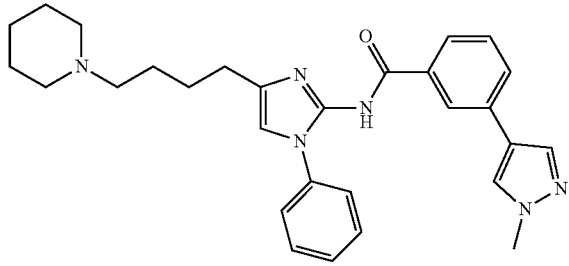 [SMILES: Cn1cc(-c2cccc(C(=O)Nc3nc(CCCCN4CCCCC4)cn3-c3ccccc3)c2)cn1]

Step 1: N-(4-(4-hydroxybutyl)-1-phenyl-1H-imidazol-2-yl)-3-(1-methyl-1H-pyrazol-4-yl)benzamide To a solution of methyl 4-(2-(3-(1-methyl-1H-pyrazol-4-yl)benzamido)-1-phenyl-1H-imidazol-4-yl)butanoate (Example 139, Step 1) (6.0 g, 13.5 mmol) in anhydrous THF (200 mL) was added LiAlH$_4$ (1.0 M in THF, 13.5 mL, 13.5 mmol) at −78° C. The reaction mixture was stirred at room temperature for 1 h, quenched with water, 15%-NaOH and stirred for 1 h. The mixture filtered through celite, filterate was concentrated under reduced pressure. Purification by silica gel column chromatography using DCM/MeOH as the eluent to afford the title compound (1.37 g, 24%).

Step 2: 3-(1-methyl-1H-pyrazol-4-yl)-N-(4-(4-oxobutyl)-1-phenyl-1H-imidazol-2-yl)benzamide To a solution of oxalyl chloride (0.4 mL, 4.62 mmol) in anhydrous DCM was added dropwise a solution of DMSO (0.66 mL, 9.24 mmol) in DCM at −78° C. After 15 min, to the mixture was added dropwise a solution of N-(4-(4-hydroxybutyl)-1-phenyl-1H-imidazol-2-yl)-3-(1-methyl-1H-pyrazol-4-yl)benzamide (1.6 g, 3.85 mmol) in DCM over 10 min. After 1 h, TEA (2.7 mL, 19.25 mmol) was added and the reaction mixture was warmed to room temperature. The reaction mixture was quenched with water extracted with DCM. The organic phase was washed with 1N—HCl, sat. aq. NaHCO$_3$, brine, dried over anhydrous Na$_2$SO$_4$ and concentrated under reduced pressure. Purification by silica gel column chromatography using DCM/MeOH as the eluent to afford the title compound (756 mg, 47%).

Step 3: 3-(1-methyl-1H-pyrazol-4-yl)-N-(1-phenyl-4-(4-(piperidin-1-yl)butyl)-1H-imidazol-2-yl)benzamide To a solution of 3-(1-methyl-1H-pyrazol-4-yl)-N-(4-(4-oxobutyl)-1-phenyl-1H-imidazol-2-yl)benzamide (100 mg, 0.24 mmol) and piperidine (41 mg, 0.48 mmol) in THF was added NaBH$_3$CN (30.4 mg, 0.48 mmol). The reaction mixture was stirred at room temperature for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (30 mg, 26%). $^1$H NMR (CDCl$_3$, 400 MHz): (CDCl$_3$, 400 MHz): δ 8.33 (s, 1H), 8.05-8.03 (m, 1H), 7.80 (s, 1H), 7.77-7.73 (m, 2H), 7.64 (s, 1H), 7.55-7.51 (m, 3H), 7.41-7.34 (m, 2H), 6.61 (s, 1H), 3.95 (s, 3H), 2.64-2.59 (m, 2H), 2.58-2.10 (m, 6H), 1.78-1.50 (m, 10H).

The following compounds were made in a similar manner to that described in Example 219 and in general scheme 1.

TABLE 15

| Ex. | Structure | Analytical data |
| --- | --- | --- |
| 220 | | $^1$H NMR (CDCl$_3$, 400 MHz): δ 8.34 (s, 1H), 8.06-8.03 (m, 1H), 7.80 (s, 1H), 7.76-7.73 (m, 2H), 7.64 (s, 1H), 7.56-7.51 (m, 3H), 7.41-7.34 (m, 2H), 6.59 (s, 1H), 3.94 (s, 3H), 2.61-2.57 (m, 2H), 2.54-2.46 (m, 4H), 2.43-2.38 (m, 2H), 1.72-1.64 (m, 6H), 1.59-1.54 (m, 2H), 1.48-1.33 (m, 4H). |
| 221 | | $^1$H NMR (CDCl$_3$, 400 MHz): δ 8.34 (s, 1H), 8.05-8.03 (m, 1H), 7.80 (s, 1H), 7.75-7.70 (m, 2H), 7.64 (s, 1H), 7.55-7.51 (m, 3H), 7.41-7.34 (m, 2H), 6.59 (s, 1H), 3.94 (s, 3H), 2.70-2.30 (m, 12H), 2.29 (s, 3H), 1.78-1.58 (m, 4H). |

| Ex. | Structure | Analytical data |
|---|---|---|
| 222 | | $^1$H NMR (CDCl$_3$, 400 MHz): δ 8.35 (s, 1H), 8.05-8.03 (m, 1H), 7.80 (s, 1H), 7.79-7.74 (m, 2H), 7.64 (s, 1H), 7.55-7.51 (m, 3H), 7.41-7.34 (m, 2H), 6.57 (s, 1H), 3.94 (s, 3H), 2.61-2.57 (m, 2H), 2.50-2.40 (m, 6H), 1.81-1.66 (m, 6H), 1.56-1.52 (m, 2H), 1.43-1.38 (m, 4H). |
| 223 | | $^1$H NMR (CDCl$_3$, 400 MHz): δ 8.35 (s, 1H), 8.05-8.03 (m, 1H), 7.80 (s, 1H), 7.76-7.74 (m, 2H), 7.64 (s, 1H), 7.55-7.51 (m, 3H), 7.41-7.34 (m, 2H), 6.58 (s, 1H), 3.94 (s, 3H), 2.65-2.57 (m, 6H), 2.49-2.44 (m, 2H), 1.81-1.60 (m, 10H), 1.56-1.30 (m, 6H). |

Example 224. 3-(1-methyl-1H-pyrazol-4-yl)-N-(4-(4-(2-oxopyrrolidin-1-yl)butyl)-1-phenyl-1H-imidazol-2-yl)benzamide Example 225. 3-(1-methyl-1H-pyrazol-4-yl)-N-(4-(6-(2-oxopyrrolidin-1-yl)hexyl)-1-phenyl-1H-imidazol-2-yl)benzamide

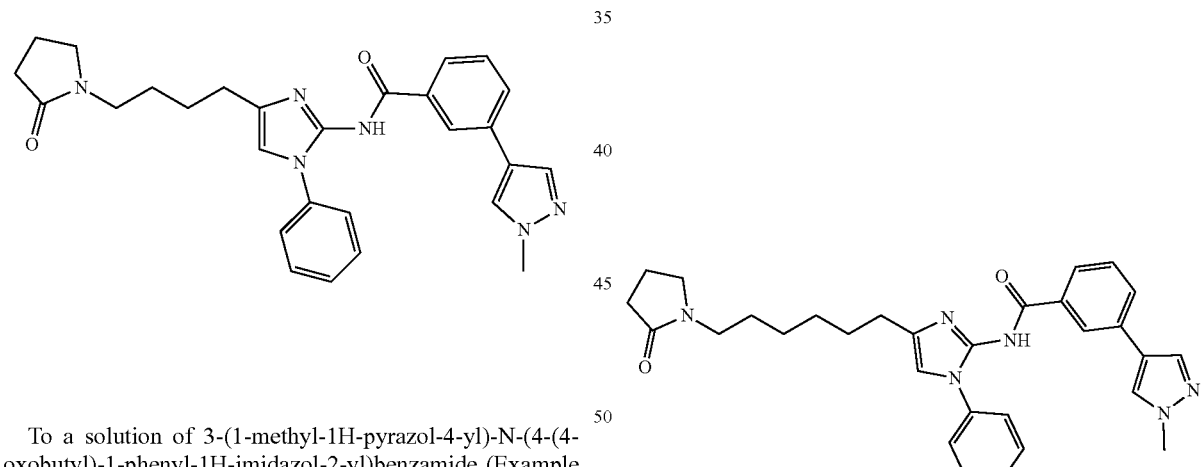

To a solution of 3-(1-methyl-1H-pyrazol-4-yl)-N-(4-(4-oxobutyl)-1-phenyl-1H-imidazol-2-yl)benzamide (Example 219, Step 2) (100 mg, 0.24 mmol) in MeOH was added ethyl 4-aminobutyrate hydrochloride (48.7 mg, 0.29 mmol), TEA (44 mL, 0.31 mmol). The reaction mixture was stirred at room temperature for 30 min and then NaBH$_3$CN was added. The reaction mixture was stirred at 45° C. for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (22 mg, 19%). $^1$H NMR (CDCl$_3$, 400 MHz): δ 8.34 (s, 1H), 8.08-8.03 (m, 1H), 7.79 (s, 1H), 7.75-7.70 (m, 2H), 7.64 (s, 1H), 7.58-7.51 (m, 3H), 7.41-7.34 (m, 2H), 6.64 (s, 1H), 3.94 (s, 3H), 3.40-3.32 (m, 4H), 2.66-2.60 (m, 2H), 2.42-2.38 (m, 2H), 2.06-2.00 (m, 2H), 1.80-1.60 (m, 4H).

Example 225 was made in a similar manner with example 224 (64 mg, 35%). $^1$H NMR (CDCl$_3$, 400 MHz): δ 8.34 (s, 1H), 8.06-8.03 (m, 1H), 7.80 (s, 1H), 7.75-7.70 (m, 2H), 7.64 (s, 1H), 7.58-7.51 (m, 3H), 7.41-7.34 (m, 2H), 6.59 (s, 1H), 3.94 (s, 3H), 3.40-3.35 (m, 2H), 3.29-3.26 (m, 2H), 2.62-2.56 (m, 2H), 2.42-2.36 (m, 2H), 2.06-2.00 (m, 2H), 1.71-1.65 (m, 2H), 1.62-1.50 (m, 2H), 1.50-1.30 (m, 4H).

Example 226. N-(4-(6-(2,5-dioxopyrrolidin-1-yl)hexyl)-1-phenyl-1H-imidazol-2-yl)-3-(1-methyl-1H-pyrazol-4-yl)benzamide

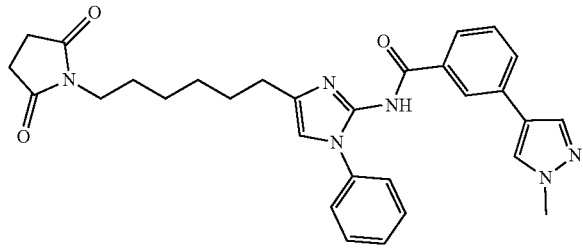 [SMILES: Cn1cc(-c2cccc(C(=O)Nc3nc(CCCCCCN4C(=O)CCC4=O)cn3-c3ccccc3)c2)cn1]

Step 1: 6-(2-(3-(1-methyl-1H-pyrazol-4-yl)benzamido)-1-phenyl-1H-imidazol-4-yl)hexyl methanesulfonate To a solution of N-(4-(6-hydroxyhexyl)-1-phenyl-1H-imidazol-2-yl)-3-(1-methyl-1H-pyrazol-4-yl)benzamide (Example 220, step 1) (430 mg, 0.97 mmol) in DCM was added TEA (0.27 mL, 1.94 mmol). The reaction mixture was cooled 0° C. and then methanesulfonyl chloride (0.11 mL, 1.45 mmol) was added at 0° C. The reaction mixture was stirred at room temperature for 1 h. The reaction mixture was quenched with sat. aq. NaHCO$_3$ and extracted with DCM, dried over anhydrous Na$_2$SO$_4$ and concentrated under reduced pressure to afford the title compound (crude obtained).

Step 2: N-(4-(6-azidohexyl)-1-phenyl-1H-imidazol-2-yl)-3-(1-methyl-1H-pyrazol-4-yl)benzamide To a solution of 6-(2-(3-(1-methyl-1H-pyrazol-4-yl)benzamido)-1-phenyl-1H-imidazol-4-yl)hexyl methanesulfonate (580 mg, 1.11 mmol) in DMF was added sodium azide (144 mg, 2.22 mmol). The reaction mixture was stirred at 90° C. for 3 h. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (210 mg, 44%).

Step 3: N-(4-(6-aminohexyl)-1-phenyl-1H-imidazol-2-yl)-3-(1-methyl-1H-pyrazol-4-yl)benzamide To a solution of N-(4-(6-azidohexyl)-1-phenyl-1H-imidazol-2-yl)-3-(1-methyl-1H-pyrazol-4-yl)benzamide (210 mg, 0.45 mmol) in MeOH was added palladium on carbon (50 mg). The mixture was flushed with hydrogen via a hydrogen-filled balloon and then stirred at room temperature for overnight. The reaction mixture was filtered through celite, washed through with MeOH and concentrated under reduced pressure to afford the title compound (197 mg, 99%).

Step 4: N-(4-(6-(2,5-dioxopyrrolidin-1-yl)hexyl)-1-phenyl-1H-imidazol-2-yl)-3-(1-methyl-1H-pyrazol-4-yl)benzamide To a solution of N-(4-(6-aminohexyl)-1-phenyl-1H-imidazol-2-yl)-3-(1-methyl-1H-pyrazol-4-yl)benzamide (120 mg, 0.27 mmol), succinic anhydride (30 mg, 0.3 mmol) in AcOH (5 mL) was added DMAP (6.6 mg, 0.054 mmol). The reaction mixture was reflux for overnight. The mixture was evaporated under reduced pressure and extracted with DCM/sat. aq. NaHCO$_3$. The organic phase was washed with 1N—HCl and brine, dried over anhydrous Na$_2$SO$_4$ and concentrated under reduced pressure. Purification by silica gel column chromatography using DCM/MeOH as the eluent to afford the title compound (54 mg, 38%). $^1$H NMR (CDCl$_3$, 400 MHz): δ 8.34 (s, 1H), 8.06-8.03 (m, 1H), 7.80 (s, 1H), 7.75-7.70 (m, 2H), 7.64 (s, 1H), 7.58-7.51 (m, 3H), 7.41-7.34 (m, 2H), 6.59 (s, 1H), 3.94 (s, 3H), 3.55-3.49 (m, 2H), 2.72 (s, 4H), 2.61-2.58 (m, 2H), 1.72-1.30 (m, 8H).

Example 227. N-(4-(4-(cyclopropanecarboxamido)butyl)-1-phenyl-1H-imidazol-2-yl)-3-(1-methyl-1H-pyrazol-4-yl)benzamide

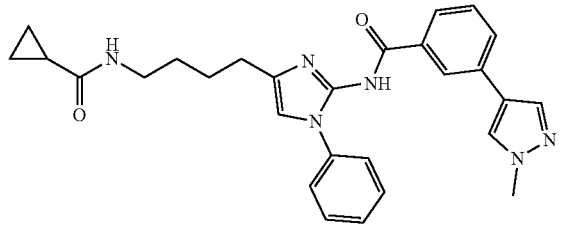 [SMILES: Cn1cc(-c2cccc(C(=O)Nc3nc(CCCCNC(=O)C4CC4)cn3-c3ccccc3)c2)cn1]

Step 1: N-(4-(4-(hydroxyimino)butyl)-1-phenyl-1H-imidazol-2-yl)-3-(1-methyl-1H-pyrazol-4-yl)benzamide To a solution of 3-(1-methyl-1H-pyrazol-4-yl)-N-(4-(4-oxobutyl)-1-phenyl-1H-imidazol-2-yl)benzamide (Example 219, Step 2) (100 mg, 0.242 mmol) in EtOH (5 mL) was added TEA (80 μL, 0.58 mmol), hydroxylamine hydrochloride (32 mg, 0.46 mmol). The reaction mixture was stirred at room temperature for 3 h. The solid was filtered and washed with EtOH (5 mL) to afford the title compound (80 mg, 77%).

Step 2: N-(4-(4-aminobutyl)-1-phenyl-1H-imidazol-2-yl)-3-(1-methyl-1H-pyrazol-4-yl)benzamide To a solution of N-(4-(4-(hydroxyimino)butyl)-1-phenyl-1H-imidazol-2-yl)-3-(1-methyl-1H-pyrazol-4-yl)benzamide (80 mg, 0.186 mmol) in THF was added 2N—HCl (2.0 mL), zinc powder (244 mg, 3.73 mmol). The reaction mixture was reflux for 2 h. The reaction mixture was extracted with DCM/water and concentrated under reduced pressure to afford the title compound (crude obtained).

Step 3: N-(4-(4-(cyclopropanecarboxamido)butyl)-1-phenyl-1H-imidazol-2-yl)-3-(1-methyl-1H-pyrazol-4-yl)benzamide A mixture of N-(4-(4-aminobutyl)-1-phenyl-1H-imidazol-2-yl)-3-(1-methyl-1H-pyrazol-4-yl)benzamide (55 mg, 0.13 mmol), cyclopropanecarboxylic acid (13.7 mg, 0.16 mmol), EDCI (38.2 mg, 0.20 mmol), HOBt (27 mg, 0.20 mmol) and DIPEA (0.12 mL, 0.66 mmol) in DMF was stirred at room temperature for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (7.0 mg, 11%). $^1$H NMR (CDCl$_3$, 400 MHz): δ 8.33 (s, 1H), 8.05-8.03 (m, 1H), 7.80 (s, 1H), 7.77-7.73 (m, 2H), 7.64 (s, 1H), 7.55-7.51 (m, 3H), 7.41-7.34 (m, 2H), 6.61 (s, 1H), 3.93 (s, 3H), 3.36-3.30 (m, 2H), 2.64-2.60 (m, 2H), 1.80-1.60 (m, 4H), 1.38-1.28 (m, 1H), 0.98-0.92 (m, 2H), 0.78-0.70 (m, 2H).

Example 228. N-(4-(6-(cyclopropanecarboxamido)hexyl)-1-phenyl-1H-imidazol-2-yl)-3-(1-methyl-1H-pyrazol-4-yl)benzamide

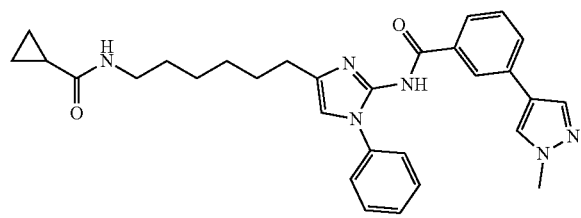 [SMILES: Cn1cc(-c2cccc(C(=O)Nc3nc(CCCCCCNC(=O)C4CC4)cn3-c3ccccc3)c2)cn1]

Example 228 was made in a similar manner with example 227 (64 mg, 35%). $^1$H NMR (CDCl$_3$, 400 MHz): δ 8.29 (s, 1H), 7.99-7.97 (m, 1H), 7.80 (s, 1H), 7.70-7.65 (m, 3H), 7.55-7.49 (m, 3H), 7.41-7.34 (m, 2H), 6.61 (s, 1H), 3.95 (s, 3H), 3.29-3.24 (m, 2H), 2.61-2.57 (m, 2H), 1.72-1.67 (m, 2H), 1.63-1.59 (m, 2H), 1.56-1.51 (m, 2H), 1.37-1.31 (m, 1H), 1.06-1.02 (m, 2H), 0.96-0.94 (m, 2H), 0.72-0.67 (m, 2H).

Example 229. N-(4-(4-(cyclopropylamino)-4-oxobutyl)-1-phenyl-1H-imidazol-2-yl)-3-(5-fluoro-1H-pyrazol-4-yl)benzamide

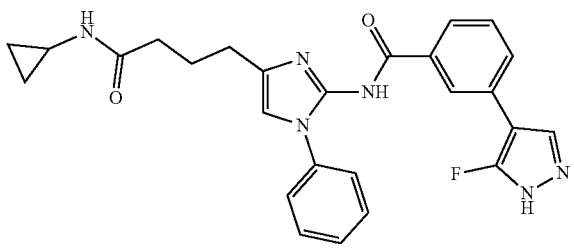 [SMILES: O=C(CCCc1cn(-c2ccccc2)c(NC(=O)c2cccc(-c3cn[nH]c3F)c2)n1)NC1CC1]

Step 1: methyl 4-(2-(3-(5-fluoro-1-((2-(trimethylsilyl)ethoxy)methyl)-1H-pyrazol-4-yl)benzamido)-1-phenyl-1H-imidazol-4-yl)butanoate A mixture of methyl 4-(2-amino-1-phenyl-1H-imidazol-4-yl)butanoate (Intermediate 26) (220 mg, 0.847 mmol), 3-(5-fluoro-1-((2-(trimethylsilyl)ethoxy)methyl)-1H-pyrazol-4-yl)benzoic acid (Intermediate 5) (285 mg, 0.847 mmol), HATU (483 mg, 1.27 mmol) and DIPEA (0.44 mL, 2.54 mmol) in DCM was stirred at room temperature for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (300 mg, 61%). $^1$H NMR (CDCl$_3$, 400 MHz): δ 8.45 (s, 1H), 8.09-8.06 (m, 1H), 7.78-7.72 (m, 1H), 7.70 (s, 1H), 7.62-7.58 (m, 1H), 7.58-7.50 (m, 2H), 7.41-7.35 (m, 2H), 6.63 (s, 1H), 5.29 (s, 2H), 3.70 (s, 3H), 3.63-3.59 (m, 2H), 2.68-2.64 (m, 2H), 2.46-2.42 (m, 2H), 2.04-2.00 (m, 2H), 0.95-0.91 (m, 2H), -0.01 (s, 9H).

Step 2: 4-(2-(3-(5-fluoro-1-((2-(trimethylsilyl)ethoxy)methyl)-1H-pyrazol-4-yl)benzamido)-1-phenyl-1H-imidazol-4-yl)butanoic acid To a solution of methyl 4-(2-(3-(5-fluoro-1-((2-(trimethylsilyl)ethoxy)methyl)-1H-pyrazol-4-yl)benzamido)-1-phenyl-1H-imidazol-4-yl)butanoate (285 mg, 0.493 mmol) in MeOH (10 mL) was added 1N—NaOH (2.0 mL, 2.0 mmol). The reaction mixture was stirred at room temperature for overnight. The mixture was evaporated under reduced pressure and acidified with 1N—HCl, filtered the solid to get the title compound (190 mg, 68%).

Step 3: N-(4-(4-(cyclopropylamino)-4-oxobutyl)-1-phenyl-1H-imidazol-2-yl)-3-(5-fluoro-1-((2-(trimethylsilyl)ethoxy)methyl)-1H-pyrazol-4-yl)benzamide A mixture of 4-(2-(3-(5-fluoro-1-((2-(trimethylsilyl)ethoxy)methyl)-1H-pyrazol-4-yl)benzamido)-1-phenyl-1H-imidazol-4-yl)butanoic acid (190 mg, 0.337 mmol), cyclopropylamine (23 mg, 0.404 mmol), HATU (192 mg, 0.505 mmol) and DIPEA (0.18 mL, 1.011 mmol) in DCM was stirred at room temperature for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (149 mg, 73%). $^1$H NMR (CDCl$_3$, 400 MHz): δ 8.44 (s, 1H), 8.08-8.04 (m, 1H), 7.76-7.72 (m, 2H), 7.70 (s, 1H), 7.62-7.58 (m, 1H), 7.55-7.50 (m, 2H), 7.42-7.36 (m, 2H), 6.64 (s, 1H), 5.90 (bs, 1H), 5.29 (s, 2H), 3.64-3.59 (m, 2H), 2.78-2.64 (m, 3H), 2.25-2.20 (m, 2H), 2.10-1.98 (m, 2H).

Step 4: N-(4-(4-(cyclopropylamino)-4-oxobutyl)-1-phenyl-1H-imidazol-2-yl)-3-(5-fluoro-1H-pyrazol-4-yl)benzamide To a solution of N-(4-(4-(cyclopropylamino)-4-oxobutyl)-1-phenyl-1H-imidazol-2-yl)-3-(5-fluoro-1-((2-(trimethylsilyl)ethoxy)methyl)-1H-pyrazol-4-yl)benzamide (205 mg, 0.34 mmol) in THF (20 mL) was added TBAF (1.0 M in THF, 1.7 mL, 1.7 mmol). The reaction mixture was reflux for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (59 mg, 37%). $^1$H NMR (CD$_3$OD, 400 MHz): δ 8.10-7.82 (m, 2H), 7.80-7.40 (m, 8H), 7.06 (s, 1H), 2.72-2.58 (m, 3H), 2.30-2.20 (m, 2H), 2.10-1.95 (m, 2H), 0.78-0.60 (m, 2H), 0.50-0.40 (m, 2H).

The following compounds were made in a similar manner to that described in Example 229 and in general scheme 1.

TABLE 16

| Ex. | Structure | Analytical data |
|---|---|---|
| 230 | 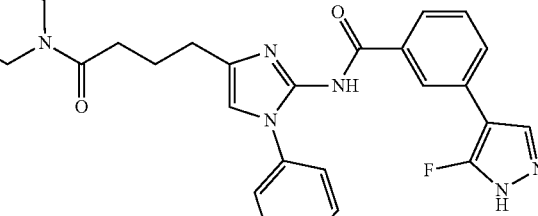 | ¹H NMR (CDCl₃, 400 MHz): δ 8.41 (s, 1H), 8.08-8.06 (m, 1H), 7.75-7.73 (m, 2H), 7.69 (s, 1H), 7.63-7.61 (m, 1H), 7.55-7.51 (m, 2H), 7.41-7.36 (m, 2H), 6.65 (s, 1H), 3.70-3.62 (m, 2H), 3.50-3.42 (m, 2H), 2.71-2.67 (m, 2H), 2.46-2.42 (m, 2H), 2.40-2.36 (m, 4H), 2.30 (s, 3H), 2.10-2.00 (m, 2H). |
| 231 | 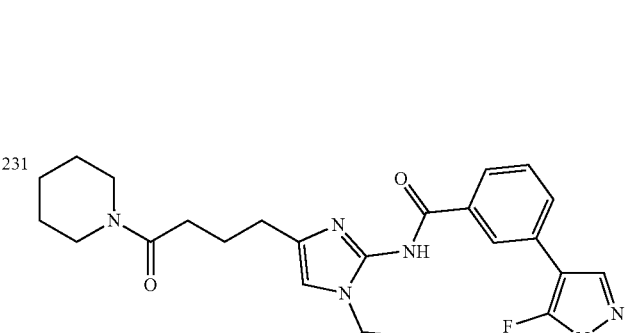 | ¹H NMR (CDCl₃, 400 MHz): δ 8.33 (s, 1H), 8.04-7.94 (m, 1H), 7.75-7.62 (m, 3H), 7.60-7.52 (m, 1H), 7.52-7.44 (m, 2H), 7.38-7.30 (m, 2H), 6.69 (s, 1H), 3.52-3.48 (m, 2H), 3.40-3.32 (m, 2H), 2.70-.2.60 (m, 2H), 2.42-2.39 (m, 2H), 2.02-1.96 (m, 2H), 1.64-1.46 (m, 6H). |

Example 232. N-(4-(4-(cyclopropylamino)-4-oxobutyl)-1-phenyl-1H-imidazol-2-yl)-3-(5-fluoro-1-methyl-1H-pyrazol-4-yl)benzamide Example 233. N-(4-(4-(cyclopropyl(methyl)amino)-4-oxobutyl)-1-phenyl-1H-imidazol-2-yl)-3-(5-fluoro-1-methyl-1H-pyrazol-4-yl)benzamide

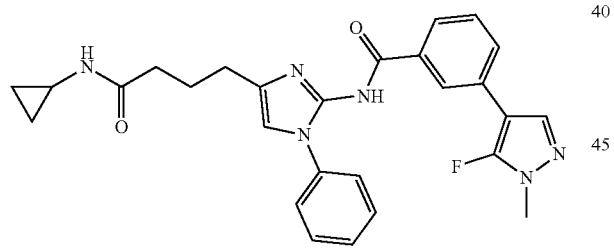

To a solution of N-(4-(4-(cyclopropylamino)-4-oxobutyl)-1-phenyl-1H-imidazol-2-yl)-3-(5-fluoro-1H-pyrazol-4-yl)benzamide (Example 229) (40 mg, 0.084 mmol) in anhydrous THF (5 mL) was added NaH (60% dispersion in mineral oil, 4.0 mg, 0.101 mmol) at 0° C. The reaction mixture was stirred at 0° C. for 30 min, and then iodomethane (13.2 mg, 0.093 mmol) was added dropwise. The reaction mixture was stirred at room temperature for 1 h, quenched with water and extracted with DCM dried over anhydrous Na₂SO₄ and concentrated under reduced pressure. Purification by silica gel column chromatography using ethyl acetate/hexane as the eluent to afford the title compound (7 mg, 17%). ¹H NMR (CDCl₃, 400 MHz): δ 8.39 (s, 1H), 8.05-8.03 (m, 1H), 7.75-7.72 (m, 2H), 7.60-7.48 (m, 3H), 7.41-7.35 (m, 2H), 6.65 (s, 1H), 5.72 (bs, 1H), 3.81 (s, 3H), 2.80-2.54 (m, 3H), 2.30-2.10 (m, 2H), 2.10-1.90 (m, 2H), 0.90-0.64 (m, 2H), 0.62-0.40 (m, 2H).

To a solution of N-(4-(4-(cyclopropylamino)-4-oxobutyl)-1-phenyl-1H-imidazol-2-yl)-3-(5-fluoro-1H-pyrazol-4-yl)benzamide (Example 229) (40 mg, 0.084 mmol) in anhydrous THF (5 mL) was added NaH (60% dispersion in mineral oil, 8.0 mg, 0.203 mmol) at 0° C. The reaction mixture was stirred at 0° C. for 30 min, and then iodomethane (26.4 mg, 0.186 mmol) was added dropwise. The reaction mixture was stirred at room temperature for 3 h, quenched with water and extracted with DCM, dried over anhydrous Na₂SO₄ and concentrated under reduced pressure. Purification by silica gel column chromatography using ethyl acetate/hexane as the eluent to afford the title compound (10 mg, 23%). ¹H NMR (CDCl₃, 400 MHz): δ 8.40 (s, 1H), 8.06-8.04 (m, 1H), 7.76-7.74 (m, 2H), 7.60-7.49 (m, 3H), 7.45-7.35 (m, 2H), 6.65 (s, 1H), 3.81 (s, 3H), 2.93 (s, 3H), 2.80-2.60 (m, 3H), 2.50-2.20 (m, 2H), 2.10-1.90 (m, 2H), 0.90-0.80 (m, 2H), 0.78-0.60 (m, 2H).

Example 234. N-(4-(4-(cyclopropylamino)-4-oxobutyl)-1-phenyl-1H-imidazol-2-yl)-3-(1-(fluoromethyl)-1H-pyrazol-4-yl)benzamide

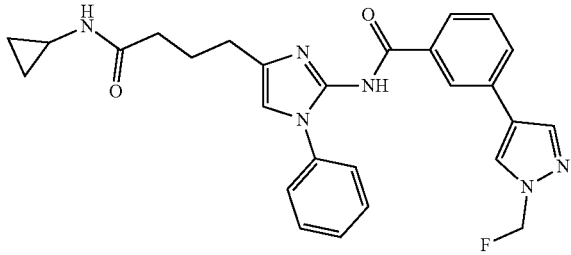 [SMILES: O=C(CCCc1cn(-c2ccccc2)c(NC(=O)c2cccc(-c3cnn(CF)c3)c2)n1)NC1CC1]

Step 1: methyl 4-(2-(3-(1-(fluoromethyl)-1H-pyrazol-4-yl)benzamido)-1-phenyl-1H-imidazol-4-yl)butanoate A mixture of methyl 4-(2-amino-1-phenyl-1H-imidazol-4-yl)butanoate (Intermediate 26) (364 mg, 1.40 mmol), 3-(1-(fluoromethyl)-1H-pyrazol-4-yl)benzoic acid (309 mg, 1.40 mmol), HATU (799 mg, 2.10 mmol) and DIPEA (0.73 mL, 4.20 mmol) in DCM was stirred at room temperature for overnight. The reaction mixture was quenched with water and extracted with DCM, dried over anhydrous $Na_2SO_4$ and concentrated under reduced pressure. Purification by silica gel column chromatography using DCM/MeOH as the eluent to afford the title compound (425 mg, 66%). $^1$H NMR ($CDCl_3$, 400 MHz): δ 8.36 (s, 1H), 8.10-8.08 (m, 1H), 7.97 (s, 1H), 7.90 (s, 1H), 7.74-7.71 (m, 2H), 7.57-7.50 (m, 3H), 7.42-7.38 (m, 2H), 6.63 (s, 1H), 6.12-5.99 (m, 2H), 3.70 (s, 3H), 2.69-2.65 (m, 2H), 2.46-2.40 (m, 2H), 2.08-2.00 (m, 2H).

Step 2: 4-(2-(3-(1-(fluoromethyl)-1H-pyrazol-4-yl)benzamido)-1-phenyl-1H-imidazol-4-yl)butanoic acid To a solution of methyl 4-(2-(3-(1-(fluoromethyl)-1H-pyrazol-4-yl)benzamido)-1-phenyl-1H-imidazol-4-yl)butanoate (420 mg, 0.91 mmol) in MeOH (10 mL) was added 1N—NaOH (3.64 mL, 3.64 mmol). The reaction mixture was stirred at room temperature for overnight. The mixture was evaporated under reduced pressure and acidified with 1N—HCl, filtered the solid to get the title compound (330 mg, 71%).

Step 3: N-(4-(4-(cyclopropylamino)-4-oxobutyl)-1-phenyl-1H-imidazol-2-yl)-3-(1-(fluoromethyl)-1H-pyrazol-4-yl)benzamide A mixture of 4-(2-(3-(1-(fluoromethyl)-1H-pyrazol-4-yl)benzamido)-1-phenyl-1H-imidazol-4-yl)butanoic acid (200 mg, 0.447 mmol), cyclopropylamine (30.6 mg, 0.536 mmol), HATU (255 mg, 0.670 mmol) and DIPEA (0.23 mL, 1.341 mmol) in DCM was stirred at room temperature for overnight. The reaction mixture was quenched with water and extracted with DCM, dried over anhydrous $Na_2SO_4$ and concentrated under reduced pressure. Purification by silica gel column chromatography using DCM/MeOH as the eluent to afford the title compound (116 mg, 53%). $^1$H NMR ($CDCl_3$, 400 MHz): δ 8.36 (s, 1H), 8.10-8.08 (m, 1H), 7.95 (s, 1H), 7.90 (s, 1H), 7.74-7.69 (m, 2H), 7.56-7.50 (m, 3H), 7.42-7.36 (m, 2H), 6.64 (s, 1H), 6.12-5.99 (m, 2H), 5.68 (bs, 1H), 2.78-2.60 (m, 3H), 2.26-2.20 (m, 2H)), 2.10-2.01 (m, 2H), 0.82-0.76 (m, 2H), 0.60-0.48 (m, 2H).

The following compounds were made in a similar manner to that described in Example 234 and in general scheme 1.

TABLE 17

| Ex. | Structure | Analytical data |
|---|---|---|
| 235 | | $^1$H NMR ($CDCl_3$, 400 MHz): δ 8.43-8.36 (m, 1H), 8.15-8.09 (m, 1H), 8.09-8.05 (m, 1H), 8.00-7.94 (m, 1H), 7.77-7.67 (m, 2H), 7.62-7.49 (m, 3H), 7.46-7.38 (m, 2H), 7.22 (t, J = 60.6 Hz, $CHF_2$, 1H), 6.67-6.63 (m, 1H), 5.67 (s, 1H), 2.78-2.62 (m, 3H), 2.29-2.20 (m, 2H), 2.12-1.97 (m, 2H), 0.82-0.74 (m, 2H), 0.55-0.47 (m, 2H). |
| 236 | | $^1$H NMR ($CDCl_3$, 400 MHz): δ 8.38 (s, 1H), 8.37-8.11 (m, 2H), 8.05 (s, 2H), 7.73-7.68 (m, 2H), 7.57-7.51 (m, 3H), 7.44-7.28 (m, 2H), 6.64 (s, 1H), 5.69 (bs, 1H), 2.78-2.65 (m, 3H), 2.26-2.22 (m, 2H), 2.04-2.01 (m, 2H), 0.80-0.75 (m, 2H), 0.52-0.50 (m, 2H). |

Example 237. 3-(1H-indazol-5-yl)-N-(4-(6-oxo-6-(piperidin-1-yl)hexyl)-1-phenyl-1H-imidazol-2-yl)benzamide

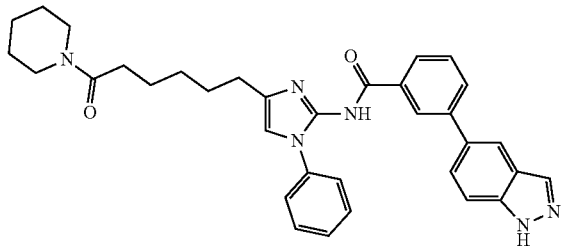 [SMILES: O=C(Nc1nc(CCCCCC(=O)N2CCCCC2)cn1-c1ccccc1)c1cccc(-c2ccc3[nH]ncc3c2)c1]

Step 1: methyl 6-(1-phenyl-2-(3-(1-((2-(trimethylsilyl)ethoxy)methyl)-1H-indazol-5-yl)benzamido)-1H-imidazol-4-yl)hexanoate A mixture of methyl 6-(2-amino-1-phenyl-1H-imidazol-4-yl)hexanoate (Intermediate 28) (4.05 g, 14.11 mmol), 3-(1-((2-(trimethylsilyl)ethoxy)methyl)-1H-indazol-5-yl)benzoic acid (Intermediate 11) (4.0 g, 10.85 mmol), HATU (6.19 g, 16.28 mmol) and DIPEA (5.67 mL, 32.56 mmol) in DCM was stirred at room temperature for overnight. The reaction mixture was quenched with water and extracted with DCM, dried over anhydrous $Na_2SO_4$ and concentrated under reduced pressure. Purification by silica gel column chromatography using DCM/MeOH as the eluent to afford the title compound (4.7 g, 68%). $^1$H NMR (CDCl$_3$, 400 MHz): δ 8.53 (s, 1H), 8.20-8.14 (m, 1H), 8.05 (s, 1H), 7.99 (s, 1H), 7.80-7.74 (m, 3H), 7.74-7.68 (m, 1H), 7.66-7.61 (m, 1H), 7.56-7.42 (m, 3H), 7.41-7.35 (m, 1H), 6.60 (s, 1H), 5.77 (s, 2H), 3.67 (s, 3H), 3.62-3.58 (m, 2H), 2.62-2.58 (m, 2H), 2.36-2.32 (m, 2H), 1.76-1.64 (m, 4H), 1.50-1.40 (m, 2H), 0.93-0.88 (m, 2H), −0.05 (s, 9H).

Step 2: 6-(1-phenyl-2-(3-(1-((2-(trimethylsilyl)ethoxy)methyl)-1H-indazol-5-yl)benzamido)-1H-imidazol-4-yl)hexanoic acid To a solution of methyl 6-(1-phenyl-2-(3-(1-((2-(trimethylsilyl)ethoxy)methyl)-1H-indazol-5-yl)benzamido)-1H-imidazol-4-yl)hexanoate (1.9 g, 2.98 mmol) in MeOH (20 mL) was added 1N—NaOH (11.92 mL, 11.92 mmol). The reaction mixture was stirred at room temperature for overnight. The mixture was evaporated under reduced pressure and acidified with 1N—HCl, extracted with DCM. The organic phase was dried over anhydrous $Na_2SO_4$ and concentrated under reduced pressure to afford the title compound (900 mg, 46%).

Step 3: N-(4-(6-oxo-6-(piperidin-1-yl)hexyl)-1-phenyl-1H-imidazol-2-yl)-3-(1-((2-(trimethylsilyl)ethoxy)methyl)-1H-indazol-5-yl)benzamide A mixture of 6-(1-phenyl-2-(3-(1-((2-(trimethylsilyl)ethoxy)methyl)-1H-indazol-5-yl)benzamido)-1H-imidazol-4-yl)hexanoic acid (200 mg, 0.321 mmol), piperidine (41 mg, 0.481 mmol), HATU (183 mg, 0.481 mmol) and DIPEA (0.17 mL, 0.962 mmol) in DCM was stirred at room temperature for overnight. The reaction mixture was quenched with water and extracted with DCM, dried over anhydrous $Na_2SO_4$ and concentrated under reduced pressure. Purification by silica gel column chromatography using DCM/MeOH as the eluent to afford the title compound (150 mg, 68%). $^1$H NMR (CDCl$_3$, 400 MHz): δ 8.53 (s, 1H), 8.20-8.12 (m, 1H), 8.06 (s, 1H), 7.99 (s, 1H), 7.80-7.72 (m, 3H), 7.72-7.69 (m, 1H), 7.66-7.61 (m, 1H), 7.54-7.50 (m, 2H), 7.49-7.45 (m, 1H), 7.41-7.38 (m, 1H), 6.62 (s, 1H), 5.77 (s, 2H), 3.60-3.50 (m, 4H), 3.42-3.36 (m, 2H), 2.66-2.58 (m, 2H), 2.38-2.30 (m, 2H), 1.80-1.40 (m, 12H), 0.93-0.88 (m, 2H), −0.05 (s, 9H).

Step 4: 3-(1H-indazol-5-yl)-N-(4-(6-oxo-6-(piperidin-1-yl)hexyl)-1-phenyl-1H-imidazol-2-yl)benzamide To a solution of N-(4-(6-oxo-6-(piperidin-1-yl)hexyl)-1-phenyl-1H-imidazol-2-yl)-3-(1-((2-(trimethylsilyl)ethoxy)methyl)-1H-indazol-5-yl)benzamide (300 mg, 0.434 mmol) in THF (20 mL) was added TBAF (1.0 M in THF, 2.17 mL, 2.17 mmol). The reaction mixture was reflux for overnight. The reaction mixture was quenched with water and extracted with DCM, dried over anhydrous $Na_2SO_4$ and concentrated under reduced pressure. Purification by silica gel column chromatography using DCM/MeOH as the eluent to afford the title compound (55 mg, 23%). $^1$H NMR (CDCl$_3$, 400 MHz): δ 8.45 (s, 1H), 8.10-8.07 (m, 1H), 8.05 (s, 1H), 7.96 (s, 1H), 7.77-7.62 (m, 4H), 7.56-7.42 (m, 4H), 7.40-7.38 (m, 1H), 6.61 (s, 1H), 3.51-3.48 (m, 2H), 3.39-3.35 (m, 2H), 2.62-2.59 (m, 2H), 2.35-2.31 (m, 2H), 1.8-1.4 (m, 12H).

The following compounds were made in a similar manner to that described in Example 237 and in general scheme 1.

TABLE 18

| Ex. | Structure | Analytical data |
| --- | --- | --- |
| 238 | ![structure] | $^1$H NMR (CDCl$_3$, 400 MHz): δ 8.51 (s, 1H), 8.17-8.15 (m, 1H), 8.11 (s, 1H), 7.98 (s, 1H), 7.75-7.64 (m, 4H), 7.56-7.44 (m, 4H), 7.39-7.36 (m, 1H), 6.60 (s, 1H), 5.80 (bs, 1H), 2.72-2.64 (m, 1H), 2.64-2.58 (m, 2H), 2.20-2.10 (m, 2H), 1.78-1.64 (m, 4H), 1.46-1.38 (m, 2H), 0.80-0.70 (m, 2H), 0.60-0.40 (m, 2H). |

TABLE 18-continued

| Ex. | Structure | Analytical data |
|---|---|---|
| 239 | | $^1$H NMR (CDCl$_3$, 400 MHz): δ 8.52 (s, 1H), 8.18-8.16 (m, 1H), 8.12 (s, 1H), 8.01 (s, 1H), 7.76-7.74 (m, 2H), 7.72-7.69 (m, 2H), 7.57-7.45 (m, 4H), 7.40-7.38 (m, 1H), 6.62 (s, 1H), 3.68-3.62 (m, 2H), 3.50-3.44 (m, 2H), 2.64-2.60 (m, 2H), 2.44-2.30 (m, 6H), 2.30 (m, 3H), 1.80-1.68 (m, 4H), 1.52-1.40 (m, 2H). |
| 240 | | $^1$H NMR (CDCl$_3$, 400 MHz): δ 8.46 (s, 1H), 8.11-8.08 (m, 2H), 8.00 (s, 1H), 7.76-7.70 (m, 4H), 7.61-7.58 (m, 1H), 7.56-7.50 (m, 2H), 7.50-7.46 (m, 2H), 7.44-7.39 (m, 1H), 6.69 (s, 1H), 3.47-3.42 (m, 2H), 3.39-3.37 (m, 2H), 2.68-2.62 (m, 2H), 2.34-2.29 (m, 2H), 2.01-1.94 (m, 2H), 1.91-1.84 (m, 2H), 1.78-1.68 (m, 4H), 1.52-1.45 (m, 2H). |
| 241 | | $^1$H NMR (CDCl$_3$, 400 MHz) δ 8.53 (s, 1H), 8.20-8.16 (m, 1H), 8.13 (s, 1H), 8.02-7.99 (m, 1H), 7.79-7.75 (m, 2H), 7.74-7.69 (m, 2H), 7.58-7.48 (m, 4H), 7.47-7.36 (m, 2H), 6.62 (s, 1H), 3.56-3.51 (m, 2H), 3.45-3.37 (m, 3H), 3.15-3.11 (m, 1H), 2.65-2.59 (m, 2H), 2.45-2.40 (m, 1H), 2.37-2.32 (m, 2H), 2.06-2.01 (m, 1H), 1.76-1.68 (m, 4H), 1.60-1.54 (m, 4H), 1.49-1.40 (m, 2H). |
| 242 | | $^1$H NMR (CDCl$_3$, 400 MHz,) δ 8.53-8.44 (m, 1H), 8.24-8.14 (m, 1H), 7.99-7.81 (m, 2H), 7.75-7.67 (m, 2H), 7.67-7.63 (m, 1H), 7.62-7.57 (m, 1H), 7.54-7.40 (m, 3H), 7.39-7.30 (m, 2H), 6.59 (s, 1H), 3.63-3.51 (m, 2H), 3.44-3.32 (m, 2H), 2.69-2.56 (m, 2H), 2.41-2.30 (m, 2H), 1.77-1.65 (m, 4H), 1.65-1.58 (m, 2H), 1.58-1.49 (m, 4H), 1.49-140 (m, 2H). |
| 243 | | $^1$H NMR (CD$_3$OD, 400 MHz): δ 8.12-8.03 (m, 3H), 7.90-7.60 (m, 5H), 7.60-7.40 (m, 6H), 7.28 (s, 1H), 5.83 (s, 1H), 3.57 (s, 2H), 2.78 (s, 3H). |

TABLE 18-continued

| Ex. | Structure | Analytical data |
|---|---|---|
| 244 | | $^1$H NMR (CDCl$_3$, 400 MHz): δ 8.53-8.47 (m, 1H), 8.20-8.09 (m, 2H), 8.02-7.97 (m, 1H), 7.78-7.65 (m, 4H), 7.59-7.43 (m, 4H), 7.42-7.33 (m, 1H), 6.68-6.63 (m, 1H), 5.66 (s, 1H), 2.82 (d, J = 5.2 Hz, 3H), 2.67 (t, J = 7.2 Hz, 2H), 2.29 (t, J = 12 Hz, 2H), 2.11-1.97 (m, 2H). |
| 245 | | $^1$H NMR (CDCl$_3$, 400 MHz): δ 8.55-8.45 (m, 1H), 8.21-8.08 (m, 2H), 8.02-7.95 (m, 1H), 7.80-7.62 (m, 4H), 7.60-7.43 (m, 4H), 7.43-7.33 (m, 1H), 6.68-6.61 (m, 1H), 5.78 (s, 1H), 2.79-2.63 (m, 3H), 2.30-2.20 (m, 2H), 2.12-1.97 (m, 2H), 0.81-0.73 (m, 2H), 0.55-0.45 (m, 2H). |
| 246 | | $^1$H NMR (CDCl$_3$, 400 MHz): δ 8.52 (s, 1H), 8.18-8.16 (m, 1H), 8.12 (s, 1H), 8.00 (s, 1H), 7.77-7.72 (m, 2H), 7.71-7.69 (m, 2H), 7.57-7.44 (m, 4H), 7.40-7.38 (m, 1H), 6.65 (s, 1H), 3.61-3.56 (m, 2H), 3.43-3.39 (m, 2H), 2.71-2.67 (m, 2H), 2.46-2.42 (m, 2H), 2.08-2.02 (m, 2H), 1.70-1.50 (m, 6H). |
| 247 | | $^1$H NMR (CDCl$_3$, 400 MHz): δ 8.52 (s, 1H), 8.18-8.16 (m, 1H), 8.12 (s, 1H), 8.00 (s, 1H), 7.76-7.74 (m, 2H), 7.72-7.69 (m, 2H), 7.57-7.44 (m, 4H), 7.40-7.38 (m, 1H), 6.65 (s, 1H), 3.68-3.62 (m, 2H), 3.50-3.44 (m, 2H), 2.71-2.67 (m, 2H), 2.50-2.38 (m, 6H), 2.30 (m, 3H), 2.07-2.03 (m, 2H). |
| 248 | | $^1$H NMR (CDCl$_3$, 400 MHz): δ 8.53 (s, 1H), 8.20-8.12 (m, 2H), 7.74-7.72 (m, 1H), 7.66-7.60 (m, 3H), 7.50-7.30 (m, 5H), 7.30-7.23 (m, 1H), 6.57 (s, 1H), 5.88 (bs, 1H), 2.78-2.50 (m, 3H), 2.30-2.10 (m, 2H), 2.04-1.84 (m, 2H), 0.80-0.70 (m, 2H), 0.60-0.40 (m, 2H). |
| 249 | | $^1$H NMR (CDCl$_3$, 400 MHz) δ 8.61 (s, 1H), 8.28 (s, 1H), 8.25-8.21 (m, 1H), 7.79-7.71 (m, 3H), 7.55-7.44 (m, 5H), 7.39-7.28 (m, 2H), 6.65 (s, 1H), 5.70 (bs, 1H), 2.75-2.65 (m, 3H), 2.28-2.23 (m, 2H), 2.08-2.02 (m, 2H), 0.80-0.76 (m, 2H), 0.54-0.49 (m, 2H). |

TABLE 18-continued

| Ex. | Structure | Analytical data |
|---|---|---|
| 250 | | ¹H NMR (CDCl₃, 400 MHz): δ 8.53 (s, 1H), 8.17-8.15 (m, 2H), 8.07 (s, 1H), 7.79-7.76 (m, 1H), 7.74-7.66 (m, 4H), 7.52-7.38 (m, 5H), 6.65 (s, 1H), 5.90 (bs, 1H), 2.78-2.50 (m, 3H), 2.30-2.10 (m, 2H), 2.04-1.84 (m, 2H), 0.80-0.70 (m, 2H), 0.60-0.40 (m, 2H). |

Example 251. 3-(1-methyl-1H-indazol-5-yl)-N-(4-(6-oxo-6-(piperidin-1-yl)hexyl)-1-phenyl-1H-imidazol-2-yl)benzamide

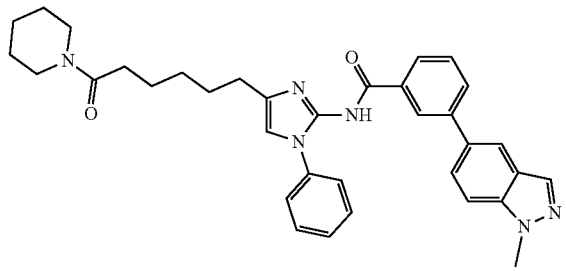 [SMILES: Cn1ncc2cc(-c3cccc(C(=O)Nc4nc(CCCCCC(=O)N5CCCCC5)cn4-c4ccccc4)c3)ccc21]

Step 1: methyl 6-(2-(3-(1-methyl-1H-indazol-5-yl)benzamido)-1-phenyl-1H-imidazol-4-yl)hexanoate A mixture of methyl 6-(2-amino-1-phenyl-1H-imidazol-4-yl)hexanoate (Intermediate 28) (1.0 g, 3.48 mmol), 3-(1-methyl-1H-indazol-5-yl)benzoic acid (Intermediate 11) (878 mg, 3.48 mmol), HATU (1.98 g, 5.22 mmol) and DIPEA (1.82 mL, 10.44 mmol) in DCM was stirred at room temperature for overnight. The reaction mixture was quenched with water and extracted with DCM, dried over anhydrous Na₂SO₄ and concentrated under reduced pressure. Purification by silica gel column chromatography using DCM/MeOH as the eluent to afford the title compound (1.05 g, 58%). ¹H NMR (CDCl₃, 400 MHz): δ 8.52 (s, 1H), 8.17-8.14 (m, 1H), 8.02 (s, 1H), 7.97 (s, 1H), 7.78-7.68 (m, 4H), 7.54-7.45 (m, 4H), 7.41-7.37 (m, 1H), 6.60 (s, 1H), 4.10 (s, 3H), 3.65 (s, 3H), 2.65-2.58 (m, 2H), 2.39-2.31 (m, 2H), 1.78-1.65 (m, 4H), 1.52-1.39 (m, 2H).

Step 2: 6-(2-(3-(1-methyl-1H-indazol-5-yl)benzamido)-1-phenyl-1H-imidazol-4-yl)hexanoic acid To a solution of methyl 6-(2-(3-(1-methyl-1H-indazol-5-yl)benzamido)-1-phenyl-1H-imidazol-4-yl)hexanoate (535 mg, 1.025 mmol) in MeOH (20 mL) was added 1N—NaOH (4.1 mL, 4.1 mmol). The reaction mixture was stirred at room temperature for overnight. The mixture was evaporated under reduced pressure and acidified with 1N—HCl, filtered the solid to get the title compound (366 mg, 70%).

Step 3: 3-(1-methyl-1H-indazol-5-yl)-N-(4-(6-oxo-6-(piperidin-1-yl)hexyl)-1-phenyl-1H-imidazol-2-yl)benzamide A mixture of 6-(2-(3-(1-methyl-1H-indazol-5-yl)benzamido)-1-phenyl-1H-imidazol-4-yl)hexanoic acid (130 mg, 0.256 mmol), piperidine (33 mg, 0.384 mmol), HATU (146 mg, 0.384 mmol) and DIPEA (0.13 mL, 0.768 mmol) in DCM was stirred at room temperature for overnight. The reaction mixture was quenched with water and extracted with DCM, dried over anhydrous Na₂SO₄ and concentrated under reduced pressure. Purification by silica gel column chromatography using DCM/MeOH as the eluent to afford the title compound (80 mg, 54%). ¹H NMR (CDCl₃, 400 MHz): δ 8.53 (s, 1H), 8.17-8.15 (m, 1H), 8.02 (s, 1H), 7.96 (s, 1H), 7.77-7.69 (m, 4H), 7.54-7.50 (m, 2H), 7.46-7.38 (m, 3H), 6.61 (s, 1H), 4.11 (s, 3H), 3.55-3.53 (m, 2H), 3.41-3.37 (m, 2H), 2.62-2.59 (m, 2H), 2.35-2.31 (m, 2H), 1.80-1.40 (m, 12H).

Example 252. 3-(1H-indazol-5-yl)-N-(1-phenyl-4-(6-(piperidin-1-yl)hexyl)-1H-imidazol-2-yl)benzamide

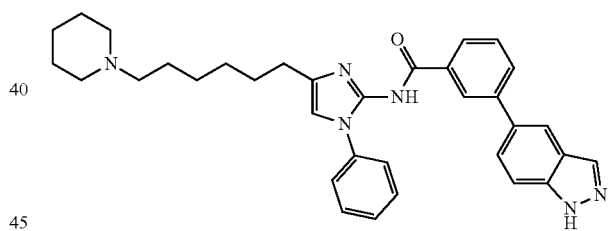

Step 1: N-(4-(6-hydroxyhexyl)-1-phenyl-1H-imidazol-2-yl)-3-(1-((2-(trimethylsilyl)ethoxy)methyl)-1H-indazol-5-yl)benzamide To a solution of methyl 6-(1-phenyl-2-(3-(1-((2-(trimethylsilyl)ethoxy)methyl)-1H-indazol-5-yl)benzamido)-1H-imidazol-4-yl)hexanoate (Example 237, Step 1) (410 mg, 0.643 mmol) in anhydrous THF (10 mL) was added LiAlH₄ (1.0 M in THF, 0.65 mL, 0.65 mmol) at −78° C. The reaction mixture was stirred at room temperature for 1 h, quenched with water, 15%-NaOH and stirred for 1 h. The mixture filtered through celite, filterate was concentrated under reduced pressure. Purification by silica gel column chromatography using DCM/MeOH as the eluent to afford the title compound (274 mg, 70%). ¹H NMR (CDCl₃, 400 MHz): δ 8.53 (s, 1H), 8.20-8.15 (m, 1H), 8.06 (s, 1H), 7.99 (s, 1H), 7.80-7.72 (m, 3H), 7.73-7.70 (m, 1H), 7.66-7.6 (m, 1H), 7.55-7.49 (m, 2H), 7.49-7.42 (m, 1H), 7.42-7.38 (m, 1H), 6.60 (s, 1H), 5.78 (s, 2H), 3.68-3.62 (m, 2H, 3.60-3.56 (m, 2H), 2.64-2.58 (m, 2H), 1.75-1.68 (m, 2H), 1.62-1.50 (m, 2H), 1.50-1.38 (m, 4H), 0.92-0.86 (m, 2H), −0.05 (s, 9H).

Step 2: N-(4-(6-oxohexyl)-1-phenyl-1H-imidazol-2-yl)-3-(1-((2-(trimethylsilyl)ethoxy)methyl)-1H-indazol-5-yl)benzamide To a solution of oxalyl chloride (93 µL, 1.082 mmol) in anhydrous DCM was added dropwise a solution of DMSO (0.15 mL, 2.165 mmol) in DCM at −78° C. After 15 min, to the mixture was added dropwise a solution of N-(4-(6-hydroxyhexyl)-1-phenyl-1H-imidazol-2-yl)-3-(1-((2-(trimethylsilyl)ethoxy)methyl)-1H-indazol-5-yl)benzamide (550 mg, 0.902 mmol) in DCM over 10 min. After 1 h, TEA (0.63 mL, 4.509 mmol) was added and the reaction mixture warmed to room temperature. The reaction mixture was quenched with water extracted with DCM. The organic phase was washed with 1N—HCl, sat. aq. NaHCO₃, brine, dried over anhydrous Na₂SO₄ and concentrated under reduced pressure to afford the title compound (380 mg, 69%).

Step 3: N-(1-phenyl-4-(6-(piperidin-1-yl)hexyl)-1H-imidazol-2-yl)-3-(1-((2-(trimethylsilyl)ethoxy)methyl)-1H-indazol-5-yl)benzamide To a solution of N-(4-(6-oxohexyl)-1-phenyl-1H-imidazol-2-yl)-3-(1-((2-(trimethylsilyl)ethoxy)methyl)-1H-indazol-5-yl)benzamide (180 mg, 0.296 mmol) and piperidine (58 µL, 0.593 mmol) in THF was added NaBH₃CN (37.3 mg, 0.593 mmol). The reaction mixture was stirred at room temperature for overnight. The reaction mixture was quenched with water and extracted with DCM, dried over anhydrous Na₂SO₄ and concentrated under reduced pressure. Purification by silica gel column chromatography using DCM/MeOH as the eluent to afford the title compound (110 mg, 55%). $^1$H NMR (CDCl₃, 400 MHz): δ 8.53 (s, 1H), 8.20-8.16 (m, 1H), 8.06 (s, 1H), 7.99 (s, 1H), 7.80-7.70 (m, 4H), 7.68-7.62 (m, 1H), 7.54-7.42 (m, 3H), 7.41-7.37 (m, 1H), 6.59 (s, 1H), 5.77 (s, 2H), 3.62-3.56 (m, 2H), 2.62-2.58 (m, 2H), 2.50-2.30 (m, 6H), 1.75-1.68 (m, 2H), 1.68-1.50 (m, 6H), 1.50-1.30 (m, 6H), 0.93-0.88 (m, 2H), −0.05 (s, 9H).

Step 4: 3-(1H-indazol-5-yl)-N-(1-phenyl-4-(6-(piperidin-1-yl)hexyl)-1H-imidazol-2-yl)benzamide To a solution of N-(1-phenyl-4-(6-(piperidin-1-yl)hexyl)-1H-imidazol-2-yl)-3-(1-((2-(trimethylsilyl)ethoxy)methyl)-1H-indazol-5-yl)benzamide (100 mg, 0.418 mmol) in THF (20 mL) was added TBAF (1.0 M in THF, 0.74 mL, 0.74 mmol). The reaction mixture was reflux for overnight. The reaction mixture was quenched with water and extracted with DCM, dried over anhydrous Na₂SO₄ and concentrated under reduced pressure. Purification by silica gel column chromatography using DCM/MeOH as the eluent to afford the title compound (55 mg, 23%). $^1$H NMR (CD₃OD, 400 MHz): δ 8.22 (s, 1H), 8.12 (s, 1H), 8.03 (s, 1H), 7.86-7.84 (m, 2H), 7.77-7.48 (m, 7H), 7.43-7.42 (m, 1H), 7.08 (s, 1H), 3.28-2.92 (m, 6H), 2.68-2.64 (m, 2H), 1.82-1.58 (m, 10H), 1.58-1.40 (m, 4H).

The following compounds were made in a similar manner to that described in Example 252 and in general scheme 1.

TABLE 19

| Ex. | Structure | Analytical data |
| --- | --- | --- |
| 253 | | $^1$H NMR (CDCl₃, 400 MHz): δ 8.55 (s, 1H), 8.38 (s, 1H), 8.13-8.11 (m, 1H), 7.92 (s, 1H), 7.77-7.72 (m, 3H), 7.54-7.50 (m, 3H), 7.46-7.44 (m, 2H), 7.41-7.38 (m, 1H), 7.23-7.20 (m, 1H), 6.61 (s, 1H), 6.58 (s, 1H), 2.62-2.57 (m, 2H), 2.56-2.30 (m, 6H), 1.72-1.60 (m, 8H), 1.50-1.30 (m, 6H). |
| 254 | | $^1$H NMR (CDCl₃, 400 MHz): δ 8.52 (s, 1H), 8.18-8.15 (m, 1H), 8.12 (s, 1H), 8.01 (s, 1H), 7.77-7.70 (m, 4H), 7.58-7.42 (m, 4H), 7.40-7.38 (m, 1H), 6.59 (s, 1H), 3.74-3.71 (m, 4H), 2.62-2.58 (m, 2H), 2.50-2.30 (m, 6H), 1.74-1.56 (m, 2H), 1.56-1.49 (m, 2H), 1.49-1.38 (m, 4H). |

TABLE 19-continued

| Ex. | Structure | Analytical data |
|---|---|---|
| 255 | | ¹H NMR (CD₃OD, 400 MHz): δ 8.38-8.23 (m, 1H), 8.19-8.11 (m, 1H), 8.04-7.91 (m, 1H), 7.91-7.82 (m, 2H), 7.67-7.53 (m, 4H), 7.53-7.44 (m, 3H) 7.44-7.36 (m, 1H), 7.31-7.22 (m, 1H), 7.05 (s, 1H), 3.12-2.89 (m, 4H), 2.89-2.77 (m, 2H), 2.71-2.59 (m, 2H), 1.84-1.64 (m, 8H), 1.64-1.54 (m, 2H), 1.54-1.38 (m, 4H). |
| 256 | | ¹H NMR (CDCl₃, 400 MHz): δ 8.09 (s, 1H), 7.99 (s, 1H), 7.78-7.67 (m, 4H), 7.60-7.57 (m, 2H), 7.53-7.46 (m, 4H), 7.42-7.38 (m, 1H), 6.76 (s, 1H), 2.99-2.90 (m, 6H), 2.70-2.66 (m, 2H), 1.90-1.81 (m, 8H), 1.79-1.73 (m, 2H). |
| 257 | | ¹H NMR (CDCl₃, 400 MHz) δ 8.62 (s, 1H), 8.28 (s, 1H), 8.25-8.22 (m, 1H), 7.79-7.71 (m, 3H), 7.55-7.44 (m, 5H), 7.38-7.29 (m, 2H), 6.61 (s, 1H), 2.65-2.60 (m, 2H), 2.49-2.38 (m, 6H), 1.74-1.62 (m, 8H), 1.49-1.42 (m, 2H). |

Example 258. 3-(1H-indazol-5-yl)-N-(4-(4-(2-oxopyrrolidin-1-yl)butyl)-1-phenyl-1H-imidazol-2-yl)benzamide

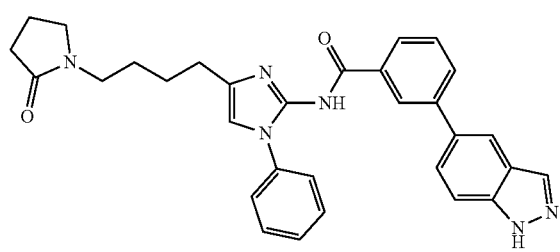 [SMILES: O=C(Nc1nc(CCCCN2CCCC2=O)cn1-c1ccccc1)c1cccc(-c2ccc3[nH]ncc3c2)c1]

Step 1: N-(4-(4-(2-oxopyrrolidin-1-yl)butyl)-1-phenyl-1H-imidazol-2-yl)-3-(1-((2-(trimethylsilyl)ethoxy)methyl)-1H-indazol-5-yl)benzamide To a solution of N-(4-(4-oxobutyl)-1-phenyl-1H-imidazol-2-yl)-3-(1-((2-(trimethylsilyl)ethoxy)methyl)-1H-indazol-5-yl)benzamide (Example 256, step 2) (340 mg, 0.586 mmol) in MeOH (20 mL) was added ethyl 4-aminobutyrate hydrochloride (118 mg, 0.703 mmol), TEA (0.11 mL, 0.762 mmol). The reaction mixture was stirred at room temperature for 30 min and then NaBH₃CN was added. The reaction mixture was stirred at 45° C. for overnight. The reaction mixture was quenched with water and extracted with DCM, dried over anhydrous Na₂SO₄ and concentrated under reduced pressure. Purification by silica gel column chromatography using DCM/MeOH as the eluent to afford the title compound (100 mg, 26%).

Step 2: 3-(1H-indazol-5-yl)-N-(4-(4-(2-oxopyrrolidin-1-yl)butyl)-1-phenyl-1H-imidazol-2-yl)benzamide To a solution of N-(4-(4-(2-oxopyrrolidin-1-yl)butyl)-1-phenyl-1H-imidazol-2-yl)-3-(1-((2-(trimethylsilyl)ethoxy)methyl)-1H-indazol-5-yl)benzamide (100 mg, 0.154 mmol) in THF (10 mL) was added TBAF (1.0 M in THF, 0.77 mL, 0.77 mmol). The reaction mixture was reflux for overnight. The reaction mixture was quenched with water and extracted with DCM, dried over anhydrous Na₂SO₄ and concentrated under reduced pressure. Purification by silica gel column chromatography using DCM/MeOH as the eluent to afford the title compound (30 mg, 37%). ¹H NMR (CDCl₃, 400 MHz): δ 8.51 (s, 1H), 8.18-8.16 (m, 1H), 8.12 (s, 1H), 8.00 (s, 1H), 7.76-7.74 (m, 2H), 7.72-7.69 (m, 2H), 7.57-7.44 (m, 4H), 7.40-7.38 (m, 1H), 6.62 (s, 1H), 3.40-3.32 (m, 4H), 2.66-2.60 (m, 2H), 2.43-2.39 (m, 2H), 2.06-2.00 (m, 2H), 1.80-1.60 (m, 4H).

The following compounds were made in a similar manner to that described in Example 258 and in general scheme 1.

TABLE 20

| Ex. | Structure | Analytical data |
|---|---|---|
| 259 | | $^1$H NMR (CDCl$_3$, 400 MHz): δ 8.52 (s, 1H), 8.18-8.16 (m, 1H), 8.13 (s, 1H), 8.01 (s, 1H), 7.76-7.74 (m, 2H), 7.72-7.69 (m, 2H), 7.57-7.45 (m, 4H), 7.40-7.38 (m, 1H), 6.60 (s, 1H), 3.39-3.32 (m, 2H), 3.30-3.26 (m, 2H), 2.61-2.57 (m, 2H), 2.41-2.36 (m, 2H), 2.03-1.99 (m, 2H), 1.71-1.65 (m, 2H), 1.56-1.50 (m, 2H), 1.50-1.40 (m, 2H), 1.38-1.34 (m, 2H). |
| 260 | | $^1$H NMR (CDCl$_3$, 400 MHz): δ 8.52 (s, 1H), 8.18-8.16 (m, 1H), 8.12 (s, 1H), 8.01 (s, 1H), 7.76-7.62 (m, 4H), 7.57-7.45 (m, 4H), 7.40-7.38 (m, 1H), 6.60 (s, 1H), 3.39-3.32 (m, 2H), 3.30-3.26 (m, 2H), 2.61-2.57 (m, 2H), 2.41-2.36 (m, 2H), 1.88-1.62 (m, 6H), 1.62-1.50 (m, 2H), 1.50-1.30 (m, 4H). |

Example 261. N-(4-(4-(cyclopropanecarboxamido)butyl)-1-phenyl-1H-imidazol-2-yl)-3-(1H-indazol-5-yl)benzamide

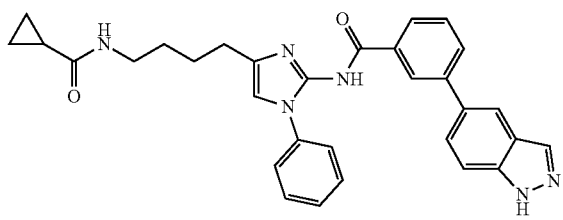 [SMILES: O=C(Nc1nc(CCCCNC(=O)C2CC2)cn1-c1ccccc1)c1cccc(-c2ccc3[nH]ncc3c2)c1]

Step 1: N-(4-(4-(hydroxyimino)butyl)-1-phenyl-1H-imidazol-2-yl)-3-(1-((2-(trimethylsilyl)ethoxy)methyl)-1H-indazol-5-yl)benzamide To a solution of N-(4-(4-oxobutyl)-1-phenyl-1H-imidazol-2-yl)-3-(1-((2-(trimethylsilyl)ethoxy)methyl)-1H-indazol-5-yl)benzamide (Example 256, step 2) (300 mg, 0.517 mmol) in EtOH (15 mL) was added TEA (0.18 mL, 1.242 mmol), hydroxylamine hydrochloride (68.3 mg, 0.983 mmol). The reaction mixture was stirred at room temperature for 3 h. The solid was filtered and washed with EtOH (5 mL) to afford the title compound (280 mg, 90%).

Step 2: N-(4-(4-aminobutyl)-1-phenyl-1H-imidazol-2-yl)-3-(1-((2-(trimethylsilyl)ethoxy)methyl)-1H-indazol-5-yl)benzamide To a solution of N-(4-(4-(hydroxyimino)butyl)-1-phenyl-1H-imidazol-2-yl)-3-(1-((2-(trimethylsilyl)ethoxy)methyl)-1H-indazol-5-yl)benzamide (280 mg, 0.47 mmol) in THF was added 2N—HCl (6.0 mL), zinc powder (615 mg, 9.41 mmol). The reaction mixture was reflux for 2 h. The reaction mixture was extracted with DCM/water and concentrated under reduced pressure to afford the title compound (crude obtained).

Step 3: N-(4-(4-(cyclopropanecarboxamido)butyl)-1-phenyl-1H-imidazol-2-yl)-3-(1-methyl-1H-pyrazol-4-yl)benzamide A mixture of N-(4-(4-aminobutyl)-1-phenyl-1H-imidazol-2-yl)-3-(1-((2-(trimethylsilyl)ethoxy)methyl)-1H-indazol-5-yl)benzamide (300 mg, 0.52 mmol), cyclopropanecarboxylic acid (54 mg, 0.62 mmol), EDCI (150 mg, 0.77 mmol), HOBt (105 mg, 0.77 mmol) and DIPEA (0.45 mL, 2.58 mmol) in DMF was stirred at room temperature for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (53 mg, 20%).

Step 4: N-(4-(4-(cyclopropanecarboxamido)butyl)-1-phenyl-1H-imidazol-2-yl)-3-(1H-indazol-5-yl)benzamide To a solution of N-(4-(4-(cyclopropanecarboxamido)butyl)-1-phenyl-1H-imidazol-2-yl)-3-(1-methyl-1H-pyrazol-4-yl)benzamide (53 mg, 0.082 mmol) in THF (10 mL) was added TBAF (1.0 M in THF, 0.41 mL, 0.41 mmol). The reaction mixture was reflux for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (16.5 mg, 39%). $^1$H NMR (CDCl$_3$, 400 MHz): δ 8.49 (s, 1H), 8.16-8.14 (m, 1H), 8.10 (s, 1H), 7.98 (s, 1H), 7.76-7.64 (m, 4H), 7.58-7.42 (m, 4H), 7.40-7.37 (m, 1H), 6.60 (s, 1H), 5.72 (bs, 1H), 3.36-3.30 (m, 2H), 2.64-2.60 (m, 2H), 1.80-1.60 (m, 4H), 1.38-1.28 (m, 1H), 0.98-0.92 (m, 2H), 0.78-0.70 (m, 2H).

Example 262. N-(4-(6-(cyclopropanecarboxamido)hexyl)-1-phenyl-1H-imidazol-2-yl)-3-(1H-indazol-5-yl)benzamide

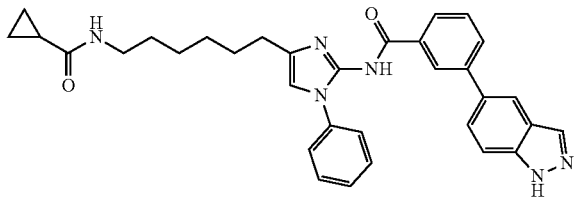 [SMILES: O=C(Nc1nc(CCCCCCNC(=O)C2CC2)cn1-c1ccccc1)c1cccc(-c2ccc3[nH]ncc3c2)c1]

Example 262 was made in a similar manner with example 261 (31 mg, 45%). ¹H NMR (CDCl₃, 400 MHz): δ 8.52 (s, 1H), 8.18-8.16 (m, 1H), 8.13 (s, 1H), 8.00 (s, 1H), 7.76-7.74 (m, 2H), 7.72-7.69 (m, 2H), 7.57-7.45 (m, 4H), 7.40-7.38 (m, 1H), 6.60 (s, 1H), 5.76 (bs, 1H), 3.32-3.26 (m, 2H), 2.64-2.58 (m, 2H), 1.80-1.30 (m, 9H), 0.98-0.82 (m, 2H), 0.78-0.60 (m, 2H).

Example 263. 3-(1-methyl-1H-indazol-5-yl)-N-(1-phenyl-4-(6-(piperidin-1-yl)hexyl)-1H-imidazol-2-yl)benzamide

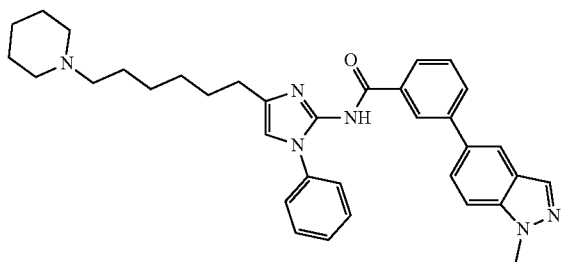 [SMILES: Cn1ncc2cc(-c3cccc(C(=O)Nc4nc(CCCCCCN5CCCCC5)cn4-c4ccccc4)c3)ccc21]

Step 1: N-(4-(6-hydroxyhexyl)-1-phenyl-1H-imidazol-2-yl)-3-(1-methyl-1H-indazol-5-yl)benzamide To a solution of methyl 6-(2-(3-(1-methyl-1H-indazol-5-yl)benzamido)-1-phenyl-1H-imidazol-4-yl)hexanoate (Example 251, Step 1) (500 mg, 0.96 mmol) in anhydrous THF (10 mL) was added LiAlH₄ (1.0 M in THF, 0.96 mL, 0.96 mmol) at −78° C. The reaction mixture was stirred at room temperature for 1 h, quenched with water, 15%-NaOH and stirred for 1 h. The mixture filtered through celite, filterate was concentrated under reduced pressure. Purification by silica gel column chromatography using DCM/MeOH as the eluent to afford the title compound (220 mg, 46%).

Step 2: 6-(2-(3-(1-methyl-1H-indazol-5-yl)benzamido)-1-phenyl-1H-imidazol-4-yl)hexyl methanesulfonate To a solution of N-(4-(6-hydroxyhexyl)-1-phenyl-1H-imidazol-2-yl)-3-(1-methyl-1H-indazol-5-yl)benzamide (120 mg, 0.243 mmol) in DCM was added TEA (68 μL, 0.45 mmol). The reaction mixture was cooled 0° C. and then methanesulfonyl chloride (28 μL, 0.36 mmol) was added at 0° C. The reaction mixture was stirred at room temperature for 1 h. The reaction mixture was quenched with sat. aq. NaHCO₃ and extracted with DCM, dried over anhydrous Na₂SO₄ and concentrated under reduced pressure. Purification by silica gel column chromatography using DCM/MeOH as the eluent to afford the title compound (97 mg, 70%).

Step 3: 3-(1-methyl-1H-indazol-5-yl)-N-(1-phenyl-4-(6-(piperidin-1-yl)hexyl)-1H-imidazol-2-yl)benzamide To a solution of piperidine (90 mg, 0.157 mmol), K₂CO₃ (44 mg, 0.315 mmol) in ACN was added a solution of 6-(2-(3-(1-methyl-1H-indazol-5-yl)benzamido)-1-phenyl-1H-imidazol-4-yl)hexyl methanesulfonate (90 mg, 0.157 mmol) in DCM. The reaction mixture was stirred at 70° C. for overnight. The reaction mixture was extracted with water/DCM, dried over anhydrous Na₂SO₄ and concentrated under reduced pressure. Purification by silica gel column chromatography using DCM/MeOH as the eluent to afford the title compound (46 mg, 52%). ¹H NMR (CDCl₃, 400 MHz): δ 8.55 (s, 1H), 8.38 (s, 1H), 8.13-8.11 (m, 1H), 7.92 (s, 1H), 7.77-7.72 (m, 3H), 7.54-7.50 (m, 3H), 7.46-7.44 (m, 2H), 7.41-7.38 (m, 1H), 7.23-7.20 (m, 1H), 6.61 (s, 1H), 6.58 (s, 1H), 2.62-2.57 (m, 2H), 2.56-2.30 (m, 6H), 1.72-1.60 (m, 8H), 1.50-1.30 (m, 6H).

Example 264. 3-(1-methyl-1H-indazol-5-yl)-N-(4-(6-morpholinohexyl)-1-phenyl-1H-imidazol-2-yl)benzamide

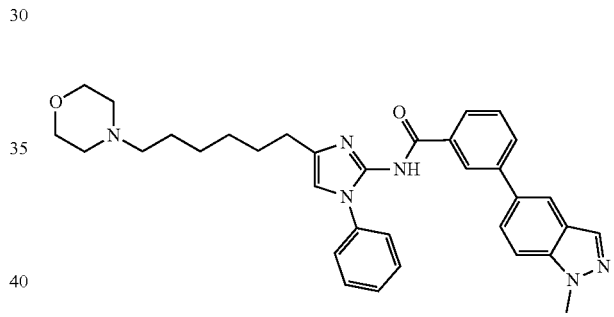

Example 264 was made in a similar manner with example 263 (20 mg, 24%). ¹H NMR (CDCl₃, 400 MHz): δ 8.53 (s, 1H), 8.17-8.15 (m, 1H), 8.02 (s, 1H), 7.96 (s, 1H), 7.76-7.69 (m, 4H), 7.54-7.50 (m, 2H), 7.46-7.44 (m, 3H), 6.58 (s, 1H), 4.10 (s, 3H), 3.71-3.57 (m, 4H), 2.62-2.10 (m, 8H), 1.80-1.30 (m, 8H).

Example 265. N-(4-(2-(methylamino)-2-oxoethyl)-1-phenyl-1H-imidazol-2-yl)-3-(pyridin-4-yl)benzamide

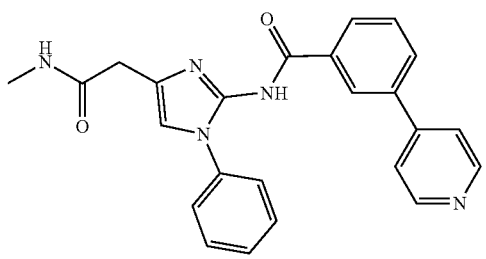 [SMILES: CNC(=O)Cc1cn(-c2ccccc2)c(NC(=O)c2cccc(-c3ccncc3)c2)n1]

Step 1: methyl 2-(1-phenyl-2-(3-(pyridin-4-yl)benzamido)-1H-imidazol-4-yl)acetate A mixture of methyl 2-(2-amino-1-phenyl-1H-imidazol-4-yl)acetate (Intermediate 25) (300 mg, 1.297 mmol), 3-(pyridin-4-yl)benzoic acid (310 mg, 1.556 mmol), HBTU (738 mg, 1.946 mmol) and DIPEA (0.68 mL, 3.892 mmol) in DCM was stirred at room temperature for overnight. The reaction mixture was quenched with water and extracted with DCM, dried over anhydrous $Na_2SO_4$ and concentrated under reduced pressure. Purification by silica gel column chromatography using DCM/MeOH as the eluent to afford the title compound (490 mg, 92%).

Step 2: 2-(1-phenyl-2-(3-(pyridin-4-yl)benzamido)-1H-imidazol-4-yl)acetic acid

To a solution of methyl 2-(1-phenyl-2-(3-(pyridin-4-yl)benzamido)-1H-imidazol-4-yl)acetate (490 mg, 1.188 mmol) in MeOH (20 mL) was added 1N—NaOH (4.75 mL, 4.75 mmol). The reaction mixture was stirred at room temperature for overnight. The mixture was evaporated under reduced pressure and acidified with 1N—HCl, filtered the solid to get the title compound (280 mg, 59%).

Step 3: N-(4-(2-(methylamino)-2-oxoethyl)-1-phenyl-1H-imidazol-2-yl)-3-(pyridin-4-yl)benzamide A mixture of 2-(1-phenyl-2-(3-(pyridin-4-yl)benzamido)-1H-imidazol-4-yl)acetic acid (100 mg, 0.251 mmol), methylamine hydrochloride (20.3 mg, 0.30 mmol), EDCI (72 mg, 0.376 mmol), HOBt (51 mg, 0.376 mmol) and DIPEA (0.26 mL, 1.506 mmol) in DMF was stirred at room temperature for overnight. The reaction mixture was quenched with water and extracted with DCM, dried over anhydrous $Na_2SO_4$ and concentrated under reduced pressure. Purification by silica gel column chromatography using DCM/MeOH as the eluent to afford the title compound (22.8 mg, 22%). $^1$H NMR (CD$_3$OD, 400 MHz): δ 8.64-8.62 (m, 2H), 8.29 (s, 1H), 8.01-7.95 (m, 2H), 7.79-7.77 (m, 2H), 7.63-7.49 (m, 5H), 7.45-7.43 (m, 1H), 7.24 (s, 1H), 3.58 (s, 2H), 2.79 (s, 3H).

The following compounds were made in a similar manner to that described in Example 265 and in general scheme 1.

TABLE 21

| Example | Structure | Analytical data |
|---|---|---|
| 266 | (structure) | $^1$H NMR (CDCl$_3$, 400 MHz): δ 8.70-8.62 (m, 2H), 8.56-8.50 (m, 1H), 8.28-8.22 (m, 1H), 7.78-7.68 (m, 3H), 7.59-7.46 (m, 5H), 7.45-7.38 (m, 1H), 6.68-6.63 (m, 1H), 5.61 (s, 1H), 2.83 (d, J = 4.8 Hz, 3H), 2.68 (t, J = 7.2 Hz, 2H), 2.30 (t, J 7.2 Hz, 2H), 2.10-1.99 (m, 2H). |
| 267 | (structure) | $^1$H NMR (CDCl$_3$, 400 MHz): δ 8.70-8.62 (m, 2H), 8.56-8.51 (m, 1H), 8.29-8.22 (m, 1H), 7.78-7.68 (m, 3H), 7.59-7.46 (m, 5H), 7.45-7.37 (m, 1H), 6.68-6.63 (m, 1H), 5.71 (s, 1H), 2.78-2.64 (m, 3H), 2.29-2.21 (m, 2H), 2.10-1.98 (m, 2H), 0.81-0.75 (m, 2H), 0.54-0.48 (m, 2H). |

Example 268. N-(1-phenyl-4-(6-(piperidin-1-yl)hexyl)-1H-imidazol-2-yl)-3-(pyridin-4-yl)benzamide

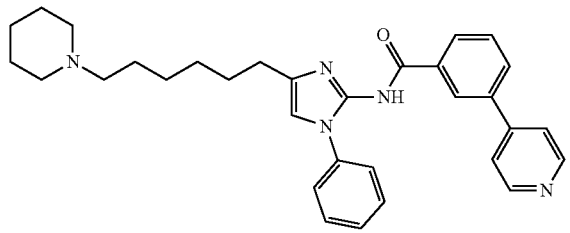 [SMILES: O=C(Nc1nc(CCCCCCN2CCCCC2)cn1-c1ccccc1)c1cccc(-c2ccncc2)c1]

Step 1: methyl 6-(1-phenyl-2-(3-(pyridin-4-yl)benzamido)-1H-imidazol-4-yl)hexanoate A mixture of methyl 6-(2-amino-1-phenyl-1H-imidazol-4-yl)hexanoate (Intermediate 28) (600 mg, 2.088 mmol), 3-(pyridin-4-yl)benzoic acid (416 mg, 2.088 mmol), HATU (1.20 g, 3.132 mmol) and DIPEA (1.10 mL, 6.264 mmol) in DCM was stirred at room temperature for overnight. The reaction mixture was quenched with water and extracted with DCM, dried over anhydrous $Na_2SO_4$ and concentrated under reduced pressure. Purification by silica gel column chromatography using DCM/MeOH as the eluent to afford the title compound (570 mg, 58%). $^1$H NMR (CDCl$_3$, 400 MHz): δ 8.67-8.62 (m, 2H), 8.53 (s, 1H), 8.27-8.24 (m, 1H), 7.78-7.69 (m, 3H), 7.58-7.43 (m, 5H), 7.43-7.35 (m, 1H), 6.60 (s, 1H), 3.67 (s, 3H), 2.63-2.58 (m, 2H), 2.37-2.30 (m, 2H), 1.75-1.63 (m, 4H), 1.50-1.40 (m, 2H).

Step 2: N-(4-(6-hydroxyhexyl)-1-phenyl-1H-imidazol-2-yl)-3-(pyridin-4-yl)benzamide To a solution of methyl 6-(1-phenyl-2-(3-(pyridin-4-yl)benzamido)-1H-imidazol-4-yl)hexanoate (570 mg, 1.22 mmol) in anhydrous THF (20 mL) was added LiAlH$_4$ (1.0 M in THF, 1.22 mL, 1.22 mmol) at −78° C. The reaction mixture was stirred at room temperature for 1 h, quenched with water, 15%-NaOH and stirred for 1 h. The mixture filtered through celite, filterate was concentrated under reduced pressure. Purification by silica gel column chromatography using DCM/MeOH as the eluent to afford the title compound (380 mg, 70%). $^1$H NMR (CDCl$_3$, 400 MHz): δ 8.67-8.62 (m, 2H), 8.53 (s, 1H), 8.27-8.24 (m, 1H), 7.78-7.69 (m, 3H), 7.58-7.43 (m, 5H), 7.43-7.35 (m, 1H), 6.60 (s, 1H), 3.70-3.65 (m, 2H), 2.63-2.58 (m, 2H), 1.78-1.68 (m, 2H), 1.68-1.40 (m, 6H).

Step 3: N-(4-(6-oxohexyl)-1-phenyl-1H-imidazol-2-yl)-3-(pyridin-4-yl)benzamide

To a solution of oxalyl chloride (88 µL, 1.022 mmol) in anhydrous DCM was added dropwise a solution of DMSO (0.15 mL, 2.043 mmol) in DCM at −78° C. After 15 min, to the mixture was added dropwise a solution of N-(4-(6-hydroxyhexyl)-1-phenyl-1H-imidazol-2-yl)-3-(pyridin-4-yl)benzamide (375 mg, 0.851 mmol) in DCM over 10 min. After 1 h, TEA (0.60 mL, 4.256 mmol) was added and the reaction mixture was warmed to room temperature. The reaction mixture was quenched with water extracted with DCM. The organic phase was washed with 1N—HCl, sat. aq. NaHCO$_3$, brine, dried over anhydrous $Na_2SO_4$ and concentrated under reduced pressure to afford the title compound (240 mg, 64%).

Step 4: N-(1-phenyl-4-(6-(piperidin-1-yl)hexyl)-1H-imidazol-2-yl)-3-(pyridin-4-yl)benzamide To a solution of N-(4-(6-oxohexyl)-1-phenyl-1H-imidazol-2-yl)-3-(pyridin-4-yl)benzamide (240 mg, 0.547 mmol) and piperidine (100 µL, 1.094 mmol) in THF was added NaBH$_3$CN (68.0 mg, 1.094 mmol). The reaction mixture was stirred at room temperature for overnight. The reaction mixture was quenched with water and extracted with DCM, dried over anhydrous $Na_2SO_4$ and concentrated under reduced pressure. Purification by silica gel column chromatography using DCM/MeOH as the eluent to afford the title compound (73 mg, 26%). $^1$H NMR (CD$_3$OD, 400 MHz): δ 8.62-8.60 (m, 2H), 8.36 (s, 1H), 8.18-8.12 (m, 1H), 7.91-7.89 (m, 1H), 7.74-7.73 (m, 2H), 7.63-7.50 (m, 5H), 7.44-7.42 (m, 2H), 7.04 (s, 1H), 2.68-2.64 (m, 2H), 2.60-2.47 (m, 4H), 2.42-2.38 (m, 2H), 1.76-1.72 (m, 2H), 1.63-1.55 (m, 6H), 1.51-1.40 (m, 6H).

The following compounds were made in a similar manner to that described in Example 268 and in general scheme 1.

TABLE 22

| Ex. | Structure | Analytical data |
|---|---|---|
| 269 | | $^1$H NMR (CDCl$_3$, 400 MHz): δ 8.77-8.76 (m, 1H), 8.70-8.68 (m, 1H), 8.25-8.23 (m, 1H), 8.18-8.13 (m, 1H), 7.82-7.71 (m, 4H), 7.55-7.48 (m, 3H), 7.41-7.39 (m, 1H), 7.24-7.21 (m, 1H), 6.59 (s, 1H), 2.62-2.57 (m, 2H), 2.56-2.30 (m, 6H), 1.72-1.60 (m, 8H), 1.50-1.30 (m, 6H). |

TABLE 22-continued

| Ex. | Structure | Analytical data |
|---|---|---|
| 270 | 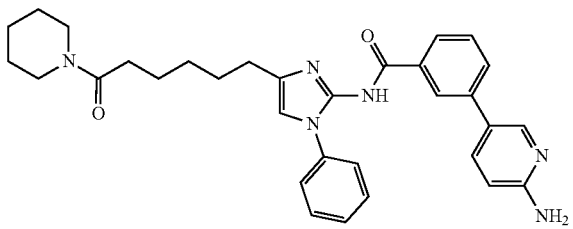 [SMILES: Nc1ccc(-c2cccc(C(=O)Nc3nc(CCCCCC(=O)N4CCCCC4)cn3-c3ccccc3)c2)cn1] | $^1$H NMR (CDCl$_3$, 400 MHz): δ 8.90-8.89 (m, 1H), 8.59-8.58 (m, 1H), 8.478-8.47 (m, 1H), 8.24-8.21 (m, 1H), 7.94-7.91 (m, 1H), 7.75-7.72 (m, 2H), 7.64-7.62 (m, 1H), 7.54-.47 (m, 3H), 7.41-7.32 (m, 2H), 6.59 (s, 1H), 2.62-2.57 (m, 2H), 2.56-2.30 (m, 6H), 1.69-1.50 (m, 8H), 1.50-1.30 (m, 6H). |

Example 271. 3-(6-aminopyridin-3-yl)-N-(4-(6-oxo-6-(piperidin-1-yl)hexyl)-1-phenyl-1H-imidazol-2-yl)benzamide Step 1: methyl 6-(2-(3-(6-((tert-butoxycarbonyl)amino)pyridin-3-yl)benzamido)-1-phenyl-1H-imidazol-4-yl)hexanoate A mixture of 3-(6-((tert-butoxycarbonyl)amino)pyridin-3-yl)benzoic acid (500 mg, 1.59 mmol), methyl 6-(2-amino-1-phenyl-1H-imidazol-4-yl)hexanoate (Intermediate 28) (685 mg, 2.38 mmol), HATU (907 mg, 2.38 mmol) and DIPEA (0.83 mL, 4.77 mmol) in DCM (18 mL) was stirred at room temperature for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (490 mg, 53%). $^1$H NMR (CDCl$_3$, 400 MHz): δ 8.54-8.52 (m, 1H), 8.43 (s, 1H), 8.19-8.16 (m, 1H), 8.04-8.01 (m, 1H), 7.96-7.91 (m, 1H), 7.77-7.73 (m, 2H), 7.65-7.61 (m, 2H), 7.56-7.50 (m, 2H), 7.49-7.44 (m, 1H), 7.42-7.38 (m, 1H), 6.60 (s, 1H), 3.67 (s, 3H), 2.65-2.57 (m, 2H), 2.37-2.33 (m, 2H), 1.76-1.67 (m, 4H), 1.54 (s, 9H), 1.50-1.43 (m, 2H).

Step 2: 6-(2-(3-(6-((tert-butoxycarbonyl)amino)pyridin-3-yl)benzamido)-1-phenyl-1H-imidazol-4-yl)hexanoic acid To a solution of methyl 6-(2-(3-(6-((tert-butoxycarbonyl)amino)pyridin-3-yl)benzamido)-1-phenyl-1H-imidazol-4-yl)hexanoate (490 mg, 0.83 mmol) in MeOH (4 mL) was added 1N—NaOH (4.2 mL, 4.20 mmol). The reaction mixture was stirred at room temperature for overnight. The mixture was evaporated under reduced pressure and acidified with 1N—HCl, filtered the solid to get the title compound (400 mg, 84%).

Step 3: tert-butyl (5-(3-((4-(6-oxo-6-(piperidin-1-yl)hexyl)-1-phenyl-1H-imidazol-2-yl)carbamoyl)phenyl)pyridin-2-yl)carbamate A mixture of 6-(2-(3-(6-((tert-butoxycarbonyl)amino)pyridin-3-yl)benzamido)-1-phenyl-1H-imidazol-4-yl)hexanoic acid (140 mg, 0.24 mmol), piperidine (30 mg, 0.36 mmol), EDCI (70.5 mg, 0.36 mmol), HOBt (50 mg, 0.36 mmol) and DIPEA (0.13 mL, 0.73 mmol) in DCM (4 mL) was stirred at room temperature for overnight. The reaction mixture was quenched with water and extracted with DCM, dried over anhydrous Na$_2$SO$_4$ and concentrated under reduced pressure. Purification by silica gel column chromatography using DCM/MeOH as the eluent to afford the title compound (70 mg, 45%). $^1$H NMR (CDCl$_3$, 400 MHz): δ 8.53-8.52 (m, 1H), 8.43 (s, 1H), 8.21-8.17 (m, 1H), 8.03-7.99 (m, 1H), 7.96-7.92 (m, 1H), 7.77-7.73 (m, 2H), 7.70-7.65 (m, 1H), 7.65-7.61 (m, 1H), 7.56-7.50 (m, 2H), 7.49-7.44 (m, 1H), 7.42-7.38 (m, 1H), 6.61 (s, 1H), 3.58-3.53 (m, 2H), 3.41-3.37 (m, 2H), 2.65-2.60 (m, 2H), 2.37-2.33 (m, 2H), 1.76-1.67 (m, 4H), 1.64-1.50 (m, 17H).

Step 4: 3-(6-aminopyridin-3-yl)-N-(4-(6-oxo-6-(piperidin-1-yl)hexyl)-1-phenyl-1H-imidazol-2-yl)benzamide TFA (0.7 mL) was added to the solution of tert-butyl (5-(3-((4-(6-oxo-6-(piperidin-1-yl)hexyl)-1-phenyl-1H-imidazol-2-yl)carbamoyl)phenyl)pyridin-2-yl)carbamate (70 mg, 0.10 mmol) in DCM (3 mL) and stirred at room temperature for overnight. The reaction mixture was quenched with sat. aq. NaHCO$_3$ and extracted with DCM, dried over anhydrous Na$_2$SO$_4$ and concentrated under reduced pressure. Purification by silica gel column chromatography using DCM/MeOH as the eluent to afford the title compound (33 mg, 61%). $^1$H NMR (CDCl$_3$, 400 MHz): δ 8.39-8.36 (m, 2H), 8.15-8.12 (m, 1H), 7.77-7.71 (m, 3H), 7.59-7.50 (m, 3H), 7.45-7.36 (m, 2H), 6.61-6.57 (m, 2H), 4.56 (bs, 2H), 3.57-3.53 (m, 2H), 3.41-3.37 (m, 2H), 2.63-2.58 (m, 2H), 2.36-2.31 (m, 2H), 1.75-1.60 (m, 6H), 1.56-1.42 (m, 6H).

The following compounds were made in a similar manner to that described in Example 271 and in general scheme 1.

TABLE 23

| Ex. | Structure | Analytical data |
|---|---|---|
| 272 | | $^1$H NMR (CDCl$_3$, 400 MHz): δ 8.39-8.37 (m, 2H), 8.15-8.12 (m, 1H), 7.77-7.72 (m, 3H), 7.60-7.50 (m, 3H), 7.46-7.36 (m, 2H), 6.61-6.58 (m, 2H), 4.49 (bs, 2H), 3.66-3.62 (m, 2H), 3.49-3.46 (m, 2H), 2.63-2.59 (m, 2H), 2.41-2.33 (m, 6H), 2.30 (s, 3H), 1.76-1.66 (m, 4H), 1.50-1.44 (m, 2H). |
| 273 | | $^1$H NMR (CDCl$_3$, 400 MHz): δ 8.40-8.37 (m, 2H), 8.15-8.12 (m, 1H), 7.76-7.72 (m, 3H), 7.59-7.50 (m, 3H), 7.45-7.36 (m, 2H), 6.65 (bs, 1H), 6.61-6.58 (m, 1H), 4.50 (bs, 2H), 3.60-3.56 (m, 2H), 3.41-3.38 (m, 2H), 2.71-2.67 (m, 2H), 2.46-2.42 (m, 2H), 2.07-2.00 (m, 2H), 1.60-1.51 (m, 6H). |
| 274 | | 1H NMR (CDCl$_3$, 400 MHz): δ 8.37-8.30 (m, 2H), 8.13-8.07 (m, 1H), 7.76-7.69 (m, 3H), 7.59-7.50 (m, 3H), 7.45-7.38 (m, 2H), 6.68 (bs, 1H), 6.62-6.59 (m, 1H), 3.68-3.64 (m, 2H), 3.52-3.48 (m, 2H), 2.71-2.67 (m, 2H), 2.48-2.39 (m, 6H), 2.31 (s, 3H), 2.07-2.00 (m, 2H). |

Example 275. 3-(6-aminopyridin-3-yl)-N-(1-phenyl-4-(6-(piperidin-1-yl)hexyl)-1H-imidazol-2-yl)benzamide

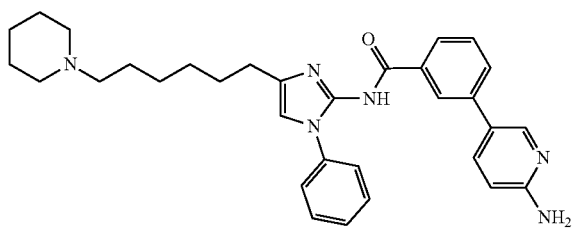 [SMILES: Nc1ccc(-c2cccc(C(=O)Nc3nc(CCCCCCN4CCCCC4)cn3-c3ccccc3)c2)cn1]

Step 1: tert-butyl (5-(3-((4-(6-hydroxyhexyl)-1-phenyl-1H-imidazol-2-yl)carbamoyl)phenyl)pyridin-2-yl)carbamate To a solution of methyl 6-(2-(3-(6-((tert-butoxycarbonyl)amino)pyridin-3-yl)benzamido)-1-phenyl-1H-imidazol-4-yl)hexanoate (Example 271, Step 1) (520 mg, 0.89 mmol) in anhydrous THF (10 mL) was added LiAlH$_4$ (1.0 M in THF (0.9 mL, 0.9 mmol)) at −78° C. The reaction mixture was stirred at room temperature for 1 h, quenched with water, 15%-NaOH and stirred for 1 h. The mixture filtered through celite, filterate was concentrated under reduced pressure. Purification by silica gel column chromatography using DCM/MeOH as the eluent to afford the title compound (240 mg, 48%). $^1$H NMR (CDCl$_3$, 400 MHz): δ 8.49-8.47 (m, 1H), 8.39 (s, 1H), 8.16-8.13 (m, 1H), 8.05-8.02 (m, 1H), 7.97-7.93 (m, 1H), 7.74-7.70 (m, 2H), 7.66-7.61 (m, 1H), 7.56-7.50 (m, 2H), 7.49-7.44 (m, 1H), 7.42-7.39 (m, 1H), 6.63 (s, 1H), 3.65-3.60 (m, 2H), 2.66-2.60 (m, 2H), 1.78-1.70 (m, 2H), 1.64-1.58 (m, 2H), 1.55 (s, 9H), 1.50-1.43 (m, 4H).

Step 2: 6-(2-(3-(6-((tert-butoxycarbonyl)amino)pyridin-3-yl)benzamido)-1-phenyl-1H-imidazol-4-yl) hexyl methanesulfonate To a mixture of tert-butyl (5-(3-((4-(6-hydroxyhexyl)-1-phenyl-1H-imidazol-2-yl)carbamoyl)phenyl)pyridin-2-yl) carbamate (110 mg, 0.19 mmol) and TEA (0.07 mL, 0.49 mmol) in anhydrous DCM (6 mL) was added methanesulfonyl chloride (0.02 mL, 0.25 mmol). The reaction mixture was stirred at room temperature for 1 h. The reaction mixture was quenched with water and extracted with DCM, dried over anhydrous Na$_2$SO$_4$ and concentrated under reduced pressure. The titled compound (110 mg, 91%) was obtained.

Step 3: tert-butyl (5-(3-((1-phenyl-4-(6-(piperidin-1-yl)hexyl)-1H-imidazol-2-yl)carbamoyl)phenyl)pyridin-2-yl)carbamate A mixture of 6-(2-(3-(6-((tert-butoxycarbonyl)amino) pyridin-3-yl)benzamido)-1-phenyl-1H-imidazol-4-yl)hexyl methanesulfonate (110 mg, 0.17 mmol), piperidine (50 mg, 0.59 mmol) and K₂CO₃ (35.5 mg, 0.25 mmol) in ACN (6 mL) was stirred at 80° C. for overnight. The reaction mixture was quenched with water and extracted with DCM, dried over anhydrous Na₂SO₄ and concentrated under reduced pressure. Purification by silica gel column chromatography using DCM/MeOH as the eluent to afford the title compound (95 mg, 90%). ¹H NMR (CDCl₃, 400 MHz): δ 8.53-8.51 (m, 1H), 8.42 (s, 1H), 8.19-8.16 (m, 1H), 8.05-8.01 (m, 1H), 7.96-7.92 (m, 1H), 7.77-7.74 (m, 2H), 7.66-7.62 (m, 1H), 7.56-7.51 (m, 2H), 7.49-7.44 (m, 1H), 7.42-7.38 (m, 1H), 6.63 (s, 1H), 2.97-2.83 (m, 4H), 2.79-2.73 (m, 2H), 2.63-2.57 (m, 2H), 1.96-1.87 (m, 4H), 1.86-1.76 (m, 2H), 1.75-1.67 (m, 2H), 1.62-1.57 (m, 2H), 1.54 (s, 9H), 1.48-1.37 (m, 4H).

Step 4: 3-(6-aminopyridin-3-yl)-N-(1-phenyl-4-(6-(piperidin-1-yl)hexyl)-1H-imidazol-2-yl)benzamide TFA (0.6 mL) was added to a solution of tert-butyl (5-(3-((1-phenyl-4-(6-(piperidin-1-yl)hexyl)-1H-imidazol-2-yl)carbamoyl)phenyl)pyridin-2-yl)carbamate (80 mg, 0.12 mmol) in DCM (3 mL) and stirred at room temperature for overnight. The reaction mixture was quenched with sat. aq. NaHCO₃ and extracted with DCM, dried over anhydrous Na₂SO₄ and concentrated under reduced pressure. Purification by silica gel column chromatography using DCM/MeOH as the eluent to afford the title compound (30 mg, 44%). ¹H NMR (CDCl₃, 400 MHz): δ 8.39-8.36 (m, 2H), 8.15-8.12 (m, 1H), 7.76-7.71 (m, 3H), 7.59-7.49 (m, 3H), 7.45-7.36 (m, 2H), 6.59-6.56 (m, 2H), 4.54 (bs, 2H), 2.60-2.55 (m, 2H), 2.44-2.37 (m, 4H), 2.33-2.29 (m, 2H), 1.72-1.65 (m, 2H), 1.63-1.57 (m, 4H), 1.55-1.50 (m, 2H), 1.46-1.40 (m, 4H), 1.38-1.32 (m, 2H).

Example 276. 3-(6-aminopyridin-3-yl)-N-(4-(6-(2-oxopyrrolidin-1-yl)hexyl)-1-phenyl-1H-imidazol-2-yl)benzamide

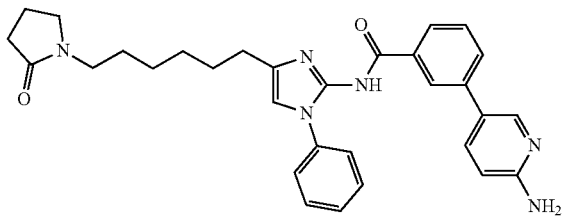 [SMILES: Nc1ccc(-c2cccc(C(=O)Nc3nc(CCCCCCN4CCCC4=O)cn3-c3ccccc3)c2)cn1]

Step 1: tert-butyl (5-(3-((4-(6-oxohexyl)-1-phenyl-1H-imidazol-2-yl)carbamoyl)phenyl)pyridin-2-yl)carbamate To a solution of oxalyl chloride (0.1 mL, 1.25 mmol) in anhydrous DCM was added dropwise a solution of DMSO (0.13 mL, 1.84 mmol) in DCM at −78° C. After 15 min, to the mixture was added dropwise a solution of tert-butyl (5-(3-((4-(6-hydroxyhexyl)-1-phenyl-1H-imidazol-2-yl)carbamoyl)phenyl)pyridin-2-yl)carbamate (Example 275, Step 1) (410 mg, 0.73 mmol) in DCM over 10 min. After 1 h, TEA (0.51 mL, 3.68 mmol) was added and the reaction mixture warmed to room temperature. The reaction mixture was quenched with water and extracted with DCM. The organic phase was washed with 1N—HCl, sat. aq. NaHCO₃, brine, dried over anhydrous Na₂SO₄ and concentrated under reduced pressure to afford the title compound (265 mg, 65%).

Step 2: tert-butyl (5-(3-((4-(6-(2-oxopyrrolidin-1-yl)hexyl)-1-phenyl-1H-imidazol-2-yl)carbamoyl)phenyl)pyridin-2-yl)carbamate To a solution of tert-butyl (5-(3-((4-(6-oxohexyl)-1-phenyl-1H-imidazol-2-yl)carbamoyl)phenyl)pyridin-2-yl)carbamate (265 mg, 0.47 mmol) in MeOH (5 mL) was added ethyl 4-aminobutyrate hydrochloride (180 mg, 1.07 mmol), TEA (0.20 mL, 1.43 mmol). The reaction mixture was stirred at room temperature for 30 min and then NaBH₃CN (90 mg, 1.43 mmol) was added. The reaction mixture was stirred at 45° C. for overnight. The reaction mixture was quenched with water and extracted with DCM, dried over anhydrous Na₂SO₄ and concentrated under reduced pressure. Purification by silica gel column chromatography using DCM/MeOH as the eluent to afford the title compound (120 mg, 40%). ¹H NMR (CDCl₃, 400 MHz): δ 8.54-8.52 (m, 1H), 8.43 (s, 1H), 8.21-8.17 (m, 1H), 8.04-8.00 (m, 1H), 7.96-7.92 (m, 1H), 7.77-7.74 (m, 2H), 7.66-7.61 (m, 1H), 7.56-7.50 (m, 3H), 7.49-7.44 (m, 1H), 7.42-7.39 (m, 1H), 6.60 (s, 1H), 3.40-3.36 (m, 2H), 3.30-3.27 (m, 2H), 2.61-2.57 (m, 2H), 2.42-2.38 (m, 2H), 2.07-1.98 (m, 2H), 1.74-1.66 (m, 2H), 1.62-1.58 (m, 2H), 1.54 (s, 9H), 1.50-1.42 (m, 2H), 1.40-1.34 (m, 2H).

Step 3: 3-(6-aminopyridin-3-yl)-N-(4-(6-(2-oxopyrrolidin-1-yl)hexyl)-1-phenyl-1H-imidazol-2-yl)benzamide TFA (0.7 mL) was added to a solution of tert-butyl (5-(3-((4-(6-(2-oxopyrrolidin-1-yl)hexyl)-1-phenyl-1H-imidazol-2-yl)carbamoyl)phenyl)pyridin-2-yl)carbamate (120 mg, 0.19 mmol) in DCM (3 mL) and stirred at room temperature for overnight. The reaction mixture was quenched with sat. aq. NaHCO₃ and extracted with DCM, dried over anhydrous Na₂SO₄ and concentrated under reduced pressure. Purification by silica gel column chromatography using DCM/MeOH as the eluent to afford the title compound (43 mg, 43%). ¹H NMR (CDCl₃, 400 MHz): δ 8.39-8.37 (m, 2H), 8.15-8.12 (m, 1H), 7.77-7.72 (m, 3H), 7.60-7.50 (m, 3H), 7.46-7.37 (m, 2H), 6.61-6.58 (m, 2H), 4.50 (bs, 2H), 3.40-3.36 (m, 2H), 3.31-3.26 (m, 2H), 2.61-2.57 (m, 2H), 2.41-2.36 (m, 2H), 2.06-1.99 (m, 2H), 1.73-1.66 (m, 2H), 1.58-1.50 (m, 2H), 1.48-1.40 (m, 2H), 1.39-1.32 (m, 2H).

Example 277. 3-(6-aminopyridin-3-yl)-N-(4-(4-(2-oxopyrrolidin-1-yl)butyl)-1-phenyl-1H-imidazol-2-yl)benzamide

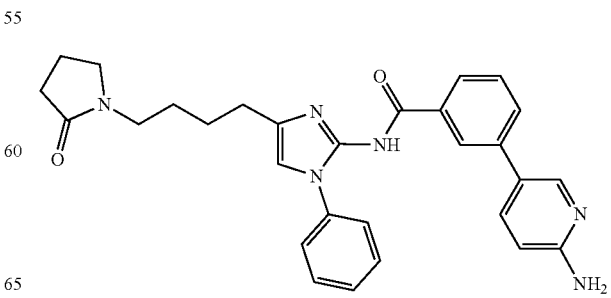

Example 277 was made in a similar manner with example 276 (31 mg, 45%). ¹H NMR (CDCl₃, 400 MHz) δ 8.39-8.37 (m, 2H), 8.15-8.12 (m, 1H), 7.76-7.72 (m, 3H), 7.60-7.50 (m, 3H), 7.46-7.37 (m, 2H), 6.63-6.62 (m, 1H), 6.61-6.58 (m, 1H), 4.51 (bs, 2H), 3.41-3.32 (m, 4H), 2.67-2.63 (m, 2H), 2.44-2.38 (m, 2H), 2.08-2.00 (m, 2H), 1.74-1.62 (m, 4H).

Example 278. 3-(6-aminopyridin-3-yl)-N-(4-(6-(cyclopropanecarboxamido)hexyl)-1-phenyl-1H-imidazol-2-yl)benzamide

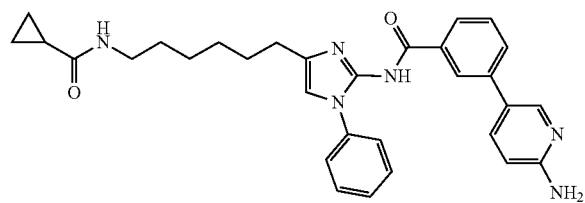 [SMILES: Nc1ccc(-c2cccc(C(=O)Nc3nc(CCCCCCNC(=O)C4CC4)cn3-c3ccccc3)c2)cn1]

Step 1: tert-butyl (5-(3-((4-(6-azidohexyl)-1-phenyl-1H-imidazol-2-yl)carbamoyl)phenyl)pyridin-2-yl)carbamate To a solution of 6-(2-(3-(6-((tert-butoxycarbonyl)amino)pyridin-3-yl)benzamido)-1-phenyl-1H-imidazol-4-yl)hexyl methanesulfonate (Example 275, Step 2) (298 mg, 0.47 mmol) in DMF (9.5 mL) was added sodium azide (46.7 mg, 0.71 mmol). The reaction mixture was stirred at 90° C. for 3 h. The reaction mixture was quenched with water and extracted with DCM, dried over anhydrous Na₂SO₄ and concentrated under reduced pressure. Purification by silica gel column chromatography using DCM/MeOH as the eluent to afford the title compound (210 mg, 77%). ¹H NMR (CDCl₃, 400 MHz): δ 8.56-8.54 (m, 1H), 8.43 (s, 1H), 8.20-8.18 (m, 1H), 8.04-8.01 (m, 1H), 7.97-7.93 (m, 1H), 7.77-7.74 (m, 2H), 7.65-7.61 (m, 1H), 7.56-7.50 (m, 2H), 7.49-7.44 (m, 1H), 7.42-7.38 (m, 1H), 6.60 (s, 1H), 3.33-3.27 (m, 2H), 2.64-2.59 (m, 2H), 1.78-1.69 (m, 2H), 1.67-1.58 (m, 2H), 1.54 (s, 9H), 1.47-1.43 (m, 4H).

Step 2: tert-butyl (5-(3-((4-(6-aminohexyl)-1-phenyl-1H-imidazol-2-yl)carbamoyl)phenyl)pyridin-2-yl)carbamate To a solution of tert-butyl (5-(3-((4-(6-azidohexyl)-1-phenyl-1H-imidazol-2-yl)carbamoyl)phenyl)pyridin-2-yl)carbamate (210 mg, 0.36 mmol) in MeOH (7 mL) was added palladium on carbon (38 mg). The mixture was flushed with hydrogen via a hydrogen-filled balloon and then stirred at room temperature for overnight. The reaction mixture was filtered through celite, washed with MeOH and concentrated under reduced pressure to afford the title compound (195 mg, 98%).

Step 3: tert-butyl (5-(3-((4-(6-(cyclopropanecarboxamido)hexyl)-1-phenyl-1H-imidazol-2-yl)carbamoyl)phenyl)pyridin-2-yl)carbamate A mixture of tert-butyl (5-(3-((4-(6-aminohexyl)-1-phenyl-1H-imidazol-2-yl)carbamoyl)phenyl)pyridin-2-yl)carbamate (195 mg, 0.35 mmol), cyclopropanecarboxylic acid (46 mg, 0.54 mmol), EDCI (103 mg, 0.54 mmol), HOBt (73 mg, 0.54 mmol) and DIPEA (0.19 mL, 1.10 mmol) in DCM (4 mL) was stirred at room temperature for overnight. The reaction mixture was quenched with water and extracted with DCM, dried over anhydrous Na₂SO₄ and concentrated under reduced pressure. Purification by silica gel column chromatography using DCM/MeOH as the eluent to afford the title compound (120 mg, 55%). ¹H NMR (CDCl₃, 400 MHz): δ 8.56-8.54 (m, 1H), 8.43 (s, 1H), 8.21-8.18 (m, 1H), 8.04-8.01 (m, 1H), 7.95-7.92 (m, 1H), 7.77-7.73 (m, 2H), 7.65-7.62 (m, 2H), 7.56-7.50 (m, 2H), 7.49-7.44 (m, 1H), 7.42-7.38 (m, 1H), 6.60 (s, 1H), 3.33-3.24 (m, 2H), 2.62-2.57 (m, 2H), 1.74-1.68 (m, 2H), 1.66-1.60 (m, 2H), 1.54 (s, 9H), 1.48-1.37 (m, 4H), 1.35-1.30 (m, 1H), 0.98-0.95 (m, 2H), 0.74-0.69 (m, 2H).

Step 4: 3-(6-aminopyridin-3-yl)-N-(4-(6-(cyclopropanecarboxamido)hexyl)-1-phenyl-1H-imidazol-2-yl)benzamide TFA (0.7 mL) was added to a solution of tert-butyl (5-(3-((4-(6-(cyclopropanecarboxamido)hexyl)-1-phenyl-1H-imidazol-2-yl)carbamoyl)phenyl)pyridin-2-yl)carbamate (120 mg, 0.19 mmol) in DCM (3 mL) and stirred at room temperature for overnight. The reaction mixture was quenched with sat. aq. NaHCO₃ and extracted with DCM, dried over anhydrous Na₂SO₄ and concentrated under reduced pressure. Purification by silica gel column chromatography using DCM/MeOH as the eluent to afford the title compound (40 mg, 40%). ¹H NMR (CDCl₃, 400 MHz): δ 8.39-8.37 (m, 2H), 8.15-8.12 (m, 1H), 7.77-7.72 (m, 3H), 7.60-7.50 (m, 3H), 7.46-7.37 (m, 2H), 6.61-6.58 (m, 2H), 5.74 (bs, 1H), 4.48 (bs, 2H), 3.31-3.25 (m, 2H), 2.62-2.58 (m, 2H), 1.75-1.66 (m, 2H), 1.58-1.51 (m, 2H), 1.46-1.39 (m, 4H), 1.36-1.30 (m, 1H), 0.98-0.93 (m, 2H), 0.73-0.68 (m, 2H).

Example 279. 3-(benzo[d]thiazol-6-yl)-N-(4-(4-(cyclopropylamino)-4-oxobutyl)-1-phenyl-1H-imidazol-2-yl)benzamide

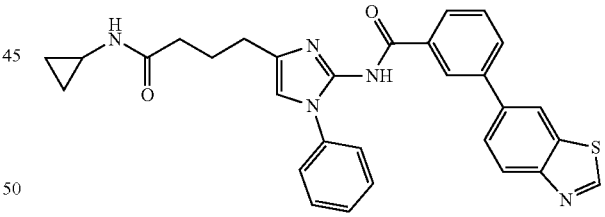

Step 1: methyl 4-(2-(3-(benzo[d]thiazol-6-yl)benzamido)-1-phenyl-1H-imidazol-4-yl)butanoate A mixture of methyl 4-(2-amino-1-phenyl-1H-imidazol-4-yl)butanoate (Intermediate 26) (1.0 g, 4.074 mmol), 3-(benzo[d]thiazol-6-yl)benzoic acid (800 mg, 3.133 mmol), HATU (1.78 g, 4.70 mmol) and DIPEA (1.64 mL, 9.40 mmol) in DCM was stirred at room temperature for overnight. The reaction mixture was quenched with water and extracted with DCM, dried over anhydrous Na₂SO₄ and concentrated under reduced pressure. Purification by silica gel column chromatography using DCM/MeOH as the eluent to afford the title compound (740 mg, 47%). ¹H NMR (CDCl₃, 400 MHz): δ 9.01 (s, 1H), 8.55 (s, 1H), 8.22-8.18

(m, 3H), 7.83-7.79 (m, 1H), 7.76-7.72 (m, 3H), 7.55-7.47 (m, 3H), 7.42-7.39 (m, 1H), 6.64 (s, 1H), 3.71 (s, 3H), 2.71-2.65 (m, 2H), 2.48-2.43 (m, 2H), 2.08-2.02 (m, 2H)

Step 2: 4-(2-(3-(benzo[d]thiazol-6-yl)benzamido)-1-phenyl-1H-imidazol-4-yl)butanoic acid To a solution of methyl 4-(2-(3-(benzo[d]thiazol-6-yl)benzamido)-1-phenyl-1H-imidazol-4-yl)butanoate (740 mg, 1.50 mmol) in MeOH (10 mL) was added 1N—NaOH (6.0 mL, 6.0 mmol). The reaction mixture was stirred at room temperature for overnight. The mixture was evaporated under reduced pressure and acidified with 1N—HCl, filtered the solid to get the title compound (590 mg, 82%).

Step 3: 3-(benzo[d]thiazol-6-yl)-N-(4-(4-(cyclopropylamino)-4-oxobutyl)-1-phenyl-1H-imidazol-2-yl)benzamide A mixture of 4-(2-(3-(benzo[d]thiazol-6-yl)benzamido)-1-phenyl-1H-imidazol-4-yl)butanoic acid (120 mg, 0.248 mmol), cyclopropylamine (17 mg, 0.298 mmol), HATU (142 mg, 0.373 mmol) and DIPEA (0.13 mL, 0.746 mmol) in DCM was stirred at room temperature for overnight. The reaction mixture was quenched with water and extracted with DCM, dried over anhydrous $Na_2SO_4$ and concentrated under reduced pressure. Purification by silica gel column chromatography using DCM/MeOH as the eluent to afford the title compound (77 mg, 59%). $^1$H NMR (CDCl$_3$, 400 MHz): δ 9.01 (s, 1H), 8.55 (s, 1H), 8.22-8.18 (m, 3H), 7.83-7.80 (m, 1H), 7.77-7.72 (m, 3H) 7.54-7.49 (m, 3H), 7.41-7.38 (m, 1H), 6.65 (s, 1H), 5.65 (bs, 1H), 2.80-2.65 (m, 3H), 2.28-2.21 (m, 2H), 2.10-2.00 (m, 2H), 0.84-0.78 (m, 2H), 0.60-0.50 (m, 2H).

The following compounds were made in a similar manner to that described in Example 279 and in general scheme 1.

TABLE 24

| Ex. | Structure | Analytical data |
| --- | --- | --- |
| 280 | | $^1$H NMR (CDCl$_3$, 400 MHz): δ 9.01 (s, 1H), 8.55 (s, 1H), 8.22-8.18 (m, 3H), 7.83-7.80 (m, 1H), 7.77-7.72 (m, 3H) 7.54-7.49 (m, 3H), 7.41-7.38 (m, 1H), 6.65 (s, 1H), 5.65 (bs, 1H), 2.80-2.65 (m, 3H), 2.28-2.21 (m, 2H), 2.10-2.00 (m, 2H), 0.84-0.78 (m, 2H), 0.60-0.50 (m, 2H). |
| 281 | | $^1$H NMR (CDCl$_3$, 400 MHz): δ 9.01 (s, 1H), 8.56 (s, 1H), 8.22-8.18 (m, 3H), 7.83-7.80 (m, 1H), 7.77-7.72 (m, 3H) 7.54-7.49 (m, 3H), 7.41-7.38 (m, 1H), 6.65 (s, 1H), 4.70-4.60 (m, 1H), 3.90-3.80 (s, 1H), 3.03-2.98 (m, 1H), 2.74-2.68 (m, 2H), 2.64-2.58 (m, 1H), 2.48-2.42 (m, 2H), 2.40-2.30 (m, 1H), 2.27 (s, 6H), 2.08-1.98 (m, 2H), 1.92-1.80 (m, 2H), 1.42-1.30 (m, 2H). |
| 282 | | $^1$H NMR (CDCl$_3$, 400 MHz) δ 9.04 (s, 1H), 8.59 (s, 1H), 8.42-8.40 (m, 1H), 8.24-8.20 (m, 1H), 8.03-8.01 (m, 1H), 7.79-7.75 (m, 4H), 7.56-7.48 (m, 3H), 7.42-7.37 (m, 1H), 6.66 (s, 1H), 4.70-4.64 (m, 1H), 3.92-3.85 (m, 1H), 3.08-3.00 (m, 1H), 2.73-2.68 (m, 2H), 2.65-2.57 (m, 1H), 2.49-2.44 (m, 2H), 2.41-2.34 (m, 1H), 2.29 (s, 6H), 2.09-2.01 (m, 2H), 1.93-1.85 (m, 2H), 1.45-1.36 (m, 2H). |

TABLE 24-continued

| Ex. | Structure | Analytical data |
|---|---|---|
| 283 | | $^1$H NMR (CDCl$_3$, 400 MHz): δ 9.04 (s, 1H), 8.65-8.57 (m, 1H), 8.42-8.39 (m, 1H), 8.22-8.18 (m, 1H), 8.04-8.00 (m, 1H), 7.79-7.73 (m, 4H), 7.58-7.47 (m, 3H), 7.45-7.38 (m, 1H), 6.66 (s, 1H), 5.72-5.66 (m, 1H), 2.76-2.64 (m, 2H), 2.60-2.40 (m, 2H), 2.28-2.20 (m, 1H), 2.08-1.96 (m, 2H), 0.82-0.76 (m, 2H), 0.60-0.48 (m, 2H). |
| 284 | | $^1$H NMR (CDCl$_3$, 400 MHz): δ 9.04 (s, 1H), 8.58 (s, 1H), 8.42-8.41 (m, 1H), 8.24-8.20 (m, 1H), 8.04-8.01 (m, 1H), 7.79-7.75 (m, 4H), 7.56-7.48 (m, 3H), 7.42-7.37 (m, 1H), 6.66 (s, 1H), 3.67-3.35 (m, 2H), 3.50-3.46 (m, 2H), 2.73-2.68 (m, 2H), 2.48-2.43 (m, 2H), 2.42-2.37 (m, 4H), 2.30 (s, 3H), 2.09-2.02 (m, 2H). |
| 285 | | $^1$H NMR (CDCl$_3$, 400 MHz): δ 9.01 (s, 1H), 8.55 (s, 1H), 8.22-8.18 (m, 3H), 7.83-7.80 (m, 1H), 7.77-7.72 (m, 3H) 7.54-7.49 (m, 3H), 7.41-7.38 (m, 1H), 6.62 (s, 1H), 3.68-3.62 (m, 2H), 3.50-3.45 (m, 2H), 2.64-2.60 (m, 2H), 2.42-2.32 (m, 6H), 2.29 (s, 3H), 1.76-1.64 (m, 4H), 1.50-1.40 (m, 2H). |
| 286 | | $^1$H NMR (CDCl$_3$, 400 MHz): δ 9.01 (s, 1H), 8.55 (s, 1H), 8.22-8.18 (m, 3H), 7.83-7.80 (m, 1H), 7.77-7.72 (m, 3H) 7.54-7.49 (m, 3H), 7.41-7.38 (m, 1H), 6.61 (s, 1H), 5.70 (bs, 1H), 2.72-2.66 (m, 1H), 2.64-2.58 (m, 2H), 2.18-2.12 (m, 2H), 1.80-1.64 (m, 4H), 1.48-1.40 (m, 2H), 0.84-0.70 (m, 2H), 0.60-0.44 (m, 2H). |
| 287 | | $^1$H NMR (CDCl$_3$, 400 MHz): δ 9.01 (s, 1H), 8.56 (s, 1H), 8.22-8.18 (m, 3H), 7.83-7.80 (m, 1H), 7.77-7.72 (m, 3H) 7.54-7.49 (m, 3H), 7.41-7.38 (m, 1H), 6.62 (s, 1H), 4.70-4.60 (m, 1H), 3.94-3.84 (s, 1H), 3.03-2.98 (m, 1H), 2.66-2.56 (m, 3H), 2.42-2.30 (m, 3H), 2.27 (s, 6H), 1.91-1.80 (m, 2H), 1.80-1.60 (m, 4H), 1.52-1.30 (m, 4H). |

TABLE 24-continued

| Ex. | Structure | Analytical data |
|---|---|---|
| 288 | | ¹H NMR (CDCl₃, 400 MHz)aa; δ 9.04 (s, 1H), 8.58 (s, 1H), 8.42-8.40 (m, 1H), 8.23-8.20 (m, 1H), 8.04-8.01 (m, 1H), 7.79-7.75 (m, 4H), 7.56-7.48 (m, 3H), 7.42-7.37 (m, 1H), 6.62 (s, 1H), 3.66-3.62 (m, 2H), 3.50-3.47 (m, 2H), 2.65-2.61 (m, 2H), 2.42-2.32 (m, 6H), 2.30 (s, 3H), 1.76-1.64 (m, 4H), 1.51-1.44 (m, 2H). |
| 289 | | ¹H NMR (CDCl₃, 400 MHz): δ 9.03 (s, 1H), 8.58 (s, 1H), 8.42-8.41 (m, 1H), 8.24-8.20 (m, 1H), 8.04-8.00 (m, 1H), 7.80-7.74 (m, 4H), 7.58-7.38 (m, 4H), 6.62 (s, 1H), 3.54-3.50 (m, 1H), 3.45-3.36 (m, 2H), 3.16-3.11 (m, 1H), 2.65-2.61 (m, 1H), 2.47-2.41 (m, 1H), 2.37-2.33 (m, 1H), 2.06-2.02 (m, 1H), 1.76-1.68 (m, 4H), 1.58-1.54 (m, 4H), 1.48-1.40 (m, 6H). |
| 290 | | ¹H NMR (CDCl₃, 400 MHz): δ 9.04 (s, 1H), 8.58 (s, 1H), 8.42-8.41 (m, 1H), 8.23-8.20 (m, 1H), 8.04-8.01 (m, 1H), 7.79-7.75 (m, 4H), 7.56-7.48 (m, 3H), 7.42-7.37 (m, 1H), 6.62 (s, 1H), 5.69 (bs, 1H), 2.74-2.68 (m, 1H), 2.65-2.59 (m, 2H), 2.18-2.13 (m, 2H), 1.75-1.66 (m, 4H), 1.48-1.40 (m, 2H), 0.78-0.72 (m, 2H), 0.50-0.46 (m, 2H). |
| 291 | | ¹H NMR (CDCl₃, 400 MHz): δ 9.04 (s, 1H), 8.58 (s, 1H), 8.42-8.40 (m, 1H), 8.24-8.20 (m, 1H), 8.04-8.01 (m, 1H), 7.79-7.75 (m, 4H), 7.56-7.48 (m, 3H), 7.42-7.37 (m, 1H), 6.62 (s, 1H), 4.68-4.62 (m, 1H), 3.94-3.87 (m, 1H), 3.06-2.98 (m, 1H), 2.65-2.54 (m, 3H), 2.39-2.32 (m, 3H), 2.28 (s, 6H), 1.92-1.82 (m, 2H), 1.78-1.66 (m, 4H), 1.52-1.43 (m, 2H), 1.42-1.34 (m, 2H). |

Example 292. N-(1-benzyl-4-(3-oxo-3-(phenylamino)propyl)-1H-imidazol-2-yl)-3-(1H-pyrazol-4-yl)benzamide

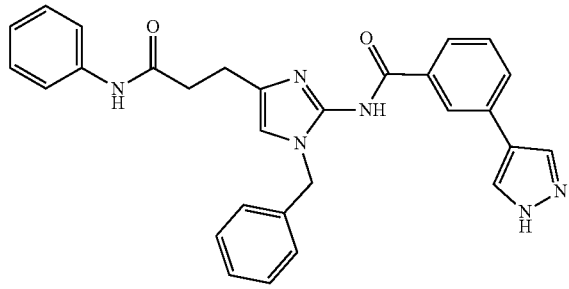 [SMILES: O=C(CCc1cn(Cc2ccccc2)c(NC(=O)c2cccc(-c3cn[nH]c3)c2)n1)Nc1ccccc1]

Step 1: methyl 5-bromo-4-oxopentanoate

To a stirred and heated (70° C.) solution of levulinic acid (10 g, 86.12 mmol) in MeOH (100 mL) was added a solution of $Br_2$ (4.43 mL, 86.12 mmol) in MeOH (20 mL) over 10 min and refluxed for 2 h. The reaction mixture was cooled to room temperature, and the solvent was removed under reduced pressure. The residue was diluted with DCM (100 mL) and washed with sat. aq. $NaHCO_3$ (50 mL×3). The organic phase was dried over anhydrous $Na_2SO_4$ and concentrated under reduced pressure to afford the title compound (crude obtained).

Step 2: methyl 5-(benzylamino)-4-oxopentanoate

To a solution of methyl 5-bromo-4-oxopentanoate (1.0 g, 4.78 mmol) and benzylamine (614 mg, 5.73 mmol) in dry DMF (30 mL) was added $NaHCO_3$ (603 mg, 7.17 mmol). The reaction mixture was stirred at room temperature for overnight. The mixture was diluted with ethyl acetate (40 mL) and washed with water (30 mL×3) and brine (30 mL). The organic phase was dried over anhydrous $Na_2SO_4$ and concentrated under reduced pressure to afford the title compound (840 mg, 75%).

Step 3: methyl 3-(2-amino-1-benzyl-1H-imidazol-4-yl)propanoate

A solution of methyl 5-(benzylamino)-4-oxopentanoate (840 mg, 3.57 mmol) and cyanamide (1.41 g, 33.56) in MeOH (20 mL) was refluxed for overnight. The solvent was removed under reduced pressure. The residue was diluted with DCM (20 mL), washed with water (30 mL×3). The organic phase was dried over anhydrous $Na_2SO_4$ and concentrated under reduced pressure. Purification by silica gel column chromatography using DCM/MeOH as the eluent to afford the title compound. (109 mg, 12%).

Step 4: methyl 3-(1-benzyl-2-(3-(1-((2-(trimethylsilyl)ethoxy)methyl)-1H-pyrazol-4-yl)benzamido)-1H-imidazol-4-yl)propanoate A mixture of methyl 3-(2-amino-1-benzyl-1H-imidazol-4-yl)propanoate (109 mg, 0.42 mmol), 3-(1-((2-(trimethylsilyl)ethoxy)methyl)-1H-pyrazol-4-yl)benzoic acid (Intermediate 1) (147 mg, 0.46 mmol), HBTU (239 mg, 0.63 mmol) and DIPEA (0.22 mL, 1.26 mmol) in DCM was stirred at room temperature for overnight. The reaction mixture was quenched with water and extracted with DCM, dried over anhydrous $Na_2SO_4$ and concentrated under reduced pressure. Purification by silica gel column chromatography using DCM/MeOH as the eluent to afford the title compound (170 mg, 72%). $^1$H NMR ($CDCl_3$, 400 MHz): δ 8.40 (s, 1H), 8.18-8.14 (m, 1H), 7.89 (s, 2H), 7.61-7.57 (m, 1H), 7.43-7.36 (m, 1H), 7.34-7.30 (m, 5H), 6.25 (s, 1H), 5.47 (s, 2H), 5.17 (s, 2H), 3.70 (s, 3H), 3.62-3.58 (m, 2H), 2.84-2.80 (m, 2H), 2.64-2.61 (m, 2H), 0.94-0.90 (m, 2H), −0.02 (s, 9H).

Step 5: 3-(1-benzyl-2-(3-(1-((2-(trimethylsilyl)ethoxy)methyl)-1H-pyrazol-4-yl)benzamido)-1H-imidazol-4-yl)propanoic acid To a solution of methyl 3-(1-benzyl-2-(3-(1-((2-(trimethylsilyl)ethoxy)methyl)-1H-pyrazol-4-yl)benzamido)-1H-imidazol-4-yl)propanoate (160 mg, 0.28 mmol) in MeOH (10 mL) was added 1N—NaOH (0.57 mL, 0.57 mmol). The reaction mixture was stirred at room temperature for overnight. The mixture was evaporated under reduced pressure and acidified with 1N—HCl, filtered the solid to get the title compound (148 mg, 95%).

Step 6: N-(1-benzyl-4-(3-oxo-3-(phenylamino)propyl)-1H-imidazol-2-yl)-3-(1-((2-(trimethylsilyl)ethoxy)methyl)-1H-pyrazol-4-yl)benzamide A mixture of 3-(1-benzyl-2-(3-(1-((2-(trimethylsilyl)ethoxy)methyl)-1H-pyrazol-4-yl)benzamido)-1H-imidazol-4-yl)propanoic acid (148 mg, 0.27 mmol), aniline (25.3 mg, 0.27 mmol), HBTU (154 mg, 0.41 mmol) and DIPEA (0.14 mL, 0.81 mmol) in DCM was stirred at room temperature for overnight. The reaction mixture was quenched with water and extracted with DCM, dried over anhydrous $Na_2SO_4$ and concentrated under reduced pressure. Purification by silica gel column chromatography using DCM/MeOH as the eluent to afford the title compound (84 mg, 50%). $^1$H NMR ($CDCl_3$, 400 MHz): δ 8.38 (s, 1H), 8.20-8.14 (m, 1H), 7.86 (s, 1H), 7.83 (s, 1H), 7.59-7.55 (m, 1H), 7.52-7.43 (m, 3H), 7.42-7.38 (m, 1H), 7.35-7.25 (m, 7H), 7.12-7.06 (m, 1H), 6.29 (s, 1H), 5.44 (s, 2H), 5.14 (s, 2H), 3.62-3.57 (m, 2H), 2.88-2.82 (m, 2H), 2.52-2.48 (m, 2H), 0.94-0.90 (m, 2H), −0.02 (s, 9H).

Step 7: N-(1-benzyl-4-(3-oxo-3-(phenylamino)propyl)-1H-imidazol-2-yl)-3-(1H-pyrazol-4-yl)benzamide TFA (1.0 mL) was added to the solution of N-(1-benzyl-4-(3-oxo-3-(phenylamino)propyl)-1H-imidazol-2-yl)-3-(1-((2-(trimethylsilyl)ethoxy)methyl)-1H-pyrazol-4-yl)benzamide (133 mg, 0.21 mmol) in DCM (10 mL) and stirred at room temperature for overnight. The reaction mixture was quenched with sat. aq. $NaHCO_3$ and extracted with DCM, dried over anhydrous $Na_2SO_4$ and concentrated under reduced pressure. Purification by silica gel column chromatography using DCM/MeOH as the eluent to afford the title compound (59 mg, 56%). $^1$H NMR (DMSO-$D_6$, 400 MHz): δ 9.96 (s, 1H), 8.30 (s, 1H), 8.20-7.90 (m, 3H), 7.75-7.60 (m, 1H), 7.59-7.57 (m, 2H), 7.31-7.27 (m, 8H), 7.05-7.01 (M, 1H), 6.82 (s, 1H), 5.15 (s, 2H), 2.85-2.81 (m, 2H), 2.65-2.61 (m, 2H).

The following compounds were made in a similar manner to that described in Example 292 and in general scheme 1.

TABLE 25

| Ex. | Structure | Analytical data |
|---|---|---|
| 293 | | ¹H NMR (DMSO-D₆, 400 MHz): δ 12.98 (s, 1H), 12.59 (bs, 0.5H), 10.53 (bs, 0.5H), 9.99 (s, 1H), 8.23-8.10 (m, 2H), 8.01-7.36 (m, 10H), 7.28-7.24 (m, 3H), 7.01-6.99 (m, 1H), 2.88-2.82 (m, 2H), 2.69-2.50 (m, 2H). |
| 294 | | ¹H NMR (CD₃OD, 400 MHz): δ 8.14 (s, 1H), 8.05-7.92 (m, 2H), 7.89-7.66 (m, 3H), 7.64-7.46 (m, 4H), 7.45-7.33 (m, 2H), 7.33-7.24 (m, 2H), 7.12-7.01 (m, 2H), 3.05-2.92 (m, 2H), 2.82-2.70 (m, 2H). |
| 295 | | ¹H NMR (DMSO-D₆, 400 MHz): δ 9.95 (s, 1H), 8.29 (s, 1H), 8.10 (s, 2H), 7.91-7.90 (m, 1H), 7.70-7.67 (m, 1H), 7.60-7.58 (m, 2H), 7.42-7.38 (m, 1H), 7.30-7.26 (m, 2H), 7.04-7.00 (m, 1H), 6.74 (s, 1H), 3.75-3.74 (m, 2H), 2.85-2.81 (m, 2H), 2.65-2.62 (m, 2H), 1.77-1.68 (m, 1H), 1.64-1.56 (m, 5H), 1.14-1.10 (m, 3H), 1.00-0.94 (m, 2H). |
| 296 | | ¹H NMR (CD₃OD, 400 MHz): δ 8.30 (s, 1H), 8.10-7.88 (m, 3H), 7.80-7.67 (m, 1H), 7.53-7.39 (m, 1H), 6.86 (s, 1H), 4.26 (s, 1H), 2.71 (s, 3H), 2.47-2.48 (m, 2H), 2.31-2.18 (m, 2H), 2.10-1.98 (m, 2H), 1.98-1.81 (m, 4H), 1.80-1.59 (m, 3H), 1.55-1.38 (m, 2H), 1.32-1.25 (m, 1H). |
| 297 | | ¹H NMR (CD₃OD, 400 MHz): δ 8.14-7.86 (m, 3H), 7.81-7.60 (m, 3H), 7.54-7.36 (m, 2H), 7.28-7.16 (m, 2H), 7.11-6.98 (m, 1H), 5.69 (bs, 1H), 2.72 (s, 3H), 2.69-2.61 (m, 2H), 2.32-2.26 (m, 2H), 2.04-1.96 (m, 2H). |

| Ex. | Structure | Analytical data |
|---|---|---|
| 298 | | ¹H NMR (CD₃OD, 400 MHz): δ 8.10-7.92 (m, 3H), 7.76-7.52 (m, 3H), 7.44-7.38 (m, 1H), 7.25-7.19 (m, 1H), 7.13-7.07 (m, 1H), 7.04-6.99 (m, 1H), 2.72 (s, 3H), 2.67-2.63 (m, 2H), 2.32-2.28 (m, 2H), 2.04-1.96 (m, 2H). |
| 299 | | ¹H NMR (CDCl₃, 400 MHz): δ 8.31 (s, 1H), 8.04-8.00 (m, 1H), 7.80 (s, 1H), 7.74-7.68 (m, 2H), 7.64 (s, 1H), 7.56-7.52 (m, 1H), 7.39-7.34 (m, 1H), 7.26-7.20 (m, 2H), 6.77 (s, 1H), 3.94 (s, 3H), 3.69-3.65 (m, 2H), 3.50-3.46 (m, 3H), 3.13-3.09 (m, 1H), 2.71-2.66 (m, 2H), 2.47-2.37 (m, 2H), 2.31 (s, 3H), 2.23-2.18 (m, 1H), 2.10-2.02 (m, 3H). |
| 300 | | ¹H NMR (CDCl₃, 400 MHz): δ 8.31 (s, 1H), 8.03-7.99 (m, 1H), 7.78 (s, 1H), 7.71-7.67 (m, 2H), 7.63 (s, 1H), 7.56-7.52 (m, 2H), 7.39-7.34 (m, 1H), 7.26-7.22 (m, 1H), 6.74 (s, 1H), 5.73 (bs, 1H), 3.94 (s, 3H), 2.74-2.58 (m, 1H), 2.54-2.39 (m, 2H), 2.28-2.20 (m, 1H), 2.04-1.92 (m, 2H), 1.88-1.78 (m, 1H), 0.82-0.74 (m, 1H), 0.62-0.48 (m, 2H), 0.30-0.22 (m, 1H). |

Example 301. N-(1-(4-fluorophenyl)-4-(6-(piperidin-1-yl)hexyl)-1H-imidazol-2-yl)-3-(1H-pyrazol-4-yl)benzamide

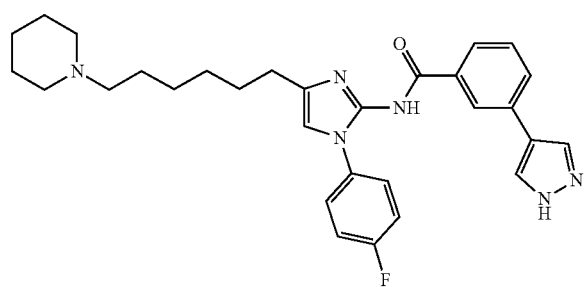 [SMILES: O=C(Nc1nc(CCCCCCN2CCCCC2)cn1-c1ccc(F)cc1)c1cccc(-c2cn[nH]c2)c1]

Step 1: methyl 8-bromo-7-oxooctanoate

To a stirred and heated (70° C.) solution of 7-oxoctanoic acid (25 g, 158.04 mmol) in MeOH (250 mL) was added a solution of Br₂ (8.15 mL, 158.04 mmol) in MeOH (50 mL) over 10 min and refluxed for 2 h. The reaction mixture was cooled to room temperature, and the solvent was removed under reduced pressure. The residue was diluted with DCM (100 mL) and washed with sat. aq. NaHCO₃ (50 mL×3). The organic phase was dried over anhydrous Na₂SO₄ and concentrated under reduced pressure to afford the title compound (crude obtained).

Step 2: methyl 8-((4-fluorophenyl)amino)-7-oxooctanoate

To a solution of methyl 8-bromo-7-oxooctanoate (3.0 g, 11.95 mmol) and 4-fluoroaniline (0.96 mL, 10.15 mmol) in dry DMF (50 mL) was added NaHCO₃ (1.2 g, 14.33 mmol). The reaction mixture was stirred at room temperature for overnight. The mixture was diluted with ethyl acetate (40 mL) and washed with water (30 mL×3) and brine (30 mL). The organic phase was dried over anhydrous Na₂SO₄ and concentrated under reduced pressure to afford the title compound (3.18 g, 95%).

Step 3: methyl 6-(2-amino-1-(4-fluorophenyl)-1H-imidazol-4-yl)hexanoate

A solution of methyl 8-((4-fluorophenyl)amino)-7-oxooctanoate (3.18 g, 11.3 mmol) and cyanamide (2.37 g, 56.52 mmol) in MeOH (50 mL) was refluxed for overnight. The solvent was removed under reduced pressure. The residue was diluted with DCM (20 mL), washed with water (30 mL×3). The organic phase was dried over anhydrous Na₂SO₄ and concentrated under reduced pressure. Purification by silica gel column chromatography using DCM/MeOH as the eluent to afford the title compound (1.19 g, 34%). $^1$H NMR (CDCl₃, 400 MHz): δ 7.38-7.32 (m, 2H), 7.18-7.13 (m, 2H), 6.37 (s, 1H), 3.66 (s, 3H), 2.50-2.42 (m, 2H), 2.34-2.28 (m, 2H), 1.70-1.60 (m, 4H), 1.46-1.38 (m, 2H).

Step 4: methyl 6-(1-(4-fluorophenyl)-2-(3-(1-((2-(trimethylsilyl)ethoxy)methyl)-1H-pyrazol-4-yl)benzamido)-1H-imidazol-4-yl)hexanoate A mixture of methyl 6-(2-amino-1-(4-fluorophenyl)-1H-imidazol-4-yl)hexanoate (500 mg, 1.637 mmol), 3-(1-((2-(trimethylsilyl)ethoxy)methyl)-1H-pyrazol-4-yl)benzoic acid (Intermediate 1) (573 mg, 1.80 mmol), HATU (934 mg, 2.456 mmol) and DIPEA (0.86 mL, 4.912 mmol) in DCM was stirred at room temperature for overnight. The reaction mixture was quenched with water and extracted with DCM, dried over anhydrous Na₂SO₄ and concentrated under reduced pressure. Purification by silica gel column chromatography using DCM/MeOH as the eluent to afford the title compound (730 mg, 74%). $^1$H NMR (CDCl₃, 400 MHz): δ 8.33 (s, 1H), 8.04-8.00 (m, 1H), 7.87 (s, 1H), 7.86 (s, 1H), 7.70-7.67 (m, 2H), 7.58-7.56 (m, 1H), 7.40-7.37 (m, 1H), 7.22-7.18 (m, 2H), 6.56 (s, 1H), 5.46 (s, 2H), 3.67 (s, 3H), 3.62-3.57 (m, 2H), 2.62-2.58 (m, 2H), 2.36-2.32 (m, 2H), 1.74-1.66 (m, 4H), 1.46-1.42 (m, 2H), 0.95-0.91 (m, 2H), −0.02 (s, 9H).

Step 5: N-(1-(4-fluorophenyl)-4-(6-hydroxyhexyl)-1H-imidazol-2-yl)-3-(1-((2-(trimethylsilyl)ethoxy)methyl)-1H-pyrazol-4-yl)benzamide To a solution methyl 6-(1-(4-fluorophenyl)-2-(3-(1-((2-(trimethylsilyl)ethoxy)methyl)-1H-pyrazol-4-yl)benzamido)-1H-imidazol-4-yl)hexanoate (730 mg, 1.20 mmol) in anhydrous THF (20 mL) was added LiAlH₄ (1.0 M in THF, 1.20 mL, 1.20 mmol) at −78° C. The reaction mixture was stirred at room temperature for 1 h, quenched with water, 15%-NaOH and stirred for 1 h. The mixture filtered through celite, filtrate was concentrated under reduced pressure. Purification by silica gel column chromatography using DCM/MeOH as the eluent to afford the title compound (486 mg, 70%). $^1$H NMR (CDCl₃, 400 MHz): δ 8.34 (s, 1H), 8.04-8.00 (m, 1H), 7.86 (s, 1H), 7.85 (s, 1H), 7.70-7.67 (m, 2H), 7.58-7.56 (m, 1H), 7.40-7.37 (m, 1H), 7.22-7.18 (m, 2H), 6.54 (s, 1H), 5.46 (s, 2H), 3.68-3.65 (m, 2H), 3.62-3.57 (m, 2H), 2.62-2.58 (m, 2H), 1.74-1.65 (m, 2H), 1.65-1.40 (m, 6H), 0.95-0.91 (m, 2H), −0.02 (s, 9H).

Step 6: N-(1-(4-fluorophenyl)-4-(6-oxohexyl)-1H-imidazol-2-yl)-3-(1-((2-(trimethylsilyl)ethoxy)methyl)-1H-pyrazol-4-yl)benzamide To a solution of oxalyl chloride (86 μL, 0.997 mmol) in anhydrous DCM was added dropwise a solution of DMSO (0.155 mL, 1.994 mmol) in DCM at −78° C. After 15 min, to the mixture was added dropwise a solution of N-(1-(4-fluorophenyl)-4-(6-hydroxyhexyl)-1H-imidazol-2-yl)-3-(1-((2-(trimethylsilyl)ethoxy)methyl)-1H-pyrazol-4-yl)benzamide (480 mg, 0.831 mmol) in DCM over 10 min. After 1 h, TEA (0.58 mL, 4.154 mmol) was added and the reaction mixture was allowed to warm to room temperature. The reaction mixture was quenched with water extracted with DCM. The organic phase was washed with 1N—HCl, sat. aq. NaHCO₃, brine, dried over anhydrous Na₂SO₄ and concentrated under reduced pressure to afford the title compound (460 mg, 96%).

Step 7: N-(1-(4-fluorophenyl)-4-(6-(piperidin-1-yl)hexyl)-1H-imidazol-2-yl)-3-(1-((2-(trimethylsilyl)ethoxy)methyl)-1H-pyrazol-4-yl)benzamide To a solution of N-(1-(4-fluorophenyl)-4-(6-oxohexyl)-1H-imidazol-2-yl)-3-(1-((2-(trimethylsilyl)ethoxy)methyl)-1H-pyrazol-4-yl)benzamide (460 mg, 0.799 mmol) and piperidine (0.16 mL, 1.598 mmol) in THF was added NaBH₃CN (100 mg, 1.598 mmol). The reaction mixture was stirred at room temperature for overnight. The reaction mixture was quenched with water and extracted with DCM, dried over anhydrous Na₂SO₄ and concentrated under reduced pressure. Purification by silica gel column chromatography using DCM/MeOH as the eluent to afford the title compound (260 mg, 50%). $^1$H NMR (CDCl₃, 400 MHz): δ 8.34 (s, 1H), 8.06-8.02 (m, 1H), 7.86 (s, 1H), 7.85 (s, 1H), 7.72-7.68 (m, 2H), 7.58-7.52 (m, 1H), 7.40-7.35 (m, 1H), 7.24-7.20 (m, 2H), 6.53 (s, 1H), 5.46 (s, 2H), 3.62-3.57 (m, 2H), 2.62-2.52 (m, 2H), 2.43-2.25 (m, 6H), 1.72-1.62 (m, 2H), 1.62-1.50 (m, 6H), 1.50-1.30 (m, 6H), 0.95-0.91 (m, 2H), −0.02 (s, 9H).

Step 8: N-(1-(4-fluorophenyl)-4-(6-(piperidin-1-yl)hexyl)-1H-imidazol-2-yl)-3-(1H-pyrazol-4-yl)benzamide TFA (1.0 mL) was added to the solution of N-(1-(4-fluorophenyl)-4-(6-(piperidin-1-yl)hexyl)-1H-imidazol-2-yl)-3-(1-((2-(trimethylsilyl)ethoxy)methyl)-1H-pyrazol-4-yl)benzamide (260 mg, 0.40 mmol) in DCM (10 mL) and stirred at room temperature for overnight. The reaction mixture was quenched with sat. aq. NaHCO₃ and extracted with DCM, dried over anhydrous Na₂SO₄ and concentrated under reduced pressure. Purification by silica gel column chromatography using DCM/MeOH as the eluent to afford the title compound (124 mg, 60%). $^1$H NMR (CD₃OD, 400 MHz): δ 8.13-7.90 (m, 3H), 7.80-7.70 (m, 2H), 7.68-7.50 (m, 2H), 7.48-7.42 (m, 1H), 7.27-7.22 (m, 2H), 7.06 (s, 1H), 3.30-2.98 (m, 6H), 2.69-2.62 (m, 2H), 1.88-1.70 (m, 8H), 1.70-1.58 (m, 2H), 1.58-1.40 (m, 4H).

Example 302. N-(1-(2,4-difluorophenyl)-4-(6-(piperidin-1-yl)hexyl)-1H-imidazol-2-yl)-3-(1H-pyrazol-4-yl)benzamide

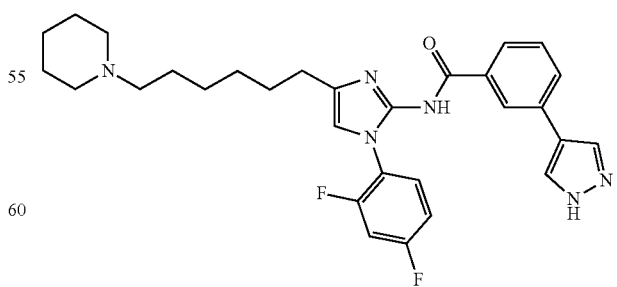

Example 302 was made in a manner similar with Example 301 (155 mg, 62%). $^1$H NMR (CD₃OD, 400 MHz): δ 8.13-7.85 (m, 3H), 7.80-7.70 (m, 1H), 7.70-0.65 (m, 1H), 7.65-7.55 (m, 1H), 7.44-7.40 (m, 1H), 7.26-7.21 (m, 1H), 7.15-7.08 (m, 1H), 6.99 (s, 1H), 3.30-2.98 (m, 6H), 2.67-2.63 (m, 2H), 1.88-1.70 (m, 8H), 1.70-1.58 (m, 2H), 1.58-1.40 (m, 4H).

Example 303. N-(4-(3-oxo-3-(phenylamino)propyl)-1-(pyridin-4-yl)-1H-imidazol-2-yl)-3-(1H-pyrazol-4-yl)benzamide

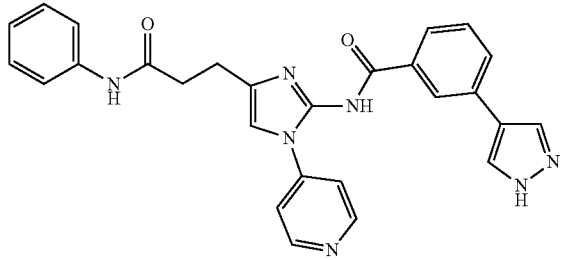 [SMILES: O=C(CCc1cn(-c2ccncc2)c(NC(=O)c2cccc(-c3cn[nH]c3)c2)n1)Nc1ccccc1]

Step 1: methyl 5-bromo-4-oxopentanoate

To a stirred and heated (70° C.) solution of levulinic acid (10 g, 86.12 mmol) in MeOH (100 mL) was added a solution of $Br_2$ (4.43 mL, 86.12 mmol) in MeOH (20 mL) over 10 min and refluxed for 2 h. The reaction mixture was cooled to room temperature, and the solvent was removed under reduced pressure. The residue was diluted with DCM (100 mL) and washed with sat. aq. $NaHCO_3$ (50 mL×3). The organic phase was dried over anhydrous $Na_2SO_4$ and concentrated under reduced pressure to afford the title (crude obtained).

Step 2: tert-butyl 2-amino-4-(3-methoxy-3-oxopropyl)-1H-imidazole-1-carboxylate

To a solution of methyl 5-bromo-4-oxopentanoate (1.0 g, 4.78 mmol) in THF was added 1-Boc-guanidine (2.28 g, 14.35 mmol). The reaction mixture was stirred at room temperature for overnight. The mixture was evaporated under reduced pressure. Purification by silica gel column chromatography using ethyl acetate/hexane as the eluent to afford the title compound (955 mg, 74%). $^1$H NMR (CDCl$_3$, 400 MHz): δ 6.55 (s, 1H), 5.58 (bs, 2H), 3.68 (s, 3H), 2.72-2.68 (m, 2H), 2.68-2.60 (m, 2H), 1.58 (s, 9H).

Step 3: methyl 3-(2-amino-1H-imidazol-4-yl)propanoate

TFA (2.0 mL) was added to the solution of tert-butyl 2-amino-4-(3-methoxy-3-oxopropyl)-1H-imidazole-1-carboxylate (450 mg, 1.67 mmol) in DCM (10 mL) and stirred at room temperature for overnight. The mixture was evaporated under reduced pressure to afford the title compound (crude obtained). $^1$H NMR (CDCl$_3$, 400 MHz): δ 11.11 (bs, 1H), 10.87 (bs, 1H), 6.37 (s, 1H), 3.70 (s, 3H), 2.81-2.76 (m, 2H), 2.78-2.60 (m, 2H).

Step 4: methyl 3-(2-amino-1-(pyridin-4-yl)-1H-imidazol-4-yl)propanoate

To a sealed tube was added methyl 3-(2-amino-1H-imidazol-4-yl)propanoate (710 mg, 1.787 mmol), 4-iodopyridine (403 mg, 1.966 mmol), CuI (34 mg, 0.179 mmol), 8-hydroxyquinoline (40 mg, 0.268 mmol), $Cs_2CO_3$ (2.4 mg, 7.149 mmol) and t-BuOH (6 mL). The mixture was heated at 100° C. in a sealed tube for overnight. The reaction mixture was cooled, diluted with ethyl acetate/MeOH (10/1), filtered through celite, filtrate was concentrated under reduced pressure. Purification by silica gel column chromatography using DCM/MeOH as the eluent to afford the title compound (148 mg, 34%). $^1$H NMR (CDCl$_3$, 400 MHz): δ 8.69-8.65 (m, 2H), 7.38-7.33 (m, 2H), 6.52 (s, 1H), 4.50 (bs, 2H), 3.67 (s, 3H), 2.82-2.77 (m, 2H), 2.70-2.62 (m, 2H).

Step 4: methyl 3-(1-(pyridin-4-yl)-2-(3-(1-((2-(trimethylsilyl)ethoxy)methyl)-1H-pyrazol-4-yl)benzamido)-1H-imidazol-4-yl)propanoate A mixture of methyl 3-(2-amino-1-(pyridin-4-yl)-1H-imidazol-4-yl)propanoate (147 mg, 0.597 mmol), 3-(1-((2-(trimethylsilyl)ethoxy)methyl)-1H-pyrazol-4-yl)benzoic acid (Intermediate 1) (228 mg, 0.716 mmol), HBTU (340 mg, 0.895 mmol) and DIPEA (0.31 mL, 1.791 mmol) in DCM was stirred at room temperature for overnight. The reaction mixture was quenched with water and extracted with DCM, dried over anhydrous $Na_2SO_4$ and concentrated under reduced pressure. Purification by silica gel column chromatography using DCM/MeOH as the eluent to afford the title compound (245 mg, 75%). $^1$H NMR (CDCl$_3$, 400 MHz): δ 8.80-8.75 (m, 2H), 8.37 (s, 1H), 2.12-8.08 (m, 1H), 7.90-7.82 (m, 4H), 7.62-7.59 (m, 1H), 7.44-7.40 (m, 1H), 6.71 (s, 1H), 5.46 (s, 2H), 3.76 (s, 3H), 3.62-3.58 (m, 2H), 2.95-2.90 (m, 2H), 2.73-2.70 (m, 2H), 0.95-0.90 (m, 2H), −0.02 (s, 9H).

Step 5: 3-(1-(pyridin-4-yl)-2-(3-(1-((2-(trimethylsilyl)ethoxy)methyl)-1H-pyrazol-4-yl)benzamido)-1H-imidazol-4-yl)propanoic acid To a solution of methyl 3-(1-(pyridin-4-yl)-2-(3-(1-((2-(trimethylsilyl)ethoxy)methyl)-1H-pyrazol-4-yl)benzamido)-1H-imidazol-4-yl)propanoate (228 mg, 0.417 mmol) in MeOH (10 mL) was added 1N—NaOH (0.84 mL, 0.84 mmol). The reaction mixture was stirred at room temperature for overnight. The mixture was evaporated under reduced pressure and acidified with 1N—HCl, extracted with DCM. The organic phase was dried over anhydrous $Na_2SO_4$ and concentrated under reduced pressure to afford the title compound (31 mg, 14%).

Step 6: N-(4-(3-oxo-3-(phenylamino)propyl)-1-(pyridin-4-yl)-1H-imidazol-2-yl)-3-(1-((2-(trimethylsilyl)ethoxy)methyl)-1H-pyrazol-4-yl)benzamide A mixture of 3-(1-(pyridin-4-yl)-2-(3-(1-((2-(trimethylsilyl)ethoxy)methyl)-1H-pyrazol-4-yl)benzamido)-1H-imidazol-4-yl)propanoic acid (31 mg, 0.0582 mmol), aniline (6.5 mg, 0.0698 mmol), HBTU (33.1 mg, 0.0873 mmol) and DIPEA (30 μL, 0.175 mmol) in DCM was stirred at room temperature for overnight. The reaction mixture was quenched with water and extracted with DCM, dried over anhydrous $Na_2SO_4$ and concentrated under reduced pressure. Purification by silica gel column chromatography using DCM/MeOH as the eluent to afford the title compound (18 mg, 51%).

Step 7: N-(4-(3-oxo-3-(phenylamino)propyl)-1-(pyridin-4-yl)-1H-imidazol-2-yl)-3-(1H-pyrazol-4-yl)benzamide TFA (0.3 mL) was added to the solution of N-(4-(3-oxo-3-(phenylamino)propyl)-1-(pyridin-4-yl)-1H-imidazol-2- yl)-3-(1-((2-(trimethylsilyl)ethoxy)methyl)-1H-pyrazol-4-yl)benzamide (38 mg, 0.06 mmol) in DCM (5 mL) and stirred at room temperature for overnight.

The reaction mixture was quenched with sat. aq. NaHCO$_3$ and extracted with DCM, dried over anhydrous Na$_2$SO$_4$ and concentrated under reduced pressure. Purification by silica gel column chromatography using DCM/MeOH as the eluent to afford the title compound (8.2 mg, 27%). $^1$H NMR (CD$_3$OD, 400 MHz): δ 8.58-8.56 (m, 2H), 8.22 (s, 1H), 7.97 (s, 2H), 7.86-7.83 (m, 1H), 7.76-7.75 (m, 2H), 7.69-7.68 (m, 1H), 7.54-7.53 (m, 2H), 7.42-7.38 (m, 1H), 7.29-7.25 (m, 2H), 7.15 (s, 1H), 7.08-7.04 (m, 1H), 2.99-2.95 (m, 2H), 2.78-2.75 (m, 2H).

TEST EXAMPLES

Test Example 1. In Vitro IRAK4 Phosphorylation Activity Assay

In vitro IRAK4 analysis was performed using N-(1H-imidazol-2-yl)benzamide compounds according to the present invention. All compounds were prepared by dissolving in DMSO. N-(1H-imidazol-2-yl)benzamide compound according to the present invention and other elements for the reaction were added to an assay well. In the standard Kinase Profiler service the preincubation step between the N-(1H-imidazol-2-yl)benzamide compound and kinase was not performed before the reaction.

To the positive control well, all reactants except for the N-(1H-imidazol-2-yl)benzamide compound according to the present invention were added, and DMSO was added to remove the solvent effect. A known control inhibitor having the following structure was added to the blank wells to inhibit kinase activity and establish a base-line.

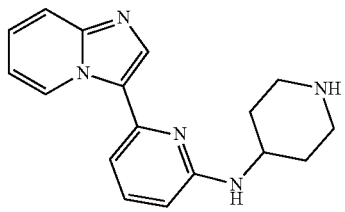 [SMILES: c1cc(NC2CCNCC2)nc(-c2cnc3ccccn23)c1]

IRAK4 was incubated with 8 mM MOPS pH 7.0, 0.2 mM EDTA, 0.33 mg/mL myelin basic protein, 10 mM magnesium acetate and [γ-33P]-ATP (specific activity approx. 500 cpm/pmol, concentration as required). The reaction was initiated by the addition of the MgATP mix. After incubation for 40 minutes at room temperature, the reaction was stopped by the addition of 3% phosphoric acid solution. 10 μL of the reaction was then spotted onto a P30 filtermat and washed three times for 5 minutes in 75 mM phosphoric acid and once in methanol prior to drying and scintillation counting.

The results are shown in Table 26 below, where the phosphorylation activity of IC$_{50}$ values for IRAK4 is shown in categories (A: <50 nM, B: 50-100 nM, C: >100 nM).

TABLE 26

| Ex. No | IC$_{50}$ for IRAK4 |
|---|---|
| 1 | C |
| 2 | C |
| 3 | C |

TABLE 26-continued

| Ex. No | IC$_{50}$ for IRAK4 |
|---|---|
| 4 | C |
| 5 | C |
| 6 | A |
| 7 | A |
| 8 | B |
| 9 | C |
| 10 | B |
| 11 | A |
| 12 | A |
| 13 | B |
| 14 | C |
| 15 | C |
| 16 | A |
| 17 | C |
| 18 | A |
| 19 | B |
| 20 | C |
| 21 | B |
| 22 | C |
| 23 | A |
| 24 | A |
| 25 | B |
| 26 | C |
| 27 | C |
| 28 | A |
| 29 | A |
| 30 | A |
| 31 | B |
| 32 | A |
| 33 | A |
| 34 | A |
| 35 | A |
| 36 | A |
| 37 | A |
| 38 | A |
| 39 | B |
| 40 | A |
| 41 | C |
| 42 | B |
| 43 | C |
| 44 | C |
| 45 | B |
| 46 | B |
| 47 | C |
| 48 | C |
| 49 | C |
| 50 | C |
| 51 | C |
| 52 | A |
| 53 | A |
| 54 | A |
| 55 | A |
| 56 | A |
| 57 | A |
| 58 | A |
| 59 | A |
| 60 | A |
| 61 | A |
| 62 | A |
| 63 | A |
| 64 | A |
| 65 | A |
| 66 | A |
| 67 | C |
| 68 | A |
| 69 | A |
| 70 | A |
| 71 | A |
| 72 | C |
| 73 | B |
| 74 | — |
| 75 | — |
| 76 | A |
| 77 | A |
| 78 | A |
| 79 | A |
| 80 | A |
| 81 | A |

TABLE 26-continued

| Ex. No | IC$_{50}$ for IRAK4 |
|---|---|
| 82 | B |
| 83 | A |
| 84 | A |
| 85 | A |
| 86 | A |
| 87 | A |
| 88 | A |
| 89 | A |
| 90 | A |
| 91 | A |
| 92 | A |
| 93 | A |
| 94 | A |
| 95 | A |
| 96 | A |
| 97 | A |
| 98 | A |
| 99 | A |
| 100 | A |
| 101 | A |
| 102 | A |
| 103 | A |
| 104 | C |
| 105 | A |
| 106 | A |
| 107 | A |
| 108 | A |
| 109 | A |
| 110 | A |
| 111 | A |
| 112 | C |
| 113 | A |
| 114 | A |
| 115 | A |
| 116 | A |
| 117 | A |
| 118 | A |
| 119 | A |
| 120 | A |
| 121 | A |
| 122 | B |
| 123 | A |
| 124 | A |
| 125 | A |
| 126 | A |
| 127 | A |
| 128 | A |
| 129 | — |
| 130 | — |
| 131 | — |
| 132 | — |
| 133 | — |
| 134 | — |
| 135 | — |
| 136 | — |
| 137 | — |
| 138 | B |
| 139 | A |
| 140 | B |
| 141 | A |
| 142 | A |
| 143 | A |
| 144 | A |
| 145 | A |
| 146 | A |
| 147 | A |
| 148 | B |
| 149 | A |
| 150 | A |
| 151 | A |
| 152 | B |
| 153 | B |
| 154 | A |
| 155 | A |
| 156 | A |
| 157 | A |
| 158 | A |
| 159 | A |
| 160 | A |
| 161 | A |
| 162 | B |
| 163 | B |
| 164 | A |
| 165 | A |
| 166 | A |
| 167 | A |
| 168 | A |
| 169 | A |
| 170 | A |
| 171 | A |
| 172 | A |
| 173 | B |
| 174 | A |
| 175 | A |
| 176 | A |
| 177 | A |
| 178 | A |
| 179 | A |
| 180 | A |
| 181 | A |
| 182 | A |
| 183 | A |
| 184 | C |
| 185 | B |
| 186 | B |
| 187 | A |
| 188 | A |
| 189 | A |
| 190 | A |
| 191 | A |
| 192 | — |
| 193 | B |
| 194 | A |
| 195 | A |
| 195 | A |
| 197 | A |
| 198 | A |
| 199 | A |
| 200 | A |
| 201 | A |
| 202 | A |
| 203 | B |
| 204 | A |
| 205 | A |
| 206 | A |
| 207 | A |
| 208 | A |
| 209 | A |
| 210 | A |
| 211 | A |
| 212 | A |
| 213 | A |
| 214 | C |
| 215 | B |
| 216 | — |
| 217 | A |
| 218 | A |
| 219 | A |
| 220 | A |
| 221 | A |
| 222 | A |
| 223 | A |
| 224 | A |
| 225 | A |
| 226 | A |
| 227 | A |
| 228 | A |
| 229 | A |
| 230 | A |
| 231 | A |
| 232 | B |
| 233 | B |
| 234 | A |
| 235 | A |
| 236 | A |
| 237 | A |

TABLE 26-continued

| Ex. No | IC$_{50}$ for IRAK4 |
|---|---|
| 238 | A |
| 239 | A |
| 240 | A |
| 241 | A |
| 242 | A |
| 243 | B |
| 244 | A |
| 245 | A |
| 246 | A |
| 247 | A |
| 248 | C |
| 249 | A |
| 250 | A |
| 251 | C |
| 252 | A |
| 253 | B |
| 254 | A |
| 255 | A |
| 256 | A |
| 257 | A |
| 258 | A |
| 259 | A |
| 260 | A |
| 261 | A |
| 262 | A |
| 263 | B |
| 264 | C |
| 265 | C |
| 266 | A |
| 267 | A |
| 268 | B |
| 269 | C |
| 270 | A |
| 271 | A |
| 272 | A |
| 273 | A |
| 274 | A |
| 275 | A |
| 276 | A |
| 277 | A |
| 278 | A |
| 279 | A |
| 280 | A |
| 281 | A |
| 282 | C |
| 283 | C |
| 284 | C |
| 285 | A |
| 286 | A |
| 287 | A |
| 288 | C |
| 289 | C |
| 290 | C |
| 291 | C |
| 292 | C |
| 293 | A |
| 294 | B |
| 295 | C |
| 296 | A |
| 297 | A |
| 298 | B |
| 299 | A |
| 300 | A |
| 301 | A |
| 302 | C |
| 303 | C |

As shown in Table 26, the N-(1H-imidazol-2-yl)benzamide compounds according to the present invention exhibit excellent inhibitory activity against IRAK-4, so that the compound can be used for efficient prevention and treatment of diseases mediated by IRAK-4 receptors, particularly autoimmune diseases or lymphomas.

While the invention has been described with respect to the above specific embodiments, it should be recognized that various modifications and changes may be made to the invention by those skilled in the art which also fall within the scope of the invention as defined by the appended claims.

The invention claimed is:

1. A compound of formula (I), or a pharmaceutically acceptable salt, a prodrug, a solvate, or a stereoisomer thereof:

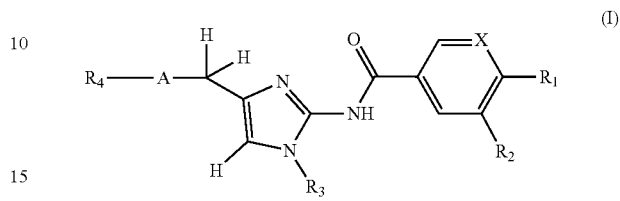

(I)

wherein

X is =CH— or =N—;

R$_1$ and R$_2$ are each independently H or 5-10 membered heteroaryl; or R$_1$ and R$_2$, together with the carbon atoms to which they are attached, form a 5-7 membered heterocyclic ring;

R$_3$ is C$_{6-10}$ aryl, 5-10 membered heteroaryl, C$_{6-10}$ aryl-C$_{1-3}$ alkyl, C$_{3-10}$ cycloalkyl, or C$_{3-10}$ cycloalkyl-C$_{1-3}$ alkyl;

A is a single bond, C$_{1-6}$ alkylene, —C(=O)—(CH$_2$)$_n$—, —O—C(=O)—(CH$_2$)$_n$—, —N(—Rx)—(CH$_2$)$_n$—, —N(—Rx)—C(=O)—(CH$_2$)$_n$—, —C(=O)—N(—Rx)—(CH$_2$)$_n$—, or —(CH$_2$)$_m$—N(—Rx)—C(=O)—(CH$_2$)$_n$—, wherein n is an integer of 0 to 6, m is an integer of 0 to 6, and Rx is H or C$_{1-6}$ alkyl;

R$_4$ is hydroxy, C$_{1-6}$ alkyl, hydroxyC$_{1-6}$ alkyl, C$_{1-10}$ alkoxy, amino, C$_{1-6}$ alkylamino, diC$_{1-6}$ alkylamino, C$_{6-10}$ aryl, C$_{3-10}$ cycloalkyl, 5-10 membered heteroaryl, 4-10 membered heterocycloalkyl, or C$_{6-10}$ aryl-(CH$_2$)$_p$-4-10 membered heterocycloalkyl, wherein p is an integer of 0 to 3;

the aryl, the cycloalkyl, the heteroaryl and the heterocycloalkyl each optionally have at least one substituent selected from the group consisting of halogen, C$_{1-6}$ alkyl, C$_{1-6}$ alkoxy, C$_{1-6}$ alkoxy-C$_{1-6}$ alkyl, haloC$_{1-3}$ alkoxy, hydroxycarbonyl, haloC$_{1-3}$ alkyl, oxido, amino, C$_{1-6}$ alkylamino, diC$_{1-6}$ alkylamino, C$_{3-6}$ cycloalkyl, 4-7 membered heterocycloalkyl, hydroxyC$_{1-6}$ alkyl, cyano, C$_{1-6}$ alkylcarbonyl, C$_{1-6}$ alkylsulfonyl, oxo, nitro, C$_{1-6}$ alkoxycarbonyloxy-C$_{1-6}$ alkyl, and trimethylsilylethoxymethyl; and the heterocyclic ring, the heteroaryl and the heterocycloalkyl each contain at least one heteroatom selected from the group consisting of N, O and S.

2. The compound of formula (I), or a pharmaceutically acceptable salt, a prodrug, a solvate, or a stereoisomer thereof, according to claim 1, wherein R$_1$ is H; and R$_2$ is H or 5-10 membered heteroaryl containing at least one nitrogen atom, wherein the heteroaryl optionally has one or two substituents selected from the group consisting of halogen, C$_{1-6}$ alkyl, C$_{1-6}$ alkoxy-C$_{1-6}$ alkyl, haloC$_{1-3}$ alkyl, amino, nitro, C$_{1-6}$ alkoxycarbonyloxy-C$_{1-6}$ alkyl, and trimethylsilylethoxymethyl; or R$_1$ and R$_2$, together with the carbon atoms to which they are attached, form a 5-7 membered heterocyclic ring containing one or two nitrogen atoms.

3. The compound of formula (I), or a pharmaceutically acceptable salt, a prodrug, a solvate, or a stereoisomer thereof, according to claim 2, wherein the heteroaryl is pyrazolyl, isoxazolyl, pyridinyl, indolyl, indazolyl, benzotriazolyl, or benzothiazolyl, each of which optionally has one or two substituents selected from the group consisting of fluoro, methyl, 1-ethoxyethyl, 2-ethoxypropan-2-yl, fluoromethyl, difluoromethyl, trifluoromethyl, amino, nitro, methoxycarbonyloxymethyl, ethoxycarbonyloxymethyl, and trimethylsilylethoxymethyl.

4. The compound of formula (I), or a pharmaceutically acceptable salt, a prodrug, a solvate, or a stereoisomer thereof, according to claim 1, wherein $R_3$ is $C_{6-10}$ aryl, $C_{6-10}$ aryl-$C_{1-3}$ alkyl, 5-6 membered heteroaryl containing nitrogen atom, $C_{5-7}$ cycloalkyl, or $C_{5-7}$ cycloalkyl-$C_{1-3}$ alkyl, wherein the aryl optionally has one or two substituents selected from halogens.

5. The compound of formula (I), or a pharmaceutically acceptable salt, a prodrug, a solvate, or a stereoisomer thereof, according to claim 1, wherein $R_3$ is phenyl, fluorophenyl, difluorophenyl, chlorophenyl, bromophenyl, benzyl, pyridinyl, cyclohexyl, or cyclohexylmethyl.

6. The compound of formula (I), or a pharmaceutically acceptable salt, a prodrug, a solvate, or a stereoisomer thereof, according to claim 1, wherein $R_4$ is hydroxy, $C_{1-3}$ alkyl, hydroxy$C_{1-6}$ alkyl, hydroxy-halo$C_{1-6}$ alkyl, $C_{1-6}$ alkoxy, amino, $C_{1-3}$ alkylamino, di$C_{1-3}$ alkylamino, $C_{3-8}$ cycloalkyl, $C_{6-10}$ aryl, 5-9 membered heteroaryl, 4-9 membered heterocycloalkyl, phenyl-5-7 membered heterocycloalkyl, or benzyl-5-7 membered heterocycloalkyl, wherein the aryl, the cycloalkyl, the heteroaryl and the heterocycloalkyl each optionally have at least one substituent selected from the group consisting of halogen, $C_{1-6}$ alkyl, $C_{1-6}$ alkoxy, $C_{1-6}$ alkoxy-$C_{1-6}$ alkyl, halo$C_{1-3}$ alkoxy, hydroxycarbonyl, halo$C_{1-3}$ alkyl, oxido, amino, $C_{1-6}$ alkylamino, di$C_{1-6}$ alkylamino, $C_{3-6}$ cycloalkyl, 4-7 membered heterocycloalkyl, hydroxy$C_{1-6}$ alkyl, cyano, $C_{1-3}$ alkylcarbonyl, $C_{1-3}$ alkylsulfonyl and oxo, and the heteroaryl and the heterocycloalkyl each contain at least one heteroatom selected from the group consisting of N, O and S.

7. The compound of formula (I), or a pharmaceutically acceptable salt, a prodrug, a solvate, or a stereoisomer thereof, according to claim 6, wherein the aryl is phenyl; the cycloalkyl is cyclopropyl, cyclobutyl, or cyclohexyl; the heteroaryl is pyridinyl, triazolyl, pyrazinyl, pyrazolyl, or indazolyl; and the heterocycloalkyl is piperidinyl, piperazinyl, pyrrolidinyl, morpholino, thiomorpholino, tetrahydropyranyl, tetrahydrofuranyl, azepanyl, or diazepanyl.

8. The compound of formula (I), or a pharmaceutically acceptable salt, a prodrug, a solvate, or a stereoisomer thereof, according to claim 6, wherein the substituent is selected from the group consisting of fluoro, methyl, t-butoxy, methoxy, methoxymethyl, trifluoromethoxy, hydroxycarbonyl, trifluoromethyl, oxido, amino, methylamino, dimethylamino, cyclopropyl, cyclohexyl, pyrrolidinyl, hydroxyethyl, cyano, methylcarbonyl, methylsulfonyl, and oxo.

9. The compound of formula (I), or a pharmaceutically acceptable salt, a prodrug, a solvate, or a stereoisomer thereof, according to claim 1, wherein the pharmaceutically acceptable salt is a hydrochloride salt, a citrate salt, a fumarate salt, a dihydroxysuccinate salt or a succinate salt of the compound of formula (I).

10. The compound of formula (I), or a pharmaceutically acceptable salt, a prodrug, a solvate, or a stereoisomer thereof, according to claim 1, which is selected from the group consisting of:

1) 3-(3-nitro-1H-pyrazol-4-yl)-N-(4-(3-oxo-3-(phenylamino)propyl)-1-phenyl-1H-imidazol-2-yl)benzamide;
2) 3-(3-amino-1H-pyrazol-4-yl)-N-(4-(3-oxo-3-(phenylamino)propyl)-1-phenyl-1H-imidazol-2-yl)benzamide;
3) N-(4-(3-oxo-3-(phenylamino)propyl)-1-phenyl-1H-imidazol-2-yl)-3-(3-(trifluoromethyl)-1H-pyrazol-4-yl)benzamide;
4) N-(4-(3-oxo-3-(phenylamino)propyl)-1-phenyl-1H-imidazol-2-yl)-5-(1H-pyrazol-4-yl)nicotinamide;
5) 3-(isoxazol-4-yl)-N-(4-(3-oxo-3-(phenylamino)propyl)-1-phenyl-1H-imidazol-2-yl)benzamide;
6) N-(4-(3-oxo-3-(phenylamino)propyl)-1-phenyl-1H-imidazol-2-yl)-3-(1H-pyrazol-4-yl)benzamide;
7) 3-(2-(3-(1H-pyrazol-4-yl)benzamido)-1-phenyl-1H-imidazol-4-yl)propanoic acid;
8) N-(4-(3-oxo-3-(piperidin-1-ylamino)propyl)-1-phenyl-1H-imidazol-2-yl)-3-(1H-pyrazol-4-yl)benzamide;
9) N-(4-(3-((4-methylpiperazin-1-yl)amino)-3-oxopropyl)-1-phenyl-1H-imidazol-2-yl)-3-(1H-pyrazol-4-yl)benzamide;
10) N-(4-(3-((4-fluorophenyl)amino)-3-oxopropyl)-1-phenyl-1H-imidazol-2-yl)-3-(1H-pyrazol-4-yl)benzamide;
11) N-(4-(3-morpholino-3-oxopropyl)-1-phenyl-1H-imidazol-2-yl)-3-(1H-pyrazol-4-yl)benzamide;
12) N-(4-(3-oxo-3-(piperidin-1-yl)propyl)-1-phenyl-1H-imidazol-2-yl)-3-(1H-pyrazol-4-yl)benzamide;
13) (S)—N-(4-(3-((2-(methoxymethyl)pyrrolidin-1-yl)amino)-3-oxopropyl)-1-phenyl-1H-imidazol-2-yl)-3-(1H-pyrazol-4-yl)benzamide;
14) N-(4-(3-oxo-3-(4-(4-(trifluoromethoxy) benzyl) piperazin-1-yl)propyl)-1-phenyl-1H-imidazol-2-yl)-3-(1H-pyrazol-4-yl)benzamide;
15) N-(4-(3-oxo-3-(pyridin-2-ylamino)propyl)-1-phenyl-1H-imidazol-2-yl)-3-(1H-pyrazol-4-yl)benzamide;
16) N-(4-(3-((2,4-difluorophenyl)amino)-3-oxopropyl)-1-phenyl-1H-imidazol-2-yl)-3-(1H-pyrazol-4-yl)benzamide;
17) (R)—N-(4-(3-((2-(methoxymethyl)pyrrolidin-1-yl)amino)-3-oxopropyl)-1-phenyl-1H-imidazol-2-yl)-3-(1H-pyrazol-4-yl)benzamide;
18) methyl 3-(2-(3-(1H-pyrazol-4-yl)benzamido)-1-phenyl-1H-imidazol-4-yl)propanoate;
19) (S)—N-(4-(3-(2-(methoxymethyl)pyrrolidin-1-yl)-3-oxopropyl)-1-phenyl-1H-imidazol-2-yl)-3-(1H-pyrazol-4-yl)benzamide;
20) (R)—N-(4-(3-(2-(methoxymethyl)pyrrolidin-1-yl)-3-oxopropyl)-1-phenyl-1H-imidazol-2-yl)-3-(1H-pyrazol-4-yl)benzamide;
21) N-(4-(3-((4H-1,2,4-triazol-4-yl)amino)-3-oxopropyl)-1-phenyl-1H-imidazol-2-yl)-3-(1H-pyrazol-4-yl)benzamide;
22) N-(4-(3-oxo-3-(pyrazin-2-ylamino)propyl)-1-phenyl-1H-imidazol-2-yl)-3-(1H-pyrazol-4-yl)benzamide;
23) (R)—N-(4-(3-(2-methylpyrrolidin-1-yl)-3-oxopropyl)-1-phenyl-1H-imidazol-2-yl)-3-(1H-pyrazol-4-yl)benzamide;
24) (S)—N-(4-(3-(2-methylpyrrolidin-1-yl)-3-oxopropyl)-1-phenyl-1H-imidazol-2-yl)-3-(1H-pyrazol-4-yl)benzamide;
25) (R)—1-(3-(2-(3-(1H-pyrazol-4-yl)benzamido)-1-phenyl-1H-imidazol-4-yl)propanoyl)pyrrolidine-3-carboxylic acid;
26) (S)—1-(3-(2-(3-(1H-pyrazol-4-yl)benzamido)-1-phenyl-1H-imidazol-4-yl)propanoyl)pyrrolidine-3-carboxylic acid;
27) N-(4-(3-oxo-3-(pyrrolidin-1-ylamino)propyl)-1-phenyl-1H-imidazol-2-yl)-3-(1H-pyrazol-4-yl)benzamide;

28) N-(4-(3-oxo-3-(pyrrolidin-1-yl)propyl)-1-phenyl-1H-imidazol-2-yl)-3-(1H-pyrazol-4-yl)benzamide;
29) N-(4-(3-((2R,5R)-2,5-dimethylpyrrolidin-1-yl)-3-oxopropyl)-1-phenyl-1H-imidazol-2-yl)-3-(1H-pyrazol-4-yl)benzamide;
30) (R)—N-(4-(3-(2-methylpiperidin-1-yl)-3-oxopropyl)-1-phenyl-1H-imidazol-2-yl)-3-(1H-pyrazol-4-yl)benzamide;
31) (S)—N-(4-(3-(2-methylpiperidin-1-yl)-3-oxopropyl)-1-phenyl-1H-imidazol-2-yl)-3-(1H-pyrazol-4-yl)benzamide;
32) N-(4-(3-((2R,6S)-2,6-dimethylpiperidin-1-yl)-3-oxopropyl)-1-phenyl-1H-imidazol-2-yl)-3-(1H-pyrazol-4-yl)benzamide;
33) N-(4-(3-(methylamino)-3-oxopropyl)-1-phenyl-1H-imidazol-2-yl)-3-(1H-pyrazol-4-yl)benzamide;
34) N-(4-(3-(3,3-dimethylpiperidin-1-yl)-3-oxopropyl)-1-phenyl-1H-imidazol-2-yl)-3-(1H-pyrazol-4-yl)benzamide;
35) N-(4-(3-(4,4-dimethylpiperidin-1-yl)-3-oxopropyl)-1-phenyl-1H-imidazol-2-yl)-3-(1H-pyrazol-4-yl)benzamide;
36) (S)—1-(3-(2-(3-(1H-pyrazol-4-yl)benzamido)-1-phenyl-1H-imidazol-4-yl)propanoyl) piperidine-3-carboxylic acid;
37) (S)—1-(3-(2-(3-(1H-pyrazol-4-yl)benzamido)-1-phenyl-1H-imidazol-4-yl)propanoyl) piperidine-3-carboxylic acid;
38) (S)—N-(4-(3-oxo-3-(2-(trifluoromethyl) piperidin-1-yl)propyl)-1-phenyl-1H-imidazol-2-yl)-3-(1H-pyrazol-4-yl)benzamide;
39) (R)—N-(4-(3-oxo-3-(2-(trifluoromethyl) piperidin-1-yl)propyl)-1-phenyl-1H-imidazol-2-yl)-3-(1H-pyrazol-4-yl)benzamide;
40) (R)—N-(4-(3-(3-aminopiperidin-1-yl)-3-oxopropyl)-1-phenyl-1H-imidazol-2-yl)-3-(1H-pyrazol-4-yl)benzamide;
41) N-(4-(2-(methylamino)-2-oxoethyl)-1-phenyl-1H-imidazol-2-yl)-3-(1H-pyrazol-4-yl)benzamide;
42) methyl 2-(2-(3-(1H-pyrazol-4-yl)benzamido)-1-phenyl-1H-imidazol-4-yl) acetate;
43) 2-(2-(3-(1H-pyrazol-4-yl)benzamido)-1-phenyl-1H-imidazol-4-yl) acetic acid;
44) (S)—N-(4-(2-((2-(methoxymethyl)pyrrolidin-1-yl)amino)-2-oxoethyl)-1-phenyl-1H-imidazol-2-yl)-3-(1H-pyrazol-4-yl)benzamide;
45) (R)—N-(4-(2-((2-(methoxymethyl)pyrrolidin-1-yl)amino)-2-oxoethyl)-1-phenyl-1H-imidazol-2-yl)-3-(1H-pyrazol-4-yl)benzamide;
46) (S)—N-(4-(2-(2-(methoxymethyl)pyrrolidin-1-yl)-2-oxoethyl)-1-phenyl-1H-imidazol-2-yl)-3-(1H-pyrazol-4-yl)benzamide;
47) (R)—N-(4-(2-(2-(methoxymethyl)pyrrolidin-1-yl)-2-oxoethyl)-1-phenyl-1H-imidazol-2-yl)-3-(1H-pyrazol-4-yl)benzamide;
48) N-(4-(2-(methylamino)-2-oxoethyl)-1-phenyl-1H-imidazol-2-yl)-4-(1H-pyrazol-4-yl)benzamide;
49) N-(4-(2-(methylamino)-2-oxoethyl)-1-phenyl-1H-imidazol-2-yl)-1H-indazole-5-carboxamide;
50) N-(4-(2-(methylamino)-2-oxoethyl)-1-phenyl-1H-imidazol-2-yl)benzamide;
51) N-(4-(2-(methylamino)-2-oxoethyl)-1-phenyl-1H-imidazol-2-yl)nicotinamide;
52) N-(4-(4-oxo-4-(phenylamino)butyl)-1-phenyl-1H-imidazol-2-yl)-3-(1H-pyrazol-4-yl)benzamide;
53) (S)—N-(4-(4-((2-(methoxymethyl)pyrrolidin-1-yl)amino)-4-oxobutyl)-1-phenyl-1H-imidazol-2-yl)-3-(1H-pyrazol-4-yl)benzamide;
54) (R)—N-(4-(4-((2-(methoxymethyl)pyrrolidin-1-yl)amino)-4-oxobutyl)-1-phenyl-1H-imidazol-2-yl)-3-(1H-pyrazol-4-yl)benzamide;
55) (S)—N-(4-(4-(2-(methoxymethyl)pyrrolidin-1-yl)-4-oxobutyl)-1-phenyl-1H-imidazol-2-yl)-3-(1H-pyrazol-4-yl)benzamide;
56) (R)—N-(4-(4-(2-(methoxymethyl)pyrrolidin-1-yl)-4-oxobutyl)-1-phenyl-1H-imidazol-2-yl)-3-(1H-pyrazol-4-yl)benzamide;
57) 4-(2-(3-(1H-pyrazol-4-yl)benzamido)-1-phenyl-1H-imidazol-4-yl)butanoic acid;
58) methyl 4-(2-(3-(1H-pyrazol-4-yl)benzamido)-1-phenyl-1H-imidazol-4-yl)butanoate;
59) N-(4-(4-oxo-4-(piperidin-1-yl)butyl)-1-phenyl-1H-imidazol-2-yl)-3-(1H-pyrazol-4-yl)benzamide;
60) N-(4-(4-(methylamino)-4-oxobutyl)-1-phenyl-1H-imidazol-2-yl)-3-(1H-pyrazol-4-yl)benzamide;
61) (R)—N-(4-(4-(2-methylpiperidin-1-yl)-4-oxobutyl)-1-phenyl-1H-imidazol-2-yl)-3-(1H-pyrazol-4-yl)benzamide;
62) (S)—N-(4-(4-(2-methylpiperidin-1-yl)-4-oxobutyl)-1-phenyl-1H-imidazol-2-yl)-3-(1H-pyrazol-4-yl)benzamide;
63) N-(4-(4-((2R,6S)-2,6-dimethylpiperidin-1-yl)-4-oxobutyl)-1-phenyl-1H-imidazol-2-yl)-3-(1H-pyrazol-4-yl)benzamide;
64) N-(4-(4-((4-fluorophenyl)amino)-4-oxobutyl)-1-phenyl-1H-imidazol-2-yl)-3-(1H-pyrazol-4-yl)benzamide;
65) N-(4-(4-((2-fluorophenyl)amino)-4-oxobutyl)-1-phenyl-1H-imidazol-2-yl)-3-(1H-pyrazol-4-yl)benzamide;
66) N-(4-(4-((2,4-difluorophenyl)amino)-4-oxobutyl)-1-phenyl-1H-imidazol-2-yl)-3-(1H-pyrazol-4-yl)benzamide;
67) N-(4-(4-(cyclopropylamino)-4-oxobutyl)-1-phenyl-1H-imidazol-2-yl)-3-(1-((2-(trimethylsilyl) ethoxy)methyl)-1H-pyrazol-4-yl)benzamide;
68) N-(4-(4-(cyclopropylamino)-4-oxobutyl)-1-phenyl-1H-imidazol-2-yl)-3-(1H-pyrazol-4-yl)benzamide;
69) N-(4-(4-(cyclobutylamino)-4-oxobutyl)-1-phenyl-1H-imidazol-2-yl)-3-(1H-pyrazol-4-yl)benzamide;
70) isopropyl 4-(2-(3-(1H-pyrazol-4-yl)benzamido)-1-phenyl-1H-imidazol-4-yl)butanoate;
71) N-(4-(4-(cyclopropyl(methyl)amino)-4-oxobutyl)-1-phenyl-1H-imidazol-2-yl)-3-(1H-pyrazol-4-yl)benzamide;
72) N-(4-(4-(cyclopropylamino)-4-oxobutyl)-1-phenyl-1H-imidazol-2-yl)-3-(1-(1-ethoxyethyl)-1H-pyrazol-4-yl)benzamide;
73) N-(4-(4-(cyclopropylamino)-4-oxobutyl)-1-phenyl-1H-imidazol-2-yl)-3-(1-(2-ethoxypropan-2-yl)-1H-pyrazol-4-yl)benzamide;
74) (4-(3-((4-(4-(cyclopropylamino)-4-oxobutyl)-1-phenyl-1H-imidazol-2-yl) carbamoyl) phenyl)-1H-pyrazol-1-yl)methyl methyl carbonate;
75) (4-(3-((4-(4-(cyclopropylamino)-4-oxobutyl)-1-phenyl-1H-imidazol-2-yl) carbamoyl) phenyl)-1H-pyrazol-1-yl)methyl ethyl carbonate;
76) N-(4-(5-oxo-5-(phenylamino) pentyl)-1-phenyl-1H-imidazol-2-yl)-3-(1H-pyrazol-4-yl)benzamide;
77) methyl 5-(2-(3-(1H-pyrazol-4-yl)benzamido)-1-phenyl-1H-imidazol-4-yl) pentanoate;
78) 5-(2-(3-(1H-pyrazol-4-yl)benzamido)-1-phenyl-1H-imidazol-4-yl) pentanoic acid;

79) N-(4-(5-oxo-5-(piperidin-1-yl) pentyl)-1-phenyl-1H-imidazol-2-yl)-3-(1H-pyrazol-4-yl)benzamide;
80) N-(4-(5-(methylamino)-5-oxopentyl)-1-phenyl-1H-imidazol-2-yl)-3-(1H-pyrazol-4-yl)benzamide;
81) N-(4-(5-((2R,6S)-2,6-dimethylpiperidin-1-yl)-5-oxopentyl)-1-phenyl-1H-imidazol-2-yl)-3-(1H-pyrazol-4-yl)benzamide;
82) (S)—N-(4-(5-(2-methylpiperidin-1-yl)-5-oxopentyl)-1-phenyl-1H-imidazol-2-yl)-3-(1H-pyrazol-4-yl)benzamide;
83) (R)—N-(4-(5-(2-methylpiperidin-1-yl)-5-oxopentyl)-1-phenyl-1H-imidazol-2-yl)-3-(1H-pyrazol-4-yl)benzamide;
84) (S)—N-(4-(5-((2-(methoxymethyl)pyrrolidin-1-yl)amino)-5-oxopentyl)-1-phenyl-1H-imidazol-2-yl)-3-(1H-pyrazol-4-yl)benzamide;
85) (R)—N-(4-(5-((2-(methoxymethyl)pyrrolidin-1-yl)amino)-5-oxopentyl)-1-phenyl-1H-imidazol-2-yl)-3-(1H-pyrazol-4-yl)benzamide;
86) (S)—N-(4-(5-(2-(methoxymethyl)pyrrolidin-1-yl)-5-oxopentyl)-1-phenyl-1H-imidazol-2-yl)-3-(1H-pyrazol-4-yl)benzamide;
87) (R)—N-(4-(5-(2-(methoxymethyl)pyrrolidin-1-yl)-5-oxopentyl)-1-phenyl-1H-imidazol-2-yl)-3-(1H-pyrazol-4-yl)benzamide;
88) N-(4-(5-(cyclopropylamino)-5-oxopentyl)-1-phenyl-1H-imidazol-2-yl)-3-(1H-pyrazol-4-yl)benzamide;
89) N-(4-(5-(cyclohexylamino)-5-oxopentyl)-1-phenyl-1H-imidazol-2-yl)-3-(1H-pyrazol-4-yl)benzamide;
90) N-(4-(6-oxo-6-(phenylamino)hexyl)-1-phenyl-1H-imidazol-2-yl)-3-(1H-pyrazol-4-yl)benzamide;
91) methyl 6-(2-(3-(1H-pyrazol-4-yl)benzamido)-1-phenyl-1H-imidazol-4-yl) hexanoate;
92) 6-(2-(3-(1H-pyrazol-4-yl)benzamido)-1-phenyl-1H-imidazol-4-yl) hexanoic acid;
93) N-(4-(6-oxo-6-(piperidin-1-yl)hexyl)-1-phenyl-1H-imidazol-2-yl)-3-(1H-pyrazol-4-yl)benzamide;
94) N-(4-(6-(methylamino)-6-oxohexyl)-1-phenyl-1H-imidazol-2-yl)-3-(1H-pyrazol-4-yl)benzamide;
95) (S)—N-(4-(6-(2-methylpiperidin-1-yl)-6-oxohexyl)-1-phenyl-1H-imidazol-2-yl)-3-(1H-pyrazol-4-yl)benzamide;
96) (R)—N-(4-(6-(2-methylpiperidin-1-yl)-6-oxohexyl)-1-phenyl-1H-imidazol-2-yl)-3-(1H-pyrazol-4-yl)benzamide;
97) N-(4-(6-((2R,6S)-2,6-dimethylpiperidin-1-yl)-6-oxohexyl)-1-phenyl-1H-imidazol-2-yl)-3-(1H-pyrazol-4-yl)benzamide;
98) (S)—N-(4-(6-((2-(methoxymethyl)pyrrolidin-1-yl)amino)-6-oxohexyl)-1-phenyl-1H-imidazol-2-yl)-3-(1H-pyrazol-4-yl)benzamide;
99) (R)—N-(4-(6-((2-(methoxymethyl)pyrrolidin-1-yl)amino)-6-oxohexyl)-1-phenyl-1H-imidazol-2-yl)-3-(1H-pyrazol-4-yl)benzamide;
100) (S)—N-(4-(6-(2-(methoxymethyl)pyrrolidin-1-yl)-6-oxohexyl)-1-phenyl-1H-imidazol-2-yl)-3-(1H-pyrazol-4-yl)benzamide;
101) (R)—N-(4-(6-(2-(methoxymethyl)pyrrolidin-1-yl)-6-oxohexyl)-1-phenyl-1H-imidazol-2-yl)-3-(1H-pyrazol-4-yl)benzamide;
102) N-(1-phenyl-4-(6-(piperidin-1-yl)hexyl)-1H-imidazol-2-yl)-3-(1H-pyrazol-4-yl)benzamide;
103) N-(4-(2-hydroxyethyl)-1-phenyl-1H-imidazol-2-yl)-3-(1H-pyrazol-4-yl)benzamide;
104) N-(1-phenyl-4-(2-(piperidin-1-yl) ethyl)-1H-imidazol-2-yl)-3-(1H-pyrazol-4-yl)benzamide;
105) N-(4-(3-hydroxypropyl)-1-phenyl-1H-imidazol-2-yl)-3-(1H-pyrazol-4-yl)benzamide;
106) N-(1-phenyl-4-(3-(piperidin-1-yl)propyl)-1H-imidazol-2-yl)-3-(1H-pyrazol-4-yl)benzamide;
107) N-(4-(3-morpholinopropyl)-1-phenyl-1H-imidazol-2-yl)-3-(1H-pyrazol-4-yl)benzamide;
108) N-(4-(3-(4-methylpiperazin-1-yl)propyl)-1-phenyl-1H-imidazol-2-yl)-3-(1H-pyrazol-4-yl)benzamide;
109) N-(1-phenyl-4-(3-(phenylamino)propyl)-1H-imidazol-2-yl)-3-(1H-pyrazol-4-yl)benzamide;
110) N-(1-phenyl-4-(3-thiomorpholinopropyl)-1H-imidazol-2-yl)-3-(1H-pyrazol-4-yl)benzamide;
111) N-(4-(4-hydroxybutyl)-1-phenyl-1H-imidazol-2-yl)-3-(1H-pyrazol-4-yl)benzamide;
112) N-(1-phenyl-4-(4-(phenylamino)butyl)-1H-imidazol-2-yl)-3-(1H-pyrazol-4-yl)benzamide;
113) N-(1-phenyl-4-(4-(piperidin-1-yl)butyl)-1H-imidazol-2-yl)-3-(1H-pyrazol-4-yl)benzamide;
114) N-(4-(4-morpholinobutyl)-1-phenyl-1H-imidazol-2-yl)-3-(1H-pyrazol-4-yl)benzamide;
115) N-(1-phenyl-4-(4-thiomorpholinobutyl)-1H-imidazol-2-yl)-3-(1H-pyrazol-4-yl)benzamide;
116) N-(4-(5-hydroxypentyl)-1-phenyl-1H-imidazol-2-yl)-3-(1H-pyrazol-4-yl)benzamide;
117) N-(1-phenyl-4-(5-(phenylamino) pentyl)-1H-imidazol-2-yl)-3-(1H-pyrazol-4-yl)benzamide;
118) N-(1-phenyl-4-(5-(piperidin-1-yl) pentyl)-1H-imidazol-2-yl)-3-(1H-pyrazol-4-yl)benzamide;
119) N-(4-(5-morpholinopentyl)-1-phenyl-1H-imidazol-2-yl)-3-(1H-pyrazol-4-yl)benzamide;
120) N-(1-phenyl-4-(5-thiomorpholinopentyl)-1H-imidazol-2-yl)-3-(1H-pyrazol-4-yl)benzamide;
121) N-(4-(6-hydroxyhexyl)-1-phenyl-1H-imidazol-2-yl)-3-(1H-pyrazol-4-yl)benzamide;
122) N-(1-phenyl-4-(6-(phenylamino)hexyl)-1H-imidazol-2-yl)-3-(1H-pyrazol-4-yl)benzamide;
123) N-(4-(6-morpholinohexyl)-1-phenyl-1H-imidazol-2-yl)-3-(1H-pyrazol-4-yl)benzamide;
124) N-(1-phenyl-4-(6-thiomorpholinohexyl)-1H-imidazol-2-yl)-3-(1H-pyrazol-4-yl)benzamide;
125) 1-(6-(2-(3-(1H-pyrazol-4-yl)benzamido)-1-phenyl-1H-imidazol-4-yl)hexyl) piperidine 1-oxide;
126) 4-(3-(2-(3-(1H-pyrazol-4-yl)benzamido)-1-phenyl-1H-imidazol-4-yl)propyl) morpholine 4-oxide;
127) N-(1-phenyl-4-(6-(piperidin-1-yl)hexyl)-1H-imidazol-2-yl)-3-(1H-pyrazol-4-yl)benzamide hydrochloride;
128) N-(4-(3-morpholinopropyl)-1-phenyl-1H-imidazol-2-yl)-3-(1H-pyrazol-4-yl)benzamide hydrochloride;
129) 3-(1-methyl-1H-pyrazol-4-yl)-N-(4-(4-(4-methylpiperazin-1-yl)-4-oxobutyl)-1-phenyl-1H-imidazol-2-yl)benzamide hydrochloride;
130) N-(4-(4-(4-(dimethylamino)piperidin-1-yl)-4-oxobutyl)-1-phenyl-1H-imidazol-2-yl)-3-(1-methyl-1H-pyrazol-4-yl)benzamide hydrochloride;
131) N-(4-(4-((4-(dimethylamino)cyclohexyl)amino)-4-oxobutyl)-1-phenyl-1H-imidazol-2-yl)-3-(1-methyl-1H-pyrazol-4-yl)benzamide hydrochloride;
132) 3-(1-methyl-1H-pyrazol-4-yl)-N-(4-(4-((1-methylpiperidin-4-yl)amino)-4-oxobutyl)-1-phenyl-1H-imidazol-2-yl)benzamide hydrochloride;
133) 3-(1-methyl-1H-pyrazol-4-yl)-N-(4-(4-(4-methylpiperazin-1-yl)-4-oxobutyl)-1-phenyl-1H-imidazol-2-yl)benzamide citrate;
134) 3-(1-methyl-1H-pyrazol-4-yl)-N-(4-(4-(4-methylpiperazin-1-yl)-4-oxobutyl)-1-phenyl-1H-imidazol-2-yl)benzamide fumarate;

135) 3-(1-methyl-1H-pyrazol-4-yl)-N-(4-(4-(4-methylpiperazin-1-yl)-4-oxobutyl)-1-phenyl-1H-imidazol-2-yl)benzamide (2R,3R)-2,3-dihydroxysuccinate;
136) 3-(1-methyl-1H-pyrazol-4-yl)-N-(4-(4-(4-methylpiperazin-1-yl)-4-oxobutyl)-1-phenyl-1H-imidazol-2-yl)benzamide succinate;
137) N-(4-(4-(4-(dimethylamino)piperidin-1-yl)-4-oxobutyl)-1-phenyl-1H-imidazol-2-yl)-3-(1-methyl-1H-pyrazol-4-yl)benzamide fumarate;
138) 3-(1-(1-ethoxyethyl)-1H-pyrazol-4-yl)-N-(1-phenyl-4-(6-(piperidin-1-yl)hexyl)-1H-imidazol-2-yl)benzamide;
139) 3-(1-methyl-1H-pyrazol-4-yl)-N-(4-(4-(methylamino)-4-oxobutyl)-1-phenyl-1H-imidazol-2-yl)benzamide;
140) 4-(2-(3-(1-methyl-1H-pyrazol-4-yl)benzamido)-1-phenyl-1H-imidazol-4-yl)butanoic acid;
141) N-(4-(4-(cyclopropylamino)-4-oxobutyl)-1-phenyl-1H-imidazol-2-yl)-3-(1-methyl-1H-pyrazol-4-yl)benzamide;
142) 3-(1-methyl-1H-pyrazol-4-yl)-N-(4-(4-oxo-4-(piperidin-1-yl)butyl)-1-phenyl-1H-imidazol-2-yl)benzamide;
143) 3-(1-methyl-1H-pyrazol-4-yl)-N-(4-(4-(4-methylpiperazin-1-yl)-4-oxobutyl)-1-phenyl-1H-imidazol-2-yl)benzamide;
144) N-(4-(4-(4-ethylpiperazin-1-yl)-4-oxobutyl)-1-phenyl-1H-imidazol-2-yl)-3-(1-methyl-1H-pyrazol-4-yl)benzamide;
145) N-(4-(4-(4-isopropylpiperazin-1-yl)-4-oxobutyl)-1-phenyl-1H-imidazol-2-yl)-3-(1-methyl-1H-pyrazol-4-yl)benzamide;
146) N-(4-(4-(4-(dimethylamino)piperidin-1-yl)-4-oxobutyl)-1-phenyl-1H-imidazol-2-yl)-3-(1-methyl-1H-pyrazol-4-yl)benzamide;
147) N-(4-(4-((4-(dimethylamino)cyclohexyl)amino)-4-oxobutyl)-1-phenyl-1H-imidazol-2-yl)-3-(1-methyl-1H-pyrazol-4-yl)benzamide;
148) 3-(1-methyl-1H-pyrazol-4-yl)-N-(4-(4-((1-methylpiperidin-4-yl)amino)-4-oxobutyl)-1-phenyl-1H-imidazol-2-yl)benzamide;
149) N-(4-(4-(4-cyclopropylpiperazin-1-yl)-4-oxobutyl)-1-phenyl-1H-imidazol-2-yl)-3-(1-methyl-1H-pyrazol-4-yl)benzamide;
150) 3-(1-methyl-1H-pyrazol-4-yl)-N-(4-(4-oxo-4-(pyridin-4-ylamino)butyl)-1-phenyl-1H-imidazol-2-yl)benzamide;
151) 3-(1-methyl-1H-pyrazol-4-yl)-N-(4-(4-oxo-4-(pyrrolidin-1-ylamino)butyl)-1-phenyl-1H-imidazol-2-yl)benzamide;
152) 3-(1-methyl-1H-pyrazol-4-yl)-N-(4-(4-oxo-4-(piperidin-1-ylamino)butyl)-1-phenyl-1H-imidazol-2-yl)benzamide;
153) 3-(1-methyl-1H-pyrazol-4-yl)-N-(4-(4-((4-methylpiperazin-1-yl)amino)-4-oxobutyl)-1-phenyl-1H-imidazol-2-yl)benzamide;
154) 3-(1-methyl-1H-pyrazol-4-yl)-N-(4-(4-oxo-4-(4-(pyrrolidin-1-yl) piperidin-1-yl)butyl)-1-phenyl-1H-imidazol-2-yl)benzamide;
155) N-(4-(4-((4-(dimethylamino) phenyl)amino)-4-oxobutyl)-1-phenyl-1H-imidazol-2-yl)-3-(1-methyl-1H-pyrazol-4-yl)benzamide;
156) N-(4-(4-(((1R,4R)-4-hydroxycyclohexyl)amino)-4-oxobutyl)-1-phenyl-1H-imidazol-2-yl)-3-(1-methyl-1H-pyrazol-4-yl)benzamide;
157) 3-(1-methyl-1H-pyrazol-4-yl)-N-(4-(4-oxo-4-((tetrahydro-2H-pyran-4-yl)amino)butyl)-1-phenyl-1H-imidazol-2-yl)benzamide;
158) 3-(1-methyl-1H-pyrazol-4-yl)-N-(4-(4-oxo-4-((3-(piperidin-1-yl)propyl)amino)butyl)-1-phenyl-1H-imidazol-2-yl)benzamide;
159) 3-(1-methyl-1H-pyrazol-4-yl)-N-(4-(4-oxo-4-((2-(piperidin-1-yl) ethyl)amino)butyl)-1-phenyl-1H-imidazol-2-yl)benzamide;
160) 3-(1-methyl-1H-pyrazol-4-yl)-N-(4-(4-morpholino-4-oxobutyl)-1-phenyl-1H-imidazol-2-yl)benzamide;
161) N-(4-(4-((4-methoxycyclohexyl)amino)-4-oxobutyl)-1-phenyl-1H-imidazol-2-yl)-3-(1-methyl-1H-pyrazol-4-yl)benzamide;
162) N-(4-(4-((2-(dimethylamino) ethyl)amino)-4-oxobutyl)-1-phenyl-1H-imidazol-2-yl)-3-(1-methyl-1H-pyrazol-4-yl)benzamide;
163) N-(4-(4-((3-(dimethylamino)propyl)amino)-4-oxobutyl)-1-phenyl-1H-imidazol-2-yl)-3-(1-methyl-1H-pyrazol-4-yl)benzamide;
164) N-(4-(4-((2-hydroxyethyl)amino)-4-oxobutyl)-1-phenyl-1H-imidazol-2-yl)-3-(1-methyl-1H-pyrazol-4-yl)benzamide;
165) N-(4-(4-((3-hydroxypropyl)amino)-4-oxobutyl)-1-phenyl-1H-imidazol-2-yl)-3-(1-methyl-1H-pyrazol-4-yl)benzamide;
166) 3-(1-methyl-1H-pyrazol-4-yl)-N-(4-(4-(2-methylpiperidin-1-yl)-4-oxobutyl)-1-phenyl-1H-imidazol-2-yl)benzamide;
167) N-(4-(4-(4,4-dimethylpiperidin-1-yl)-4-oxobutyl)-1-phenyl-1H-imidazol-2-yl)-3-(1-methyl-1H-pyrazol-4-yl)benzamide;
168) N-(4-(4-(4-cyanopiperidin-1-yl)-4-oxobutyl)-1-phenyl-1H-imidazol-2-yl)-3-(1-methyl-1H-pyrazol-4-yl)benzamide;
169) N-(4-(4-(4-hydroxypiperidin-1-yl)-4-oxobutyl)-1-phenyl-1H-imidazol-2-yl)-3-(1-methyl-1H-pyrazol-4-yl)benzamide;
170) N-(4-(4-((2-hydroxy-2-methylpropyl)amino)-4-oxobutyl)-1-phenyl-1H-imidazol-2-yl)-3-(1-methyl-1H-pyrazol-4-yl)benzamide;
171) N-(4-(4-((3-hydroxy-3-methylbutyl)amino)-4-oxobutyl)-1-phenyl-1H-imidazol-2-yl)-3-(1-methyl-1H-pyrazol-4-yl)benzamide;
172) 3-(1-methyl-1H-pyrazol-4-yl)-N-(4-(4-oxo-4-(((tetrahydro-2H-pyran-4-yl) methyl)amino)butyl)-1-phenyl-1H-imidazol-2-yl)benzamide;
173) 3-(1-methyl-1H-pyrazol-4-yl)-N-(4-(4-oxo-4-(4-(4-(trifluoromethoxy) benzyl) piperazin-1-yl)butyl)-1-phenyl-1H-imidazol-2-yl)benzamide;
174) (R)—N-(4-(4-(2-(2-hydroxyethyl) piperidin-1-yl)-4-oxobutyl)-1-phenyl-1H-imidazol-2-yl)-3-(1-methyl-1H-pyrazol-4-yl)benzamide;
175) N-(4-(4-(3,3-difluoropiperidin-1-yl)-4-oxobutyl)-1-phenyl-1H-imidazol-2-yl)-3-(1-methyl-1H-pyrazol-4-yl)benzamide;
176) (R)—3-(1-methyl-1H-pyrazol-4-yl)-N-(4-(4-oxo-4-(2-(trifluoromethyl) piperidin-1-yl)butyl)-1-phenyl-1H-imidazol-2-yl)benzamide;
177) N-(4-(4-(4-methoxypiperidin-1-yl)-4-oxobutyl)-1-phenyl-1H-imidazol-2-yl)-3-(1-methyl-1H-pyrazol-4-yl)benzamide;
178) N-(4-(4-(3-hydroxypiperidin-1-yl)-4-oxobutyl)-1-phenyl-1H-imidazol-2-yl)-3-(1-methyl-1H-pyrazol-4-yl)benzamide;

179) 3-(1-methyl-1H-pyrazol-4-yl)-N-(4-(4-oxo-4-((tetrahydrofuran-3-yl)amino)butyl)-1-phenyl-1H-imidazol-2-yl)benzamide;
180) 3-(1-methyl-1H-pyrazol-4-yl)-N-(4-(4-oxo-4-(((tetrahydrofuran-3-yl) methyl)amino)butyl)-1-phenyl-1H-imidazol-2-yl)benzamide;
181) N-(4-(4-(4-(tert-butyl) piperazin-1-yl)-4-oxobutyl)-1-phenyl-1H-imidazol-2-yl)-3-(1-methyl-1H-pyrazol-4-yl)benzamide;
182) N-(4-(4-(4-cyclohexylpiperazin-1-yl)-4-oxobutyl)-1-phenyl-1H-imidazol-2-yl)-3-(1-methyl-1H-pyrazol-4-yl)benzamide;
183) N-(4-(4-(4-methyl-1,4-diazepan-1-yl)-4-oxobutyl)-1-phenyl-1H-imidazol-2-yl)-3-(1-methyl-1H-pyrazol-4-yl)benzamide;
184) 3-(1-methyl-1H-pyrazol-4-yl)-N-(4-(4-((2-morpholinoethyl)amino)-4-oxobutyl)-1-phenyl-1H-imidazol-2-yl)benzamide;
185) (R)—N-(4-(4-((2-fluoro-3-hydroxy-3-methylbutyl)amino)-4-oxobutyl)-1-phenyl-1H-imidazol-2-yl)-3-(1-methyl-1H-pyrazol-4-yl)benzamide;
186) 3-(1-methyl-1H-pyrazol-4-yl)-N-(4-(4-((3-(4-methylpiperazin-1-yl)propyl)amino)-4-oxobutyl)-1-phenyl-1H-imidazol-2-yl)benzamide;
187) 3-(1-methyl-1H-pyrazol-4-yl)-N-(4-(4-((2-(4-methylpiperazin-1-yl) ethyl)amino)-4-oxobutyl)-1-phenyl-1H-imidazol-2-yl)benzamide;
188) 3-(1-methyl-1H-pyrazol-4-yl)-N-(4-(4-oxo-4-(4-phenylpiperazin-1-yl)butyl)-1-phenyl-1H-imidazol-2-yl)benzamide;
189) N-(4-(4-amino-4-oxobutyl)-1-phenyl-1H-imidazol-2-yl)-3-(1-methyl-1H-pyrazol-4-yl)benzamide;
190) N-(4-(4-((1-methyl-1H-pyrazol-3-yl)amino)-4-oxobutyl)-1-phenyl-1H-imidazol-2-yl)-3-(1-methyl-1H-pyrazol-4-yl)benzamide;
191) N-(4-(4-((1-methyl-1H-indazol-5-yl)amino)-4-oxobutyl)-1-phenyl-1H-imidazol-2-yl)-3-(1-methyl-1H-pyrazol-4-yl)benzamide;
192) 3-(1-methyl-1H-pyrazol-4-yl)-N-(4-(2-(methylamino)-2-oxoethyl)-1-phenyl-1H-imidazol-2-yl)benzamide;
193) 3-(1-methyl-1H-pyrazol-4-yl)-N-(4-(3-oxo-3-(phenylamino)propyl)-1-phenyl-1H-imidazol-2-yl)benzamide;
194) 3-(1-methyl-1H-pyrazol-4-yl)-N-(4-(3-(4-methylpiperazin-1-yl)-3-oxopropyl)-1-phenyl-1H-imidazol-2-yl)benzamide;
195) N-(4-(3-(4-methyl-1,4-diazepan-1-yl)-3-oxopropyl)-1-phenyl-1H-imidazol-2-yl)-3-(1-methyl-1H-pyrazol-4-yl)benzamide;
196) 3-(1-methyl-1H-pyrazol-4-yl)-N-(4-(5-(4-methylpiperazin-1-yl)-5-oxopentyl)-1-phenyl-1H-imidazol-2-yl)benzamide;
197) 3-(1-methyl-1H-pyrazol-4-yl)-N-(4-(5-oxo-5-((tetrahydro-2H-pyran-4-yl)amino) pentyl)-1-phenyl-1H-imidazol-2-yl)benzamide;
198) 3-(1-methyl-1H-pyrazol-4-yl)-N-(4-(5-((2-morpholinoethyl)amino)-5-oxopentyl)-1-phenyl-1H-imidazol-2-yl)benzamide;
199) N-(4-(6-(cyclopropylamino)-6-oxohexyl)-1-phenyl-1H-imidazol-2-yl)-3-(1-methyl-1H-pyrazol-4-yl)benzamide;
200) 3-(1-methyl-1H-pyrazol-4-yl)-N-(4-(6-oxo-6-(piperidin-1-yl)hexyl)-1-phenyl-1H-imidazol-2-yl)benzamide;
201) 3-(1-methyl-1H-pyrazol-4-yl)-N-(4-(6-(4-methylpiperazin-1-yl)-6-oxohexyl)-1-phenyl-1H-imidazol-2-yl)benzamide;
202) 3-(1-methyl-1H-pyrazol-4-yl)-N-(4-(4-oxo-4-(piperazin-1-yl)butyl)-1-phenyl-1H-imidazol-2-yl)benzamide;
203) 3-(1-methyl-1H-pyrazol-4-yl)-N-(4-(3-oxo-3-(piperazin-1-yl)propyl)-1-phenyl-1H-imidazol-2-yl)benzamide;
204) 3-(1-methyl-1H-pyrazol-4-yl)-N-(4-(5-oxo-5-(piperazin-1-yl) pentyl)-1-phenyl-1H-imidazol-2-yl)benzamide;
205) N-(4-(4-(4-acetylpiperazin-1-yl)-4-oxobutyl)-1-phenyl-1H-imidazol-2-yl)-3-(1-methyl-1H-pyrazol-4-yl)benzamide;
206) 3-(1-methyl-1H-pyrazol-4-yl)-N-(4-(4-(4-(methylsulfonyl) piperazin-1-yl)-4-oxobutyl)-1-phenyl-1H-imidazol-2-yl)benzamide;
207) (S)—1-(4-(2-(3-(1-methyl-1H-pyrazol-4-yl)benzamido)-1-phenyl-1H-imidazol-4-yl)butanoyl) piperidine-3-carboxylic acid;
208) (S)—1-(5-(2-(3-(1-methyl-1H-pyrazol-4-yl)benzamido)-1-phenyl-1H-imidazol-4-yl) pentanoyl) piperidine-3-carboxylic acid;
209) N-(4-(4-(4-aminopiperidin-1-yl)-4-oxobutyl)-1-phenyl-1H-imidazol-2-yl)-3-(1-methyl-1H-pyrazol-4-yl)benzamide;
210) (R)—N-(4-(4-(3-aminopiperidin-1-yl)-4-oxobutyl)-1-phenyl-1H-imidazol-2-yl)-3-(1-methyl-1H-pyrazol-4-yl)benzamide;
211) (S)—N-(4-(4-(3-aminopiperidin-1-yl)-4-oxobutyl)-1-phenyl-1H-imidazol-2-yl)-3-(1-methyl-1H-pyrazol-4-yl)benzamide;
212) (R)—N-(4-(4-(3-aminopyrrolidin-1-yl)-4-oxobutyl)-1-phenyl-1H-imidazol-2-yl)-3-(1-methyl-1H-pyrazol-4-yl)benzamide;
213) N-(4-(5-(4-aminopiperidin-1-yl)-5-oxopentyl)-1-phenyl-1H-imidazol-2-yl)-3-(1-methyl-1H-pyrazol-4-yl)benzamide;
214) 3-(1-methyl-1H-pyrazol-4-yl)-N-(4-(4-oxo-4-(piperidin-4-ylamino)butyl)-1-phenyl-1H-imidazol-2-yl)benzamide;
215) N-(4-(4-(((1R,4R)-4-aminocyclohexyl)amino)-4-oxobutyl)-1-phenyl-1H-imidazol-2-yl)-3-(1-methyl-1H-pyrazol-4-yl)benzamide;
216) 3-(1-methyl-1H-pyrazol-4-yl)-N-(4-(4-(4-(methylamino)piperidin-1-yl)-4-oxobutyl)-1-phenyl-1H-imidazol-2-yl)benzamide;
217) N-(4-(4-((1H-pyrazol-3-yl)amino)-4-oxobutyl)-1-phenyl-1H-imidazol-2-yl)-3-(1-methyl-1H-pyrazol-4-yl)benzamide;
218) N-(4-(4-(methyl (4-methylpiperazin-1-yl)amino)-4-oxobutyl)-1-phenyl-1H-imidazol-2-yl)-3-(1-methyl-1H-pyrazol-4-yl)benzamide;
219) 3-(1-methyl-1H-pyrazol-4-yl)-N-(1-phenyl-4-(4-(piperidin-1-yl)butyl)-1H-imidazol-2-yl)benzamide;
220) 3-(1-methyl-1H-pyrazol-4-yl)-N-(1-phenyl-4-(6-(piperidin-1-yl)hexyl)-1H-imidazol-2-yl)benzamide;
221) 3-(1-methyl-1H-pyrazol-4-yl)-N-(4-(4-(4-methylpiperazin-1-yl)butyl)-1-phenyl-1H-imidazol-2-yl)benzamide;
222) 3-(1-methyl-1H-pyrazol-4-yl)-N-(1-phenyl-4-(6-(pyrrolidin-1-yl)hexyl)-1H-imidazol-2-yl)benzamide;
223) N-(4-(6-(azepan-1-yl)hexyl)-1-phenyl-1H-imidazol-2-yl)-3-(1-methyl-1H-pyrazol-4-yl)benzamide;

224) 3-(1-methyl-1H-pyrazol-4-yl)-N-(4-(4-(2-oxopyrrolidin-1-yl)butyl)-1-phenyl-1H-imidazol-2-yl)benzamide;
225) 3-(1-methyl-1H-pyrazol-4-yl)-N-(4-(6-(2-oxopyrrolidin-1-yl)hexyl)-1-phenyl-1H-imidazol-2-yl)benzamide;
226) N-(4-(6-(2,5-dioxopyrrolidin-1-yl)hexyl)-1-phenyl-1H-imidazol-2-yl)-3-(1-methyl-1H-pyrazol-4-yl)benzamide;
227) N-(4-(4-(cyclopropanecarboxamido) butyl)-1-phenyl-1H-imidazol-2-yl)-3-(1-methyl-1H-pyrazol-4-yl)benzamide;
228) N-(4-(6-(cyclopropanecarboxamido) hexyl)-1-phenyl-1H-imidazol-2-yl)-3-(1-methyl-1H-pyrazol-4-yl)benzamide;
229) N-(4-(4-(cyclopropylamino)-4-oxobutyl)-1-phenyl-1H-imidazol-2-yl)-3-(5-fluoro-1H-pyrazol-4-yl)benzamide;
230) 3-(5-fluoro-1H-pyrazol-4-yl)-N-(4-(4-(4-methylpiperazin-1-yl)-4-oxobutyl)-1-phenyl-1H-imidazol-2-yl)benzamide;
231) 3-(5-fluoro-1H-pyrazol-4-yl)-N-(4-(4-oxo-4-(piperidin-1-yl)butyl)-1-phenyl-1H-imidazol-2-yl)benzamide;
232) N-(4-(4-(cyclopropylamino)-4-oxobutyl)-1-phenyl-1H-imidazol-2-yl)-3-(5-fluoro-1-methyl-1H-pyrazol-4-yl)benzamide;
233) N-(4-(4-(cyclopropyl(methyl)amino)-4-oxobutyl)-1-phenyl-1H-imidazol-2-yl)-3-(5-fluoro-1-methyl-1H-pyrazol-4-yl)benzamide;
234) N-(4-(4-(cyclopropylamino)-4-oxobutyl)-1-phenyl-1H-imidazol-2-yl)-3-(1-(fluoromethyl)-1H-pyrazol-4-yl)benzamide;
235) N-(4-(4-(cyclopropylamino)-4-oxobutyl)-1-phenyl-1H-imidazol-2-yl)-3-(1-(difluoromethyl)-1H-pyrazol-4-yl)benzamide;
236) N-(4-(4-(cyclopropylamino)-4-oxobutyl)-1-phenyl-1H-imidazol-2-yl)-3-(1-(trifluoromethyl)-1H-pyrazol-4-yl)benzamide;
237) 3-(1H-indazol-5-yl)-N-(4-(6-oxo-6-(piperidin-1-yl)hexyl)-1-phenyl-1H-imidazol-2-yl)benzamide;
238) N-(4-(6-(cyclopropylamino)-6-oxohexyl)-1-phenyl-1H-imidazol-2-yl)-3-(1H-indazol-5-yl)benzamide;
239) 3-(1H-indazol-5-yl)-N-(4-(6-(4-methylpiperazin-1-yl)-6-oxohexyl)-1-phenyl-1H-imidazol-2-yl)benzamide;
240) 3-(1H-indazol-5-yl)-N-(4-(6-oxo-6-(pyrrolidin-1-yl)hexyl)-1-phenyl-1H-imidazol-2-yl)benzamide;
241) N-(4-(6-(azepan-1-yl)-6-oxohexyl)-1-phenyl-1H-imidazol-2-yl)-3-(1H-indazol-5-yl)benzamide;
242) 3-(1H-benzo[d][1,2,3]triazol-5-yl)-N-(4-(6-oxo-6-(piperidin-1-yl)hexyl)-1-phenyl-1H-imidazol-2-yl)benzamide;
243) 3-(1H-indazol-5-yl)-N-(4-(2-(methylamino)-2-oxoethyl)-1-phenyl-1H-imidazol-2-yl)benzamide;
244) 3-(1H-indazol-5-yl)-N-(4-(4-(methylamino)-4-oxobutyl)-1-phenyl-1H-imidazol-2-yl)benzamide;
245) N-(4-(4-(cyclopropylamino)-4-oxobutyl)-1-phenyl-1H-imidazol-2-yl)-3-(1H-indazol-5-yl)benzamide;
246) 3-(1H-indazol-5-yl)-N-(4-(4-oxo-4-(piperidin-1-yl)butyl)-1-phenyl-1H-imidazol-2-yl)benzamide;
247) 3-(1H-indazol-5-yl)-N-(4-(4-(4-methylpiperazin-1-yl)-4-oxobutyl)-1-phenyl-1H-imidazol-2-yl)benzamide;
248) N-(4-(4-(cyclopropylamino)-4-oxobutyl)-1-phenyl-1H-imidazol-2-yl)-3-(1H-indazol-7-yl)benzamide;
249) N-(4-(4-(cyclopropylamino)-4-oxobutyl)-1-phenyl-1H-imidazol-2-yl)-3-(1H-indazol-4-yl)benzamide;
250) N-(4-(4-(cyclopropylamino)-4-oxobutyl)-1-phenyl-1H-imidazol-2-yl)-3-(1H-indazol-6-yl)benzamide;
251) 3-(1-methyl-1H-indazol-5-yl)-N-(4-(6-oxo-6-(piperidin-1-yl)hexyl)-1-phenyl-1H-imidazol-2-yl)benzamide;
252) 3-(1H-indazol-5-yl)-N-(1-phenyl-4-(6-(piperidin-1-yl)hexyl)-1H-imidazol-2-yl)benzamide;
253) 3-(1H-indol-5-yl)-N-(1-phenyl-4-(6-(piperidin-1-yl)hexyl)-1H-imidazol-2-yl)benzamide;
254) 3-(1H-indazol-5-yl)-N-(4-(6-morpholinohexyl)-1-phenyl-1H-imidazol-2-yl)benzamide;
255) 3-(1H-indazol-4-yl)-N-(1-phenyl-4-(6-(piperidin-1-yl)hexyl)-1H-imidazol-2-yl)benzamide;
256) 3-(1H-indazol-5-yl)-N-(1-phenyl-4-(4-(piperidin-1-yl)butyl)-1H-imidazol-2-yl)benzamide;
257) 3-(1H-indazol-4-yl)-N-(1-phenyl-4-(4-(piperidin-1-yl)butyl)-1H-imidazol-2-yl)benzamide;
258) 3-(1H-indazol-5-yl)-N-(4-(4-(2-oxopyrrolidin-1-yl)butyl)-1-phenyl-1H-imidazol-2-yl)benzamide;
259) 3-(1H-indazol-5-yl)-N-(4-(6-(2-oxopyrrolidin-1-yl)hexyl)-1-phenyl-1H-imidazol-2-yl)benzamide;
260) 3-(1H-indazol-5-yl)-N-(4-(6-(2-oxopiperidin-1-yl)hexyl)-1-phenyl-1H-imidazol-2-yl)benzamide;
261) N-(4-(4-(cyclopropanecarboxamido) butyl)-1-phenyl-1H-imidazol-2-yl)-3-(1H-indazol-5-yl)benzamide;
262) N-(4-(6-(cyclopropanecarboxamido) hexyl)-1-phenyl-1H-imidazol-2-yl)-3-(1H-indazol-5-yl)benzamide;
263) 3-(1-methyl-1H-indazol-5-yl)-N-(1-phenyl-4-(6-(piperidin-1-yl)hexyl)-1H-imidazol-2-yl)benzamide;
264) 3-(1-methyl-1H-indazol-5-yl)-N-(4-(6-morpholinohexyl)-1-phenyl-1H-imidazol-2-yl)benzamide;
265) N-(4-(2-(methylamino)-2-oxoethyl)-1-phenyl-1H-imidazol-2-yl)-3-(pyridin-4-yl)benzamide;
266) N-(4-(4-(methylamino)-4-oxobutyl)-1-phenyl-1H-imidazol-2-yl)-3-(pyridin-4-yl)benzamide;
267) N-(4-(4-(cyclopropylamino)-4-oxobutyl)-1-phenyl-1H-imidazol-2-yl)-3-(pyridin-4-yl)benzamide;
268) N-(1-phenyl-4-(6-(piperidin-1-yl)hexyl)-1H-imidazol-2-yl)-3-(pyridin-4-yl)benzamide;
269) N-(1-phenyl-4-(6-(piperidin-1-yl)hexyl)-1H-imidazol-2-yl)-3-(pyridin-2-yl)benzamide;
270) N-(1-phenyl-4-(6-(piperidin-1-yl)hexyl)-1H-imidazol-2-yl)-3-(pyridin-3-yl)benzamide;
271) 3-(6-aminopyridin-3-yl)-N-(4-(6-oxo-6-(piperidin-1-yl)hexyl)-1-phenyl-1H-imidazol-2-yl)benzamide;
272) 3-(6-aminopyridin-3-yl)-N-(4-(6-(4-methylpiperazin-1-yl)-6-oxohexyl)-1-phenyl-1H-imidazol-2-yl)benzamide;
273) 3-(6-aminopyridin-3-yl)-N-(4-(4-oxo-4-(piperidin-1-yl)butyl)-1-phenyl-1H-imidazol-2-yl)benzamide;
274) 3-(6-aminopyridin-3-yl)-N-(4-(4-(4-methylpiperazin-1-yl)-4-oxobutyl)-1-phenyl-1H-imidazol-2-yl)benzamide;
275) 3-(6-aminopyridin-3-yl)-N-(1-phenyl-4-(6-(piperidin-1-yl)hexyl)-1H-imidazol-2-yl)benzamide;
276) 3-(6-aminopyridin-3-yl)-N-(4-(6-(2-oxopyrrolidin-1-yl)hexyl)-1-phenyl-1H-imidazol-2-yl)benzamide;
277) 3-(6-aminopyridin-3-yl)-N-(4-(4-(2-oxopyrrolidin-1-yl)butyl)-1-phenyl-1H-imidazol-2-yl)benzamide;
278) 3-(6-aminopyridin-3-yl)-N-(4-(6-(cyclopropanecarboxamido) hexyl)-1-phenyl-1H-imidazol-2-yl)benzamide;
279) 3-(benzo[d]thiazol-6-yl)-N-(4-(4-(cyclopropylamino)-4-oxobutyl)-1-phenyl-1H-imidazol-2-yl)benzamide;

280) 3-(benzo[d]thiazol-6-yl)-N-(4-(4-(4-methylpiperazin-1-yl)-4-oxobutyl)-1-phenyl-1H-imidazol-2-yl)benzamide;

281) 3-(benzo[d]thiazol-6-yl)-N-(4-(4-(4-(dimethylamino)piperidin-1-yl)-4-oxobutyl)-1-phenyl-1H-imidazol-2-yl)benzamide;

282) 3-(benzo[d]thiazol-5-yl)-N-(4-(4-(4-(dimethylamino)piperidin-1-yl)-4-oxobutyl)-1-phenyl-1H-imidazol-2-yl)benzamide;

283) 3-(benzo[d]thiazol-5-yl)-N-(4-(4-(cyclopropylamino)-4-oxobutyl)-1-phenyl-1H-imidazol-2-yl)benzamide;

284) 3-(benzo[d]thiazol-5-yl)-N-(4-(4-(4-methylpiperazin-1-yl)-4-oxobutyl)-1-phenyl-1H-imidazol-2-yl)benzamide;

285) 3-(benzo[d]thiazol-6-yl)-N-(4-(6-(4-methylpiperazin-1-yl)-6-oxohexyl)-1-phenyl-1H-imidazol-2-yl)benzamide;

286) 3-(benzo[d]thiazol-6-yl)-N-(4-(6-(cyclopropylamino)-6-oxohexyl)-1-phenyl-1H-imidazol-2-yl)benzamide;

287) 3-(benzo[d]thiazol-6-yl)-N-(4-(6-(4-(dimethylamino)piperidin-1-yl)-6-oxohexyl)-1-phenyl-1H-imidazol-2-yl)benzamide;

288) 3-(benzo[d]thiazol-5-yl)-N-(4-(6-(4-methylpiperazin-1-yl)-6-oxohexyl)-1-phenyl-1H-imidazol-2-yl)benzamide;

289) N-(4-(6-(azepan-1-yl)-6-oxohexyl)-1-phenyl-1H-imidazol-2-yl)-3-(benzo[d]thiazol-5-yl)benzamide;

290) 3-(benzo[d]thiazol-5-yl)-N-(4-(6-(cyclopropylamino)-6-oxohexyl)-1-phenyl-1H-imidazol-2-yl)benzamide;

291) 3-(benzo[d]thiazol-5-yl)-N-(4-(6-(4-(dimethylamino)piperidin-1-yl)-6-oxohexyl)-1-phenyl-1H-imidazol-2-yl)benzamide;

292) N-(1-benzyl-4-(3-oxo-3-(phenylamino)propyl)-1H-imidazol-2-yl)-3-(1H-pyrazol-4-yl)benzamide;

293) N-(1-(3-chlorophenyl)-4-(3-oxo-3-(phenylamino)propyl)-1H-imidazol-2-yl)-3-(1H-pyrazol-4-yl)benzamide;

294) N-(1-(3-bromophenyl)-4-(3-oxo-3-(phenylamino)propyl)-1H-imidazol-2-yl)-3-(1H-pyrazol-4-yl)benzamide;

295) N-(1-(cyclohexylmethyl)-4-(3-oxo-3-(phenylamino)propyl)-1H-imidazol-2-yl)-3-(1H-pyrazol-4-yl)benzamide;

296) N-(1-cyclohexyl-4-(4-(methylamino)-4-oxobutyl)-1H-imidazol-2-yl)-3-(1H-pyrazol-4-yl)benzamide;

297) N-(1-(4-fluorophenyl)-4-(4-(methylamino)-4-oxobutyl)-1H-imidazol-2-yl)-3-(1H-pyrazol-4-yl)benzamide;

298) N-(1-(2,4-difluorophenyl)-4-(4-(methylamino)-4-oxobutyl)-1H-imidazol-2-yl)-3-(1H-pyrazol-4-yl)benzamide;

299) N-(1-(4-fluorophenyl)-4-(4-(4-methylpiperazin-1-yl)-4-oxobutyl)-1H-imidazol-2-yl)-3-(1-methyl-1H-pyrazol-4-yl)benzamide;

300) N-(4-(4-(cyclopropylamino)-4-oxobutyl)-1-(4-fluorophenyl)-1H-imidazol-2-yl)-3-(1-methyl-1H-pyrazol-4-yl)benzamide;

301) N-(1-(4-fluorophenyl)-4-(6-(piperidin-1-yl)hexyl)-1H-imidazol-2-yl)-3-(1H-pyrazol-4-yl)benzamide;

302) N-(1-(2,4-difluorophenyl)-4-(6-(piperidin-1-yl)hexyl)-1H-imidazol-2-yl)-3-(1H-pyrazol-4-yl)benzamide; and 303) N-(4-(3-oxo-3-(phenylamino)propyl)-1-(pyridin-4-yl)-1H-imidazol-2-yl)-3-(1H-pyrazol-4-yl)benzamide.

11. A pharmaceutical composition comprising a compound of formula (I), or a pharmaceutically acceptable salt, a prodrug, a solvate or a stereoisomer thereof, according to claim 1, as an active ingredient, and a pharmaceutically acceptable carrier or excipient.

12. A pharmaceutical composition comprising a compound of formula (I), or a pharmaceutically acceptable salt, a prodrug, a solvate or a stereoisomer thereof, according to claim 10, as an active ingredient, and a pharmaceutically acceptable carrier or excipient.

13. A method of treating a disease mediated by interleukin-1 receptor-binding kinase-4 (IRAK4) in a subject in need thereof, which comprises administering a compound of formula (I), or a pharmaceutically acceptable salt, a prodrug, a solvate or a stereoisomer thereof, according to claim 1, to the subject.

14. A method of inhibiting interleukin-1 receptor-binding kinase-4 (IRAK4), which comprises contacting IRAK4 with an effective amount of the compound of formula (I), or a pharmaceutically acceptable salt, a prodrug, a solvate or a stereoisomer thereof, according to claim 1.

15. The method according to claim 13, wherein the disease mediated by IRAK4 is an autoimmune disease or lymphoma.

16. The method according to claim 13, wherein the disease mediated by IRAK4 is selected from the group consisting of atopic dermatitis, alopecia areata, allergy, asthma, conjunctivitis, periodontitis, rhinitis, otitis media, pharyngitis, tonsillitis, pneumonia, gastric ulcer, gastritis, Crohn's disease, colitis, hemorrhoids, gout, ankylosing spondylitis, rheumatic fever, lupus, fibromyalgia, psoriasis, Arthritis, osteoarthritis, rheumatoid arthritis, frozen shoulder, tendinitis, tendonitis, peritonitis, myositis, hepatitis, cystitis, nephritis, Sjogren's syndrome, multiple sclerosis, and activated B cell-like diffuse large B-cell lymphoma.

17. The method according to claim 14, wherein the contacting IRAK4 with a compound of formula (I), or a pharmaceutically acceptable salt, a prodrug, a solvate or a stereoisomer thereof, is performed in vivo in a patient in need of inhibiting IRAK4, wherein the contacting comprises administering the compound the compound of formula (I), or the pharmaceutically acceptable salt, the prodrug, the solvate or the stereoisomer thereof to the patient.

18. The method according to claim 17, wherein the patient is suffering from an autoimmune disease or lymphoma.

19. The method according to claim 17, wherein the patient is suffering from a disorder selected from the group consisting of atopic dermatitis, alopecia areata, allergy, asthma, conjunctivitis, periodontitis, rhinitis, otitis media, pharyngitis, tonsillitis, pneumonia, gastric ulcer, gastritis, Crohn's disease, colitis, hemorrhoids, gout, ankylosing spondylitis, rheumatic fever, lupus, fibromyalgia, psoriasis, Arthritis, osteoarthritis, rheumatoid arthritis, frozen shoulder, tendinitis, tendonitis, peritonitis, myositis, hepatitis, cystitis, nephritis, Sjogren's syndrome, multiple sclerosis, and activated B cell-like diffuse large B-cell lymphoma.

* * * * *